US011824864B2

(12) United States Patent
Padmanabhan et al.

(10) Patent No.: US 11,824,864 B2
(45) Date of Patent: Nov. 21, 2023

(54) SYSTEMS, METHODS, AND APPARATUSES FOR IMPLEMENTING A DECLARATIVE AND METADATA DRIVEN BLOCKCHAIN PLATFORM USING DISTRIBUTED LEDGER TECHNOLOGY (DLT)

(71) Applicant: Salesforce, Inc., San Francisco, CA (US)

(72) Inventors: Prithvi Krishnan Padmanabhan, San Ramon, CA (US); Bertha Ching Wai Lam, San Francisco, CA (US); Brent Fosdick, Fort Collins, CO (US); Sri Naga Deepthi Velisetti, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 843 days.

(21) Appl. No.: 16/399,920

(22) Filed: Apr. 30, 2019

(65) Prior Publication Data
US 2020/0252406 A1 Aug. 6, 2020

Related U.S. Application Data

(63) Continuation-in-part of application No. 16/264,645, filed on Jan. 31, 2019.

(51) Int. Cl.
*G06F 16/907* (2019.01)
*H04L 9/40* (2022.01)
(Continued)

(52) U.S. Cl.
CPC ........ *H04L 63/102* (2013.01); *G06F 16/1824* (2019.01); *G06F 16/1834* (2019.01);
(Continued)

(58) Field of Classification Search
None
See application file for complete search history.

(56) References Cited

U.S. PATENT DOCUMENTS 5,634,053 A 5/1997 Noble et al.
6,333,929 B1 12/2001 Drottar et al.
(Continued)

FOREIGN PATENT DOCUMENTS

CN 108021986 A 5/2018
CN 109173261 A 1/2019
(Continued)

OTHER PUBLICATIONS

"Deloitte IoT Powered by Blockchain", dated May 2017, 20 pages.
(Continued)

*Primary Examiner* — Amy Ng
*Assistant Examiner* — Mellissa M. Ohba
(74) *Attorney, Agent, or Firm* — Polygon IP, LLP

(57) ABSTRACT

Exemplary systems, methods, and apparatuses implement a declarative and metadata driven blockchain platform using Distributed Ledger Technology (DLT) in conjunction with a cloud based computing environment. The exemplary system operates a blockchain interface to the blockchain; receives inputs declaring a new application, network participants for the new application, access rights to the new application, as well as entity types and field definitions for the new application. The system further generates a blockchain asset having encoded therein as the defined metadata for the new application, at least (i) the plurality of network participants declared, (ii) the plurality of entity types declared, and (iii) the one or more new field definitions declared for each of the plurality of entity types; and transacts the blockchain asset having onto the blockchain.

28 Claims, 45 Drawing Sheets

(51) Int. Cl.
    *G06F 16/182*     (2019.01)
    *G06Q 20/38*     (2012.01)
    *H04L 9/06*     (2006.01)
    *H04L 9/00*     (2022.01)

(52) U.S. Cl.
    CPC ......... *G06F 16/907* (2019.01); *G06Q 20/382* (2013.01); *H04L 9/0643* (2013.01); *H04L 9/50* (2022.05)

(56) References Cited

U.S. PATENT DOCUMENTS

| | | |
|---|---|---|
| 7,587,348 B2 | 9/2009 | Liao et al. |
| 7,730,478 B2 | 6/2010 | Weissman |
| 8,095,463 B1 | 1/2012 | Hartmaier |
| 9,027,094 B1 | 5/2015 | Balazs et al. |
| 9,390,154 B1 | 7/2016 | Baird, III |
| 9,529,923 B1 | 12/2016 | Baird, III |
| 9,569,700 B1 | 2/2017 | Santos et al. |
| 9,646,029 B1 | 5/2017 | Baird, III |
| 9,690,822 B2 | 6/2017 | Roy-Faderman |
| 9,875,510 B1 | 1/2018 | Kasper |
| 9,978,067 B1 | 5/2018 | Sadaghiani et al. |
| 9,998,286 B1 | 6/2018 | Ramathal |
| 10,042,636 B1 | 8/2018 | Srivastava et al. |
| 10,102,265 B1 | 10/2018 | Madisetti |
| 10,210,527 B2 | 2/2019 | Radocchia |
| 10,311,250 B2 | 6/2019 | Jagadeesan et al. |
| 10,373,129 B1 | 8/2019 | James et al. |
| 10,425,399 B2 | 9/2019 | Kravitz et al. |
| 10,482,466 B1 | 11/2019 | Walters et al. |
| 10,491,375 B2 | 11/2019 | Maggu |
| 10,505,726 B1 | 12/2019 | Andon et al. |
| 10,521,196 B1* | 12/2019 | Wang ................ G06F 9/45529 |
| 10,521,780 B1 | 12/2019 | Hopkins, III et al. |
| 10,528,551 B2 | 1/2020 | Li |
| 10,541,821 B2 | 1/2020 | Toll et al. |
| 10,628,578 B2 | 4/2020 | Eksten |
| 10,701,054 B2 | 6/2020 | Padmanabhan et al. |
| 10,728,283 B1 | 7/2020 | Dobrek et al. |
| 10,762,079 B2 | 9/2020 | Shi |
| 10,762,506 B1 | 9/2020 | Cash et al. |
| 10,831,935 B2 | 11/2020 | Vijayasankar |
| 10,885,567 B2 | 1/2021 | Bhattacherjee et al. |
| 10,929,866 B1 | 2/2021 | Qi et al. |
| 11,038,771 B2 | 6/2021 | Padmanabhan |
| 11,068,389 B2 | 7/2021 | Gao |
| 11,184,394 B1 | 11/2021 | Dobrek et al. |
| 11,244,313 B2 | 2/2022 | Padmanabhan et al. |
| 11,431,693 B2 | 8/2022 | Padmanabhan |
| 11,431,696 B2 | 8/2022 | Padmanabhan |
| 2005/0102159 A1 | 5/2005 | Mondshine |
| 2006/0118611 A1 | 6/2006 | Michelsen et al. |
| 2006/0259361 A1 | 11/2006 | Barhydt et al. |
| 2008/0066165 A1 | 3/2008 | Rosenoer |
| 2009/0037949 A1 | 2/2009 | Birch |
| 2009/0119299 A1 | 5/2009 | Rhodes |
| 2011/0265069 A1 | 10/2011 | Fee |
| 2011/0276892 A1 | 11/2011 | Jensen-Horne |
| 2011/0289140 A1 | 11/2011 | Pletter et al. |
| 2013/0041934 A1 | 2/2013 | Annamalaisami et al. |
| 2013/0151515 A1 | 6/2013 | Davis |
| 2013/0226682 A1 | 8/2013 | Grossman |
| 2013/0346173 A1 | 12/2013 | Chandoor |
| 2014/0039990 A1 | 2/2014 | Georgi |
| 2014/0278894 A1 | 9/2014 | Toumayan et al. |
| 2014/0279857 A1 | 9/2014 | Bharadwaj |
| 2015/0026061 A1 | 1/2015 | Siegel et al. |
| 2016/0012465 A1 | 1/2016 | Sharp |
| 2016/0027229 A1 | 1/2016 | Spanos et al. |
| 2016/0042383 A1 | 2/2016 | Joshi et al. |
| 2016/0092872 A1 | 3/2016 | Prakash et al. |
| 2016/0148251 A1 | 5/2016 | Thomas et al. |
| 2016/0337400 A1 | 11/2016 | Gupta |
| 2016/0350860 A1 | 12/2016 | Dintenfass et al. |
| 2016/0358267 A1 | 12/2016 | Arjomand et al. |
| 2016/0364743 A1 | 12/2016 | St. Lawrence et al. |
| 2017/0005804 A1 | 1/2017 | Zinder |
| 2017/0046698 A1 | 2/2017 | Haldenby et al. |
| 2017/0085545 A1 | 3/2017 | Lohe et al. |
| 2017/0103167 A1 | 4/2017 | Shah |
| 2017/0103472 A1 | 4/2017 | Shah |
| 2017/0132625 A1 | 5/2017 | Kennedy |
| 2017/0132630 A1 | 5/2017 | Castinado et al. |
| 2017/0140145 A1 | 5/2017 | Shah |
| 2017/0161833 A1 | 6/2017 | Porth |
| 2017/0200157 A1 | 7/2017 | Bergeon et al. |
| 2017/0206603 A1 | 7/2017 | Al-Masoud |
| 2017/0236094 A1 | 8/2017 | Shah |
| 2017/0236215 A1 | 8/2017 | Eisen et al. |
| 2017/0289111 A1 | 10/2017 | Voell et al. |
| 2017/0295021 A1 | 10/2017 | Gutiérrez et al. |
| 2017/0295023 A1 | 10/2017 | Madhavan et al. |
| 2017/0300627 A1* | 10/2017 | Giordano ............ G06F 21/6245 |
| 2017/0300872 A1 | 10/2017 | Brown et al. |
| 2017/0300876 A1 | 10/2017 | Musiala, Jr. et al. |
| 2017/0323392 A1 | 11/2017 | Kasper |
| 2017/0337534 A1 | 11/2017 | Goeringer et al. |
| 2017/0344988 A1 | 11/2017 | Cusden et al. |
| 2017/0353309 A1 | 12/2017 | Gray |
| 2017/0364450 A1* | 12/2017 | Struttmann ............ H04L 63/123 |
| 2017/0364549 A1 | 12/2017 | Abalos |
| 2017/0364698 A1* | 12/2017 | Goldfarb ............ G06F 16/9024 |
| 2017/0364699 A1* | 12/2017 | Goldfarb ............ G06F 16/2282 |
| 2017/0364700 A1* | 12/2017 | Goldfarb ............ H04L 9/3247 |
| 2017/0364701 A1* | 12/2017 | Struttmann ............ G06F 21/78 |
| 2017/0366353 A1* | 12/2017 | Struttmann ............ G06F 21/64 |
| 2017/0372300 A1 | 12/2017 | Dunlevy et al. |
| 2018/0005186 A1 | 1/2018 | Hunn |
| 2018/0006831 A1 | 1/2018 | Toll et al. |
| 2018/0019879 A1 | 1/2018 | Kravitz et al. |
| 2018/0026505 A1 | 1/2018 | Galmiche et al. |
| 2018/0039667 A1 | 2/2018 | Pierce |
| 2018/0041345 A1 | 2/2018 | Maim |
| 2018/0060496 A1 | 3/2018 | Bulleit |
| 2018/0082256 A1 | 3/2018 | Tummuru et al. |
| 2018/0088928 A1 | 3/2018 | Smith et al. |
| 2018/0117446 A1 | 5/2018 | Tran |
| 2018/0117447 A1 | 5/2018 | Tran |
| 2018/0123779 A1 | 5/2018 | Zhang |
| 2018/0139186 A1 | 5/2018 | Castagna |
| 2018/0144042 A1 | 5/2018 | Sheng et al. |
| 2018/0158162 A1 | 6/2018 | Ramasamy |
| 2018/0165416 A1 | 6/2018 | Saxena et al. |
| 2018/0181768 A1 | 6/2018 | Leporini |
| 2018/0189100 A1 | 7/2018 | Nemoto et al. |
| 2018/0191503 A1 | 7/2018 | Alwar et al. |
| 2018/0204111 A1 | 7/2018 | Zadeh |
| 2018/0204213 A1 | 7/2018 | Zappier et al. |
| 2018/0205552 A1* | 7/2018 | Struttmann ............ G06F 21/78 |
| 2018/0218176 A1 | 8/2018 | Voorhees et al. |
| 2018/0225611 A1 | 8/2018 | Daniel et al. |
| 2018/0232644 A1 | 8/2018 | Acharya et al. |
| 2018/0232659 A1 | 8/2018 | Ranatunga et al. |
| 2018/0239897 A1 | 8/2018 | Ventura |
| 2018/0241573 A1 | 8/2018 | Ramathal |
| 2018/0247191 A1 | 8/2018 | Katz et al. |
| 2018/0253661 A1 | 9/2018 | Strauss |
| 2018/0260125 A1 | 9/2018 | Botes |
| 2018/0260212 A1 | 9/2018 | Wisnovsky |
| 2018/0262505 A1 | 9/2018 | Ligatti |
| 2018/0268401 A1 | 9/2018 | Ortiz et al. |
| 2018/0268483 A1 | 9/2018 | Jayaram |
| 2018/0268506 A1 | 9/2018 | Wodetzki et al. |
| 2018/0276553 A1 | 9/2018 | Redkar et al. |
| 2018/0276626 A1 | 9/2018 | Laiben |
| 2018/0285412 A1 | 10/2018 | Zhuang |
| 2018/0285839 A1 | 10/2018 | Yang |
| 2018/0285996 A1 | 10/2018 | Ma |
| 2018/0300382 A1 | 10/2018 | Madisetti |
| 2018/0307857 A1* | 10/2018 | Beecham ............ G06F 16/9024 |
| 2018/0307990 A1 | 10/2018 | Chawla et al. |
| 2018/0311930 A1 | 11/2018 | Sakamoto |
| 2018/0315143 A1 | 11/2018 | Rang |

(56) References Cited

U.S. PATENT DOCUMENTS

| | | |
|---|---|---|
| 2018/0322485 A1 | 11/2018 | Jayaram |
| 2018/0323963 A1 | 11/2018 | Stollman |
| 2018/0336286 A1 | 11/2018 | Shah |
| 2018/0343238 A1 | 11/2018 | Tola |
| 2018/0365686 A1 | 12/2018 | Kondo |
| 2018/0367528 A1 | 12/2018 | Schwarz et al. |
| 2018/0372502 A1 | 12/2018 | Rønnow |
| 2018/0373776 A1 | 12/2018 | Madisetti |
| 2018/0374173 A1 | 12/2018 | Chen |
| 2019/0012249 A1 | 1/2019 | Mercuri et al. |
| 2019/0012595 A1 | 1/2019 | Beser et al. |
| 2019/0019090 A1 | 1/2019 | Chacko et al. |
| 2019/0028276 A1 | 1/2019 | Pierce et al. |
| 2019/0034404 A1 | 1/2019 | Anderson et al. |
| 2019/0035018 A1 | 1/2019 | Nolan et al. |
| 2019/0042619 A1 | 2/2019 | Baird, III |
| 2019/0050855 A1 | 2/2019 | Martino et al. |
| 2019/0052454 A1 | 2/2019 | Wright et al. |
| 2019/0058581 A1 | 2/2019 | Wood |
| 2019/0058709 A1 * | 2/2019 | Kempf .................... G06F 21/64 |
| 2019/0081796 A1 | 3/2019 | Chow et al. |
| 2019/0086988 A1 | 3/2019 | He et al. |
| 2019/0087598 A1 | 3/2019 | Adkins et al. |
| 2019/0087892 A1 | 3/2019 | Pinski et al. |
| 2019/0102409 A1 | 4/2019 | Shi et al. |
| 2019/0102423 A1 | 4/2019 | Little et al. |
| 2019/0108543 A1 | 4/2019 | Chan et al. |
| 2019/0109702 A1 | 4/2019 | Maggu et al. |
| 2019/0109713 A1 * | 4/2019 | Clark .................... H04L 9/3239 |
| 2019/0122186 A1 | 4/2019 | Kano et al. |
| 2019/0123892 A1 | 4/2019 | Basu |
| 2019/0132350 A1 | 5/2019 | Smith |
| 2019/0147532 A1 | 5/2019 | Singh et al. |
| 2019/0149325 A1 | 5/2019 | Garagiola et al. |
| 2019/0149334 A1 | 5/2019 | Velden |
| 2019/0149600 A1 | 5/2019 | Duan |
| 2019/0158270 A1 | 5/2019 | Berti |
| 2019/0164156 A1 | 5/2019 | Lindemann |
| 2019/0164220 A1 | 5/2019 | Raj et al. |
| 2019/0171739 A1 | 6/2019 | Cochrane |
| 2019/0172282 A1 | 6/2019 | Patel |
| 2019/0182047 A1 | 6/2019 | Andreina et al. |
| 2019/0188706 A1 | 6/2019 | McCurtis |
| 2019/0215149 A1 | 7/2019 | Ramasamy et al. |
| 2019/0228006 A1 | 7/2019 | Tormasov et al. |
| 2019/0236559 A1 | 8/2019 | Padmanabhan |
| 2019/0236562 A1 | 8/2019 | Padmanabhan |
| 2019/0236598 A1 | 8/2019 | Padmanabhan |
| 2019/0236606 A1 | 8/2019 | Padmanabhan et al. |
| 2019/0238316 A1 | 8/2019 | Padmanabhan |
| 2019/0238525 A1 | 8/2019 | Padmanabhan et al. |
| 2019/0266601 A1 | 8/2019 | Allen |
| 2019/0268147 A1 | 8/2019 | Baird, III |
| 2019/0287026 A1 | 9/2019 | Calmon et al. |
| 2019/0287116 A1 | 9/2019 | Karantzis |
| 2019/0295114 A1 | 9/2019 | Pavletic et al. |
| 2019/0303121 A1 | 10/2019 | Padmanabhan |
| 2019/0303445 A1 | 10/2019 | Padmanabhan |
| 2019/0303579 A1 | 10/2019 | Reddy et al. |
| 2019/0306235 A1 | 10/2019 | Veale et al. |
| 2019/0334716 A1 | 10/2019 | Kocsis et al. |
| 2019/0370634 A1 | 12/2019 | Moreno et al. |
| 2019/0370866 A1 | 12/2019 | Lawbaugh et al. |
| 2019/0377806 A1 | 12/2019 | Padmanabhan et al. |
| 2019/0385160 A1 | 12/2019 | Safak et al. |
| 2019/0386834 A1 | 12/2019 | Furukawa |
| 2020/0019923 A1 | 1/2020 | Santhar et al. |
| 2020/0027005 A1 | 1/2020 | Harrison et al. |
| 2020/0027090 A1 | 1/2020 | Braundmeier |
| 2020/0034448 A1 | 1/2020 | Sato |
| 2020/0034453 A1 | 1/2020 | Sato |
| 2020/0034469 A1 | 1/2020 | Sato |
| 2020/0042939 A1 | 2/2020 | Padmanabhan |
| 2020/0050613 A1 | 2/2020 | Gauvreau, Jr. |
| 2020/0057860 A1 | 2/2020 | Patil et al. |
| 2020/0074477 A1 | 3/2020 | Lamba et al. |
| 2020/0074515 A1 | 3/2020 | Ghatage et al. |
| 2020/0076574 A1 | 3/2020 | Austin et al. |
| 2020/0089672 A1 | 3/2020 | Velisetti et al. |
| 2020/0089895 A1 | 3/2020 | Gollogly |
| 2020/0104636 A1 | 4/2020 | Halevi et al. |
| 2020/0118011 A1 | 4/2020 | Kaiser et al. |
| 2020/0119906 A1 | 4/2020 | Das |
| 2020/0133955 A1 | 4/2020 | Padmanabhan et al. |
| 2020/0134613 A1 | 4/2020 | Jiang |
| 2020/0134656 A1 | 4/2020 | Padmanabhan |
| 2020/0143267 A1 | 5/2020 | Gidney |
| 2020/0143372 A1 | 5/2020 | Liu |
| 2020/0167512 A1 | 5/2020 | Chitra |
| 2020/0169546 A1 | 5/2020 | Padmanabhan |
| 2020/0186338 A1 | 6/2020 | Andon et al. |
| 2020/0186523 A1 | 6/2020 | Kursun |
| 2020/0234386 A1 | 7/2020 | Blackman et al. |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250661 A1 | 8/2020 | Padmanabhan |
| 2020/0250683 A1 | 8/2020 | Padmanabhan et al. |
| 2020/0250747 A1 | 8/2020 | Padmanabhan |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0336475 A1 | 10/2020 | Padmanabhan et al. |
| 2020/0344132 A1 | 10/2020 | Padmanabhan |
| 2020/0357084 A1 | 11/2020 | Hunn et al. |
| 2021/0004774 A1 | 1/2021 | Ramgopal |
| 2021/0152535 A1 | 5/2021 | Padmanabhan et al. |
| 2021/0152536 A1 | 5/2021 | Padmanabhan et al. |
| 2021/0166231 A1 | 6/2021 | Han |
| 2021/0182423 A1 | 6/2021 | Padmanabhan |
| 2021/0226774 A1 | 7/2021 | Padmanabhan |
| 2021/0243193 A1 | 8/2021 | Padmanabhan |
| 2022/0006705 A1 | 1/2022 | Padmanabhan |

FOREIGN PATENT DOCUMENTS

| | | |
|---|---|---|
| CN | 2019800219289 | 9/2020 |
| EP | 197071681 | 8/2020 |
| JP | 2020541893 | 7/2020 |
| WO | 2016161073 A1 | 10/2016 |
| WO | 2018007827 A1 | 1/2018 |
| WO | 2018007828 A2 | 1/2018 |
| WO | 2018194707 A1 | 10/2018 |
| WO | 2018230581 A1 | 12/2018 |
| WO | 2019152750 A1 | 8/2019 |
| WO | 2020160109 A1 | 8/2020 |

OTHER PUBLICATIONS

"How Creating Digital Twins In Blockchain Will Protect Brands?", dated Nov. 15, 2018, 4 pages.

"How Smart Certificates of Authenticity Improve Asset Management", Jan. 17, 2019, 4 pages.

"Nasdaq, Using Blockchain Track Assets Proof Ownership", dated Nov. 30, 2016, 30 pages.

Final Office Action for U.S. Appl. No. 15/885,803, dated Jul. 20, 2020, 29 pages.

Final Office Action for U.S. Appl. No. 15/885,811, dated Aug. 5, 2020, 45 pages.

Final Office Action for U.S. Appl. No. 15/932,092 dated Jun. 22, 2020, 42 pages.

Final Office Action for U.S. Appl. No. 15/932,099 dated Jun. 1, 2020, 26 pages.

International Search Report and Written Opinion for Application No. PCT/US2020/01561B dated May 11, 2020, 13 pages.

Notice of allowance for U.S. Appl. No. 16/264,653 dated Nov. 23, 2020, 16 pages.

Office Action for U.S. Appl. No. 16/177,305 dated Jul. 23, 2020, 41 pages.

Office Action for U.S. Appl. No. 16/264,657, dated Sep. 18, 2020, 33 pages.

(56) References Cited

OTHER PUBLICATIONS

Office Action for U.S. Appl. No. 16/683,945 dated Sep. 14, 2020, 26 Pages.
Office Action for U.S. Appl. No. 15/932,099 dated Oct. 3, 2019, 26 pages.
Office Action for EP Application No. 19707168.1 dated Sep. 24, 2020, 3 pages.
"BigchainDB 2.0 The Blockchain Database," Berlin Germany dated May 2018, 14 pages.
Azaria, A., et al "MedRec: Using Blockchain for Medical Data Access and Permission Management," 2016 2nd Int'l Conference on Open and Big Data, IEEE, (Aug. 22, 2016), pp. 25-30.
Genestier, P., et al, "Blockchain for Consent Management in the eHealth Environment A Nugget for Privacy and Security Challenges," Journal of the Int'l Society for Telemedicine and eHealth, (Jan. 1, 2017), 4 pages.
International Search Report and Written Opinion for Application No. PCT/US2019/036103, dated Aug. 1, 2019, 12 pages.
International Search Report and Written Opinion for International Patent Application No. PCT/US2019/016199, dated Apr. 2, 2019, 12 pages.
McConaghy et al., "BigchainDB: A Scalable Blockchain Database (Draft)" dated Jun. 8, 2016.
Notice of Allowance for U.S. Appl. No. 15/940,646, dated Oct. 31, 2019, 8 pages.
Office Action for U.S. Appl. No. 15/885,803 dated Jan. 8, 2020, 47 pages.
Office Action for U.S. Appl. No. 15/885,811 dated Jan. 17, 2020, 40 pages.
Office Action for U.S. Appl. No. 15/932,092 dated Jan. 22, 2020, 36 pages.
Office Action for U.S. Appl. No. 15/932,100, dated Nov. 8, 2019, 9 pages.
Office Action for U.S. Appl. No. 15/940,646, dated Apr. 29, 2019, 7 pages.
Ojha, "Chaincode for Go Developers, Part 1: Writing Blockchain Chaincode in Go for Hyperledger Fabric v0.6," 2017, 15 pages.
Peterson, K., et al, "A Blockchain-Based Approach to Health Information Exchange Networks," (Aug. 8, 2016), Retrieved from the Internet: URL: http://kddlab.zjgsu.edu.cn:7200/research/blockchain/huyiyang-reference/A%20Blockchain-Based%20Approach%20to%20Health%20Information%20Exchange.pdf, Retrieved on Mar. 21, 2019), 10 pages.
Salesforce, "Force.com Apex Code Developer's Guide," version 34.0, 2015, 1000 pages.
Sandgaard, J., et al, "MedChain White Paper V1.1," (Oct. 1, 2017), Retrieved from the Internet: URL:https://www.medchain.global/doc/Medchain%20Whitepaper%20v1.1.pdf, Retrieved on Mar. 21, 2019, 54 pages.
Using Sawtooth with Docker: Configuring the List of Transaction Families, Apr. 6, 2018, 13 pages.
Wikipedia, "Federate database system," Jun. 8, 2016, https://en.wikipedia.org/w/index.php/?title=Federated%20database%20system&oldid=808166410, 6 pages.
Wikipedia, "Solidity," Feb. 2, 2017, https://web.archive.org/web/2017020202304/https://en.wikipeida.org/wiki/Solidity (Year: 2017), 3 pages.
Zyskind, G., et al, "Decentralizing Privacy: Using Blockchain to Protect Personal Data," 2015 IEEE Security and Privacy Workshops (May 1, 2015), 5 pages.
U.S. Appl. No. 17/153,872, filed Jan. 20, 2021, Prithvi Krishnan Padmanabhan, Entire Document.
U.S. Appl. No. 17/163,547, filed Jan. 31, 2021, Prithvi Krishnan Padmanabhan, Entire Document.
U.S. Appl. No. 17/348,286, filed Jun. 15, 2021, Prithvi Krishnan Padmanabhan, Entire Document.
Bendor-Samuel, P. (2017) Blockchain-enabled "smart-contracts" solve problems in administering IT ecosystem services, CIO, 3 pages.
Final Office Action for U.S. Appl. No. 15/932,099 dated Jun. 1, 2020, 27 pages.
Final Office Action for U.S. Appl. No. 16/177,305 dated Feb. 2, 2021, 47 pages.
Final Office Action for U.S. Appl. No. 16/264,657 dated May 17, 2021, 36 pages.
Non-final Office Action for U.S. Appl. No. 16/177,305 dated Jul. 23, 2020, 52 pages.
Normans Media Ltd., Smart Contracts: Blockchain-based contracts that don't require lawyers. 2016, 4 pages.
Notice of Allowance for U.S. Appl. No. 16/264,653 dated Jun. 7, 2021, 21 pages.
Notice of Allowance for U.S. Appl. No. 16/683,945, dated Feb. 10, 2021, 14 pages.
Office Action for U.S. Appl. No. 15/885,803, dated Apr. 14, 2021, 31 pages.
Office Action for U.S. Appl. No. 15/932,092 dated Mar. 17, 2021, 23 pages.
Office Action for U.S. Appl. No. 16/177,300 dated Jun. 16, 2021, 80 pages.
Office Action for U.S. Appl. No. 16/683,945, dated Sep. 14, 2020, 18 pages.
Shukla, A., et al., "Smart Contracts for Multiagent Plan Execution in Untrusted Cyber-physical Systems," 2018 IEEE 25th International Conference on High Performance Computing Workshops (HiPCW), 10 pages.
Final Office Action for U.S. Appl. No. 15/885,803 dated Nov. 17, 2021, 28 pages.
Final Office Action for U.S. Appl. No. 15/885,811, dated Feb. 3, 2022, 38 pages.
Final Office Action for U.S. Appl. No. 15/932,092 dated Sep. 27, 2021, 25 pages.
Final Office Action for U.S. Appl. No. 15/932,099 dated Nov. 1, 2021, 35 pages.
Mandal, S., "A Framework for Modular Norm Extraction, Modeling, and Reasoning," [Doctoral dissertation, University of Nebraska], 2017, 151 pages, ProQuest Dissertations Publishing.
Non-final Office Action for U.S. Appl. No. 16/777,409 dated Oct. 4, 2021, 42 pages.
Non-final Office Action for U.S. Appl. No. 16/917,506, dated Oct. 4, 2021, 44 pages.
Norta, A. et al., "Self-Aware Agent Supported Contract Management on Blockchains for Legal Accountability," 2017, 37 pages.
Notice of Allowance for U.S. Appl. No. 16/177,300, dated Oct. 6, 2021, 14 pages.
Notice of Allowance for U.S. Appl. No. 16/264,653 dated Sep. 29, 2021, 17 pages.
Notice of Allowance for U.S. Appl. No. 16/683,932 dated Dec. 3, 2021, 9 pages.
Office Action for U.S. Appl. No. 15/885,811 dated Aug. 4, 2021, 26 pages.
Office Action for U.S. Appl. No. 16/177,305 dated Sep. 16, 2021, 42 pages.
Office Action for U.S. Appl. No. 16/264,645 dated Oct. 27, 2021, 46 pages.
Office Action for U.S. Appl. No. 16/399,913, dated Dec. 24, 2021, 51 pages.
Abdellatif et al. Formal verification of smart contracts based on users and blockchain behavior models. Conference Paper | Feb. 2018. DOI: 10.1109/NTMS.2018.8328737. Retrieved via Research Gate on [Sep. 13, 2022]. (Year: 2018).
Alessi etal., "Make users own their data: a decentralized personal data store prototype based on Ethereum and IPFS;" 2018 3rd International Conference on Smart and Sustainable Technologies (SpliTech) (Year: 2018).
Cai et al., "BCSolid: A Blockchain-Based Decentralized Data Storage and Authentication Scheme for Solid;" Springer Nature Singapore Pte Ltd. 2020, Z. Zheng etal. (Eds.): BlockSys 2019, CCIS 1156, pp. 676-689, 2020. (Year: 2020).
Duan et al. Formal Modeling and Verification of Blockchain System. ICCMS 2018, Jan. 8-10, 2018, Sydney, Australia © 2018

(56) References Cited

OTHER PUBLICATIONS

Association for Computing Machinery. ACM ISBN 978-1-4503-6339-6/18/01. https://doi.org/10.1145/3177457.3177485. (Year: 2018).

Hu, Y.C. et si, "Analyzing smart contract interactions and contract level state consensus," Concurrency and Compulation: Practice and Experience 32, 202G, 17 pages.

Jackson, "Understanding the Implication of Blockchain Technology on the Audit Profession;" 2018, Honors Undergraduate Theses; 421; https://stars.library.ucf.edu/honorstheses/421 (Year: 2018).

Kalra. S. et al, "ZEUS: Analyzing Safety of Smart Contracts," In Ndss Feb. 18, 2018, pp. 1-12.

Mao et al. Visual and User-Defined Smart Contract Designing System Based on Automatic Coding. © 2019 IEEE Access. vol. 7, 2019. DOI: 10.1109/ACCESS.2019.2920776. 13 pages (Year: 2019).

Non-final Office Action for U.S. Appl. No. 16/399,920, dated Feb. 17, 2022, 66 pages.

Notice of Allowance for U.S. Appl. No. 15/932,100 dated Feb. 20, 2020, 5 pages.

Office Action (Final Rejection) dated May 15, 2023 for U.S. Appl. No. 16/777,141 (pp. 1-35).

Office Action (Non-Final Rejection) dated May 25, 2023 for U.S. Appl. No. 16/399,913 (pp. 1-23).

Office Action (Notice of Allowance and Fees Due (PTOL-85)) dated May 26, 2023 for U.S. Appl. No. 16/777,073 (pp. 1-11).

Salah, K. et al., "Blockchain for AI: Review and Open Research Challenges," IEEE, vol. 7, 2019, 23 pages.

\* cited by examiner

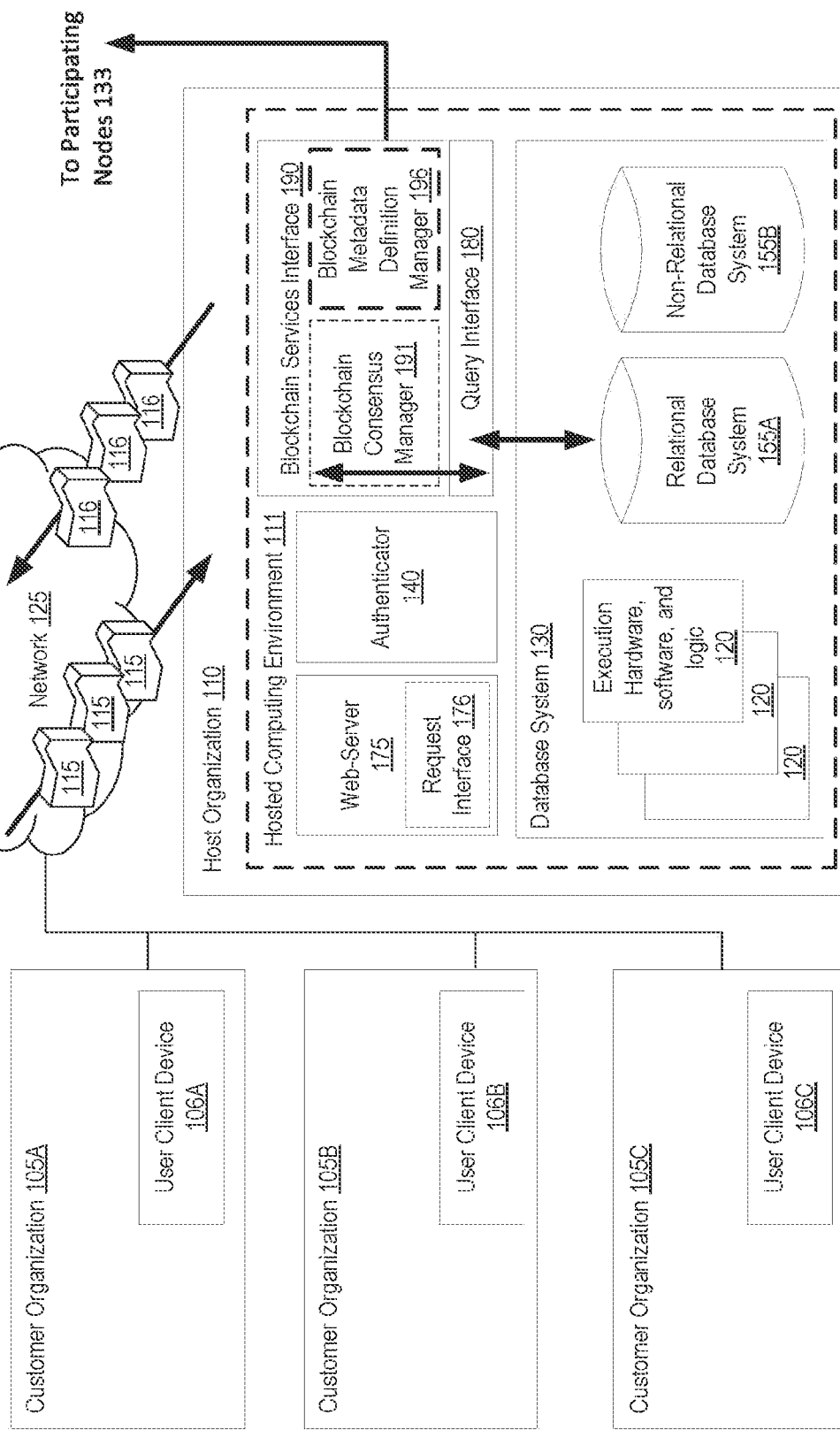

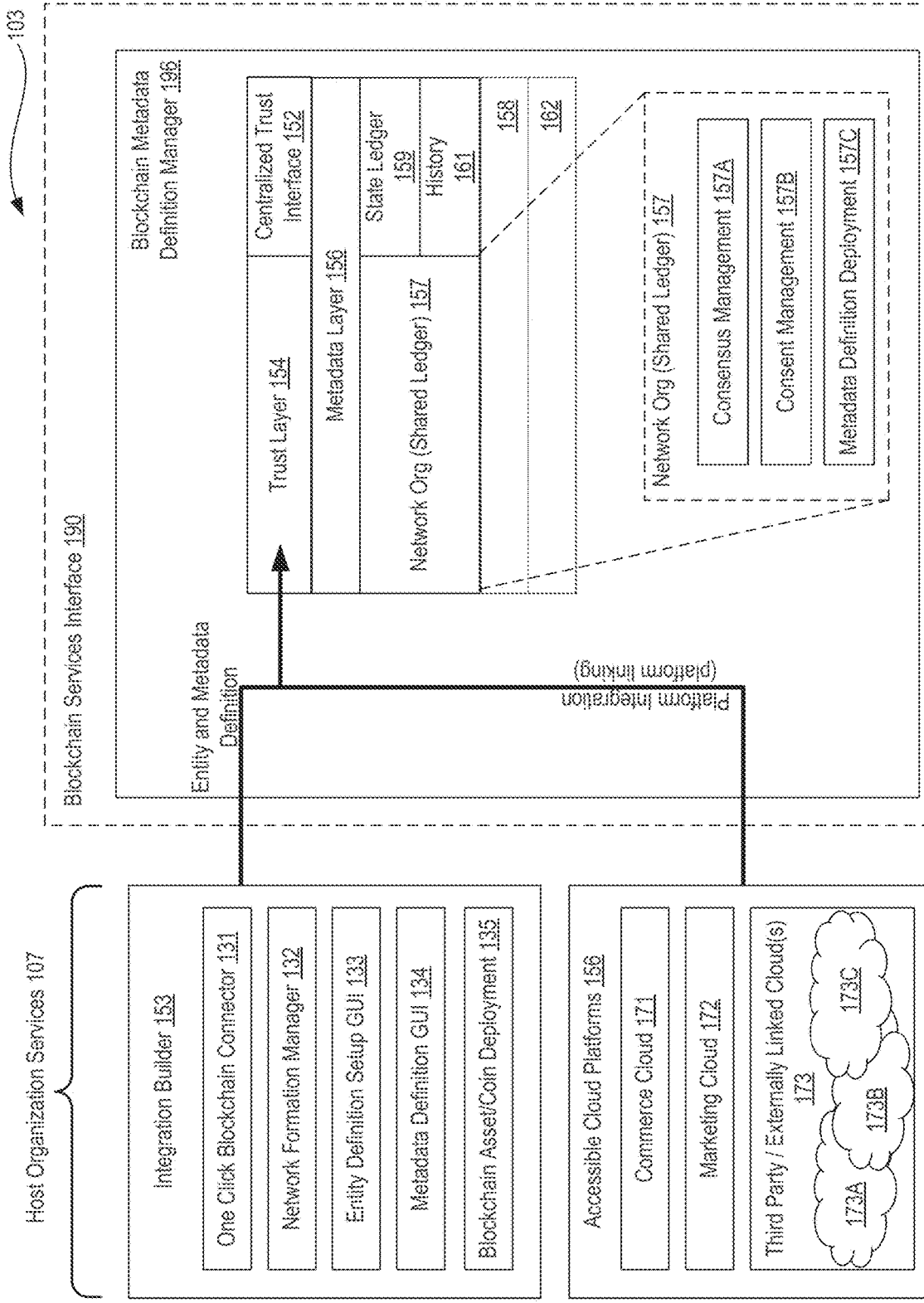

FIG. 3B
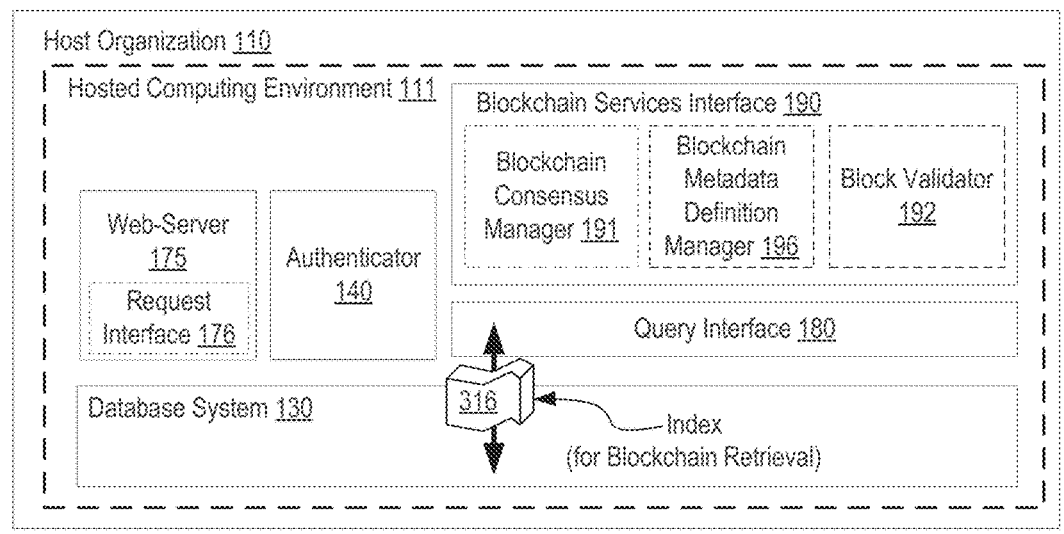
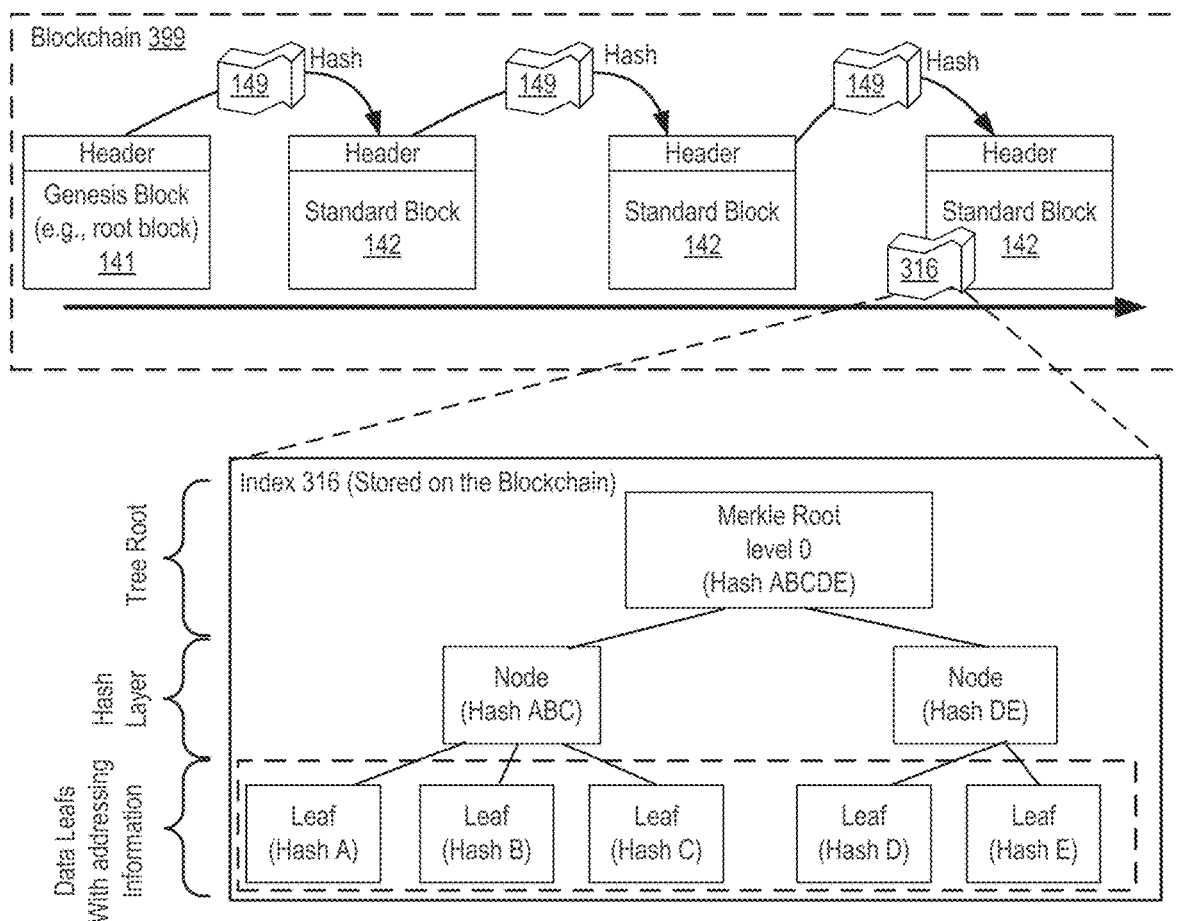

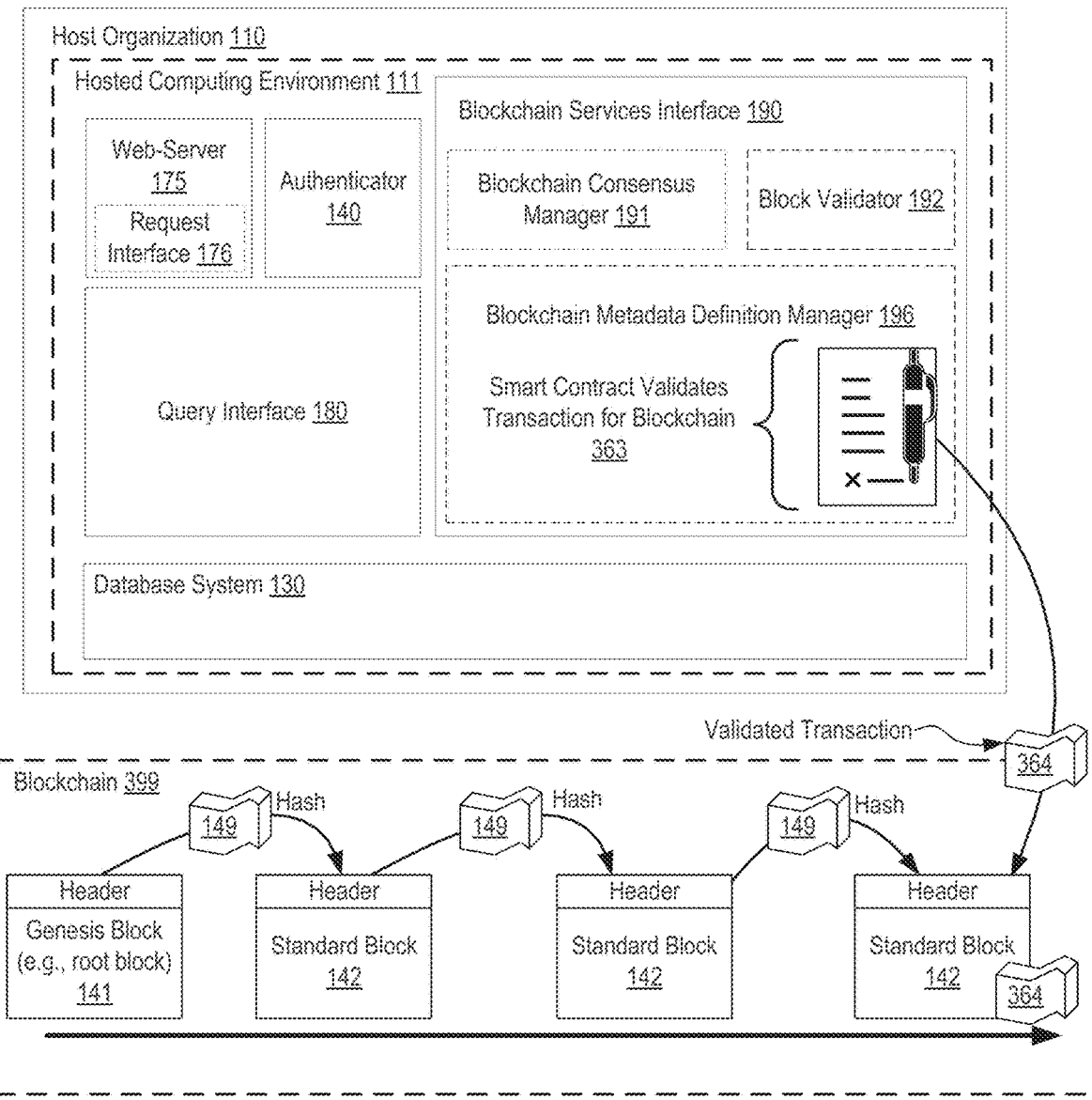

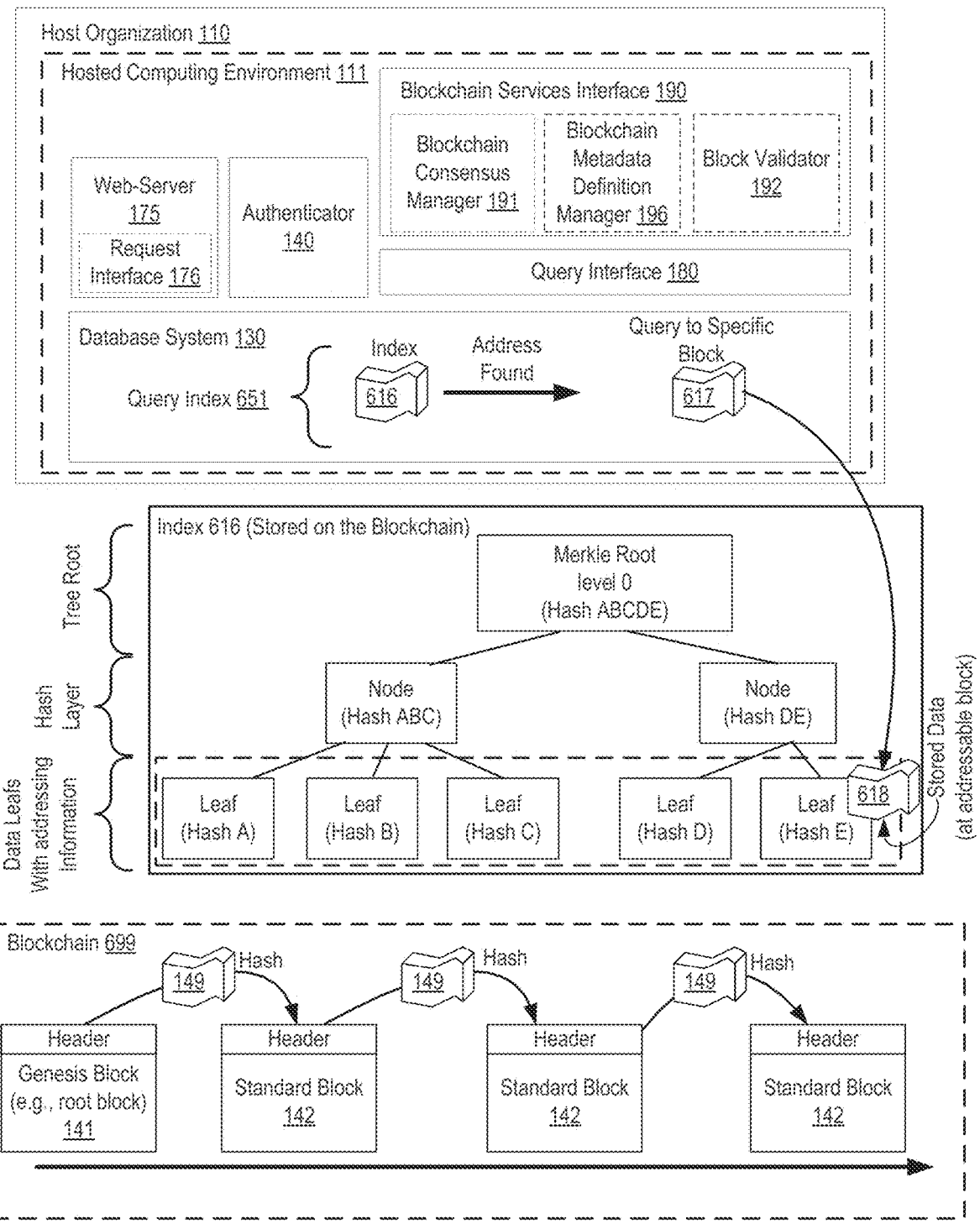

FIG. 8G

807 → Generated Code  
Graphical User Interface (GUI) 810

```
// ═══════════════════════════

47.         {
48.                 "field_name": "created_by",
49.                 "is_system_field":  true
50.         },
51.         {
52.                 "required":  true,
53.                 "field_label": "Type",
54.                 "field_type":  "TEXT",
55.                 "field_name":  "type",
56.                 "is_system_field":  true
57.         }
58.       ],
59.   {
60.     "entity_label": "Issuer",          ⎫
61.     "entity_name": "issuer",           ⎬ "Issuer"
62.     "allowed_operations": {            ⎭ entity defined
63.          "allow_update":  true
64.                    }
65.   },
66.   {
67.     "field_definitions": [
68.       {
69.          "required":  true,
70.       }
71.     ]
72.   }
```

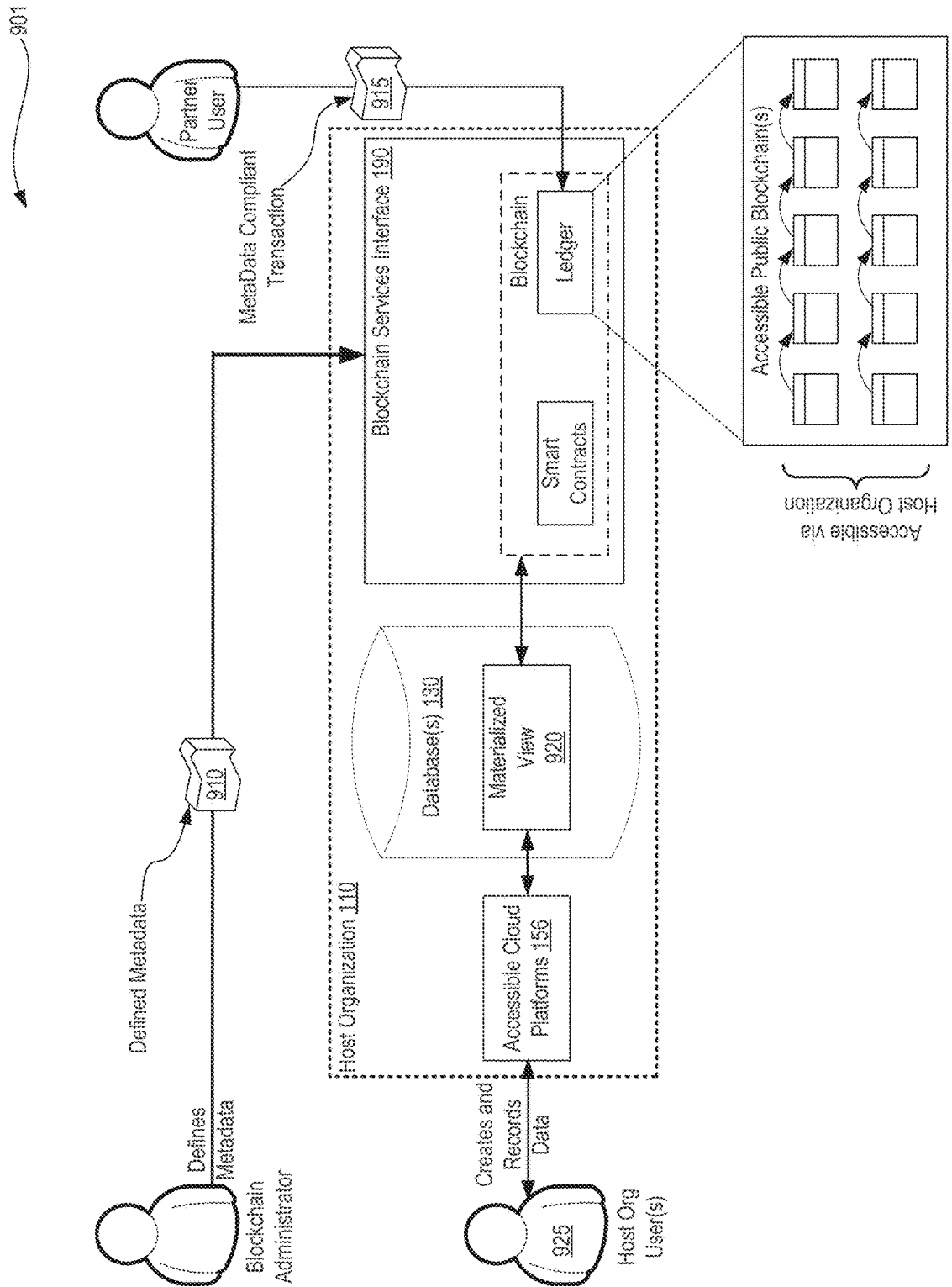

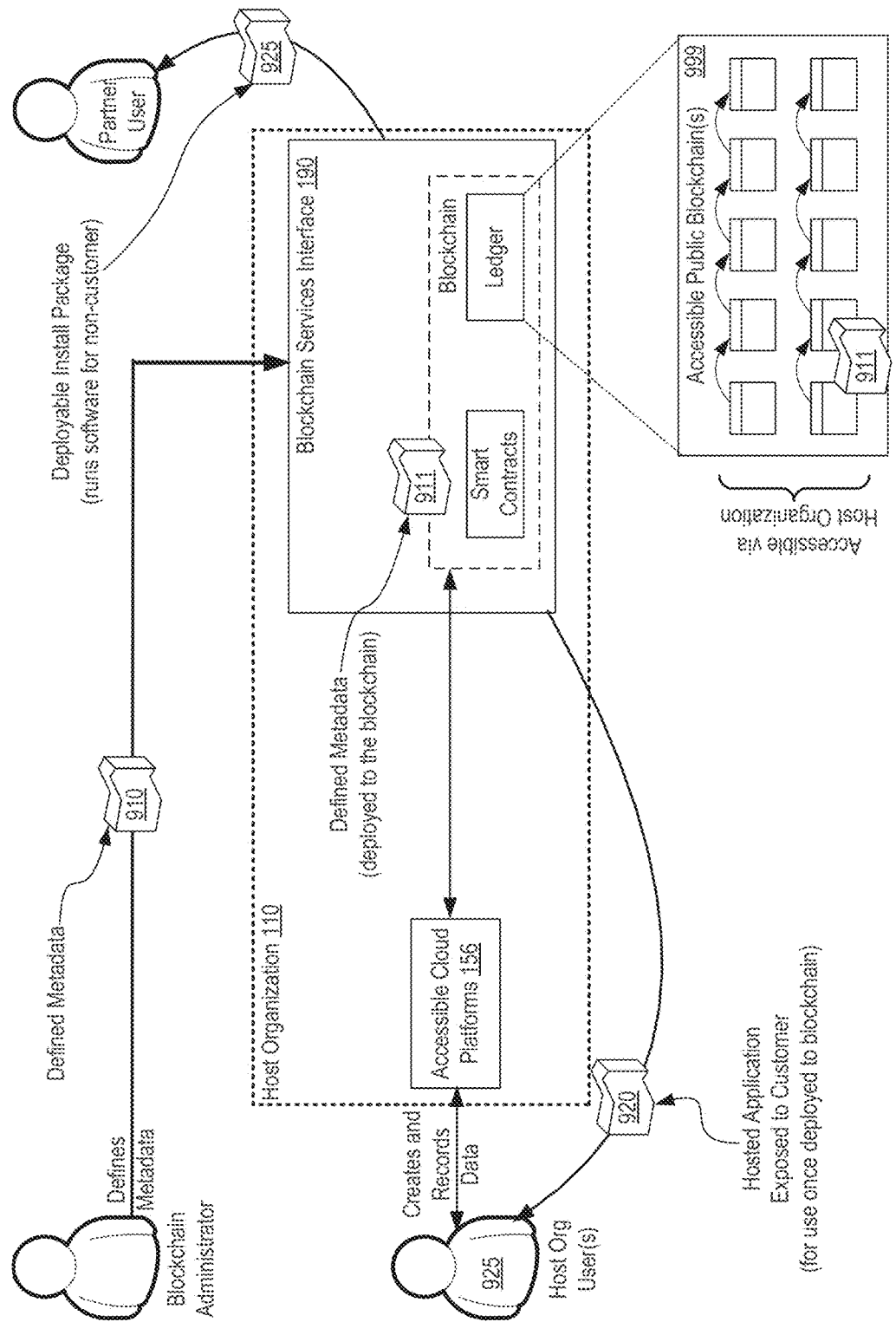

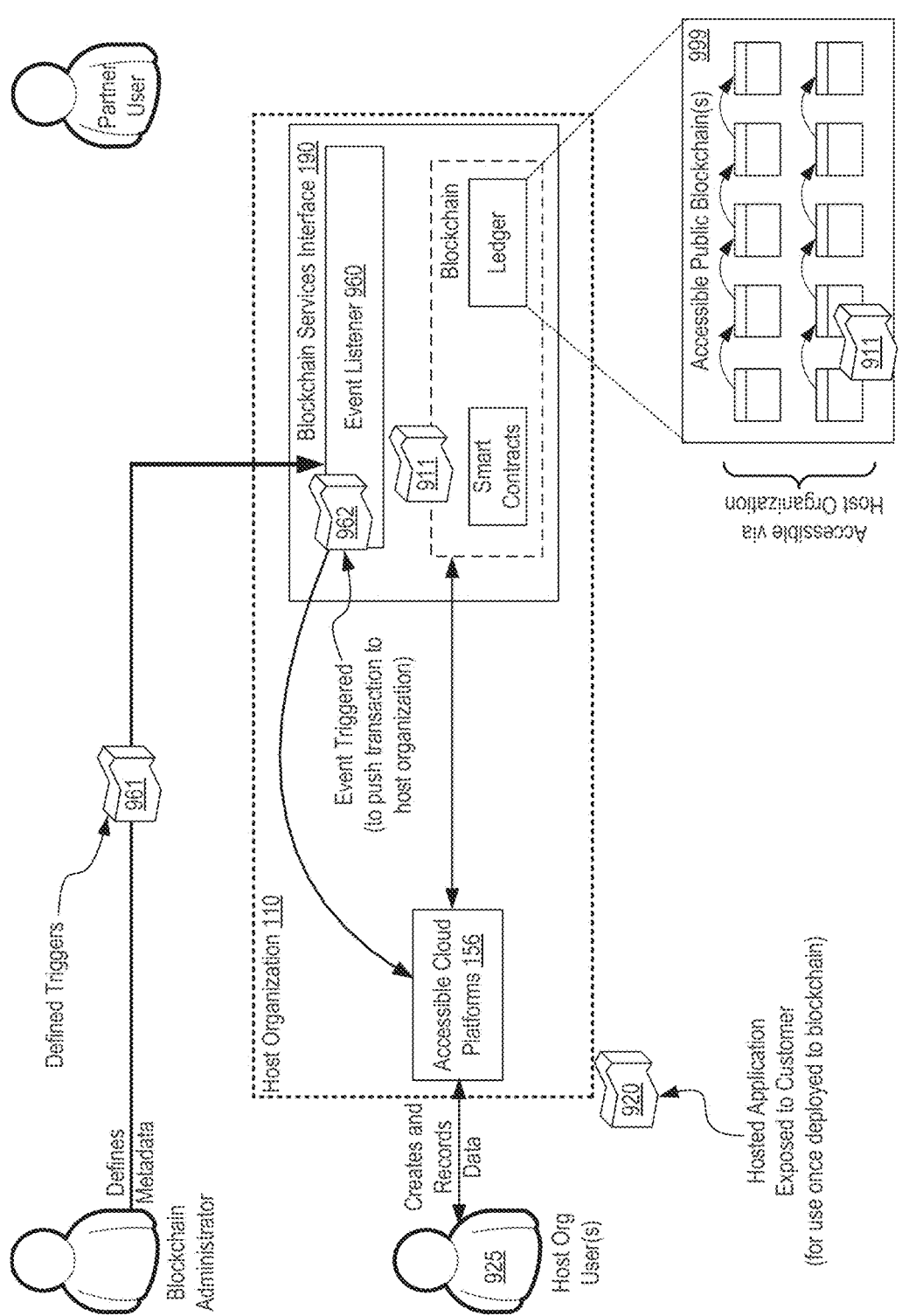

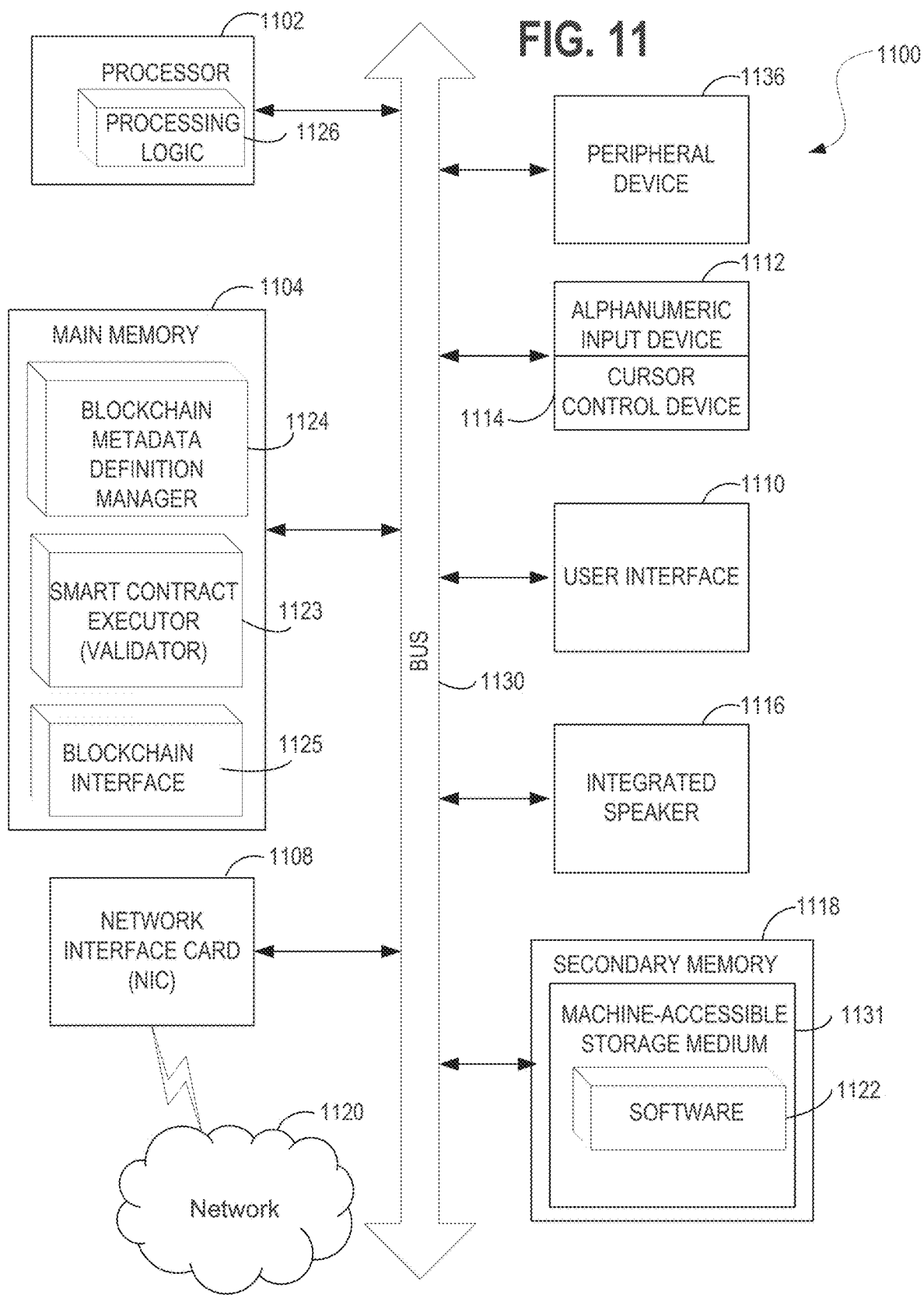

1402

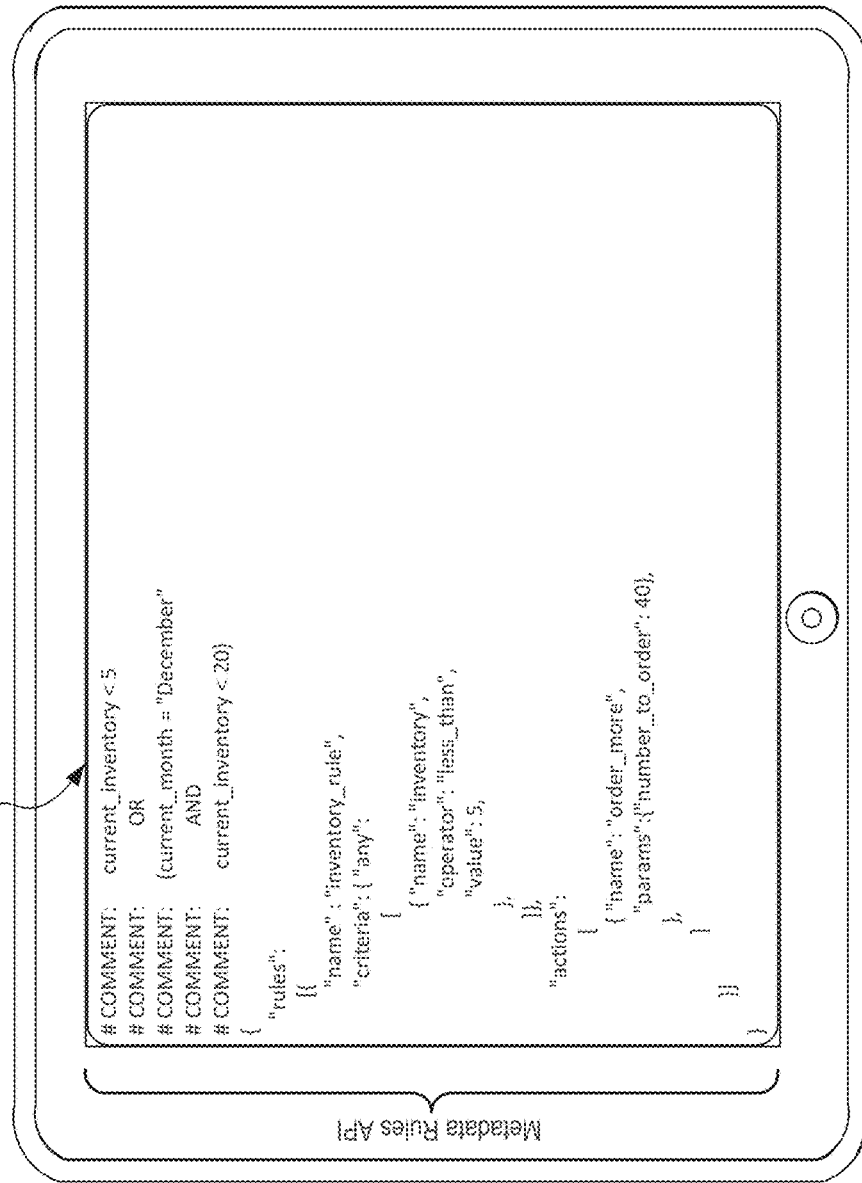
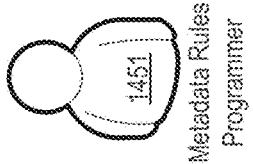

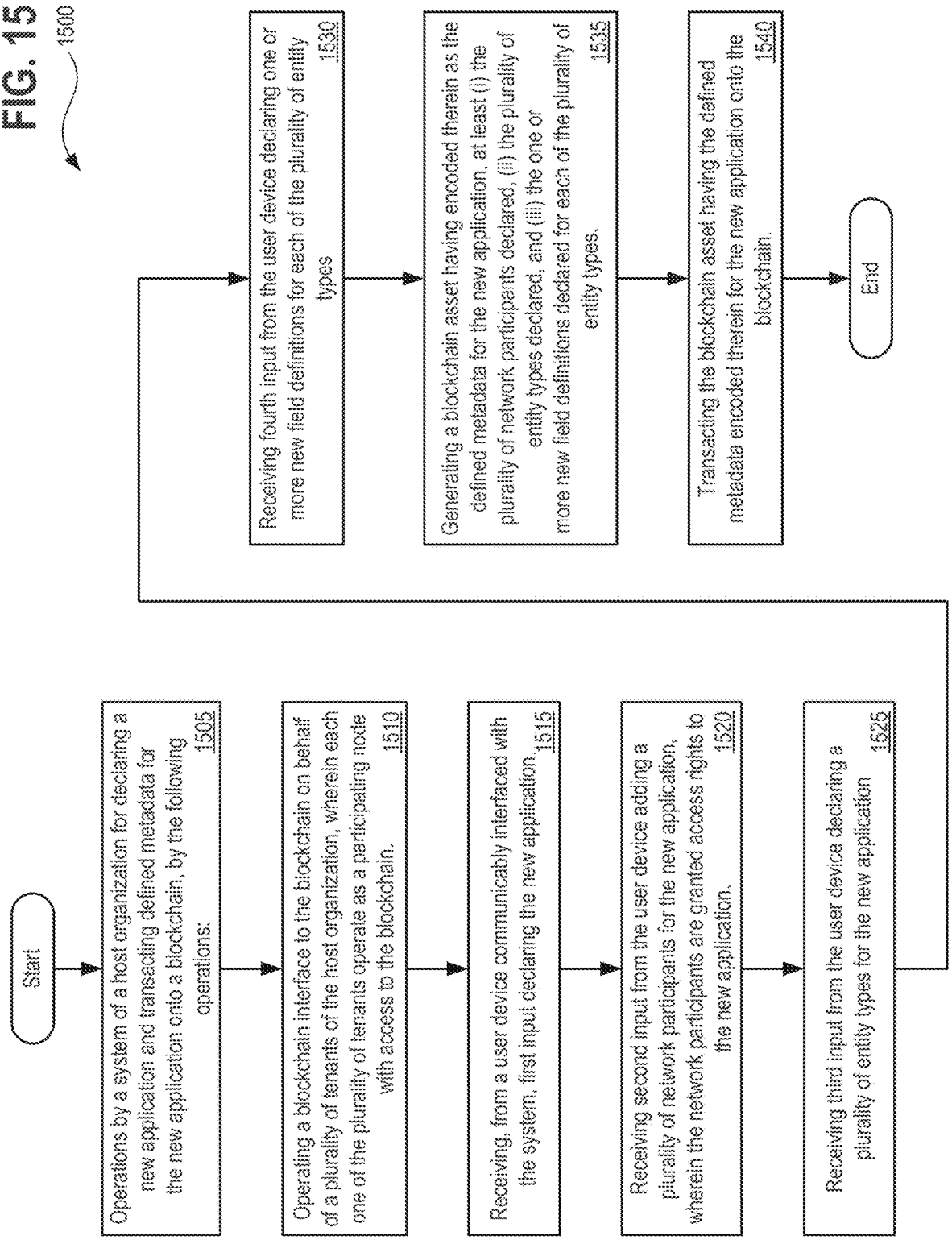

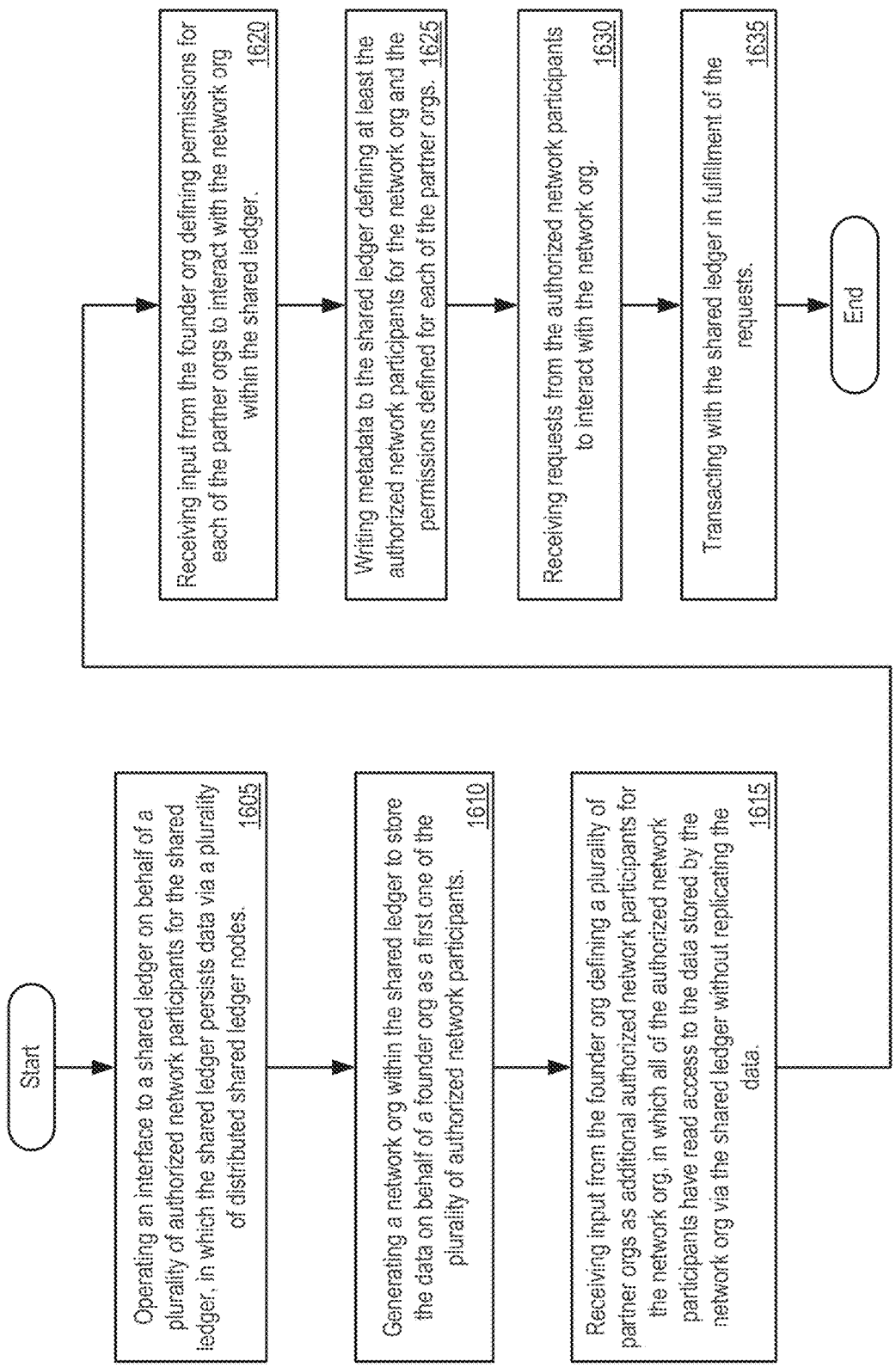

SYSTEMS, METHODS, AND APPARATUSES FOR IMPLEMENTING A DECLARATIVE AND METADATA DRIVEN BLOCKCHAIN PLATFORM USING DISTRIBUTED LEDGER TECHNOLOGY (DLT)

CLAIM OF PRIORITY

This United States Continuation In Part (CIP) patent application is related to, and claims priority to, the non-provisional U.S. Utility patent application entitled "SYSTEMS, METHODS, AND APPARATUSES FOR IMPLEMENTING EFFICIENT STORAGE AND VALIDATION OF DATA AND METADATA WITHIN A BLOCKCHAIN USING DISTRIBUTED LEDGER TECHNOLOGY (DLT)," filed Jan. 31, 2019, having an application Ser. No. 16/264,645, the entire contents of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology and blockchain platforms. More particularly, disclosed embodiments relate to systems, methods, and apparatuses for implementing a declarative and metadata driven blockchain platform using Distributed Ledger Technology (DLT) in conjunction with a cloud based computing environment.

BACKGROUND

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

In modern financial systems, assets such as currencies, or securities, are typically held and traded electronically. Transferring assets often requires point-to-point interaction between multiple intermediaries, and reconciliation of duplicated ledgers. This system has some disadvantages, such as the time required for settlement of asset transfers or payments, which often takes days. Moreover, transfers often involve fee payments to multiple intermediaries, and reconciliation involves expensive overhead. Further still, it may be difficult to determine the status of a pending transfer or the current owner of an asset. Other potential problems include transfers that fail to complete, leading to uncertainty within such a system. Still further, such systems are very often restricted insomuch that it is difficult or infeasible to make one transfer conditional on another. Lastly, the complexity of such systems makes it difficult to prevent fraud or theft, and, whether transactions are reversible depends on the transfer mechanism, rather than the business requirements of the transacting party.

Many of these problems are fixable if asset ownership were to be recorded on a single shared ledger. However, a combination of practical and technological constraints have made such ledgers difficult to adopt. Such a shared ledger tends to require trust in a single party. That party needs to have the computational capacity and bandwidth to process every transaction in real time. Additionally, to address the disadvantages discussed above, the ledger needs to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and the platform provides only limited support for custom programs that determine asset movement, sometimes called smart contracts, without any mechanism by which to customize the underlying functions or the associated smart contracts.

Distributed Ledger Technology (DLT) helps to address and overcome many of these types of shortcomings of conventional financial systems, however, the technology may nevertheless be expanded to introduce even further benefits to those utilizing such DLT and related blockchain platforms.

Ethereum, introduced in 2015, generalizes the concept of a blockchain to a fully programmable state replication mechanism. While it includes a much more powerful programming language, the Ethereum platform nevertheless presents its own unique challenges for scalability and efficiency, such as the inability to handle high-frequency updates and data streams (such as those generated by Internet of Things devices (IoT devices) or the ability to index location information for assets and stored records persistently stored to the blockchain platform.

Unfortunately, presently available Distributed Ledger Technology (DLT) and blockchains utilizing such DLT technologies store data in a fixed, immutable, and static manner. Thus, once you write the data into the blockchain, it is fixed there, wholly absent of context, metadata, or any other information which describes the stored data, describes the shape of the data, describes the type of the data, etc. Consequently, it may prove extremely difficult to transform data retrieved from the blockchain back into a format which is acceptable for the business objectives due to the lack of context of other metadata describing that stored data.

Further still, presently available Distributed Ledger Technology (DLT) and blockchains utilizing such DLT technologies permit various entities to write information into the blockchain in a non-standardized manner, which results in the possibility that identical data is not only saved multiple times, but persisted onto the blockchain utilizing different formats, different data structures, and different data types, resulting in wasted storage space and inefficient use of available computational resources. More problematically, the saving of identical data in non-standardized formats and structures results in a problem of non-transferability of such data between entities and non-transferability of such data amongst various applications, due to the simple fact that the non-standardized data cannot be understood by non-originating entities and applications.

The present state of the art may therefore benefit from the systems, methods, and apparatuses for improving upon, modifying, and expanding upon blockchain and related distributed ledger technologies by providing means for implementing a declarative and metadata driven blockchain platform using Distributed Ledger Technology (DLT) in conjunction with a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1A depicts an exemplary architecture in accordance with described embodiments;

FIG. 1D depicts another exemplary architecture, which depicts the integration of host organization services with the blockchain services interface in greater detail, in accordance with described embodiments;

FIG. 3B depicts another exemplary architecture in accordance with described embodiments;

FIG. 3D depicts another exemplary architecture in accordance with described embodiments;

FIG. 6A depicts another exemplary architecture for retrieving stored records from addressable blocks using an indexing scheme, in accordance with described embodiments;

FIGS. 8F and 8G depict another exemplary architecture in accordance with described embodiments;

FIG. 9A depicts another exemplary architecture in accordance with described embodiments;

FIG. 9B depicts another exemplary architecture in accordance with described embodiments;

FIG. 9C depicts another exemplary architecture in accordance with described embodiments;

FIG. 11 illustrates a diagrammatic representation of a machine in the exemplary form of a computer system, in accordance with one embodiments;

FIG. 14C depicts another exemplary architecture in accordance with described embodiments;

FIG. 15 depicts a flow diagram illustrating a method for implementing a declarative and metadata driven blockchain platform using Distributed Ledger Technology (DLT) in conjunction with a cloud based computing environment, in accordance with described embodiments; and FIG. 16 depicts a flow diagram illustrating a method for implementing a declarative, metadata driven, cryptographically verifiable multi-network (multi-tenant) shared ledger in conjunction with a cloud based computing environment, in accordance with described embodiments.

DETAILED DESCRIPTION

Figure 1B:
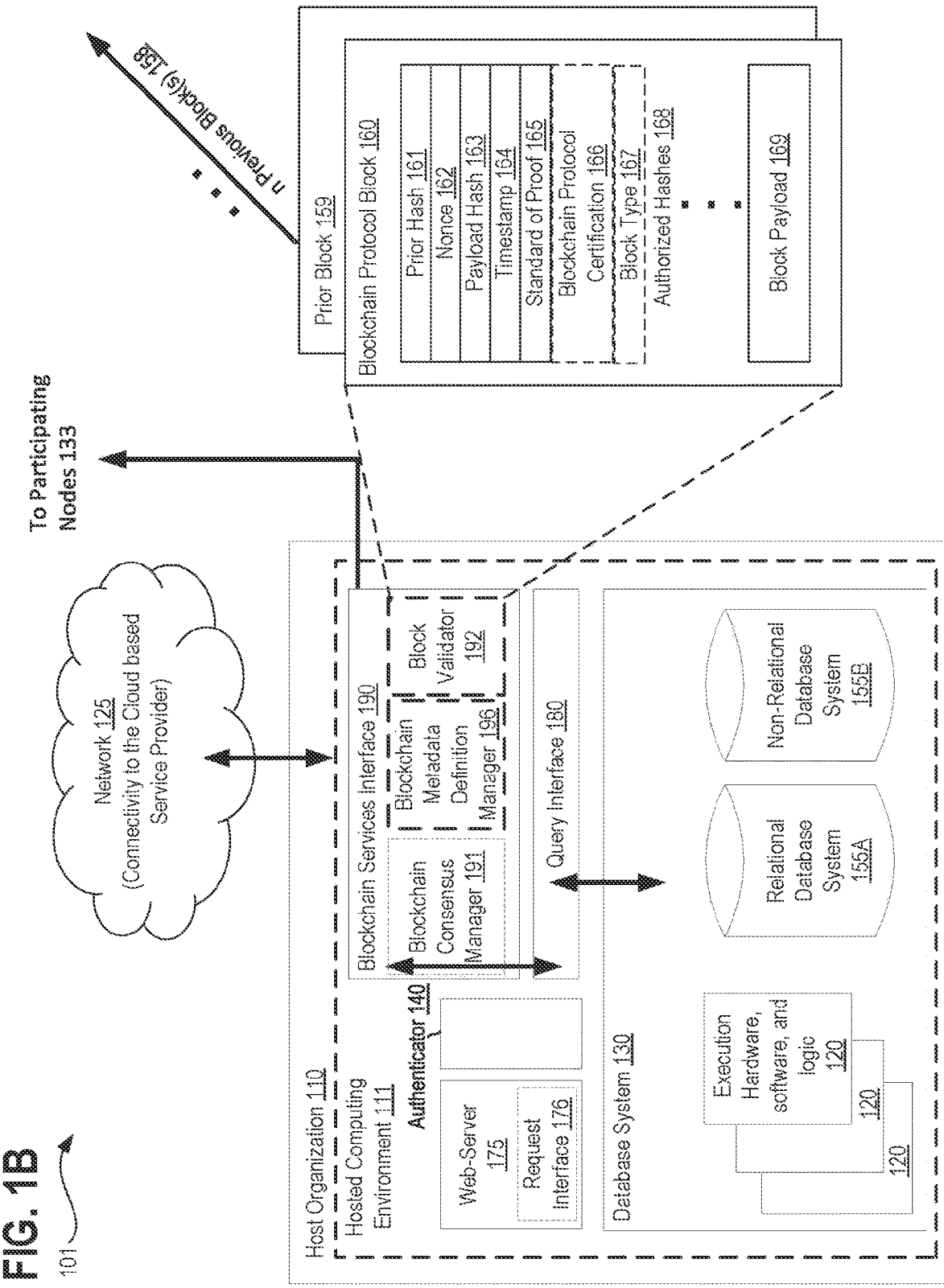
FIG. 1B depicts another exemplary architecture, with additional detail of a blockchain protocol block operating in conjunction with a block validator, in accordance with described embodiments.

Described herein are systems, methods, and apparatuses for implementing a declarative and metadata driven blockchain platform using Distributed Ledger Technology (DLT) in conjunction with a cloud based computing environment.

For instance, according to a particular embodiment, there is a system having at least a processor and a memory therein, in which the system includes means for operating a blockchain interface to the blockchain on behalf of a plurality of tenants of the host organization, in which each one of the plurality of tenants operate as a participating node with access to the blockchain; receiving, from a user device communicably interfaced with the system, first input declaring the new application; receiving second input from the user device adding a plurality of network participants for the new application, in which the network participants are granted access rights to the new application; receiving third input from the user device declaring a plurality of entity types for the new application; receiving fourth input from the user device declaring one or more new field definitions for each of the plurality of entity types; generating a blockchain asset having encoded therein as the defined metadata for the new application, at least (i) the plurality of network participants declared, (ii) the plurality of entity types declared, and (iii) the one or more new field definitions declared for each of the plurality of entity types; and transacting the blockchain asset having the defined metadata encoded therein for the new application onto the blockchain.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments.

In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records including user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface 180. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

Further depicted is the host organization 110 receiving input and other requests 115 from customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

Certain requests 115 received at the host organization may be directed toward a blockchain for which the blockchain services interface 190 of the host organization 110 operates as an intermediary.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores. Additionally, the query interface 180 provides interoperability with the blockchain services interface 190, thus permitting the host organization 110 to conduct transactions with either the database system 130 via the query interface 180 or to transact blockchain transactions onto a connected blockchain for which the host organization 110 is a participating node or is in communication with the participating nodes 133, or the host organization 110 may conduct transactions involving both data persisted by the database system 130 (accessible via the query interface 180) and involving data persisted by a connected blockchain (e.g., accessible from a participating node 133 or from a connected blockchain directly, where the host organization operates a participating node on such a blockchain).

In certain embodiments, the Application Programming Interface (API) of the query interface 180 provides an API model through which programmers, developers, and administrators may interact with the blockchain services interface 190 or the database system 130, or both, as the needs and particular requirements of the API caller dictate.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 which facilitates consensus management for private and public blockchains upon which tenants, customer organizations, or the host organization itself 110 operate as a participating node on a supported blockchain. Additionally depicted is the blockchain metadata definition manager 196, which enables the blockchain services interface 190 to define and create metadata which is then pushed to and transacted onto a blockchain which is interfaced via the blockchain services interface. For instance, via the blockchain metadata definition manager 196, it is possible to for any customer organization 105A-C of the host organization to define and create metadata which is then recorded or transacted onto the blockchain for use by that customer organization 105A-C and for use by other participating nodes on the blockchain, regardless of whether or not those participating nodes 133 are also customer organizations 105A-C with the host organization 110. For example, once metadata is defined and created via the blockchain metadata definition manager 196 and pushed onto the blockchain, any participating node 133 with access to the blockchain where that metadata definition resides can then create data records and store information onto the blockchain which adopts the defined metadata definition and thus complies with the newly created metadata definition. In such a way, all participating nodes can utilize information which is stored in compliance with the newly created metadata definition, as there is a standardized (albeit customized) manner for storing such data.

As shown here, the blockchain services interface 190 communicatively interfaces the host organization 110 with other participating nodes 133 (e.g., via the network 125) so as to enable the host organization 110 to participate in available blockchain protocols by acting as a blockchain protocol compliant node, which in turn, permits the host organization 110 to access information within such a blockchain as well as enabling the host organization 110 to provide blockchain services to other participating nodes 133 for any number of blockchain protocols supported by, and offered to customers and subscribers by the host organization 110. In certain embodiments, the host organization 110 both provides the blockchain protocol upon which the host organization then also operates as participating node. In other embodiments, the host organization merely operates as a participating node so as to enable the host organization 110 to interact with the blockchain protocol(s) provided by others.

According to certain embodiments, the blockchain metadata definition manager 196 additionally permits non-subscribers (e.g., entities which are not customer organizations 105A-C) of the host organization to nevertheless utilize the blockchain metadata definition manager 196 and GUIs associated with the blockchain metadata definition manager 196 via an exposed API interface for such non-subscribing customers which may then create and define metadata definitions which are then pushed onto the blockchain via the host organization's blockchain services interface 190.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high *Byzantine* fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is needed. This means that applications may be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

FIG. 1B depicts another exemplary architecture 101, with additional detail of a blockchain protocol block 160 operating in conjunction with a block validator 192, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 is organized.

According to certain embodiments, blockchain metadata definition manager 196 as shown here may utilize a specific blockchain implementation which is provided by the host organization 110 and thus, for which the applicable blockchain protocol is defined by the host organization 110 or alternatively, the blockchain metadata definition manager 196 may utilize any publicly accessible blockchain for which the host organization operates as a participating node so as to establish access or the blockchain metadata definition manager 196 may utilize a private blockchain, including those which are not provided by the host organization 110, so long as the host organization is able to authenticate with such a private blockchain and access the blockchain by operating as a participating node on the private blockchain.

As will be described in greater detail below, the blockchain metadata definition manager 196 implements a specialized metadata definition and creation scheme which may include the use of GUIs and other user-friendly interfaces which are provided by the host organization either via an API or via an interface of the host organization, such as the web-server 175 via which users and customer organizations may interact with the host organization and more particularly, with the services and applications provided by the host organization, including use of GUIs provided by the blockchain metadata definition manager 196 which is made accessible to tenants of the host organization via the cloud computing platform and in certain embodiments made available to non-tenants and non-subscribers of the host organization 110, either of which may then utilize the GUIs and functionality provided by the blockchain metadata definition manager 196.

It may be necessary in accordance with certain embodiments that a customized blockchain protocol implementation be provided by the host organization to support use of the specialized metadata definition and creation scheme as implemented by the blockchain metadata definition manager 196, however, in embodiments where the metadata may permissibly be defined and stored onto a blockchain by the host organization 110, then any blockchain utilized to store such data will be otherwise unaffected as the blockchain is agnostic as to what types of metadata is defined or created and transacted onto the blockchain by the host organization. Stated differently, while the host organization 110 facilitates the definition and creation of such metadata and transacts that information onto a blockchain, it is immaterial to the blockchain as to what applications elect to utilize such data, whereas the host organization facilitates a platform in which applications may elect to only utilize data which is in compliance with the defined and created metadata, thus permitting transferability of such data, as well as many other benefits.

With respect to the blockchain protocol block 160 (regardless of whether it is an existing and already available blockchain protocol or a custom implemented blockchain protocol), the prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 163 provides a hash of the data stored within the block payload 169 portion of the blockchain protocol block 160 and need not meet any specific standard of proof 165. However, the payload hash is included as part of the input when the hash is calculated for the purpose of storing as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a time stamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized to store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standard of proofs 165 may be utilized pursuant to the particular blockchain protocol chosen, such as proof of work, hash value requirements, proof of stake, a key, or some other indicator such as a consensus, or proof of consensus. Where consensus-based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may be all of the same type or of different types, depending on the particular blockchain protocol implementation. For instance, permissible hash functions include MD5, SHA-1, SHA-224, SHA-256, SHA-384, SHA-515, SHA-515/224, SHA-515/

256, SHA-3 or any suitable hash function resistant to pre-image attacks. There is also no requirement that a hash is computed only once. The results of a hash function may be reused as inputs into another or the same hash function again multiple times in order to produce a final result.

Figure 1C:
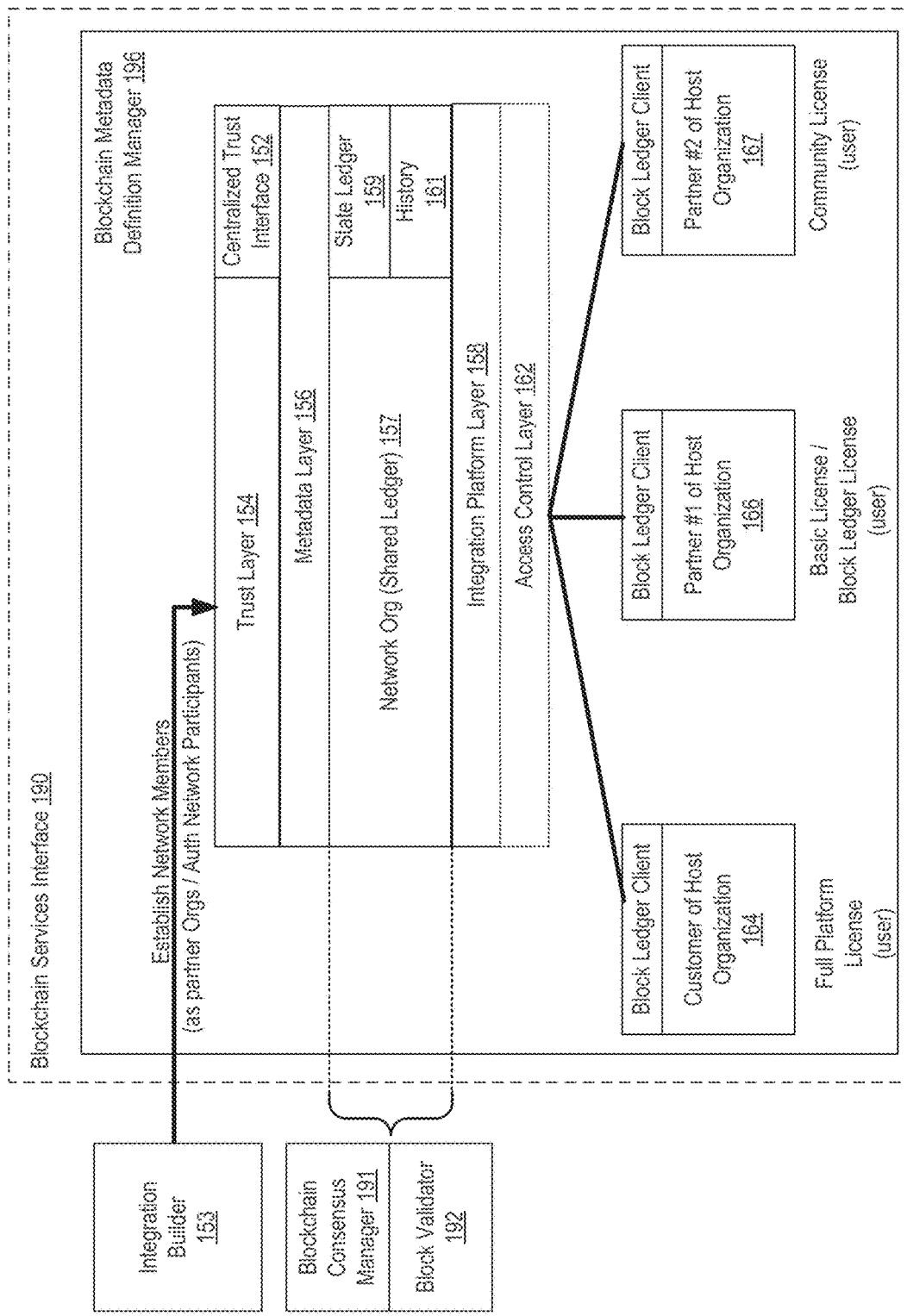
FIG. 1C depicts another exemplary architecture, with additional detail of the blockchain metadata definition manager set forth in greater detail, in accordance with described embodiments.

FIG. 1C depicts another exemplary architecture 102, with additional detail of the blockchain metadata definition manager 196 set forth in greater detail, in accordance with described embodiments.

As can be seen here, there is a blockchain services interface 190 which includes the blockchain metadata definition manager 196. Also depicted as interacting with the various elements of the blockchain metadata definition manager 196 are the integration builder 153 which is capable of establishing network members to participate with the metadata definition and creation scheme, as well as the blockchain consensus manager 191 and the block validator 192.

Internal to the blockchain metadata definition manager 196 there are various further elements, including a trust layer 154 and a centralized trust interface 152 capable of interacting with both tenants and customer organizations of the host organization as well as non-subscribers to the services of the host organization. There is further depicted a metadata layer 156 having knowledge of all presently defined metadata definitions created and pushed to the accessible blockchains, followed by a network organization 157 layer or a shared ledger, which serves as an interface to the variously accessible blockchains. The state ledger 159 maintains the status of the accessible blockchains and any connection or non-connection states while the history 161 block maintains a transaction history and logging for the platform. The integration platform layer 158 provides an interface to other components within the host organization 110 to interface with the components of the blockchain metadata definition manager 196 while the access control layer 162 is described in greater detail below, but provides certain access rights and restrictions for private and permissioned blockchains that are not fully open to public access.

Lastly, there is depicted various block ledger clients, including the customer of the host organization 164 which enjoys a full platform license as a subscribing customer of the host organization, while the next block ledger client at block 166 having the partner #1 of the host organization enjoys only a basic license and a block ledger license with limited user capabilities provided by the host organization, followed by the last block ledger client at block 167 having the partner #2 of the host organization which is limited to strictly a community license which is available to all parties without subscription to any subscription required user services provided by the host organization.

From a high level, the depicted architecture provides similar services to public blockchain, except that, according to this particular embodiment, the shared ledger 157 operates a blockchain internal to the host organization and defines the blockchain protocol of the hosted network org or a so called "shared ledger 157" as shown here. The depicted shared ledger 157 therefore permits customers and non-customers to interact with orgs and clients and non-subscribing clients, but not necessarily third party instances since this particular embodiment operates the shared ledger 157 internal to the host organization. In such a way, the functionality provided by public and private blockchains may still be realized and utilized, yet, because the shared ledger 157 is wholly internal to the host organization 110, its possible to operate the shared ledger, utilizing Distributed Ledger Technology (DLT) modified which is modified to rely upon the host organization's 110 trust layer 154 as a centralized trust authority (and providing validation of trust via the centralized trust interface 152) rather than the more customary use of a blockchain consensus manager 191 as is typical with other related embodiments described by this paper.

Regardless of the trust authority (e.g., be it the host organization 110 or distributed nodes reaching consensus as managed by the blockchain consensus manager 191), all data is transparent and cryptographically verifiable and data and users are not owned by a single party, notwithstanding being hosted internal to the host organization, and the history 161 and state ledger 159 provide for an enhanced audit trail. The integration builder 153 permits the execution of Smart contracts run on shared data as well as run against data which is owned by the network org 157 itself, such as metadata definitions which are accessible to all members but which nevertheless remain owned by the host organization.

In this particular embodiment, as alluded to above, because trust is established by the host organization itself, via the trust layer 154, there is no need for consensus, although consensus may optionally be utilized depending on the implementation.

According to particular embodiments, there is a multi tenant ledger platform that works at the network level providing and provides an equivalent amount of transparency and provenance that is available through Blockchain, yet is entirely within the control of the host organization 110, and thus provides for certain benefits, such as the establishment of centralized trust by the host organization 110.

In a manner of speaking, such an architecture represents a compromise between a centralized and decentralized database, and notably, deviates from the fundamentals of blockchain which utilized distributed ledger technology and thus operates as a distributed database. Nevertheless, depicted here is the host organization 110 operating as a central party, by and through the blockchain services interface 190, which provides the trust on behalf of all tenants, as opposed to blockchain where trust is delivered by the network, and specifically by the nodes distributed throughout the network reaching consensus.

Data and information which is persisted via the shared ledger 157 of the host organization is wholly owned and by the network and specifically by the established network members, yet the infrastructure is owned by the central party, in this case, the host organization 110 owns, controls, and manages the computing infrastructure and resources upon which the shared ledger 157 operates. Thus, if any established network member trusts host organization as the central party, then the system and architecture works for that particular established network member. Notably, however, the established network members must place their trust into a third party, in this case the host organization 110. If doing so is not possible, or not permissible based on the various data security requirements, regulations, or other concerns, then the Distributed Ledger Technology (DLT) which requires consensus by the distributed nodes, as managed by the blockchain consensus manager 191 is more appropriate for those parties.

According to a particular embodiment, a tenant-focused network org or a tenant focused shared ledger 157 is provided, again internal to the host organization 110 (and specifically the blockchain services interface 190 of the host organization) in which all users are controlled by each respective customer organization rather than being controlled by a centralized customer. Stated differently, there may be tenant-specific customer control, such that any user for a given instance of the shared ledger 157 is controlled by the tenant or customer org having authority over that instance of the shared ledger 157. In such a way, there can be multiple instances of the shared ledger 157, each having its user-set controlled by a specific customer org, without having to negotiate or rely upon any other customer org, tenant, or any other entity to approve or deny user inclusion. This includes the tenant's customer org being able to determine for itself which users are permitted in their instance of the shared ledger 157 without having to go through the host organization, despite the instance of the shared ledger 157 being internally hosted by the host organization. This is because the host organization 110 effectively delegates full control over user inclusion for each respective instance of the shared ledger 157 to the customer org for which that particular shared ledger 157 operates.

According to certain embodiments, the shared ledger 157 embodies a Merkle Directed Acyclic Graph (DAG) or a "Merkle-DAG" which is a data structure similar to a native Merkle tree, except that a Merkle DAG structure does not need to be balanced and its non-leaf nodes are allowed to contain data. In such a way, a Merkle-DAG is similar to native Merkle trees in that they both embody a tree of hashes. While a Merkle tree connects transactions by sequence, the Merkle-DAG is differentiated insomuch that it connects transactions by hashes. Therefore, in a Merkle-DAG structure, addresses are represented by a Merkle hash. The resulting spider web of Merkle hashes links data addresses together by a Merkle graph. The directed acyclic graph (DAG) portion of the Merkle-DAG may therefore be utilized to model information, such as modeling what specific address stores specific data.

According to another embodiment, the data is encrypted and cryptographically verifiable within each instance of the shared ledger 157. For instance, utilizing an extension of the blockchain services interface 190 platform, any tenant having an instance of the shared ledger 157 may cryptographically verify any stored encrypted data within their instance of the shared ledger 157.

As noted above, for many customers, it is much preferred to lease or subscribe to cloud-based computing infrastructure and software rather than having to own, operate, maintain, and configure such computing infrastructure themselves. Where certain customers and partners require only transparency of their data and the ledger (e.g., and do not necessarily require consensus amongst distributed nodes), such a solution represents a substantial improvement over competing alternatives. While blockchain technology presents many advantages, many of which are described in greater detail elsewhere by this paper, the reality is that certain customers simply are not concerned with decentralization of the data and the ledger, and thus, may realize significant benefits from utilizing a shared ledger 157 instance which is entirely operated within the host organization 110 with a centralized trust interface 152, thus negating the need to participate in other consensus regimes common to distributed blockchain ledgers.

In accordance with one embodiment, the shared ledger 157 provides an audit trail which is immutable by any party, including by the host organization 110, and thus, provides greater security, transparency, and assurance than a standard audit trail offered by competing solutions. Added value is thus brought to the tenants and customer organizations when utilizing the shared ledger 157 when compared with a standard centralized system.

Further still, because the shared ledger 157 is multi-tenant aware (e.g., each tenant or customer organization may utilize its own instance of the shared ledger 157) and metadata driven, with executable smart contracts via triggers, there are multiple advantages for the host organization's tenant subscribers, above and beyond the platform benefits offered by the host organization.

Consider the example of a large retailer wishing to go to market utilizing blockchain to manage their supply chain of products ranging from clothing to fresh produce. Such a pilot may begin with cotton as raw materials for clothing and leafy greens to be sold in stores as packaged produce. Ultimately, the large retailer may evolve to a full blockchain solution, but initially, many customers may prefer to utilize a wholly controlled, single point of trust, and hosted solution such as the shared ledger 157 provided by the host organization. Reasons for initially beginning with the hosted shared ledger solution may to enable a single login or a single authentication portal via their current host organization which already provides them with cloud-based services, which will then enable the large retailer to experiment with the Distributed Ledger Technology (DLT) while permitting the large retailer to view their validated ledger information from the single sign-on portal.

Such a structure would thus allow the large retailer, by way of example, to place their trust into the immutability of the data due to the data being stored within the immutable shared ledger 157, albeit within the host organization 110. This is possible because even the host organization cannot alter the shared ledger 157 audit trail. This is in contrast to the use of prior cloud based platforms which provides a standardized audit trail, yet because the audit trail is not immutable all parties, it could theoretically be manipulated by malicious actors, albeit such a scenario is highly unlikely. Nevertheless, the shared ledger 157 utilizing modified DLT technologies is by design immutable by all parties, in terms of its audit trail, and thus, a higher level of trust may be appropriately placed into the centralized trust authority, such as the host organization, given that even the host organization lacks the capability to alter the historical records stored within the shared ledger 157.

The same logic may apply to companies wishing to utilize such a ledger internally within one company and its subsidiaries as doing so will permit greater integration and data sharing amongst the company and its subsidiaries, while benefiting from the immutability of the shared ledger, above and beyond that which may be provided by competing solutions, such as locally and remotely operated databases, or a strictly on-demand cloud based solution.

Consider for example, a mortgage division wishing to share sales lead information with their commercial banking division or a healthcare company having multiple divisions across the country, which are not well integrated amongst the various divisions, resulting in duplicative operational centers, such as a claims processing group in northern California and another claims processing group in Southern California, which currently lack full integration, yet could migrate to the hosted shared ledger 157 solution to realize greater integration, trusted audit trails through the immutability of the records written into the platform, and in turn, improved ease of use and transparency of data utilized by the various divisions of the large healthcare provider.

Therefore, according to a particular embodiment, there are operations by a system of a host organization that include operating an interface to a shared ledger on behalf of a plurality of authorized network participants for the shared ledger, in which the shared ledger persists data via a plurality of distributed shared ledger nodes; generating a network org within the shared ledger to store the data on behalf of a founder org as a first one of the plurality of authorized network participants; receiving input from the founder org defining a plurality of partner orgs as additional authorized network participants for the network org, in which all of the authorized network participants have read access to the data stored by the network org via the shared ledger without replicating the data; receiving input from the founder org defining permissions for each of the partner orgs to interact with the network org within the shared ledger; writing metadata to the shared ledger defining at least the authorized network participants for the network org and the permissions defined for each of the partner orgs; receiving requests from the authorized network participants to interact with the network org; and transacting with the shared ledger in fulfillment of the requests.

According to the operations of another embodiment, the shared ledger includes a declarative, metadata driven, cryptographically verifiable multi-network (multi-tenant) shared ledger operating on a relational database system internal to the host organization; in which the method further includes: assigning a unique network ID to each of the partner orgs and to the founder org; and partitioning a table of the relational database system having the data of the network org stored thereupon by network ID.

According to the operations of another embodiment, the relational database system immutably stores an audit log recording all insertions, deletions, and updates affecting the data stored within the network org via the plurality of shared ledger nodes.

According to the operations of another embodiment, transacting with the shared ledger in fulfillment of the requests includes at least: (i) retrieving the metadata for the network org from the shared ledger; (ii) validating each request originates from one of the authorized network participants for the network org; (iii) validating each request specifies an interaction by the founder org or an interaction by one of the partner orgs in compliance with the permissions defined by the retrieved metadata for the network org; and (iv) transacting with the network org via the shared ledger in fulfillment of the request pursuant to successful validation.

According to the operations of another embodiment, the permissions defined by the metadata for each of the partner orgs include one or more of: write access to the metadata at the request of one of the partner orgs, the write access to the metadata granted by the founder org; and write access to the data stored by the network org at the request of one of the partner orgs, the write access to the data granted by the founder org.

According to the operations of another embodiment, the permissions defined by the metadata for each of the partner orgs include permission to create new users associated with one of the partner orgs.

According to the operations of another embodiment, the permissions defined by the metadata for each of the partner orgs include permission to add new partner orgs as authorized network participants for the network org.

According to the operations of another embodiment, the permissions defined by the metadata further include one or more of: permission for the founder org granted by the founder org to modify the metadata; permission for the founder org granted by the founder org to modify the data stored by the network org; permission for the founder org granted by the founder org to remove one of the partner orgs from the network org and eliminating the removed partner org as one of the authorized network participants for the network org; permission for the founder org granted by the founder org to add a new partner orgs as an authorized network participant for the network org; permission for the founder org granted by the founder org to declare new business logic common across all of the authorized network participants for the network org; and permission for the founder org granted by the founder org to declare new business rules common across all of the authorized network participants for the network org.

According to the operations of another embodiment, the data stored by the network org within the shared ledger includes one or more of: application data records common across all of the authorized network participants for the network org; business data records common across all of the authorized network participants for the network org; declared business logic common across all of the authorized network participants for the network org; and declared business rules common across all of the authorized network participants for the network org.

According to another embodiment such operations may further include: receiving a request from one of the authorized network participants to store localized data via the shared ledger; storing the localized data via the shared ledger; and in which the stored localized data is accessible to only to the authorized network participant having originated the request to store the localized data and in which the stored localized data is not exposed to the other authorized network participants.

According to the operations of another embodiment, the stored localized data includes at least one of: a modification to the data stored by the network org accessible only to the authorized network participant having originated the request to store the localized data; a modification to application data records common across all of the authorized network participants for the network org, in which the modification is accessible only to the authorized network participant having originated the request to store the localized data; a modification to business data records common across all of the authorized network participants for the network org, in which the modification is accessible only to the authorized network participant having originated the request to store the localized data; a modification declared business logic common across all of the authorized network participants for the network org, in which the modification is accessible only to the authorized network participant having originated the request to store the localized data; and a modification declared business rules common across all of the authorized network participants for the network org, in which the modification is accessible only to the authorized network participant having originated the request to store the localized data.

According to the operations of another embodiment, the stored localized data includes a new user account for the authorized network participant having originated the request to store the localized data and defined user permissions for the new user account; and in which each authorized network participant has distinct user controls without affecting the data stored by the network org within the shared ledger.

According to the operations of another embodiment, the authorized network participant having originated the request to store the localized data is a customer organization having a plurality of users within the host organization; in which the stored localized data includes a new user account for the authorized network participant having originated the request to store the localized data; and in which the new user account is distinct from any user account associated with the plurality of user accounts for the customer organization.

According to the operations of another embodiment, the authorized network participant having originated the request to store the localized data is a customer organization having tenancy within the host organization; in which the stored localized data includes a customer organization specific workflow to execute against CRM data for the customer organization based on changes affecting the data stored by the network org.

According to the operations of another embodiment, all changes affecting the data and metadata stored by the network org are cryptographically verifiable providing a full audit log including at least what data was changed, when the data was changed, and who made the changes to the data.

According to the operations of another embodiment, each of the authorized network participants are tenants of the host organization.

According to the operations of another embodiment, the founder org is a first one of a plurality of tenants of the host organization having requested generation of the network org; and in which each of the partner orgs are tenants of the host organization different than the founder org and having been added as authorized network participants for the shared ledger by the founder org.

According to the operations of another embodiment, the system of the host organization embodies hardware, software, and logic elements to implement cloud based functionality providing on-demand services, on-demand database services, and cloud computing services to subscribing customer organizations; and in which the founder org and each of the partner orgs are selected from amongst the subscriber customer organizations; and in which the cloud based functionality is accessible to the subscribing customer organizations over a public Internet.

According to the operations of another embodiment, the network org is represented by the host organization as one of a plurality of customer organizations of the host organization.

According to the operations of another embodiment, the shared ledger includes a relational database system internal to the host organization; in which a copy of the data stored by the network org is accessible from each of a plurality of data centers of the host organization via one or more of the plurality of shared ledger nodes; and in which the method further includes: determining a first one of the plurality of shared ledger nodes is inaccessible based on an outage at one of the plurality of datacenters of the host organization or pursuant to a non-response from the first one of the plurality of shared ledger nodes; and transacting with the network org stored by the shared ledger from a second one of the plurality of shared ledger nodes subsequent to the determination.

According to the operations of another embodiment, the shared ledger implements a Distributed Ledger Technology (DLT) data store internal to the host organization; in which a copy of the data stored by the network org is accessible from each of the plurality of shared ledger nodes distributed across a plurality of geographically dispersed data centers of the host organization; and in which the DLT data store immutably stores all data within assets added to the DLT data store.

According to the operations of another embodiment, data deletion transactions at the network org are represented by new assets specifying the data deleted from the network org without removing any data from the DLT data store; in which data update transactions at the network org are represented by new assets specifying a current version of the data updated at the network org without removing any data from the DLT data store; and in which all prior versions of the data transacted to the network org are immutably persisted by the DLT data store and available via an audit log for the DLT data store including any data specified as having been deleted and all prior versions of the data transacted to the network org having been affected by one or more updates.

According to the operations of another embodiment, the host organization operates as a centralized trust authority to validate any transaction against the DLT data store on behalf of the authorized network participants for the network org.

According to the operations of another embodiment, the DLT data store is implemented via a hardware and software infrastructure operating wholly under the host organization's exclusive control.

According to the operations of another embodiment, operating the interface to the shared ledger includes operating a blockchain services interface to a blockchain on behalf of the authorized network participants for the shared ledger; in which each of the authorized network participants operate as a participating node on the blockchain and transact with the blockchain via the blockchain services interface operated by the host organization.

According to the operations of another embodiment, a copy of the data stored by the network org is accessible from any of the authorized network participants operating as participating nodes on the blockchain and further accessible from any other participating node on the blockchain; in which the blockchain immutably stores all record added to the blockchain; and in which the data stored by the network org affected by deletions and updates remain accessible from the blockchain as a non-current version of the data via an audit log for the blockchain.

According to the operations of another embodiment, the host organization operates a participating node on the blockchain; and in which the blockchain operates external from the host organization and operates outside of the host organization's exclusive control.

According to the operations of another embodiment, the network org includes one of a plurality of distinct network orgs operating via the shared ledger; or alternatively in which the network org operates on a unique shared ledger instance of the host organization and in which different network orgs operate on other shared ledger instances within the host organization separate from the unique shared ledger instance upon which the network org operates.

According to the operations of another embodiment, the data stored by the network org is associated with a first declared application and a second declared application, both the first and the second declared applications being utilized by the founder org and the plurality of partner orgs; and in which the permissions defined by the metadata specify different access permissions to the data stored by the network org based on whether each of the partner organizations is accessing the data utilizing the first declared application or the second declared application.

According to the operations of another embodiment, the metadata written to the shared ledger further defines a plurality of entity types and a plurality of field definitions for each of the plurality of entity types; and in which the method further includes: generating a virtual table within a database system of the host organization; structuring the virtual table at the database system of the host organization based on the metadata written to the shared ledger, in which the entity types from the metadata written to the shared ledger are represented as tables within the virtual table and further in which the one or more new field definitions for each of the plurality of entity types are represented as columns within the tables at the virtual table.

According to the operations of another embodiment, the virtual table includes a materialized view hosted at the database system of the host organization structured based on the metadata declared for the new application; in which the materialized view hosted at the database system of the host organization does not store any data associated with the new application; and in which SQL queries requesting read-only access are processed against the materialized view by translating the read-only SQL queries into a shared ledger transaction to retrieve the requested data from the shared ledger.

According to the operations of another embodiment, the metadata written to the shared ledger further defines a plurality of entity types and a plurality of field definitions for each of the plurality of entity types; and in which the method further includes: retrieving the metadata from the shared ledger, including the plurality of entity types, the one or more new field definitions for each of the plurality of entity types, and any field types applied to the one or more field definitions; generating a materialized view of the data stored via the shared ledger within a virtual table at the host organization by structuring the virtual table based on the defined metadata; in which the materialized view represents the structure of the data associated stored by the shared ledger without storing the data within the materialized view at the host organization.

According to another embodiment such operations may further include: receiving, at the host organization, an SQL statement from a user device, in which the SQL statement is directed toward the materialized view requesting an SQL update or an SQL insert for the data persisted to the blockchain and associated with the new application; processing the SQL statement against the materialized view by translating the SQL statement requesting the SQL update or the SQL insert into a corresponding shared ledger transaction to update or add the data associated with the new application at the shared ledger; and issuing an acknowledgement to the user device confirming successful processing of the SQL statement against the materialized view pursuant to the corresponding shared ledger transaction being accepted by the shared ledger and successfully updating or adding the data associated with the new application at the shared ledger.

According to another embodiment such operations may further include: receiving an SQL statement directed toward the materialized view at the host organization; in which the SQL statement specifies one or more of (i) a SELECT from SQL statement, (ii) an INSERT into SQL statement, and (iii) an UPDATE set SQL statement; and in which the SQL statement received is processed by translating the SQL statement into a corresponding shared ledger transaction and executing the corresponding shared ledger transaction against the shared ledger in fulfillment of the SQL statement directed toward the materialized view at the host organization.

According to a particular embodiment, there is non-transitory computer-readable storage media having instructions stored thereupon that, when executed by a processor of a system having at least a processor and a memory therein, the instructions cause the system to perform operations including: operating an interface to a shared ledger on behalf of a plurality of authorized network participants for the shared ledger, in which the shared ledger persists data via a plurality of distributed shared ledger nodes; generating a network org within the shared ledger to store the data on behalf of a founder org as a first one of the plurality of authorized network participants; receiving input from the founder org defining a plurality of partner orgs as additional authorized network participants for the network org, in which all of the authorized network participants have read access to the data stored by the network org via the shared ledger without replicating the data; receiving input from the founder org defining permissions for each of the partner orgs to interact with the network org within the shared ledger; writing metadata to the shared ledger defining at least the authorized network participants for the network org and the permissions defined for each of the partner orgs; receiving requests from the authorized network participants to interact with the network org; and transacting with the shared ledger in fulfillment of the requests.

According to another embodiment, there is a system to execute at a host organization, in which the system includes: a memory to store instructions; a processor to execute instructions; in which the processor is to execute a shared ledger interface to a shared ledger on behalf of a plurality of authorized network participants for the shared ledger, in which the shared ledger persists data via a plurality of distributed shared ledger nodes; in which the processor is to generate a network org within the shared ledger to store the data on behalf of a founder org as a first one of the plurality of authorized network participants; a receive interface to receive input from the founder org defining a plurality of partner orgs as additional authorized network participants for the network org, in which all of the authorized network participants have read access to the data stored by the network org via the shared ledger without replicating the data; the receive interface to further receive input from the founder org defining permissions for each of the partner orgs to interact with the network org within the shared ledger; in which the shared ledger interface is to metadata to the shared ledger defining at least the authorized network participants for the network org and the permissions defined for each of the partner orgs; the receive interface to further receive requests from the authorized network participants to interact with the network org; and in which the shared ledger interface further is to transact with the shared ledger in fulfillment of the requests.

Notably, the shared ledger provides similar decentralization capabilities as blockchain, although as noted, the shared ledger may run on a shared ledger instance internal to the host organization, may run on a public blockchain external to the host organization, may run on a private blockchain external to the host organization or a private blockchain implemented by the host organization, or the shared ledger may run on a distributed relational database system.

One problem with conventional solutions is that anytime two or more organizations agree to share data, ultimately at least one of the organizations must go back to the founder organization of the data repository for help to change access permissions, or to make any changes to the structure of the shared data. Worse yet, there are situations where a founder organization of the data repository must go to another third party for assistance, for example, to delegate certain administrative rights.

The shared ledger enables a founder organization to specify what other entities may operate as partner organizations and further permits the founder organization to delegate enhanced administrative privileges to themselves and to other partner organizations. For instance, partner organizations may be enabled to create users or to modify metadata defining the structure of the network org data persisted or saved by the shared ledger. Moreover, the shared ledger implements a declarative, metadata driven, cryptographically verifiable multi-network (multi-tenant) shared ledger in accordance with certain embodiments which permits the sharing of data amongst the founder org and partner orgs without having to replicate any data whatsoever in fulfillment of the sharing capabilities or to benefit from the distributed nature of the shared ledger's distributed nodes.

Consider for example a loyalty rewards program implemented by a credit card company such as American Express. It may be the case that Amex wishes to share data with multiple different partner organizations so that information may be gathered within a centralized location to the benefit of Amex as the founder organization and the partner organizations. With prior solutions, each of the partner organizations would continually need to go back to Amex for help anytime the partner organizations needed to add users to the system for data access, or make any changes whatsoever to data stored by the system, and so forth.

However, with the use of the shared ledger, a founder org such as Amex may delegate certain rights to the partner orgs. For example, Amex may permit the partner orgs to create their own user accounts or modify business logic shared by the founder org and the partner org or create localized data (e.g., such as a CRM flow to execute for one of the partner orgs) specific to only one of the partner orgs without affecting the common pool of data in the shared ledger shared by all the partner orgs and the founder org, or to perform certain data modification operations, such as permitting certain applications for the partner org to have write access to the shared data, and so forth.

According to a particular embodiment, the host organization implements, manages, maintains, and controls the entirety of the computing infrastructure for the shared ledger, yet permits the founder org to delegate or assign certain rights to themselves (e.g., the founder org may assign privileges to the founder org) or to the partner orgs, such as write access to stored data or write and update access to the stored metadata defining the structure of the stored data on behalf of the partner orgs and the founder org for a given network org.

According to a particular embodiment, each of the founder orgs and the partner orgs are an existing customer organization or tenant of the host organization and are thus enabled, through participation with the shared ledger as an authorized network participant, to define their own access controls for themselves and for their users, without having to solicit administrative support from the host organization.

Moreover, because the shared ledger provides all the information in a cryptographic manner, a type of an audit trail or fully transparent audit log is created, permitting the founder org and possibly the partner orgs to see who changed what data and when, thus allowing a full traceback as to the who, what, where, when, and why changes to the data records were made, as may be required by law, accounting principles, or contractual obligations.

Notably, with the shared ledger there is only one single repository for the data of the host org, and data is not replicated for each of the partner nodes (although certain distributed technologies do provide a single data repository which is distributed amongst a plurality of nodes). Notably, however, there are no synchronization mechanisms provided because the data is always persisted via the shared ledger and is not copied elsewhere and referenced as is the case with many prior solutions to the problem of data sharing.

According to certain embodiments, some or all of the partners may create their own business rules and business logic which is then written to the common pool of data stored by the network org within a shared ledger. In other embodiments, partners may write their own partner org specific rules and business logic which is persisted via the shared ledger, but not placed within the common pool of data for the network org and therefore is not exposed to the other partner orgs or to the founder org. This may occur when a partner org creates a CRM data flow to execute based on modifications to the data stored by the network org within the shared ledger, in which case, the common pool of data is referenced by the partner org's CRM data flow, but the CRM data flow itself is only useful for that particular partner org. Notably, however, common business rules and logic for all authorized network participants is not only feasible, but very likely to occur on any given network org having data shared by multiple distinct entities.

Further still, despite the data being persisted within a shared ledger, it is provided in accordance with certain embodiments that a data-less virtual table is created within the host organization as a "materialized view" in which founder or and the partner org may issue and process SQL based queries against the materialized view as if it were a traditional relational database table, notwithstanding the fact that certain embodiments of the shared ledger may be persisted to a non-relational data store, such as a DLT based data store within the host organization or a blockchain (private or public), while in other situations, the shared ledger may be permissibly persisted to a relational database, so long as it is cryptographically verifiable.

With such embodiments, a materialized view may be provided for every one of the authorized network participants (e.g., founders and partners) which then permits SQL transactions to be processed against the materialized view from the perspective of such participants, with the host organization then providing the necessary translation from the received SQL statements to the necessary shared ledger transaction commands, be a blockchain, DLT data store, or even another relational database store.

According to certain embodiments, the shared ledger is multi-tenant aware and multi-network aware, with every authorized network participant being assigned a unique network ID and further in which all data stored within a network org via the shared ledger is then partitioned by network ID and/or referenceable via the network ID, thus permitting data specific to only one or more specified authorized network participants to be referenced.

According to another embodiment, the same common pool of data for a network org may be subjected to different access permissions based on the declared app being utilized to access such data. For example, where Amex is a founder org and Chevron is a partner org, it may be that a first application for inventory management used by the network org allows Chevron only read access to the common pool of data, and yet, the same partner org, Chevron, when utilizing a different app to access the same common pool of data, such as a customer rewards points app, permits Chevron to have write access to some of the data stored by the network org, thus permitting different permissions based on the declared app and not just based on the particular partner org.

FIG. 1D depicts another exemplary architecture 103, which depicts the integration of host organization services with the blockchain services interface 190 in greater detail, in accordance with described embodiments.

In particular, there is now depicted both an integration builder 153 and accessible cloud platforms 186, each of which are interfaced into the blockchain metadata definition manager 196 of the blockchain services interface. The Integration builder 153 provides a variety of functionality which collectively permits for entity and metadata definition into a shared ledger 157 which is hosted internal to the host organization or which permits the entity and metadata definition into a blockchain which is made accessible through the host organization, even when such a blockchain is a public blockchain which is not under the ultimate control of the host organization.

Specifically depicted at the integration builder 153 is a one-click blockchain connector 131 permitting users to click and drag components to link their application with an available blockchain internal to the host organization or accessible via the host organization, thus specifying a linkage between an application and a blockchain, without the user necessarily having to write code to establish the link.

The network formation manager 132 permits users to define what entities (e.g., applications, etc.), partners, tenants, users, customer organizations, etc., have access to the information written into the blockchain via their application.

The entity definition setup GUI 133 permits users to define, without writing code, an application or entity to which specified metadata will apply. For instance, this may be a new entity specified at the entity definition setup GUI 133 or this may be an existing application, which is to be made compatible with the metadata definitions specified and established via the metadata definition GUI 134.

Lastly, the blockchain asset or coin deployment 135 permits a user to deploy their specified entities, with defined metadata and any associated applications, partners, customer orgs, tenants, users, etc., as specified via the network formation manager 132 onto the connected blockchain for use by applications or anyone having connectivity and where appropriate, relevant access rights. Once the entity and metadata defined via the GUIs are deployed onto the blockchain, they may be utilized by any application or entity having access and relevant access rights to the blockchain in question. Stated differently, the blockchain asset or coin deployment 135 component serves to "publish" or "go live" with the defined entities and metadata.

Further depicted are the accessible cloud platforms 186, via which information stored outside of the linked blockchain, yet accessible via the host organization, may be linked through a defined entity.

Therefore, if a user creates a new application and defines metadata for that application and deploys the defined entity and metadata onto the blockchain chosen, then it is further permissible to retrieve, reference, read and write data stored on variously accessible cloud platforms 171 accessible via the host organization which are not persisted within the chosen blockchain in question for that particular application.

For example, an application on the shared ledger 157 or another blockchain accessible via the host organization may retrieve data from the commerce cloud 171 provided by the host organization, or retrieve data from the marketing cloud 172 provided by the host organization or may reference information from third party and externally linked clouds 173, such as the externally linked clouds depicted here as 173A, 173B, and 173C, which may in reality correspond to, for example, an Amazon AWS cloud service interface, or a Microsoft Azure cloud service interface, or an Oracle cloud service interface, etc. So long as such third party clouds are externally linked via the host organization services 107, then they may be referenced by entities and applications which persist their data within a blockchain accessible via the host organization or hosted internal to the host organization.

Further depicted is a more detailed breakout of the network org shared ledger 157, which as noted previously, may provide to customer orgs wishing to avoid full deployment to a public blockchain, certain Distributed Ledger Technology (DLT) functional aspects, yet provide internally hosted ledger capabilities (within the host organization) which implements a centralized trust authority via the trust layer 154, rather than requiring consensus. Optionally, the shared ledger 157 may permit the customer org to reference consent management protocols 157A for testing or validation purposes, in which the customer organization may simply provide their own consensus for any transaction, as they are permitted to do within an internally hosted shared ledger 157 for which the customer organization has its own instance, and thus, ultimate authority. This is similar in function to relying upon the centralized trust interface 152, yet permits the customer organization to utilize DLT based consensus management as would be observed on a public blockchain, while retaining control over consensus management decisions. Later, if the customer org transitions their application to a public blockchain, then their migration path will be simplified as there will already be integration with consensus management components.

The consent management 157A and 157B permits the customer org utilizing the shared ledger 157 to define which entities, users, partners, customer orgs, etc. have authority to reference, read, write, update, or delete transactions associated with a defined application as well as permit those same entities, users, partners, customer orgs, etc., to grant authority for their data to be referenced. The metadata definition deployment 157C module permits defined metadata to be written to the blockchain in question or written into the shared ledger 157 as an asset or as a coin, subsequent to which, entities, applications, and any code interacting with information for which metadata has been defined must be in compliance with the defined metadata, and may be forced into compliance via smart contract execution which performs metadata compliance validation.

Figure 1E:
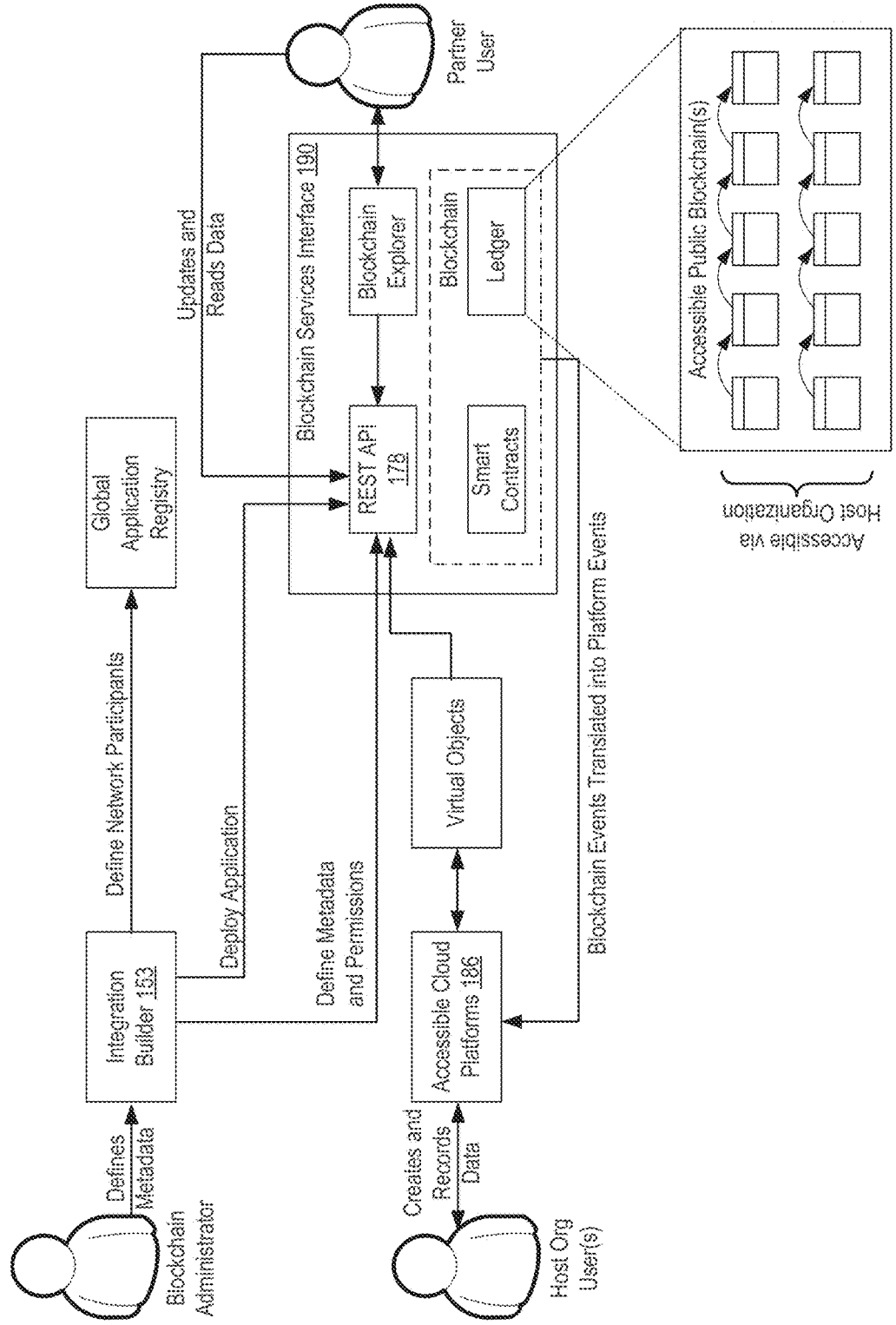
FIG. 1E depicts another exemplary architecture, which depicts an exemplary data flow utilizing the blockchain services interface, in accordance with described embodiments.

FIG. 1E depicts another exemplary architecture 104, which depicts an exemplary data flow utilizing the blockchain services interface 190, in accordance with described embodiments.

In particular, as shown here, there is a partner user which interacts with the blockchain services interface 190 and specifically with the blockchain explorer through which accessible blockchains may be discovered and referenced. The partner user may then update and read data, where permissions are appropriate, from the blockchain via the REST API as depicted at element 178. The blockchain persists the information for a defined entity application in compliance with the metadata definitions described previously.

The REST API 178 or the "Representational State Transfer" API is a software architectural style that defines a set of constraints used for creating and utilizing Web services. Web services that conform to the REST architectural style, termed RESTful Web services (RWS), provide interoperability between computer systems on the public Internet. RESTful Web services allow the requesting systems to access and manipulate textual representations of Web resources by using a uniform and predefined set of stateless operations, while other supported Web services, such as SOAP Web services, expose their own arbitrary sets of operations.

Such Web services may include any application entity that may be identified, named, addressed, or handled, in any way permitted by the application, via the public Internet, with so called RESTful Web service permitting requests to be made to a resource's URI which will then in turn elicit a responsive payload formatted in HTML, XML, JSON, or some other selected format. Utilizing a stateless protocol and standard operations, RESTful systems aim for fast performance, reliability, and the ability to grow, by re-using components that can be managed and updated without affecting the system as a whole, even while it is running, thus permitting fuller interoperability between the depicted blockchain and the connected elements, such as the partner user, the host org users, and the integration builder 153.

As shown here, there are blockchain events which are translated into platform events and transmitted to the accessible cloud platforms 186.

Host organization users may interact with such accessible cloud platforms 186 to create and record data, and where appropriate, data and events may be pushed back into the blockchain through configured virtual objects which communicate with the REST API to write information into the blockchain or to reference information in the blockchain or to update state information for managed events within the blockchain.

Additionally depicted here is a blockchain administrator which, for example, may utilize the previously described GUIs to define metadata at the integration builder 153, thus permitting the blockchain administrator to define network participants which are recorded in the global application register, or to deploy an application which is then referenced by the REST API at the blockchain services interface, as well as to define metadata and permissions for the entity application deployed, thus ensuring that information for that deployed application when written into the blockchain must be in compliance with the defined metadata for such information associated with the application. Such compliance may be enforced by the smart contracts depicted here within the blockchain at the blockchain services interface 190.

As noted previously, the blockchain may be an internally hosted blockchain, such as shared ledger 157 hosted internally and wholly controlled by the host organization, or the blockchain may be any public blockchain accessible via the host organization.

Figure 2A:
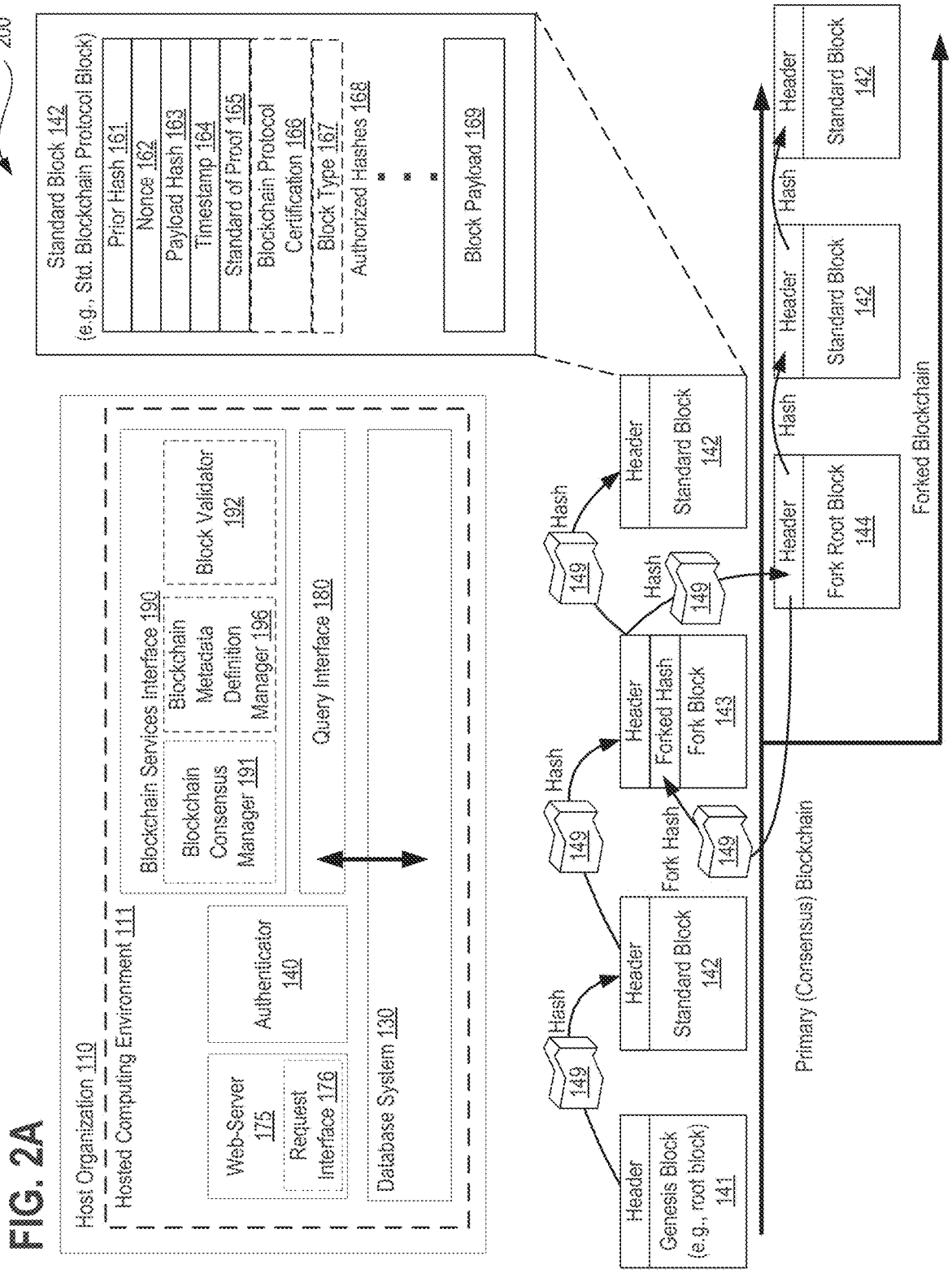
FIG. 2A depicts another exemplary architecture, with additional detail of a blockchain and a forked blockchain, in accordance with described embodiments.

FIG. 2A depicts another exemplary architecture 200, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary blockchain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing and potentially valid primary blockchains. Once consensus is reached (typically after one or two cycles of new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

For instance, a forked blockchain may be utilized to support declarative smart actions as enabled by the host organization where a forked blockchain of a public or private blockchain is customized via a new blockchain protocol certification 166 to support both the declarative establishment of smart actions and their required information capture provisions as defined by an administrator as well as the ability to map the data captured with a transaction utilizing such a declared smart action back to the cloud platform entity as provided by the host organization.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which declared smart actions for assets, tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

Consider for instance the host organization's use of a previously existing blockchain for the implementation of the services provided by the blockchain metadata definition manager 196. It may be advantageous to utilize an existing blockchain, but then creating a specialized sidechain or a forked blockchain specifically for the services provided by blockchain metadata definition manager 196 yet remain in compliance with the blockchain protocol certification 166 required by the primary (consensus) blockchain. In other instances, a modified Distributed Ledger Technology such as the shared ledger 157 at FIG. 1C may be utilized which is a hosted ledger fully under the control of the host organization, and as such, it may not be necessary to side-chain from a primary chain. Still other examples may include the host organization providing and defining the blockchain protocol for a public blockchain, in which case the host organization may define the blockchain protocol utilized in such a way that the extended capabilities of the blockchain metadata definition manager 196 (see e.g., FIG. 1A) are native to the protocol, thus requiring no side-chaining or conversely, the host organization may define and operate a public blockchain which has a limited sub-set of functionality available to the public and then extend the capabilities of the blockchain metadata definition manager 196 by side-chining off of the public blockchain to provide the enhanced functionality.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C#, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

Figure 2B:
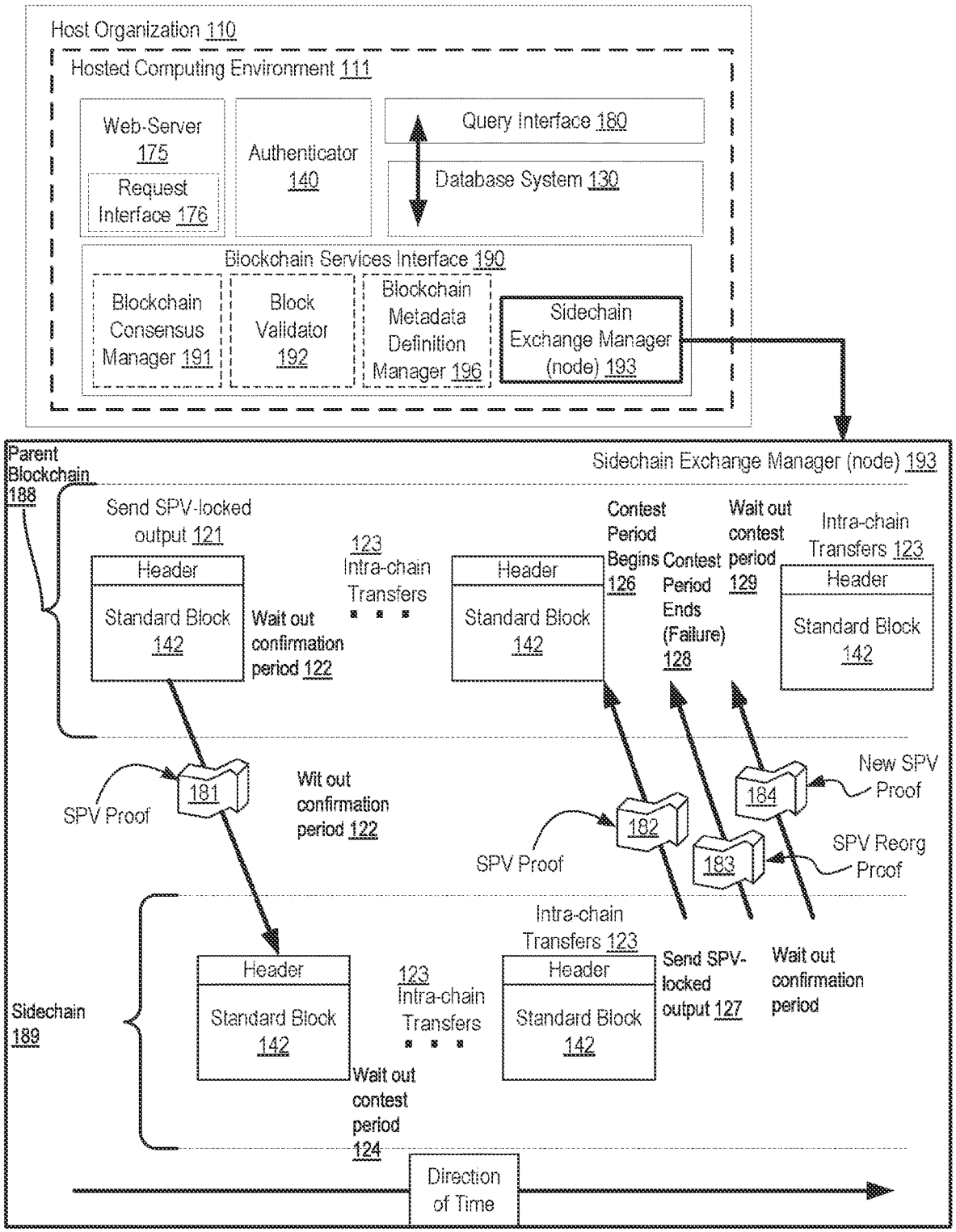
FIG. 2B depicts another exemplary architecture with additional detail for sidechains, in accordance with described embodiments.

FIG. 2B depicts another exemplary architecture 201 with additional detail for sidechains, in accordance with described embodiments.

More particularly, there is depicted here mechanism by which to perform a symmetric two-way pegged transfer from a parent blockchain 188 (e.g., e.g., a primary chain) to a sidechain 189, which may be a different blockchain protocol supported by and provided by the host organization 110 or the sidechain may be a foreign blockchain, public or private, for which the sidechain exchange manager 193 of the host organization 110 participates as a node, so as to permit access and transactional capabilities with the sidechain.

Regardless, it is in accordance with described embodiments that inter-chain transfers between the parent blockchain 188 and the sidechain 189 may permissibly performed in compliance with the rules and conditions of each respective blockchain. Notably, as described here, the perspective of each blockchain is interchangeable insomuch that the sidechain 189 depicted here may consider itself as a primary or parent blockchain and consider the depicted parent blockchain 188 as the child blockchain or a sidechain. Regardless, each blockchain operates independently, yet has a defined exchange mechanism by which to exchange assets, coins, tokens, value, or other payload information between them which have been created by a transaction utilizing a declared smart action.

As shown here, the sidechain exchange manager 193 of the host organization may send a parent chain asset as an output of the parent blockchain 188 at operation 151.

A Simplified Payment Verification (SPV) proof 181 associated with the parent blockchain 188 asset is generated as the output and communicated to the sidechain 189. The SPV proof may include a threshold level of work, and the generating may take place over a predetermined period of time, which may also be referred to as a confirmation period 152. The confirmation period of a transfer between chains may be a duration for which a coin, token, or other exchanged value is locked on the parent blockchain 188 before may successfully be transferred to the sidechain 189. This confirmation period may allow for sufficient work to be created such that a denial of service attack in the next waiting period becomes more computationally difficult.

Consider for instance an exemplary confirmation period which may be on the order of 1-2 days. The confirmation period may be implemented, in such an example, as a per-sidechain security parameter, which trades off cross-chain transfer speeds in exchange for greater security. Other confirmation periods which are much shorter may be utilized where sufficiently difficult proof of work conditions are effectuated so as to ensure adequate security so as to protect the integrity of both blockchains and negate the potential for fraudulent transactions.

The output created on the parent blockchain 188 may specify via rules and configuration parameters (e.g., stored within the blockchain protocol certification portion of each block of the parent blockchain 188) a requirement that any spending, transfer, or consumption of an asset received by the output in the future are burdened with additional conditions, in addition to the rules governing transfer within the parent chain. For example, any release of assets received by the output may require additional conditions for verifying a proof from the destination chain, such as validating that the rules for the destination chain proof show that the destination chain has released the asset and show to where the asset has been released. After creating the output on the parent blockchain 188, the user waits out the confirmation period, meanwhile, intra-chain transfers 153 continue to occur. Subsequent to waiting out the confirmation period 122, a transaction is then created on the sidechain 189 referencing the output from the parent blockchain 188.

The sidechain, using a sidechain validator service, such as the block validator 192 of the host organization, is then provided with an SPV proof that shows the parent chain asset was created and encumbered by sufficient work within the parent chain. A sidechain validator service (e.g., block validator 192 if performed by the host organization's available services) will then validate that the SPV proof associated with the parent blockchain 188 asset meets the required threshold level of work indicated by the SPV proof at operation 154 and a sidechain 189 asset corresponding to the parent blockchain 188 asset is then generated.

The generated sidechain 189 asset also may be held for a predetermined contest period at operation 154, during which time the transfer will be invalidated if a reorganization proof 183 associated with the parent blockchain 188 asset is detected in the parent blockchain.

The contest period at operation 154 may be a duration during which a newly-transferred token, coin, value, or payload data may not be spent, accessed, or consumed on the sidechain 189. The predetermined contest period is implemented to prevent any possibility for double-spending in the parent blockchain 188 by transferring previously-locked coins, tokens, value, or payload data during a reorganization. If at any point during this delay, a new SPV proof 184 (known as a "reorganization proof") is published containing a chain with more aggregate work which does not include the block in which the SPV lock output 121 was created, the conversion is retroactively invalidated. If no reorganization proof is detected, the sidechain asset may be released. All participating nodes on the sidechain have an incentive to produce reorganization proofs if possible, as the consequence of a bad proof being admitted degrades the value of all sidechain tokens, coins, value, or trust in the authenticity of payload data stored by the sidechain 189.

Similar to the above, an exemplary contest period 126 at operation 156 may also be on the order of 1-2 days. To avoid these delays, users may instead employ use atomic swaps for fungible transfers, so long as a liquid market is available. Where the exchanged asset is a unique or less common token, value, or payload data, atomic swaps will not be feasible and a sidechain transfer must instead occur, despite the necessity of a potentially lengthy 1-2 day waiting period.

Upon eventual release of the sidechain asset, the side chain asset corresponding to the parent chain asset may then be transferred or consumed within the sidechain one or more times the intra-chain transfers 123 of the sidechain 189. While locked on the parent blockchain 188, the asset is freely transferable within the sidechain and without requiring any further interaction with the parent blockchain 188, thus permitting the sidechain 189 to again operate wholly independently. Notwithstanding the above, the sidechain asset retains its identity as a parent chain token, coin, value, or payload data and may therefore, if the need arises, be transferred back to the originating parent blockchain 188 from which the sidechain asset originated. In certain embodiments, transfers are relegated to only a single hop, such that an asset cannot be transferred to a sidechain 189 and then transferred again to another sidechain, where it is necessary to prevent obfuscation of the source. Such restrictions are dependent upon the particular blockchain protocol chosen and the define exchange agreement (e.g., pegging conditions) established between a parent blockchain 188 and a sidechain 189.

Where it becomes necessary to redeem a sidechain asset in the parent blockchain 188, the sidechain asset may be sent to an output of the sidechain as depicted at operation 157. An SPV proof 182 associated with the sidechain asset is thus generated and communicated to the parent blockchain 188. A parent chain validator service, such as the block validator 192 of the host organization 110, may validate the SPV proof 182 associated with the sidechain asset at operation 156. The validated the SPV proof 182 associated with the sidechain 189 asset may include, for example, validation that the SPV proof 182 associated with the sidechain asset meets the threshold level of work indicated by the SPV proof 182 associated with the sidechain asset.

As before, the parent chain asset associated with the sidechain asset may be held for a second predetermined contest period at step 129, during which a release of the parent chain asset is denied at operation 128 where the contest period ends if a reorganization proof 183 associated with the sidechain asset is detected in the sidechain. The parent chain asset may be released if no reorganization proof 183 associated with the sidechain asset is detected.

If validation failure occurs with respect to the new and second SPV proof 184, after the reorganization proof 183 is received, then a new and second SPV proof 184 associated with the sidechain asset may be received and validated by the parent blockchain 188 during a third predetermined contest period at operation 159. The parent blockchain 188 asset may be released if no reorganization proof associated with the sidechain asset is detected during the third predetermined contest period, after which the parent chain asset is free to be transferred within the parent chain via the depicted intra-chain transfers 123 shown at the rightmost side of the parent blockchain 188 flow.

Because pegged sidechains may carry assets from many different blockchains, it may be problematic to make assumptions about the security of the other foreign blockchains. It is therefore required in accordance with certain embodiments that different assets are not interchangeable (except by an explicit trade) within the sidechain. Otherwise, a malicious user may potentially execute a fraudulent transaction by creating a worthless chain with a worthless asset, and then proceed to move the worthless asset from their worthless chain into the primary blockchain 188 or into a sidechain 189 with which the primary blockchain 188 interacts and conducts exchanges. This presumes that the worthless chain secures a pegged exchange agreement with the sidechain. However, because the rules, configuration options, and security scheme of the sidechain 189 is not controlled by the parent blockchain 188 (assuming the sidechain is a foreign sidechain and not another blockchain protocol provided by the host organization 110), it simply cannot be known with certainty that the sidechain 189 being interacted with does not contain such vulnerabilities. To negate this potential security vulnerability, the sidechain 189 may be required, as per the pegged exchange agreement, to treat assets from separate parent blockchains as wholly as separate asset types, as denoted by the block type portion of a blockchain protocol block as depicted at FIG. 1B, element 167.

With a symmetric two-way pegged sidechain transfer, both the parent blockchain 188 and sidechains 189 may perform SPV validation services of data on each other, especially where the parent blockchain 188 is provided the host organization and where the sidechain is a foreign sidechain for which the host organization is merely a participating node via the sidechain exchange manager node 193. Because the parent blockchain 188 clients (e.g., participating nodes) do not observe every sidechain, users import proofs of work from the sidechain into the parent chain in order to prove possession. In a symmetric two-way peg, the reverse is also true. For example, to use Bitcoin as a parent blockchain 188, an extension script to recognize and validate such SPV proofs may be utilized. To facilitate such transactions, the SPV proofs are sufficiently small in size so as to fit within a Bitcoin transaction payload. However, such a change may alternatively be implemented as a forking transaction, as described previously, without affecting transactions not involved in pegged sidechain transactions. Stated differently, using symmetric two-way pegged sidechains as described above, no further restrictions need to be placed upon any transaction deemed valid within Bitcoin.

Through the use of such pegged sidechains transactions, independent blockchains are made to be flexible enough to support many assets, including assets that did not exist when the chain was first created. Each of these assets may be labeled with the blockchain from which it was transferred so as to ensure that transfers may be unwound (e.g., transferred back) correctly.

According to certain embodiments, the duration of the contest period is made as a function of the relative hashpower of the parent chain and the sidechain, such that the receiving sidechain (or the parent blockchain with an incoming transfer) may only unlock tokens, coins, value, or data payloads, given an SPV proof of one day's worth of its own proof-of-work, which may, for example, correspond to several days of the sending blockchain's proof-of-work. Security parameters of the particular sidechain's blockchain protocol implementation may thus be tuned to each particular sidechain's implementation.

According to described embodiments, the block validator 192 may require, utilize, or apply various types of consensus management to the blocks requiring validation.

When a block containing a particular asset or transaction is to be added to the blockchain, the transaction type database is queried using the type of the particular asset or transaction that is to be added to the blockchain to determine the corresponding consensus protocol type that is to be used to commit the particular asset or transaction, or block containing the particular asset or transaction, to the blockchain. For example, in the database, a transaction type of "loan" may be associated with a consensus protocol type of "proof of stake" (PoS), an asset type of "document" may be associated with a consensus protocol type of "*Byzantine Fault Tolerant*" (BFT), an asset or transaction type of "currency" may be associated with a consensus protocol type of "proof of work" (PoW), and a default transaction type to be used in the case of an otherwise unenumerated transaction type in the database may be associated with a default consensus protocol type, say, PoS. Another transaction type may correspond to an asset type having metadata stored therein, possibly typed as "metadata," while a closely related transaction type stores a "related entity" as metadata within the blockchain having a transaction type of either "metadata" if it shares the same type as normal metadata or having a transaction type of "related entity" if separate. Still further, a "stored record" transaction type may be utilized to store a record having multiple distinct data elements embedded therein, typically which will be defined by metadata specified by an application developer.

For instance, when a block or transaction within a block having a particular transaction type corresponding to transactions utilizing a declared smart action is to be added to the blockchain, the consensus protocol type to be used to commit the block or transaction therein to the blockchain is PoS, when a block or transaction therein with a particular asset having the type "document" is to be added to the blockchain, the consensus protocol type to be used to commit the block or transaction therein to the blockchain is BFT, and when a block or transaction therein with a particular transaction having a transaction type that is not specified in the database is to be added to the blockchain, then the default consensus protocol type of PoS is to be used to commit the block or transaction therein to the blockchain.

This selected consensus protocol type may be communicated to the nodes in the consortium for use in for validating the request to add the new block or transaction therein to the blockchain. According to certain embodiments, the host organization 110 receives validation of the request to add the new block or transaction therein to the blockchain when the nodes in the consortium reach consensus according to the selected consensus protocol to add the block or transaction therein to the blockchain and communicate such to the host.

Any relevant factors may be used in determining which nodes participate in the consensus protocol, including, for example, the selected consensus protocol itself, a particular node's computing resources, the stake a particular node has in the consortium or the selected consensus protocol, relevant (domain) knowledge a particular node has, whether that knowledge is inside (on-chain) or outside (off-chain) with regard to the blockchain or consortium, a particular node's previous or historical performance, whether in terms of speed or accuracy, or lack thereof, in participating in the selected consensus protocol, the block number of the new block being added to the blockchain, the number of transactions in the new block, the size of the block, and the fiduciary or nonfiduciary nature of the assets or transactions in the block being added to the blockchain.

According to a particular embodiment, the host organization 110 receives from each of one or more of the nodes in a peer-to-peer network a weighted vote to validate or to add a new block or transaction therein to the blockchain, in response to the request, or in response to a request for a vote issued by the blockchain platform host. These nodes learn of the request either through a blockchain protocol packet broadcast by the node generating the request, or by communication with other nodes in the consortium or the blockchain platform host providing notice of the request in conjunction or combination with the request for a vote transmitted by the blockchain platform host. The host organization then responsively validates, or receives validation of, the request to add the new block or transaction therein to the blockchain when a sum of the received weighted votes exceeds a threshold.

According to another embodiment, a consortium of nodes participate in a private, or permissioned, blockchain within which each node is assigned a weight that its vote will be given, for example, based on domain (general) knowledge about the transactions, or types of transactions, the nodes may add to a new block in the blockchain. Certain nodes may be given a zero weight within such a permissioned blockchain, whereas other nodes may be given such a significant weight that their vote is near controlling or even controlling when combined with a limited number of other highly weighted nodes, depending upon the particular implementation.

Before a node adds a transaction to a new block of the blockchain, or before the new block including the transaction may be added to the blockchain, other nodes in the consortium vote on adding the transaction to the new block for the blockchain and/or adding the new block to the blockchain. When a majority of nodes agree the transaction and/or new block is valid and may thus be accepted as a valid block on the primary blockchain, the transaction and/or new block is added and accepted to that primary blockchain, sometimes called the main chain or the consensus chain. For instance, while an invalid block may be added to the blockchain, such an invalid block in effect creates a side chain which fails to attain consensus, and thus, is never accepted as an added valid block within the main or primary blockchain. Nodes are weighted such that a "majority" may be obtained or denied based on the votes of one or more of the nodes participating in the private blockchain, that is, a majority may be obtained from less than all of the nodes participating in the blockchain.

According to this embodiment, the parties in the consortium agree upon the weight, w, to assign each node in the consortium, for example, based on a party's domain knowledge, and/or other criteria, including, for example, a party's participation in another blockchain or sidechain. The total weight, W, of the nodes in the consortium is equal to the sum of the individual node weights, $w_1+w_2+ \ldots w_n$, where n is the number of nodes in the consortium. The weight, w, of any one member, or the ratio of w/W may or may not exceed a certain threshold, in one embodiment. Each node's weight is attributed to the respective node's vote. If the sum of the weights for the nodes that voted exceed a certain threshold, the transaction/new block is validated and added to the blockchain. In particular, the transaction/new block is added if the total weight, W, attributed to the votes meets or exceeds a threshold (e.g., a plurality, majority, supermajority, in terms of percentage of w/W, or absolute value for w, whatever is agreed upon by the consortium) to reach consensus for the blockchain. In this embodiment, the nodes in the blockchain do not need to come to unanimous agreement about adding the transaction and/or new block to the blockchain, and indeed, after the threshold is met, a node need not begin, or continue, to participate in the voting process.

In one embodiment, at least a minimum number of nodes, k, vote on adding a transaction to the new block in the blockchain, or adding the new block that includes the transaction to the blockchain, to mitigate the risk of fraud or double-spending, or to prevent one node with a large weight, w, or a small group of nodes with a collectively large weight, from controlling the outcome of the vote. In one embodiment, the number of nodes that participate in voting, k, or the ratio of k/n must meet a minimum threshold.

Figure 3A:
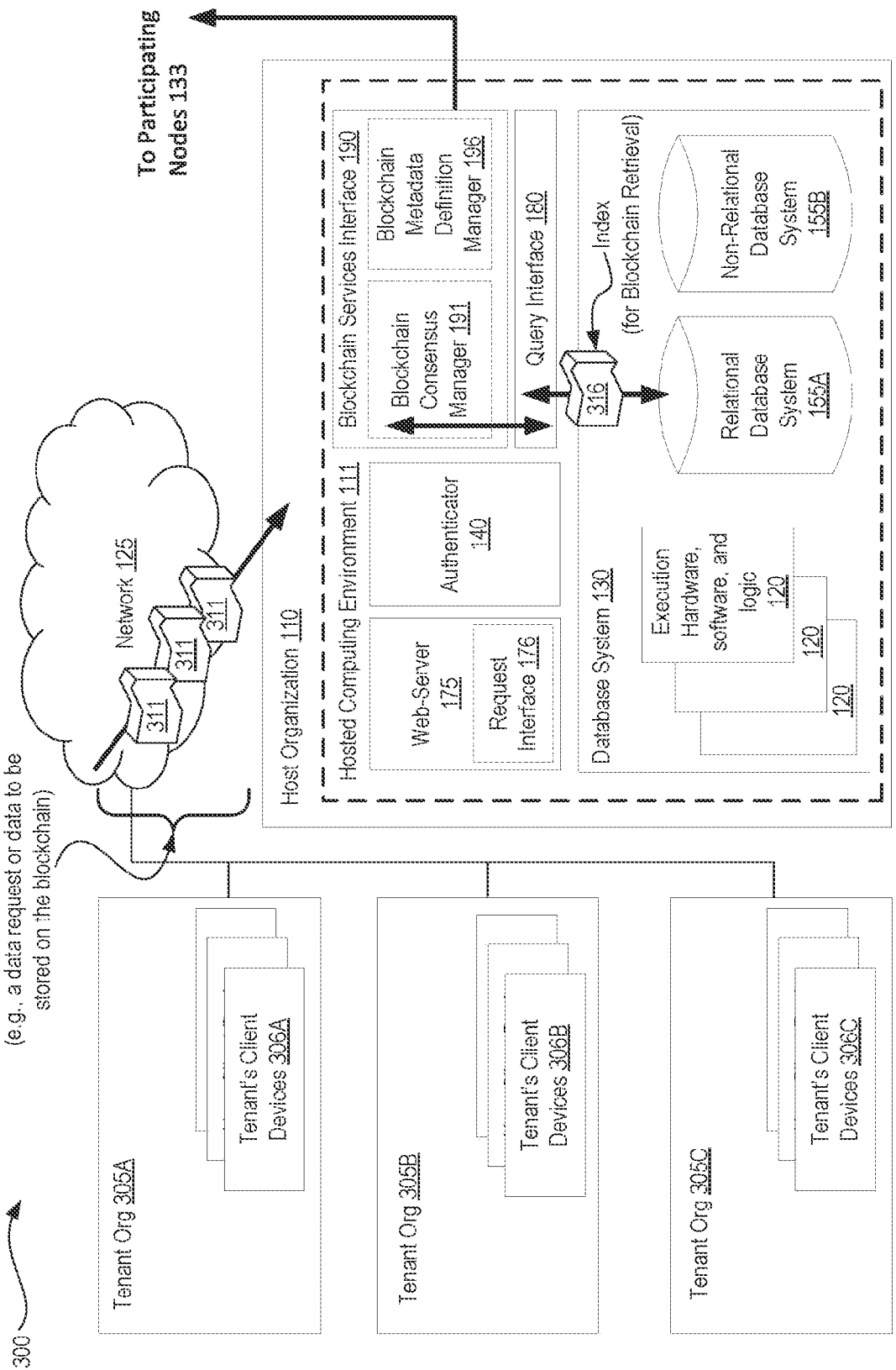
FIG. 3A depicts an exemplary architecture in accordance with described embodiments.

FIG. 3A depicts an exemplary architecture 300 in accordance with described embodiments.

As depicted here, there is again the host organization 110 which includes the hosted computing environment 111 having a processors and memory (e.g., within the execution hardware, software, and logic 120 of the database system 130) which serve to operate the blockchain services interface 190 including the blockchain consensus manager 191 and blockchain metadata definition manager 196. There is additionally depicted an index 316 which provides addressing capabilities for data, metadata, and records which are written to, or transacted onto the blockchain.

Additionally depicted are the multiple tenant orgs 305A, 305B, and 305C (also referred to sometimes as customer orgs) each of which have tenant client devices 306A, 306B, and 306C via which the tenants and the tenants' users may interact with the host organization 110 and its services. For example, the tenant orgs may submit queries or data 311 to the host organization to request data retrieval from the blockchain or to store data to the blockchain, either of which may utilize the depicted index 316.

According to certain embodiments, the index 316 implements a Merkle Tree Index or a Merkle Directed Acyclic Graph (DAG) or a "Merkle-DAG" tree index. In cryptography and computer science, a hash tree or Merkle tree is a tree in which every leaf node is labeled with the hash of a data block, and every non-leaf node is labeled with the cryptographic hash of the labels of its child nodes. Such trees allow for efficient and secure verification of the contents of large data structures and thus provide significant efficiencies for data retrieval from large data structures. According to such an embodiment, implementing the index 316 via a Merkle tree or the Merkle-DAG tree recursively defines the index as a binary tree of hash lists where the parent node is the hash of its children, and the leaf nodes are hashes of the original data blocks. The Merkle-DAG tree permits for unbalanced trees and permits data in the leaf (terminal) nodes.

Implementing the index 316 via a Merkle tree provides a means to prove the integrity and validity of data stored within the index, requires relatively little memory or disk space as the proofs are computationally easy and fast, and additionally, the proofs and management for the Merkle tree index requires only very small or tiny amounts of information to be transmitted across networks, thus being more operationally efficient in terms of network resource consumption. While many blockchains heavily rely upon the use of Merkle trees for the purposes of block verification, the index 316 implemented utilizing a Merkle tree, is unrelated to the block verification functions of the blockchain and is used here as a robust and efficient means by which to store the index 316 information.

FIG. 3B depicts another exemplary architecture 301 in accordance with described embodiments.

There is again the host organization 110 which includes the hosted computing environment 111 having a processors and memory (e.g., within the execution hardware, software, and logic 120 of the database system 130) which serve to operate the blockchain services interface 190 including the blockchain consensus manager 191 and blockchain metadata definition manager 196. There is additionally depicted an index 316 which provides addressing capabilities for data, metadata, and records which are written to, or transacted onto the blockchain 399.

As shown, the index 316 is stored within the database system 130 of the host organization, however, the Merkle tree index 316 may alternatively be written to and stored on the blockchain itself, thus enabling participating nodes with the blockchain which lack access to the query interface 180 of the host organization to nevertheless be able to retrieve the Merkle tree index 316 (when stored on the blockchain) and then use an address retrieved from the Merkle tree index 316 to directly reference an addressable block on the blockchain to retrieve the desired record, data, or metadata, without having to traverse the entire blockchain or search the blockchain for the needed record.

As depicted, there is another index 316 depicted as being shown within the last standard block 142 of the blockchain 399. Only one index 316 is required, but the index 316 may permissibly be stored in either location.

The Merkle tree index 316 depicted in greater detail at the bottom shows a level 0 Merkle root having a hash of ABCDE, followed by a hash layer with two hash nodes, a first with hash ABC and a second with a hash DE, followed by the data blocks within the data leafs identified by hash A, B, C, D, and E, each containing the addressing information for the addressable blocks on the blockchain.

Storing data and metadata on the blockchain 399 via the blockchain metadata definition manager 196 in conjunction with the use of a Merkle tree index 316 is much more efficient than previously known data storage schemes as it is not necessary to search through multiple blocks 141 and 142 of the blockchain to retrieve a data record. Rather, the index 316 is first searched to retrieve an address for the desired block, which is very fast and efficient, and then using the retrieved address from the index 316, the record is retrieved directly from the addressable block on the blockchain 399.

As data is stored within a blockchain using conventional techniques, the amount of data in the blockchain explodes in terms of total volume of stored data creating scalability problems and resulting in problematic inefficiencies. The total volume of data stored to a blockchain tends to explode or grow unsustainably over time because every time a stored record is updated or modified, it is necessary to re-write the entirety of the modified record back to the blockchain which then becomes the most recent and up-to-date record, however, all prior versions and copies are retained within the blockchain, thus resulting in significant duplicative data entries being stored. The benefit to such an approach is that an entire record may be retrieved from a single block on the blockchain, without having to refer back to prior blocks on the blockchain for the same record. But, such a storage scheme is highly inefficient in terms of storage.

Alternatively, only a modification to a record stored within the blockchain may be stored, in accordance with conventional approaches, thus resulting in the modified data being written into a new block on the blockchain, with the non-modifiable data being retrievable from a prior block of the blockchain. This approach reduces the total amount of data stored by the blockchain. Unfortunately, any data retrieval of a modified record requires the inspecting and retrieval from multiple blocks on the blockchain, thus mitigating the data redundancy and unsustainable growth problem, but trading that problem for an undesirable data retrieval inefficiency problem.

In such a way, data management for records and information stored within the blockchain 399 is improved. Moreover, metadata may additionally be stored within the blockchain to provide additional information and context regarding stored records, with each of the data records and the metadata describing such data records being more easily retrievable through the use of the index 316. Such metadata permits a business or other entity to transform the data record retrieved from the blockchain back into a useable format much easier than with conventional approaches which lose such context and metadata for any record written to the blockchain.

Figure 3C:
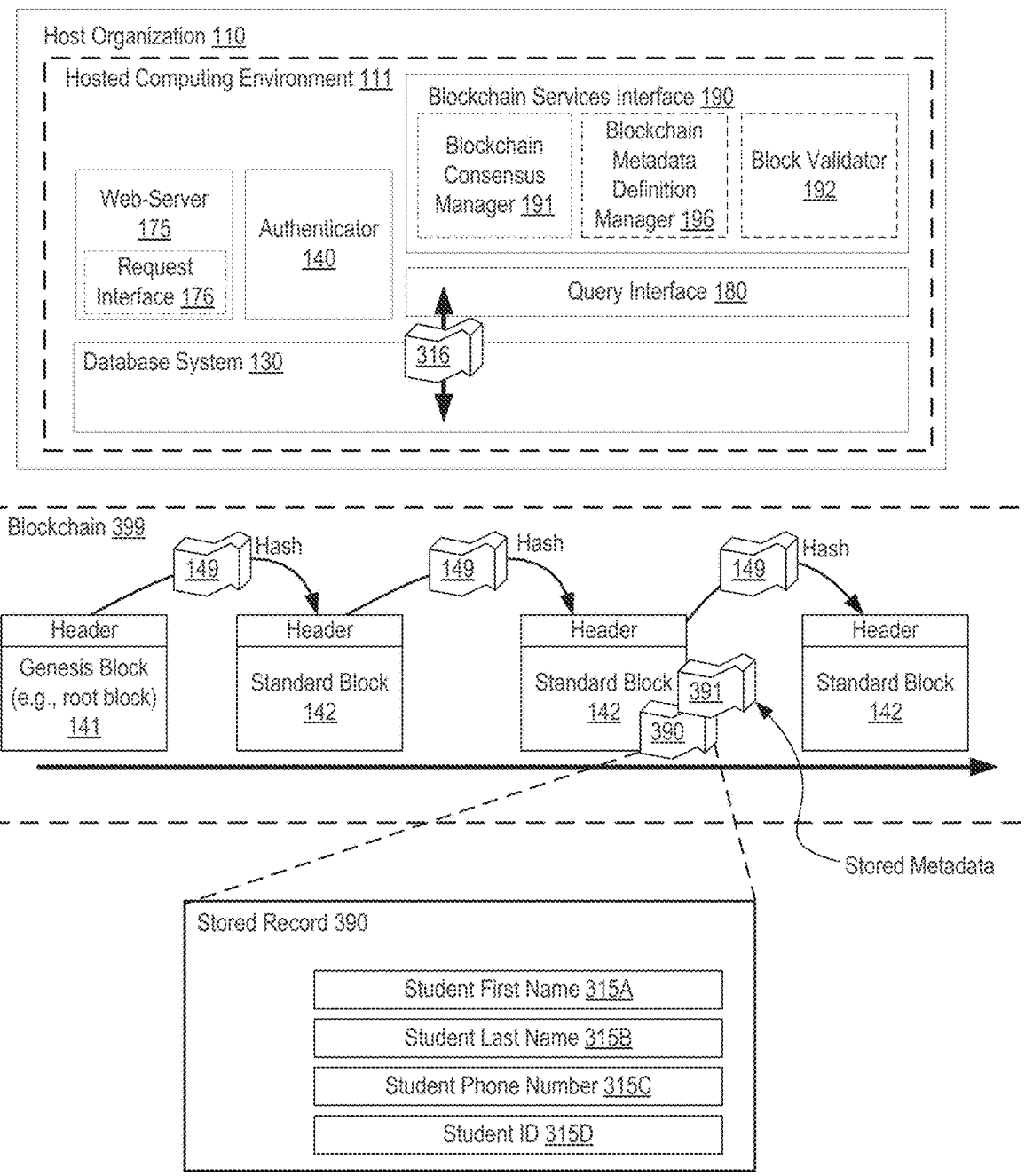
FIG. 3C depicts another exemplary architecture in accordance with described embodiments.

FIG. 3C depicts another exemplary architecture 302 in accordance with described embodiments.

There is again the host organization 110 which includes the hosted computing environment 111 having a processors and memory (e.g., within the execution hardware, software, and logic 120 of the database system 130) which serve to operate the blockchain services interface 190 including the blockchain consensus manager 191 and the blockchain metadata definition manager 196 which utilizes an index 316 by which to identify an addressable block of the blockchain 399 via which a desired record is stored. There is additionally depicted an exemplary stored record 390 at the second to last block of the blockchain 399.

Here the stored record 390 stores student information including a student first name 315A, a student last name 315B, a student phone number 315C, and a student ID 315D.

Once the stored record 390 is transacted onto the blockchain, for instance, by adding an asset to the blockchain within which the stored record 390 is embodied, student data is persistently stored by the blockchain and accessible to participating nodes with access to the blockchain 399, however, when such data is retrieved, the stored record does not in of itself describe how to use such data, any particular format for such data, or how to validate such data. Therefore, it is further permissible to store metadata within the blockchain which may then be used to define the format, validation means, and use for such data, but storage of the metadata only exacerbates the problem of searching for and retrieving data from the blockchain as there is now a stored record 390 and also stored metadata 391 which is associated with that record. An organization methodology is thus provided by the indexing scheme as implemented by the blockchain metadata definition manager 196 in conjunction with use of the index 316 which provides for more efficient storage, retrieval, and validation of data stored on the blockchain.

According to one embodiment, the stored record 390 is therefore converted to a more efficient format for storage within the blockchain. Consider the stored record 390 for which student information is stored. Initially, the stored record 390 may include only student first name 315A and student last name 315B, and is then stored. Subsequently, the student record is updated to include student phone number 315C, and thus, either the stored record 390 is updated and re-written to the blockchain in its entirety thus creating a second copy, albeit updated, of the stored record 390 or alternatively, only the new portion, the student phone number 315C is written to the blockchain with a reference back to the prior record, in which case total storage volume is reduced, but retrieval of the entire record requires searching for and finding multiple blocks on the blockchain from which to reconstruct the entire stored record 390. Worse yet, if the student ID 315D is subsequently assigned, then the stored record 390 needs to be updated again, thus writing yet another entire stored record 390 to the blockchain resulting in now three different versions and copies on the blockchain, or as before, writing only the new portion of the stored record to the blockchain 399, in which case the stored record 390 is fragmented across at least three blocks of the blockchain.

This fragmentation is problematic because if you are looking for student information, it may result that a first block contains the student's first name and last name, a second block contains a change to the student's last name due to an update, a third block contains only the student's phone number, and so forth. Consequently, it is necessary to travel the blocks of the blockchain to pick up all the fragmented pieces so as to reconstruct the entire stored record 390 before it may be used for whatever application requires the data.

FIG. 3D depicts another exemplary architecture 303 in accordance with described embodiments.

According to one embodiment, the blockchain metadata definition manager 196 writes data or metadata onto a blockchain by transacting an asset to the blockchain or adding an asset to the blockchain via a new transaction with the blockchain. According to a particular embodiment, the transaction has a specific transaction type, for instance, defined as a blockchain storage transaction type, which triggers execution of a smart contract to perform validation of the transaction and specifically to perform validation of the data or metadata within the asset being added to or transacted onto the blockchain.

For example, such a smart contract 363 may execute via the host organization's blockchain services interface 190 which performs the validation and then transacts the new asset onto the blockchain pursuant to successful validation of the data or metadata within the asset being stored on the blockchain. As shown here at element 363, a smart contract executes and validates the transaction for the blockchain. Subsequently, a validated transaction 364 is then added to or transacted onto the blockchain 399.

Figure 4A:
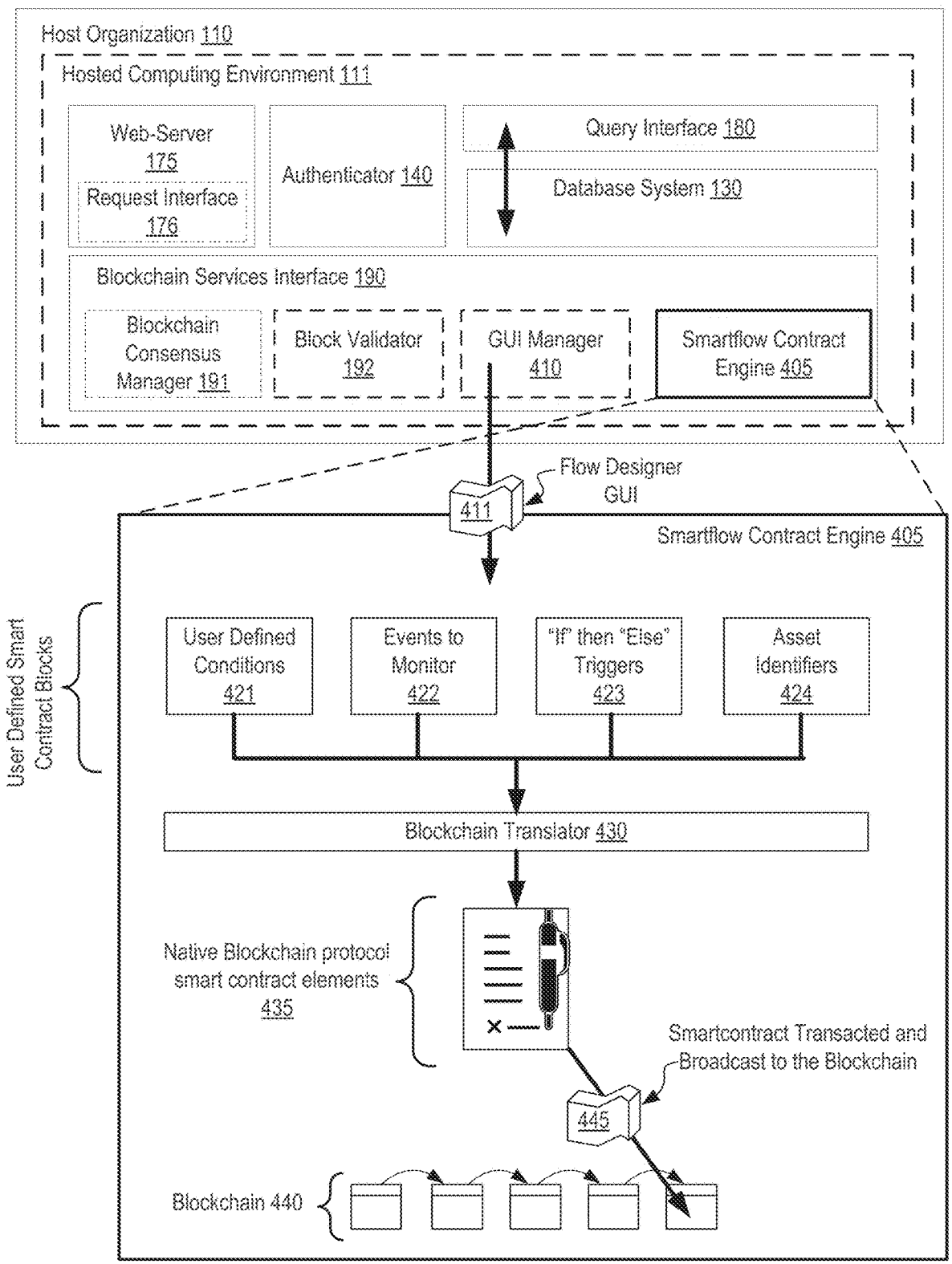
FIG. 4A depicts another exemplary architecture, with additional detail of a blockchain implemented smart contract created utilizing a smartflow contract engine, in accordance with described embodiments.

FIG. 4A depicts another exemplary architecture 400, with additional detail of a blockchain implemented smart contract created utilizing a smartflow contract engine 405, in accordance with described embodiments.

In particular, there is depicted here within the host organization the blockchain services interface 190 which now includes the smartflow contract engine 405 and additionally includes the GUI manager 410.

Because blockchain utilizes a distributed ledger, creation and execution of smart contracts may be technically complex, especially for novice users. Consequently, a smart flow visual designer allow implementation of smart contracts with greater ease. The resulting smart flow contract has mathematically verifiable auto-generated code, as created by the blockchain translator 430 freeing customers and users from having to worry about the programming language used in any given blockchain protocol. Moreover, the smart flow contract engine implements visual designers that coordinate with the blockchain translator 430 to generate the requisite native code capable of executing on each of the participating nodes of the blockchain, thus further allowing easy processing and verification of the smart contract. According to certain embodiments, each smart flow contract utilizes a mathematical code based verifiable encryption scheme.

Flow designers provide users with a simple, intuitive, web-based interface for designing applications and customized process flows through a GUI based guided flow design experience. The flow designer enables even novice users to create otherwise complex functionality, without necessarily having coding expertise or familiarity with the blockchain.

The GUI manager 410 presents a flow designer GUI 411 interface to a user device via which users may interact with the host organization. The smartflow contract engine 405 in coordination with the GUI manager interprets the various rules, conditions, and operations provided by the user, to generate a smartflow contract which is then translated or written into the target blockchain protocol.

Through the flow designer GUI 411, a user may completely define utilizing visual flow elements how a particular process, event, agreement, contract, purchase, or some other transaction needs to occur, including dependencies, checks, required process inputs and outputs, triggers, etc.

Using the flow designer GUI 411, the user simply drags and drops operational blocks and defines various conditions and "if then else" events, such as if this event occurs, then take this action. As depicted here, there are a variety of user defined smart contract blocks including user defined conditions 421, events to monitor 421, "if" then "else" triggers 423, and asset identifiers 424.

Once the user has completed defining the flow including all of its operational blocks, conditions, triggers and events, the smartflow contract engine takes each of the individual blocks and translates them into a native target blockchain protocol via the blockchain translator 430, and then generates a transaction to write the translated smartflow contract 445 into the blockchain 440 via the blockchain services interface 190.

Once transacted to the blockchain, every participating node with the blockchain will have a copy of the smart contract, and therefore, if any given event occurs, the corresponding trigger or rule or condition will be viewable to all participating nodes, some of which may then take an action based on the event as defined by the smart contract.

The blockchain services interface 190 of the host organization provides customers, users, and subscribers access to different blockchains, some of which are managed by the host organization 110, such as private blockchains, others being public blockchains which are accessible through the host organization 110 which participates as a node on such public blockchains. Regardless, each blockchain utilizes a different blockchain protocol and has varying rules, configurations, and possibly different languages via which interfaces must use to communicate with the respective blockchains. Consequently, the blockchain translator 430 depicted here translates the user defined smart contract blocks into the native or required language and structure of the targeted blockchain 440 onto which the resulting smart contract is to be written or transacted.

Once the smart contract is transacted and broadcast to the blockchain 445 it is executed within the blockchain and its provisions, as set forth by the user defined smart contract blocks, are then carried out and enforced.

According to one embodiment, a salesforce.com visual flow designer is utilized to generate the user defined smart contract blocks which are then translated into a blockchain smart contract. According to other embodiments, different visual flow designers are utilized and the blockchain translator 430 translates the user defined smart contract blocks into a blockchain smart contract.

The resulting native blockchain protocol smart contract elements 435 may be embodied within a code, structure, or language as dictated by the blockchain 440 onto which the smart contract is to be written. For instance, if the smart contract is to be written to Ethereum then the blockchain translator 430 must translate the user defined smart contract blocks into the Ethereum compliant "Solidity" programming language. Solidity is a contract-oriented, high-level language for implementing smart contracts specifically on Ethereum. Influenced by C++, Python and JavaScript, the language is designed to target the Ethereum Virtual Machine (EVM). Smart contract elements include support for voting, crowd funding, blind auctions, multi-signature wallets, as well as many other functions.

Conversely, if the smart contract is to be written to Hyperledger, then the language is different, utilizing the Go programming language which permits use of a distributed ledger blockchain for and smart contracts, among other capabilities.

While smart contracts are beneficial and supported by many blockchain protocols they may be cumbersome to implement to the requirement that they be programmed in differing languages depending on the particular blockchain being targeted. Therefore, not only must users understand programming constructs, but also the particular syntactical nuances of the required programming language for the blockchain protocol in question.

By utilizing the smart flow contract engine 405, even novice users may create compliant smart contracts by generating the smart contract elements with the flow designer and then leveraging the blockchain translator 430 to actually render the native blockchain programming language code embodying the smart contract elements as defined by the user, subsequent to which the blockchain services interface 190 handles the transacting of the smart contract onto the blockchain.

Consider for example a vendor that sells to Home Depot and wants to execute a smart contract with Home Depot which uses Ethereum. The vendor logs in with the host organization, assuming he is an authenticated user and has access to the cloud subscription services, and then accesses the smartflow contract engine 405 through which the user may generate whatever flow he wishes. When done, the user, via the flow designer GUI 411, instructs the blockchain services interface 190 to execute the smart contract, thus causing the smartflow contract engine to translate the user's custom designed smartflow contract into Ethereum compliant "Solidity" code, subsequent to which the smart contract is then written into the blockchain for execution. The vendor need not know how to program or even understand the details of transacting with the blockchain. Rather, the cloud based services accessible through the host organization 110 remove the complexity from the process and present the user with a simple flow designer GUI 411 through which all the necessary operations may thus be carried out.

According to such embodiments, writing the smart contract to the blockchain requires storing metadata defining the smart contract in the blockchain as supported by the particular blockchain protocol. According to one embodiment, when a transaction occurs on the blockchain, having the metadata for the smart contract therein, the smart contract is executed and the various user defined smart contract events, conditions, and operations are then effectuated.

According to certain embodiments, the user defined smart contract, having been translated and transacted onto the blockchain, triggers events on the within the host organization.

For example, consider that Wal-Mart and Nestle have an agreement that a shipment must be transported within a climate controlled trailer within a range of 35 to 39 degrees Fahrenheit at all time. Moreover, if the temperature exceeds 39 degrees at anytime, then the payment is nullified.

Within the host organization, a Customer Relationship Management (CRM) platform defines and manages the various relationships and interactions between customers, vendors, potential customers. suppliers, etc. The term CRM is usually in reference to a CRM system, which is a tool that helps businesses with contact management, sales management, workflow processes, productivity and so forth.

In the above example with Wal-Mart and Nestle, the CRM system will possess the requirements for the shipment. Because the host organization through the CRM system monitors the shipment and subscribes to shipment events, such as temperature data, the CRM system will monitor for and become aware of a temperature related event for the particular shipment which may then be linked back to the smart contract automatically. More particularly, because the host organization operates as a participating node for the blockchain within which the smart contract is executing, the host organization has visibility to both the smart contract terms and conditions accessible via the blockchain and also the CRM requirements for the shipment, such as the required temperature range.

Therefore, upon the occurrence of a smart contract condition violation, the host organization will synchronize the violation with the CRM system (which is not part of the blockchain) to halt the payment associated with that particular shipment, pursuant to the terms of the executing smart contract.

According to one embodiment, the blockchain sends out an event which the CRM system of the host organization will listen to, and then conduct some substantive action based on the event according to what is specified by the user defined smart contract flow. With the above example, the substantive action being to halt payment for the shipment pursuant to the smart contract on the blockchain.

Each of the participating parties for an executing smart contract will likely have their respective CRM systems subscribed to events of the blockchain associated with the executing smart contract, and therefore, both parties are likely to be aware of the event.

According to one embodiment, logic is written into the CRM system to facilitate a specific action responsive to a blockchain event. Stated differently, non-blockchain actions may be carried out pursuant to an executing blockchain smart contract.

Figure 4B:
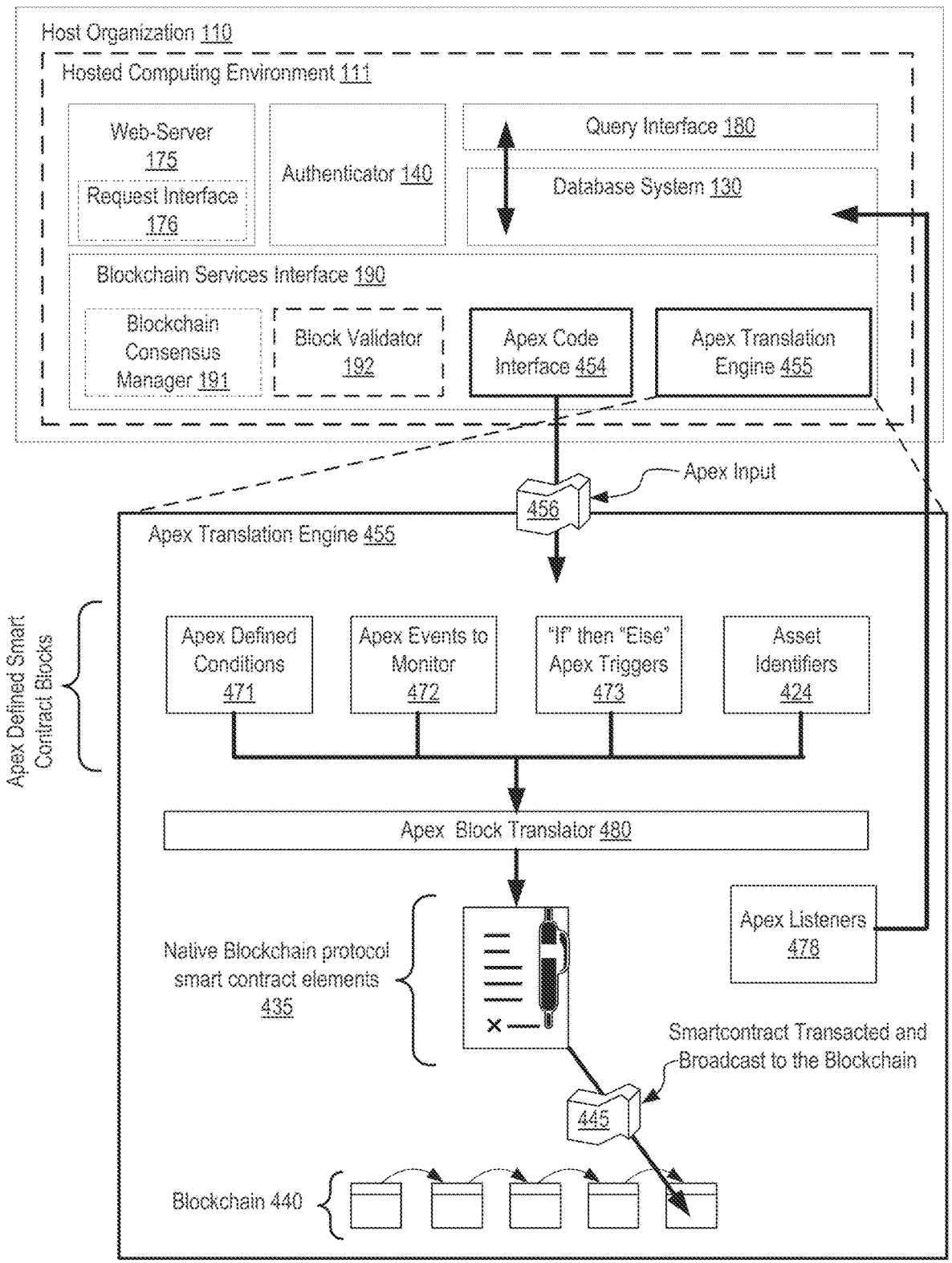
FIG. 4B depicts another exemplary architecture, with additional detail of a blockchain implemented smart contract created utilizing an Apex translation engine, in accordance with described embodiments.

FIG. 4B depicts another exemplary architecture 401, with additional detail of a blockchain implemented smart contract created utilizing an Apex translation engine 455, in accordance with described embodiments.

As depicted here, there is an Apex translation engine 455 within the blockchain services interface 190.

Apex is a programming language provided by the Force.com platform for developers. Apex is similar to Java and C# as it is a strongly typed, object-oriented based language, utilizing a dot-notation and curly-brackets syntax. Apex may be used to execute programmed functions during most processes on the Force.com platform including custom buttons and links, event handlers on record insertion, update, or deletion, via scheduling, or via the custom controllers of Visualforce pages.

Developers of the salesforce.com host organization utilize Apex frequently to implement SQL programming, database interactions, custom events for GUI interfaces, report generation, and a multitude of other functions. Consequently, there is a large community of developers associated with the host organization 110 which are very familiar with Apex and prefer to program in the Apex language rather than having to utilize a less familiar programming language.

Problematically, smart contracts must be written in the native language of the blockchain protocol being targeted for execution of the smart contract on the respective blockchain.

For instance, as noted above, if the smart contract is to be written to Ethereum then the smart contract must be written with the Ethereum compliant "Solidity" programming language.

Like the smart contracts, Apex is a kind of metadata. Therefore, the Apex translation engine 455 permits developers familiar with Apex to program their smart contracts for blockchains utilizing the Apex programming language rather than utilizing the native smart contract protocol programming language.

As depicted here, developers write their smart contracts utilizing the Apex programming language and then provide the Apex input 456 to the Apex translation engine 455 via the depicted Apex code interface, for example, by uploading a text file having the developer's Apex code embedded therein.

The Apex translation engine 455 parses the Apex input 456 to identify the Apex defined smart contract blocks and breaks them out in preparation for translation. As despite here, there are Apex defined conditions 471, Apex events to monitor 472, "if" then "else" Apex triggers 473, and as before, asset identifiers 424 which are not Apex specific.

The Apex defined smart contract blocks are then provided to the Apex block translator 480 which converts them into the native blockchain protocol smart contract elements 435 for the targeted blockchain protocol. Once translated, the process is as described above, in which the translated smart contract is transacted and broadcast 445 to the blockchain 440 for execution 445.

Unlike the visual flow GUI, because Apex is programmatic, users writing Apex code may write programs to execute on a smart contract and are not limited by the available functions within the visual flow GUI.

According to a particular embodiment, the Apex input 456 is first translated into JavaScript and then subsequently translated into a specific blockchain API appropriate for the targeted blockchain protocol upon which the smart contract is to be executed.

According to another embodiment, listening events may be written using the Apex language and provided in the Apex input 456, however, such listening events are to be executed by the host organization. Therefore, the Apex block translator 480 separates out any identified Apex listeners 478 and returns those to the host organization 110 where they may be implemented within the appropriate CRM system or other event monitoring system. In such a way, developers may write the Apex input 456 as a single program and not have to separately create the smart contract and also the related listening events in separate systems.

Figure 4C:
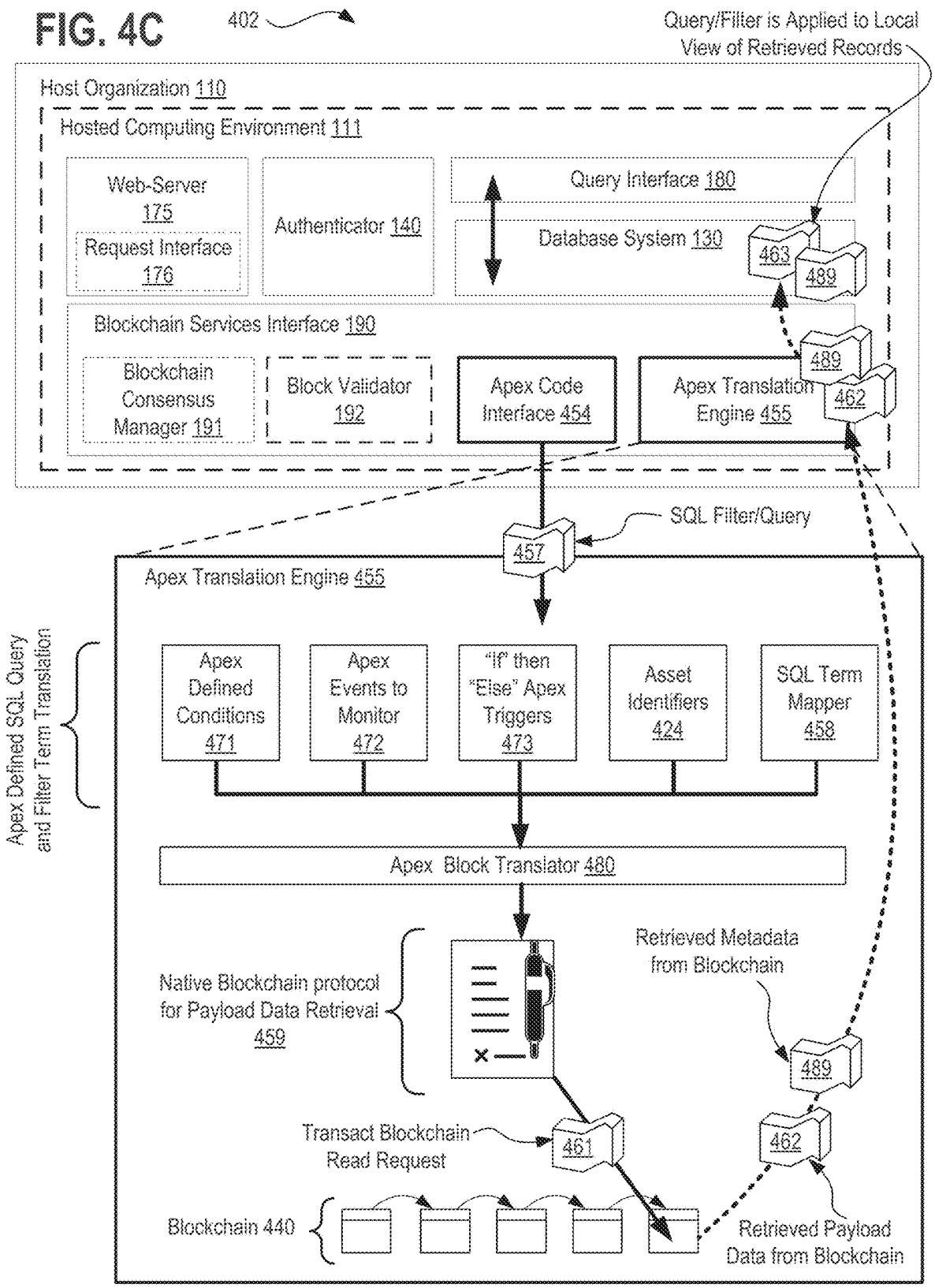
FIG. 4C depicts another exemplary architecture, with additional detail of an SQL Filtering and Query translator utilizing an Apex translation engine for records stored persistently to a blockchain, in accordance with described embodiments.

FIG. 4C depicts another exemplary architecture 402, with additional detail of an SQL Filtering and Query translator utilizing an Apex translation engine 455 for records stored persistently to a blockchain, in accordance with described embodiments.

As may be viewed here, there is now the Apex translation engine 455 which is to receive an SQL filter or an SQL query which is submitted against the host organization's 110 query interface 180, however, for records that are persisted by the blockchain 440, it is necessary for the query interface 180 to delegate some of the work to the blockchain services interface 190.

Problematically, the blockchain has no capability whatsoever to receive, process, or transact SQL based queries or filters as the blockchain is not a relational database system. And yet, the host organization 110 provides on-demand and cloud based services to its users at least partially on the premise that users are provided with greater technical capabilities (e.g., permitting use of the blockchain 440) yet with simplified tools, so as to not burden the host organization's users with technical complexity.

Therefore, the host organization implements the Apex translation engine 455 as depicted here which operates in conjunction with the apex code interface 454 to receive the SQL filter/query 457 from the query interface 180 of the host organization 110.

The SQL filter/query 457 is communicated into the Apex translation engine 455 which as part of its Apex defined SQL query and filter term translation blocks is now depicted as including an SQL term mapper 458 which is capable of reading, parsing, and dissecting the incoming SQL filter/query 457 into its constituent parts, such that the appropriate asset identifiers 424 which actually store the various payload data within assets of the blockchain may be referenced, such that the underlying data records may be retrieved from the blockchain 440.

The parsed terms and the appropriate asset identifiers 424 are then transmitted through the Apex block translator 480 and then converted into native blockchain protocol for payload data retrieval at element 459.

The native blockchain protocol for payload data retrieval at element 459 may then be executed against the blockchain 440 by transacting the blockchain read request 461 onto the blockchain 440 resulting in the retrieved payload data from the blockchain at element 462 being returned from the blockchain 440.

This record set as represented by the retrieved payload data from the blockchain 462 is not in the appropriate format for an SQL filter/query 457, however, it does include the necessary data to ultimately fulfill the received SQL filter/query 457. Stated differently, the retrieved payload data from the assets of the blockchain includes data representing the records being queried, albeit in a wholly incompatible format, corresponding to the format of the blockchain, often with the data being hashed or serialized and thus, needing conversion back into a readable format based on metadata 489 retrieved from the blockchain describing the structure of the stored data.

The retrieved payload data from the blockchain 462 is next returned back to the apex translation engine 455 which converts the data from the blockchain into a readable format. Next the translated records are communicated to the database system 130 within a temporary view 463 of the returned record set at which point the SQL query/filter (e.g., element 457) is then applied to the temporary view 463 at the database system 130 utilizing the original SQL filter/query terms or utilizing translated and optimized SQL filter/query terms, so as to return the originally requested record set responsive to the incoming SQL filter/query.

In such a way, it is thus possible for a user to issue SQL query/filters against data which is stored on the blockchain 440 without the user needing any understanding of how to interact with the blockchain or how to transact with the blockchain, and indeed, without requiring the user even having knowledge that such data is stored on the blockchain 440.

According to one embodiment, the data stored on the blockchain is queried or filtered using the SQL filter/query 457 request and more particularly, the filtering requested is to be done based on relationships between the data elements stored within the blockchain.

Notably, however, there is no construct for "relationships" between data elements for payload data stored within assets on the blockchain as the blockchain is not a relational database system.

Nevertheless, such SQL filter/query 457 requests are made possible through the host organization 110 based on the defined metadata 489 declared, defined, and stored to the blockchain by transacting the metadata to the blockchain to describe the structure and relationships of data being written onto the blockchain by, for example, a declared application. Such metadata may be defined through the creation and declaration of the application in accordance with related embodiments as is described in greater detail below.

In such a way, it is possible to define entities that are related to one another, similar to the manner in which entities are related to one another in a relational database system, with the distinction that such records are written to a DLT platform such as the blockchain 440. Notably, the records within the blockchain are not inherently related to one another as with a relational database, but rather, it is necessary to retrieve both the data and also the metadata which defines such records.

It is therefore in accordance with such embodiments that the Apex translation engine 455 translates the relationships between the defined entities on behalf of the blockchain which then in turn permits the host organization's database system 130 and/or query interface 180 to perform the necessary JOIN operations on the data to form a unified table or a JOIN table view, against which the SQL filter/query 457 request may then be applied.

According to a particular embodiment, any transaction written onto the blockchain results in a leaf node persisting data as an off-chain stored database representation which may later be correlated to an RDBMS format by the Apex translation engine 455.

According to such an embodiment, relational tables are later created by the Apex translation engine based on the retrieved payload data from the blockchain and based on the metadata 489 transacted onto the blockchain and retrieved concurrent with the retrieved payload data.

According to the described embodiments, anytime there is a change to the metadata which defines the structure of such data, the metadata changes are updated by transacting the new metadata definition onto the blockchain, and consequently, any such changes to the metadata are automatically translated into any RDBMS formatted tables which are built on retrieved data, since the Apex translation engine with retrieve and reference the updated metadata definitions.

According to such embodiments, once the RDBMS formatted tables are built by the Apex translation engine, the SQL filter/query 457 request is then queried against the built RDBMS tables at the host organization's 110 database systems 130. According to another embodiment, the RDBMS tables are built first by retrieving the metadata 489 from the blockchain, but without retrieving the payload data. Subsequently, the SQL filter/query 457 request is applied to the RDBMS formatted tables and based on the query, the Apex translation engine identifies the appropriate asset identifiers 424 within which the payload data is stored on the blockchain 440, identifying the corresponding block number for the data on the blockchain before then retrieving the payload data from the blockchain and populating the retrieved data into the previously formatted RDBMS tables, which are structured but empty. The retrieved payload data is then populated into the empty RDBMS tables so as to facilitate the SQL filter/query 457 request being applied against the now populated RDBMS tables in fulfillment of the request.

In such a way, it is then possible to query against the data in the blockchain utilizing SQL queries and it is possible to filter using SQL based on the relationships, notwithstanding the fact that the authoritative source of the data is ultimately the payload data written to assets transacted onto the blockchain 440 and not a relational database system.

By creating a separate table view with the block ID and block number that is persisted to the blockchain for any changes, it is possible to perform much faster lookups utilizing the separate view while still validating that the reference data is current by utilizing the block ID to check the data at the blockchain without having to perform a time-intensive search of the blockchain for the data in question, as the block ID permits reference directly to a single block.

To be clear, according to such an embodiment, there are two queries. A first SQL based query against the temporary view in the database system through the RDBMS formatted tables and then a fast lookup for the block ID and block number is performed and the Apex translation engine then goes back to the blockchain to validate that the queried data is current and accurate, based on the table look up of the block ID and block number which is maintained as the asset identifiers 424 by the Apex translation engine.

Additionally, because the data is represented in an RDBMS format, it is further permissible to perform JOINs on data stored within the blockchain. Such JOINs are important as they permit analytics to be performed utilizing data stored in the blockchain which would not otherwise be possible.

According to such embodiments, the RDBMS formatted table representation in the database system 130 is not an immutable table, however, it is restricted in such a way that no entity has authority to make changes to the RDBMS formatted table, with the exception of the Apex translation engine's transaction playback mechanism discussed below.

Therefore, it is only the blockchain monitoring/event listener component which is enabled to update this table and which performs the necessary synchronizations from the blockchain authoritative source back to the RDBMS formatted table and temporary view in the database system 130 of the host organization anytime that changes to either the metadata or changes to the persisted data stored to the blockchain are observed by the event listener.

According to further embodiments, there is additionally a transaction playback mechanism for processing SQL filter/query 457 requests when the blockchain is inaccessible and a recovery mechanism for blockchain data restoration in the event the blockchain becomes permanently inaccessible or in the highly unlikely event that the data on the blockchain becomes corrupted.

According to such embodiments, the playback mechanism permits SQL filter/query 457 requests to be processed by the host organization 110 without validating the data stored within the blockchain to verify the temporary host organization's view of the data is current.

It is possible that a SQL filter/query 457 request is received while the blockchain 440 is inaccessible. Accordingly, the Apex translation engine in conjunction with the database system 130 of the host organization record all transactions that add, update, or delete data for the temporary view. While such changes are transacted onto the blockchain, those changes are recorded as a series of updates and maintained at the host organization. These changes represent a non-authoritative source, but may nevertheless be referenced.

Therefore, in the event that the blockchain 440 is inaccessible, the recorded changes to the data may be replayed by the database system 130 to update the temporary view of the data at the host organization utilizing the replayed add, delete, and update transactions, thus bringing the temporary view into synchronization with the authoritative source of the same data stored on the blockchain. Once the replay is completed, the SQL filter/query 457 request may then be processed against the temporary view of the data, without requiring the intermediate operation of the Apex translation engine locating the asset identifiers 424 for the data stored on the blockchain to validate and verify the data is current.

Thus, the blockchain may be queried and the SQL filter/query 457 request fulfilled utilizing SQL based language queries and filters even when the blockchain cannot be accessed on a temporary basis.

Such a transaction playback mechanism permits the RDBMS formatted tables and temporary view to self-heal and come back up to a fully restored state at the blockchain level, without needing to reference the blockchain. For example, the host organization's systems will recognize that the blockchain node went down or is inaccessible, and so it then replays all transactions observed and re-applies the metadata to determine the proper state, similar to the manner that all participating nodes on the blockchain would self-update, with the exception that reference is not being made to the blockchain's nodes and likely is much slower than retrieving the state data and current information from the blockchain directly. Notwithstanding the speed penalty, the benefit is that valid data may nevertheless be retrieved despite the blockchain node being down.

According to another embodiment, there is a recovery and restoration mechanism for data stored on the blockchain in the event that the blockchain 440 becomes permanently inaccessible. While this scenario is highly unlikely, it does present the opportunity to perform a data restoration if necessary. Also permissible is the ability to perform a data migration from the blockchain 440 where the data is persisted as the authoritative source to a new blockchain, in the event that the host organization or users wish to relocate their data.

Such an embodiment operates similar to the playback of all recorded transactions which is described above, with the added addition that once the playback is complete, all metadata 489 and the records from the temporary view at the database system 130 of the host organization is then written onto a restored blockchain 440 or written to a new blockchain repository, thus creating new assets on the blockchain within which the records are persisted as payload data and updating the block IDs and asset identifiers 424 for such data, so as to fully recover or restore all data on the blockchain 440 after a catastrophic failure or pursuant to an intentional data migration.

According to a particular embodiment, changes to the metadata are recognized by the host organization's event listener which looks for changes at the blockchain that affect any of the assets within which such metadata is stored. Thus, once metadata is committed to the blockchain pursuant to consensus for a transacted asset, the blockchain services interface will retrieve the updated version of the metadata so that the RDBMS formatted tables for the temporary view within the host organization 110 may be re-built based on the new version of the metadata. For example, the metadata is translated to an SQL data definition language and then based on the metadata, the RDBMS data tables which are empty or the RDBMS data representation for populated tables are rebuilt or restructured according to the new metadata utilizing the translated SQL data definition language.

According to described embodiments, anytime that a blockchain event occurs, cryptographic data is returned and the data is then persisted in the metadata format. The cryptographic data is translated into a format which is understood by other systems, such as using SQL data definitions or a REST standard or some other standardized decrypted format for other systems to reference and consume. This data is then pushed out to other systems which rely upon the data stored in the blockchain which is now inaccessible such that those systems may also synch up any other database with a temporary view of the data or synch up any entity listing for events from the blockchain affecting such data. For instance, an analytics engine may constantly listen to a data feed from the event listener for changes to the blockchain so that it may feed the analytics engine. Similarly, an AI engine may listen to the feed so that it may input training data to the AI, etc.

Figure 5A:
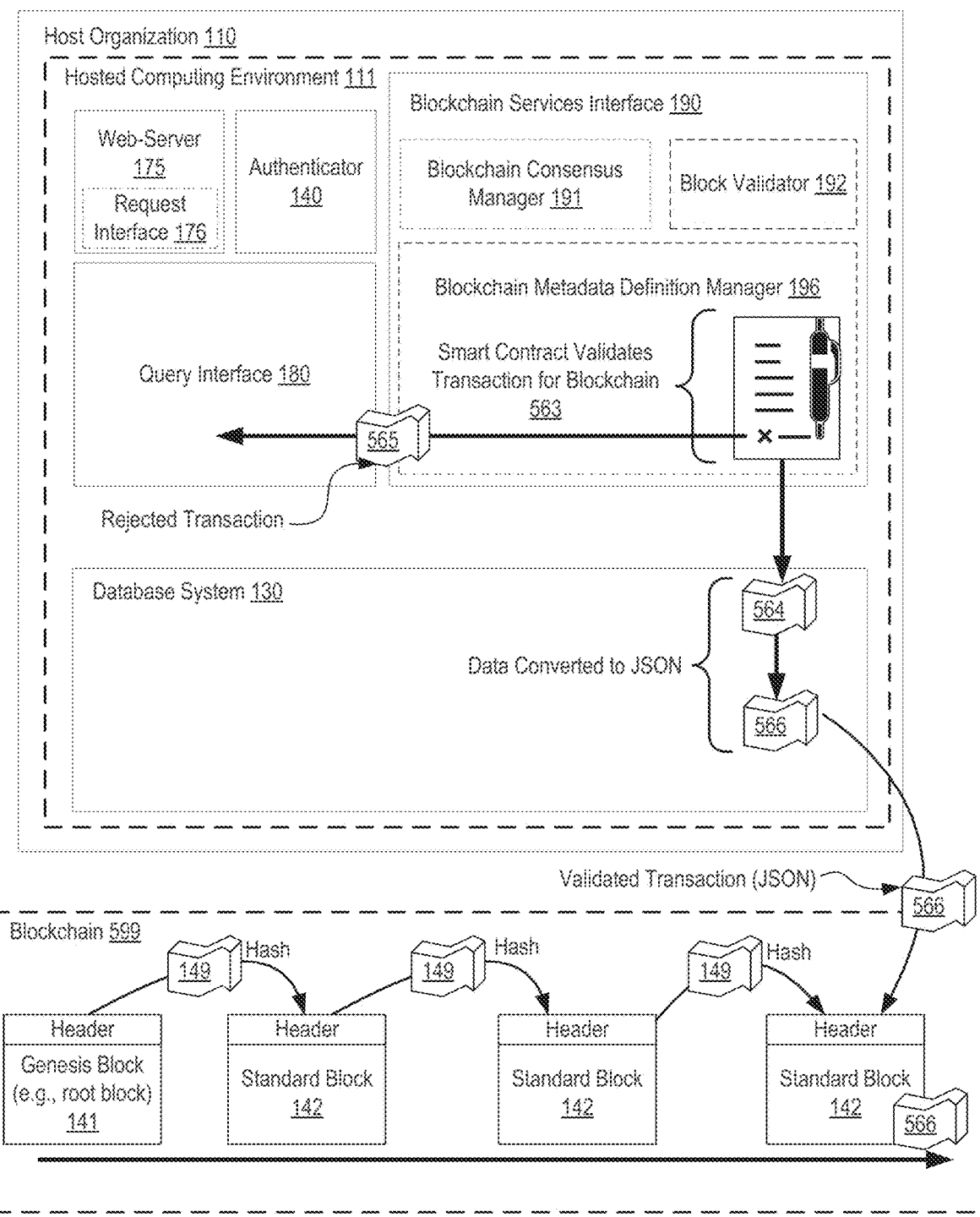
FIG. 5A depicts another exemplary architecture in accordance with described embodiments.

FIG. 5A depicts another exemplary architecture 501 in accordance with described embodiments.

Conventional solutions permit the storage of free-form text within an asset transacted onto the blockchain, for instance, storing such data within a payload portion of the asset, however, because such data is not validated, there is a risk that corrupted or incorrect data is written to the blockchain and later retrieved on the assumption that such data is valid.

By executing a smart contract to perform transaction validation of the entity or asset being transacted onto the blockchain, it is therefore possible to enforce various masks, data structures, data types, data format, or other requirements prior to such data being written to the blockchain 599.

According to such embodiments, the blockchain metadata definition manager 196 executes smart contract validation 563, and if the data to be written to the blockchain is not compliant with the requirements set forth by the executed smart contract, then the transaction is rejected 565, for instance, sending the transaction back to a query interface to inform the originator of the transaction. Otherwise, assuming the transaction is compliant pursuant to smart contract execution, then the transaction is validated 564 and written to the blockchain.

According to one embodiment, the smart contract applies a data mask to validate compliance of the data or metadata to be written to the blockchain. In other embodiments, the smart contract enforces rules which are applied to the data as part of the validation procedure.

According to one embodiment, the smart contract executes as part of a pre-defined smart contract system which executes with any blockchain which permits the use of smart contracts, and the smart contract performs the necessary data validation.

According to one embodiment, the data or metadata to be written to the blockchain 599 is converted to a JSON format to improve storage efficiency. JavaScript Object Notation (JSON) provides an open-standard file format that uses human-readable text to transmit data objects consisting of attribute-value pairs and array data types or any other serializable value. It is a very common data format used for asynchronous browser-server communication, including as a replacement for XML, in some AJAX-style systems. Additionally, because JSON is a language-independent data format, it may be validated by the smart contract on a variety of different smart contract execution platforms and blockchain platforms, regardless of the underlying programming language utilized for such platforms.

Thus, as depicted here, data or metadata to be written to the blockchain may be converted into a JSON format 566 (e.g., within database system 130 of the host organization 110) and the validated and converted JSON data is then transacted onto the blockchain.

Figure 5B:
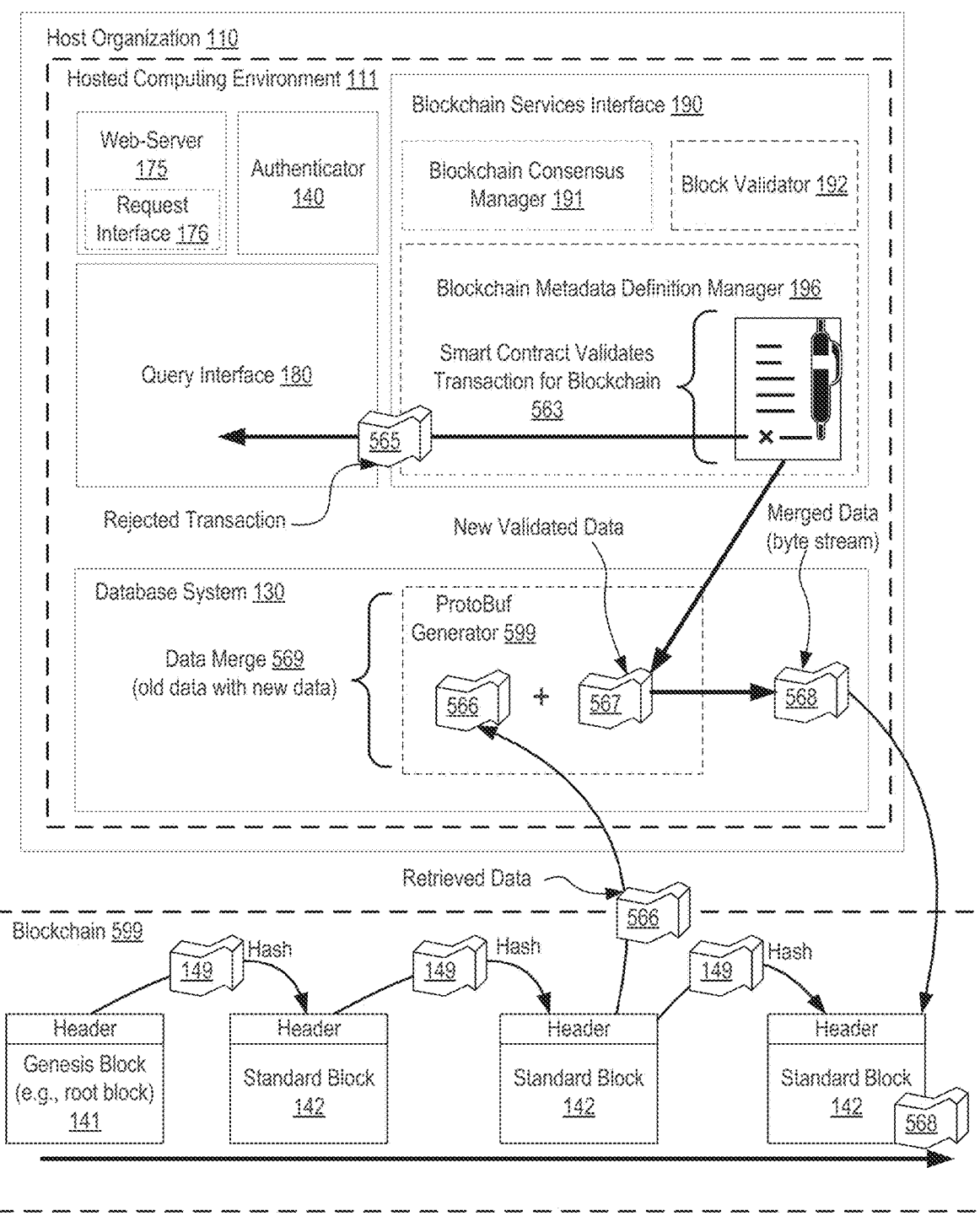
FIG. 5B depicts another exemplary architecture for performing dynamic metadata validation of stored data in accordance with described embodiments.

FIG. 5B depicts another exemplary architecture 502 for performing dynamic metadata validation of stored data in accordance with described embodiments.

According to certain embodiments, it is desirable to improve the efficiency of data stored on the blockchain 599, and therefore, all new transactions having data to be written to the blockchain perform a data merge 569 process prior to writing the new data to the blockchain. This is performed by first retrieving old data, such as a previously written stored record from the blockchain, for instance, pulling retrieved data 566 into the database system 130 of the host organization, and then merging the retrieved data 566 with the new validated data 567 having been checked by the executed smart contract, resulting in merged data 568. The merged data 568 is then written to the blockchain, for instance, by embedding the merged data 568 within a new asset which is added to the blockchain or by updating an existing asset and replacing a payload portion of the existing asset with the merged data 568, thus having an entire updated and validated record stored on one block of the blockchain for more efficient retrieval.

According to one embodiment, the data merge 569 process is performed by a protobuf generator 599 which reduces the total size of the data in addition to merging the retrieved data 566 with the new validated data 567. For example, via performance of a dynamic protobuf generation for the retrieved data 566 with the new validated data 567, the data is made to be extremely small and efficient.

Protocol Buffers (referred to as a protobuf or protobuff) provide a means for serializing structured data, thus converting the retrieved data 566 and the new validated data 567 into a merged serialized byte stream at the protobuf generator 599. This has the added benefit of permitting encryption of the merged data and providing such data in a byte stream format which is easily usable by any other application later retrieving the stored data. The protobuf generator 599 utilizes an interface description language that describes the structure of the data to be stored with a program that generates source code from that description for generating or parsing a stream of bytes that represents the structured data represented by the retrieved data 566 and the new validated data 567.

Such an approach enables the storing and interchanging all kinds of structured information. For instance, a software developer may define the data structures (such as the retrieved data 566 and the new validated data 567) and the protobuf generator 599 then serializes the data into a binary format which is compact, forward- and backward-compatible, but not self-describing (that is to say, there is no way to tell the names, meaning, or full datatypes of fields without an external specification), thus providing a layer of encryption and data security for the stored data.

In such a way, the protobuf generator 599 improves efficiency of network communication and improves interoperability with other languages or systems which may later refer to such data.

Thus, consider the previously described example of the student's stored record with the student's first name, last name, phone number, and student ID.

According to a particular embodiment, processing begins with generating a protobuf of the metadata describing the student record as provided by and defined by the application seeking to store data on the blockchain, thus resulting in protobuffed student record metadata or serialized (e.g., JSON) compliant student record metadata. Next, processing validates the student data within the stored record against the metadata to ensure compliance (e.g., by executing the smart contract) and then processing generates a protobuf of the student data within the stored record resulting in protobuffed student record data. Next, both the protobuffed or serialized metadata describing the student record and the protobuffed or serialized data of the student record is then written to the blockchain. Thus, storing the protobuffed or serialized version of the data results in more efficient storage of such data on the blockchain. According to such embodiments, metadata defined by an application which is used for validation purposes is also stored in its protobuffed or serialized version, thus resulting in efficient storage of protobuffed or serialized metadata on the blockchain.

According to such embodiments, the data merge 569 process includes adding new fields and new data to the stored record which is then re-written to the blockchain 599 with subsequent to dynamically validating the new fields using the metadata.

For instance, according to such embodiments, processing includes taking the retrieved data 566, adding in the new fields, such as adding in a student's newly assigned universal ID (e.g., such as a universally unique identifier (UUID) or a globally unique identifier (GUID) as a 128-bit number used to identify information within the host organization) to the previously stored student's first name, last name, and phone number, so as to generate the merged data 568, subsequent to which processing dynamically validates merged data 568 based on the metadata by executing the smart contract. If the metadata has previously been written to the blockchain then there is no need to update or store the metadata again, which is likely the case for merged data 568 which will constitute an updated record. Thus, only the merged data 568 is written to the blockchain. If the data is new (e.g., not retrieved and not merged) then processing dynamically validates the new data using metadata provided by the application and then stores both the new data and the metadata onto the blockchain.

Metadata, as defined by the application seeking to store the data onto the blockchain, may specify, for example, a student record has three mandatory fields and one optional fields, such as mandatory first name, last name, and student ID, and optionally a student phone number, thus permitting validation of data to be written to the blockchain. The metadata may further define a format, data mask, or restrictions for the data fields, such as names must not have numbers, and the phone number must have a certain number of digits, etc.

Multiple different applications may store data onto the blockchain, with each of the multiple different applications defining different metadata for their respective stored records, and thus permitting the smart contract execution to perform validation of different kinds of data based on the variously defined metadata for the respective applications. For example, a student record with a student name, phone number, UUID will have different metadata requiring different data validation of a credit card record with a credit card number, expiration data, security code, etc. Regardless, the same processing is applied as the dynamically applied metadata validation process is agnostic of the underlying data, so long as such data is in compliance with the defined metadata for the data of the data record to be stored.

Figure 5C:
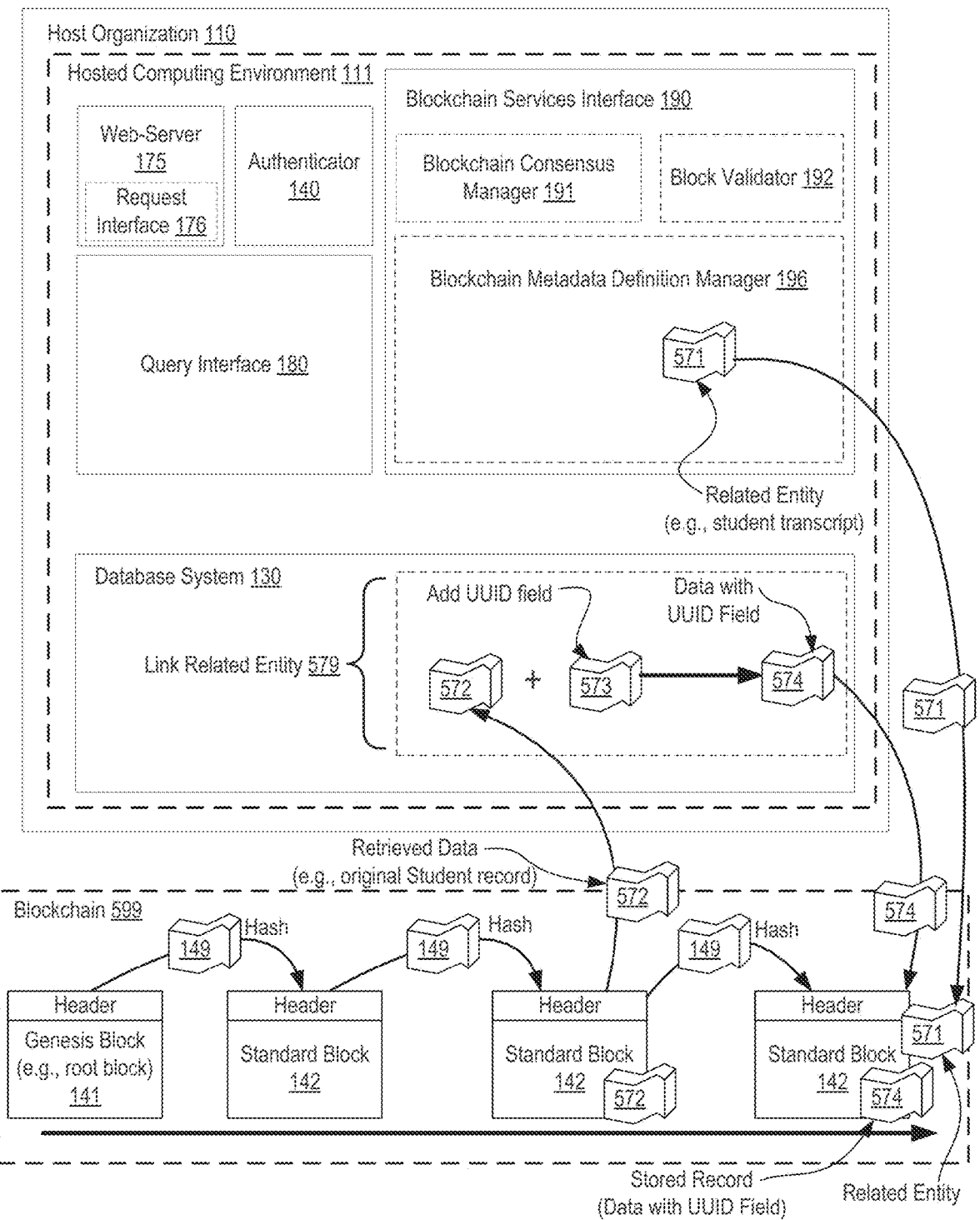
FIG. 5C depicts another exemplary architecture for storing related entities in accordance with described embodiments.

FIG. 5C depicts another exemplary architecture 503 for storing related entities in accordance with described embodiments.

In the example of the saved student record as described above, there was a student record saved to the blockchain having, for example, a student first name, student last name, student phone number, and a student ID. Also stored was metadata defined by an application seeking to store the student record, with such metadata being utilized for dynamic validation of the student record.

According to further embodiments, related entities are stored on the blockchain and linked with the previously stored record. Consider for example, a stored student record on the blockchain for which a new student transcript is provided.

As depicted here, a link related entity 579 process is performed in which retrieved data 572 is modified to add a UUID field 573 identifying the related entity, providing a link between the related entity 571 and the data record previously stored on the blockchain and retrieved 572 for modification. This results now in data with the UUID field 574, which has not yet been stored. Next, the data with the UUID field 574 linking and identifying the new related entity 571 is then written to and stored within the blockchain, resulting in the stored record now having the original data of the stored record, but also a UUID field 574 linking to and identifying the new related entity. Next, the related entity 571 is written to the blockchain as metadata with the same UUID data field, thus permitting subsequent retrieval of the related entity 571 from the blockchain by first referencing the UUID within the stored record and then retrieving the linked related entity 571 stored within the blockchain as metadata.

Thus, if a student record defines the student's name, phone number, and student ID, then a transcript for the student may be stored as metadata on the blockchain. A new UUID is automatically generated for the transcript to be stored and then within the student record, a related entity field within the student record is updated to store the new UUID generated for the transcript, thus linking the student record updated with the related entity field identifying the UUID for the transcript with the separately stored transcript which is written to the blockchain as stored metadata. In such a way, any number of related entities may be added to the blockchain, each being stored as metadata within the blockchain and linked to another stored record via the data field for the related entity. Multiple related entity fields may be added to any record, each using a different UUID to link to and identify the related entity in question. For instance, if the student has a transcript and also medical records, each are separately saved to the blockchain as metadata, each identified separately by a unique UUID, and each UUID being updated within the student's stored record as separate related entity fields. As before, the updated record with the related entity field identifying the UUID for the separately stored related entity may be stored in its protobuffed or serialized version.

FIG. 6A depicts another exemplary architecture 601 for retrieving stored records from addressable blocks using an indexing scheme, in accordance with described embodiments.

Use of the Merkle tree index 616 or a Merkle DAG tree index permits retrieval of stored records from the blockchain by going to a particular block of the blockchain based on the Merkle tree index, thus permitting retrieval of a stored record in a more efficient manner. For instance, the Merkle tree index identifies an address for one of many addressable blocks 618 on the blockchain, then retrieval of the stored record negates the need to traverse the blockchain looking for the stored record in question and instead permits the retrieval of the stored record directly from the block identified by the Merkle tree index.

Thus, as depicted here, processing performs a query 651 to the index 616 to identify an address for the desired data, subsequent to which a query to a specific block 617 is performed to retrieve the stored data at the addressable block 618 based on the address without having to traverse the blockchain or traverse the tree to find the data.

According to certain embodiments, the index 616 is stored within the blockchain 699 as an entity, for instance, the index may be stored as an asset on the blockchain. Additionally, by storing the stored records within a Merkle tree index 616 which itself is stored onto the blockchain, it is possible to retrieve any data from the index 616 by going to a particular block with an index. Thus, if the index is known, it is not necessary to query 651 the index 616 for the address, but instead, go directly to a node for a known address within the index and receiving back anything at that node. If the address points to a leaf within the index 616 then the data stored within the leaf is returned based on a direct query to that address within the index 616. If the address points to a node having a sub-tree beneath it, such as additional nodes or simply multiple leafs, then the entire sub-tree is returned. For instance, if the address ABC is used, then the entire node having hash ABC is returned, including the three leafs beneath that node, including the leaf having hash A, the leaf having hash B, and the leaf having hash C.

If the index 616 stores addressing information for specific blocks within the blockchain, then based on the returned addressing information, the specific block of the blockchain may be checked to retrieve the stored record to be retrieved. Alternatively, if the addressing is stored within the index 616 along with the latest information of the stored record, then going to the index 616 using an address will return both the addressing information for a block on the blockchain where the stored record is located as well as returning the latest information of that stored record, thus negating the need to query the blockchain further.

Figure 6B:
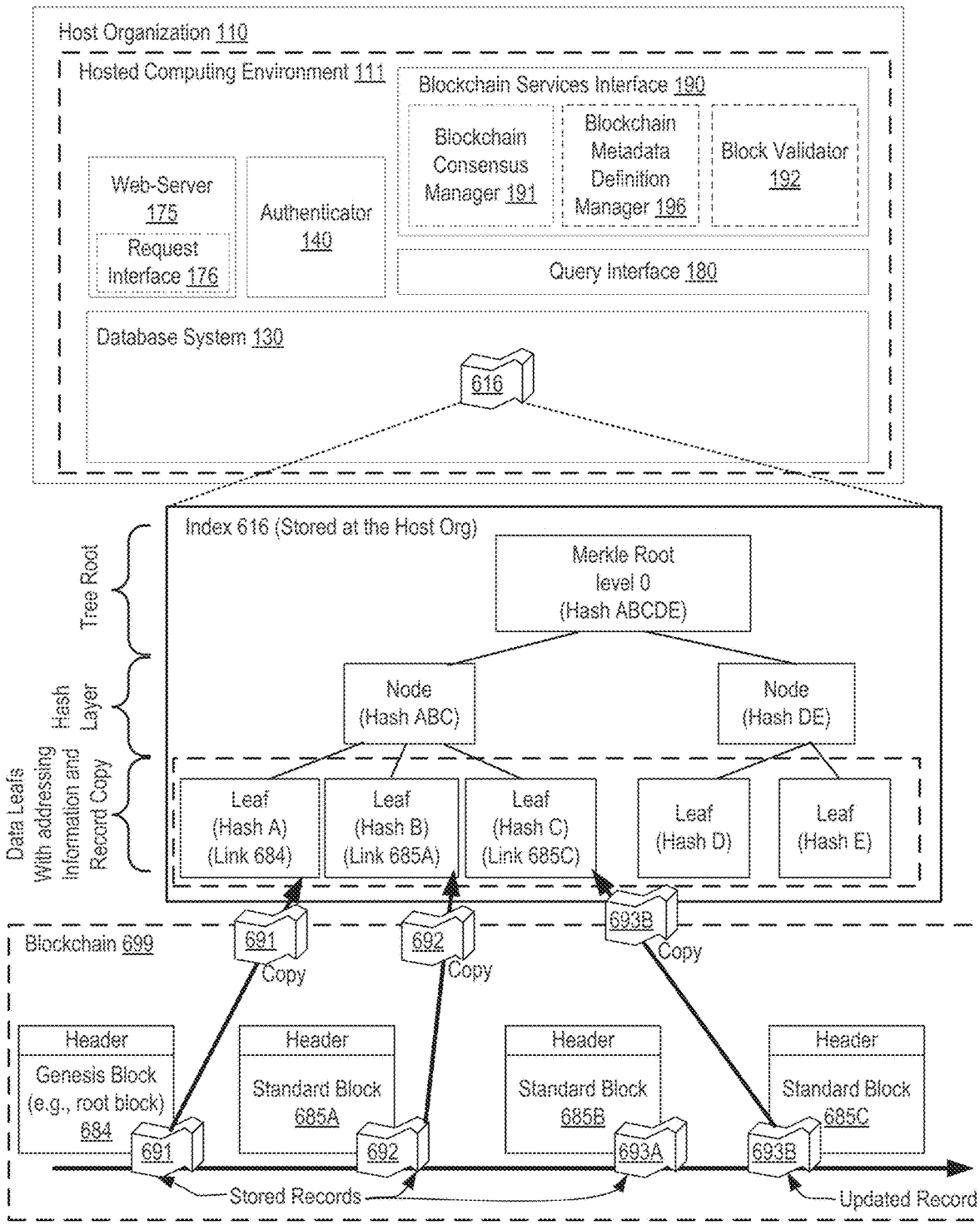
FIG. 6B depicts another exemplary architecture for building an index from records in the blockchain and maintaining the index, in accordance with described embodiments.

FIG. 6B depicts another exemplary architecture 602 for building an index from records in the blockchain and maintaining the index, in accordance with described embodiments.

According to a particular embodiment, it is desirable to enable extremely fast access to the data records stored within the blockchain through the use of the index 616. As noted above, the index 616 may store only an address of an addressable block on the blockchain within which the underlying stored record is kept, thus permitting retrieval of the record from the blockchain using the address retrieved from the index 616. Alternatively, both the latest information, that is to say, the up to date and current version of a particular record stored by the blockchain may be stored within the index along with the addressable block of the blockchain where the underlying stored record is kept by the blockchain. To be clear, this results in duplicative records being persisted. A latest and current version of a record is kept within the blockchain, considered as the authoritative record, however, for the sake of improving query speeds, a second copy of the same record is kept within the index 616 along with the address on the blockchain of where the authoritative version of that record is maintained.

According to such an embodiment, an index 616 may therefore be built or generated by the host organization by referring to the underlying stored records within the blockchain.

As shown here, within the blockchain 699 there are multiple stored records at different addressable blocks of the blockchain. Stored record 691 is located at the root block 684. Stored record 692 located at block 685A, stored record 693A located at 685B, and finally an updated record 693B is stored at block 685C, with the updated record depreciating previously store record 693A as no longer current.

Any of these stored records may be retrieved from the blockchain by walking or traversing the blockchain searching for the relevant record, locating the relevant record, and then retrieving the stored record from the located block.

Building the index 616 improves the retrieval efficiency of this process by providing at least the address for the block within the blockchain where the stored record is kept. As described above, an index 616 with such addressing information may be checked, returning the addressable block of the blockchain for the stored record, and then the stored record may be retrieved from the blockchain without having to traverse or walk multiple blocks of the blockchain. For example the index 616 may be checked for the location of updated record 693B, with the index returning the location of addressable blockchain block 685C, and then block 685C may be queried directly to retrieve the latest and most current version of the authoritative stored record which is updated record 693B at standard block 685C.

Alternatively, both the contents or the data of updated record 693B and the location of addressable blockchain block 685C identifying where the most current version of the authoritative stored record 693B is kept may be persisted within the index 616, thus wholly negating the need to retrieve anything from the blockchain. While this results in an additional copy of the updated record 693B being stored within the index 616, the speed with which the data of the updated record 693B may be retrieved is vastly improved. This is especially true where the index 616 itself is stored within the host organization rather than being written to the blockchain. In such an embodiment, the index 616 is checked within the host organization 110 and both the location of the stored record is returned as well as the contents or the data of the stored record, with such data corresponding to the copy of the data from the stored record in the blockchain being returned from the index 616 stored at the host organization. Thus, the application receiving such information is subsequently checked to validate the information stored within the blockchain by retrieving the stored record from the blockchain using the location for the stored record within the blockchain as returned by the index 616 or the application may simply utilize the copy of the data returned from the index 616 itself, depending on the data consistency requirements and concerns of that particular application.

Thus, as may be observed here, the data leafs of the index 616 now include not just addressing information providing the location of the block in question within the blockchain, but additionally persist a copy of the stored record within the blockchain, thus providing duplicative locations from which to retrieve such data. One copy of the stored records is retrievable from the blockchain itself, but a copy of the stored record in the blockchain is also retrievable from the index 616.

As depicted here, the leaf hash A now has a link to location 684, thus providing the location or addressing information for block 684 on the blockchain 699 where stored record 691 is persisted. However, leaf hash A additionally now has a copy of stored record 691 which is persisted within the index 616 itself, thus permitting retrieval of the data or contents from stored record 618 directly from the index 616 stored on the host organization without necessarily having to retrieve the stored record from the blockchain, despite the blockchain having the authoritative copy of the stored record 691. By identifying the records to be indexed (e.g., all student records for example) and then searching for and retrieving those records from the blockchain and recording the location of those records within the index 616 along with a copy of the stored records retrieved, such an index 616 may be built and utilized for very fast retrieval of the record contents. Further depicted is leaf hash B having a link to the blockchain block location 685A along with a copy of stored record 692 located within the index 616 and because stored records 693A was updated and thus deprecated by stored record 693B, the leaf hash C is built with a link to blockchain block location 685C along with a copy of the stored record 693B from the blockchain to be persisted within the index 616 stored at the host organization 110 (e.g., within the database system 130 of the host organization 110). In alternative embodiments where the index 616 is saved within the blockchain retrieval efficiency is still improved as only the index 616 needs to be retrieved, which will have within it the duplicative copies of the stored records as described above.

The index 616 may then be searched much more quickly than searching the blockchain or in the event the hash or address is known for a leaf or node within the index 616, then the address may be utilized to go directly to the leaf or node within the index 616 from which all contents may thus be retrieved. For instance, is the address or hash points to a leaf, then the location information for the addressable block within the blockchain will be returned along with the persisted duplicate copy of the stored record at that blockchain location. If the address or hash points to a node with sub-nodes or multiple leafs beneath it, then the entire sub-tree will be returned, thus providing the contents of multiple records within the respective leafs (end-points) of the sub-tree returned.

Figure 6C:
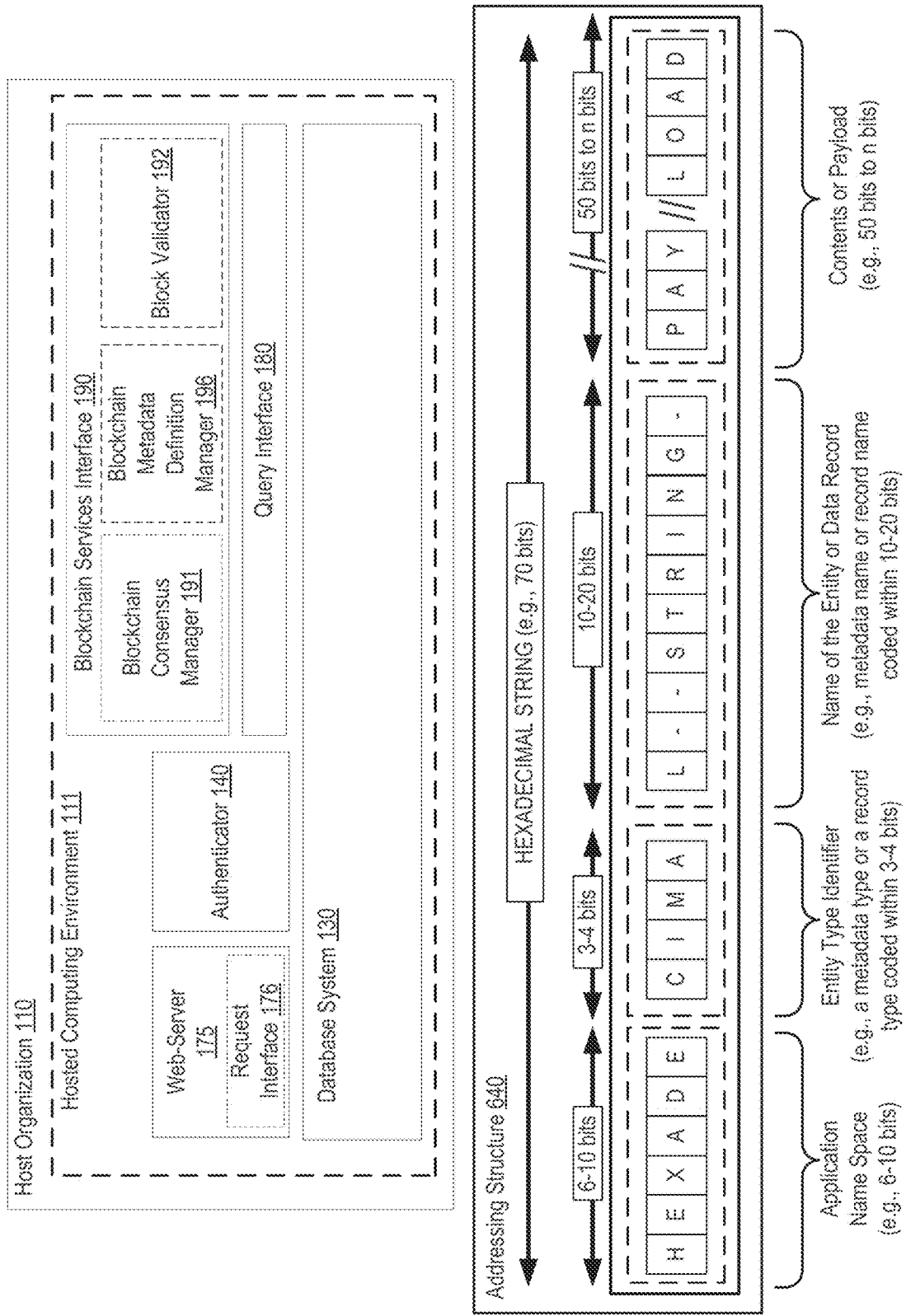
FIG. 6C depicts another exemplary architecture for utilizing an addressing structure to form an address for retrieving information from the index, in accordance with described embodiments.

FIG. 6C depicts another exemplary architecture 603 for utilizing an addressing structure to form an address for retrieving information from the index, in accordance with described embodiments.

Structuring of the addresses within the Merkle tree index permits very fast access to the specific node or leaf within which the location information for the stored records within the blocks on the blockchain is provided as well as, according to certain embodiments, a copy of the stored record. Without the structured address, it is necessary to begin at the root of the Merkle tree index 616 and then step through each level until the desired node or leaf is found. While this traversal of an index 616 is faster than walking or traversing the blocks of the blockchain, even faster access is realized by referring directly to a single leaf or a node (and thus it's sub-nodes or leafs) via a structured address as depicted via the addressing structure 640 shown here.

Specifically depicted here is an addressing data structure 640 for the indexing scheme utilizing the Merkle tree index 616 which is broken into four primary components which make up a hexadecimal string. The first portion provides an application namespace of an exemplary 6-10 bits (though the size may differ) in which a specific application may be coded. For instance, the student records discussed above may be defined by and utilized in conjunction with a student record look-up API or interface coded as "SLDB" (e.g., Student Lookup DataBase) which converts to hex "534c4442." This application namespace field is then followed by an entity type identifier of an exemplary 3-4 bits (though the size may differ) to identify the type or kind of information stored, such as a stored record or a metadata entity or a related entity stored as metadata, etc. For example, the information may be the contents of a student record which may be coded as SR which converts to hex "5352" or the information may be metadata defining a student record which may be coded as MD which converts to hex "4d44" or the information may be a related entity. Certain related entities are stored as metadata with the same type identifier (e.g., MD/4d44) or alternatively may be stored as metadata with a unique entity type identifier, such as being coded RE for a related entity which converts to hex "5245."

Next, within the addressing structure 640 is the name of the entity or data record of an exemplary 10-20 bits (though the size may differ) to specify what is being stored (not the contents, but the name of the stored information). Thus, metadata defining a student record may be coded as SRAMD (e.g., for Student Record Application MetaData) which converts to hex "5352414d4420" or the stored information may be the student record itself, thus being named STUDREC (e.g., for Student Record) which converts to hex "5354554452454320" or perhaps the stored information is a related entity within which there is stored a student's transcript named TRNSCRPT which converts to hex "54524e534352505420" or the stored information may be a stored a student's medical records named MEDREC which converts to hex "4d454452454320" information may be a related entity. Any extra space for the respective portions of the addressing structure may be padded with leading zeros depending on the application's use and means of parsing such data.

Lastly, there is a contents or payload portion of the addressing structure having therein the actual information to be stored, such as the contents of a stored record (e.g., the values making up a student's record), or metadata defining a record (e.g., the metadata by which to define, validate, structure, mask, or type the actual stored contents. Similarly, there may be stored within the payload or contents portion of the addressing structure 640, metadata identifying a related entity via a linked UUID which corresponds to a UUID field within a stored record (e.g. a student record may include a related entity field with a UUID for a student's transcript, thus linking the student's record with the student's separately stored transcript within a related entity metadata stored asset on the blockchain).

Within the payload or contents portion of the addressing structure 640, the application developer utilizing the indexing scheme has nearly unlimited flexibility of what may be stored, up to the size limits imposed, such as a 70 bit total limit for an extremely small, efficient, albeit restrictive addressing structure 640 up to n bits (e.g., hundreds or thousands depending on the use case) within which significantly more information may be stored.

Because the information is stored as a hexadecimal string, the information may easily be protobuffed, serialized, encrypted, and decrypted as well as every efficiently transmitted across networks and utilized by heterogeneous applications without regard to any specialized formats.

Figure 6D:
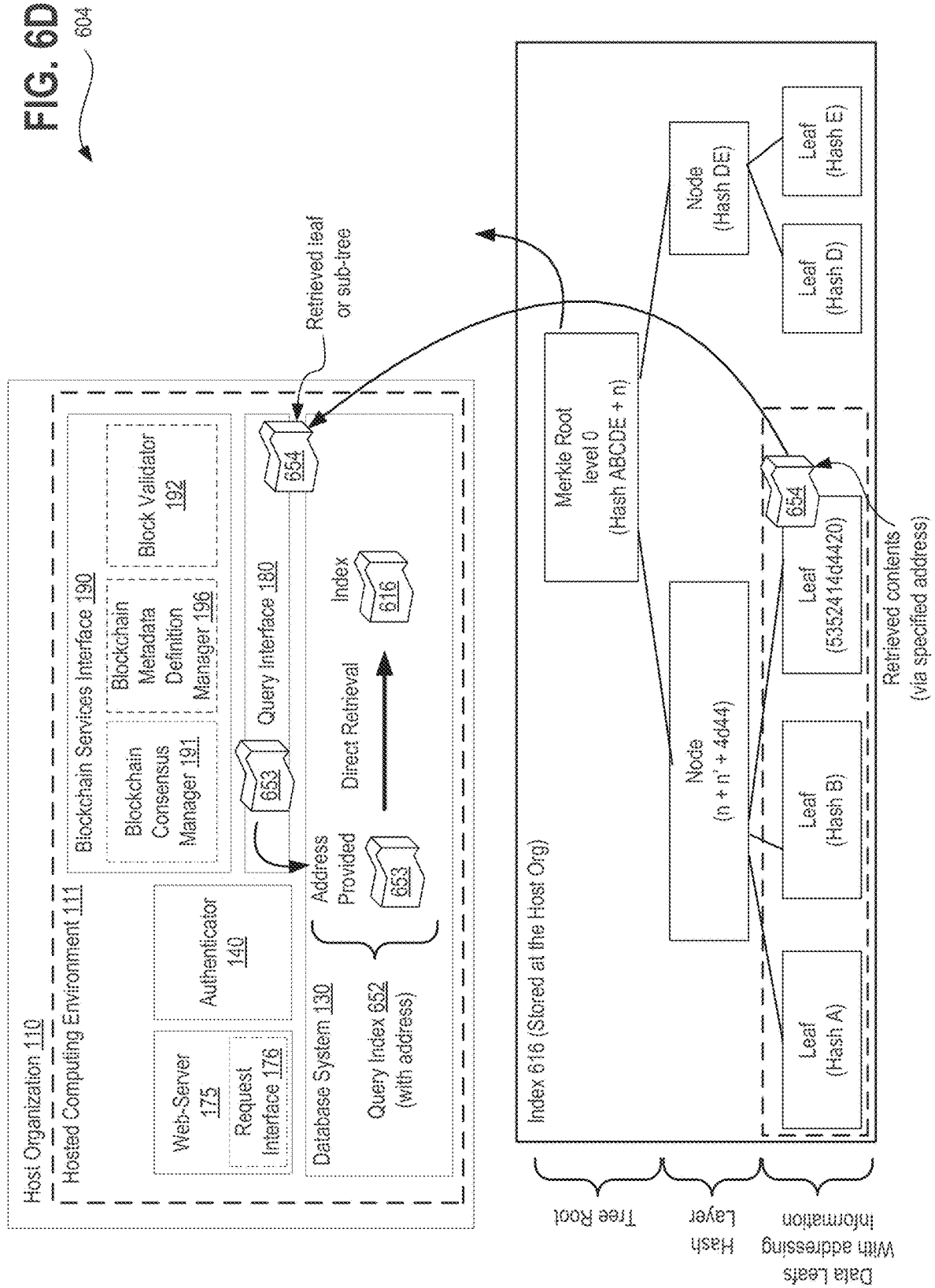
FIG. 6D depicts another exemplary architecture for utilizing an address to retrieve information from the index, in accordance with described embodiments.

FIG. 6D depicts another exemplary architecture 604 for utilizing an address to retrieve information from the index, in accordance with described embodiments.

As depicted here, the query interface 180 provides an address 653 via which to perform a query 652 against the index using the address, thus permitting direct retrieval from the index 616 of either a leaf or a sub-tree of the index 616 depending on what retrieved data is queried for via the address.

Consider a query 652 against the index 616 address using the indexing scheme and address structure from the example above.

For example, the application namespace for a student record look-up API or interface is coded as "SLDB" (e.g., Student Lookup DataBase) which converts to hex "534c4442" followed by the type or kind of information stored coded as MD (for metadata) which converts to hex "4d44" followed by metadata defining a student record coded as SRAMD which converts to hex "5352414d4420."

This results in an address of 534c4442+4d44+ 5352414d4420 or 534c44424d445352414d4420. It is not necessary to define the address for the contents or payload since this is the data being retrieved, however, such data may be written to the index using the above address concatenated with the hexadecimal representation of the contents or payload.

Nevertheless, querying against the index 616 using the address 534c4442+4d44+5352414d4420 provides a fully qualified address down to a leaf in the Merkle tree index having therein the payload or contents to be retrieved, which in this case is the metadata for an application called "SLDB" (e.g., Student Lookup DataBase) which defines the coding of student records for that application.

Similarly, if a student record is to be retrieved, then querying the index 616 using the address 534c4442 (for the Student Lookup DataBase)+5352 (for SR or a Student Record)+5354554452454320 provides a fully qualified address down to a leaf in the Merkle tree index having therein the student record payload or contents to be retrieved, which in this case is the student record information for the application called "SLDB" (e.g., Student Lookup DataBase) which is defined by the metadata retrieved above. If the student's UUID or student ID is utilized as a leading portion of the stored student record payload, then the address may be further qualified to retrieve a specific record's contents only for that particular student.

Another benefit of such an indexing scheme is the ability to query for information using a non-fully-qualified address or a partial address. For example, continuing with the above example, the developer may trigger the index to return all the metadata for their specific application by submitting a partial address to the index 616 for direct retrieval by specifying their address and the entity type identifier for their metadata. Thus, such a partial address forms the hex string for the application namespace portion corresponding to the "SLDB" (e.g., Student Lookup DataBase) which converts to hex "534c4442" followed by the type or kind of information stored coded as MD (for metadata) which converts to hex "4d44," thus resulting in 534c4442+4d44 or simply 534c44424d44.

Querying the index 616 for direct retrieval using this partial address will cause the index to return all metadata for the "SLDB" (e.g., Student Lookup DataBase) application, regardless of what such metadata is named or how many leafs or sub-trees are consumed to store such data. More particularly, querying the index 616 using the partial address will return an entire sub-tree below the node of the Merkle tree index hashed with the hex string 534c4442+4d44. Similarly, all student records may be retrieved (via an entire sub-tree being returned) by specifying a partial address for direct retrieval, such as specifying to the query of the index 616 the address 534c4442 (for the Student Lookup DataBase)+5352 (for SR or a Student Record) without any specifically named student records.

In the event the contents or payload information in the index includes both the location information for the stored record within the blockchain as well as the contents of the stored record copied from the blockchain into the index 616, then it is not necessary to retrieve anything further from the blockchain. If only the location information of the contents within a specified block of the blockchain is provided (thus resulting in a much smaller storage volume and faster retrieval due to a smaller index) then the blockchain services interface 190 will subsequently utilize the location information to fetch the contents of the stored record directly from the specified block on the blockchain without having to traverse or walk multiple blocks of the blockchain in search of the specified stored record.

Figure 6E:
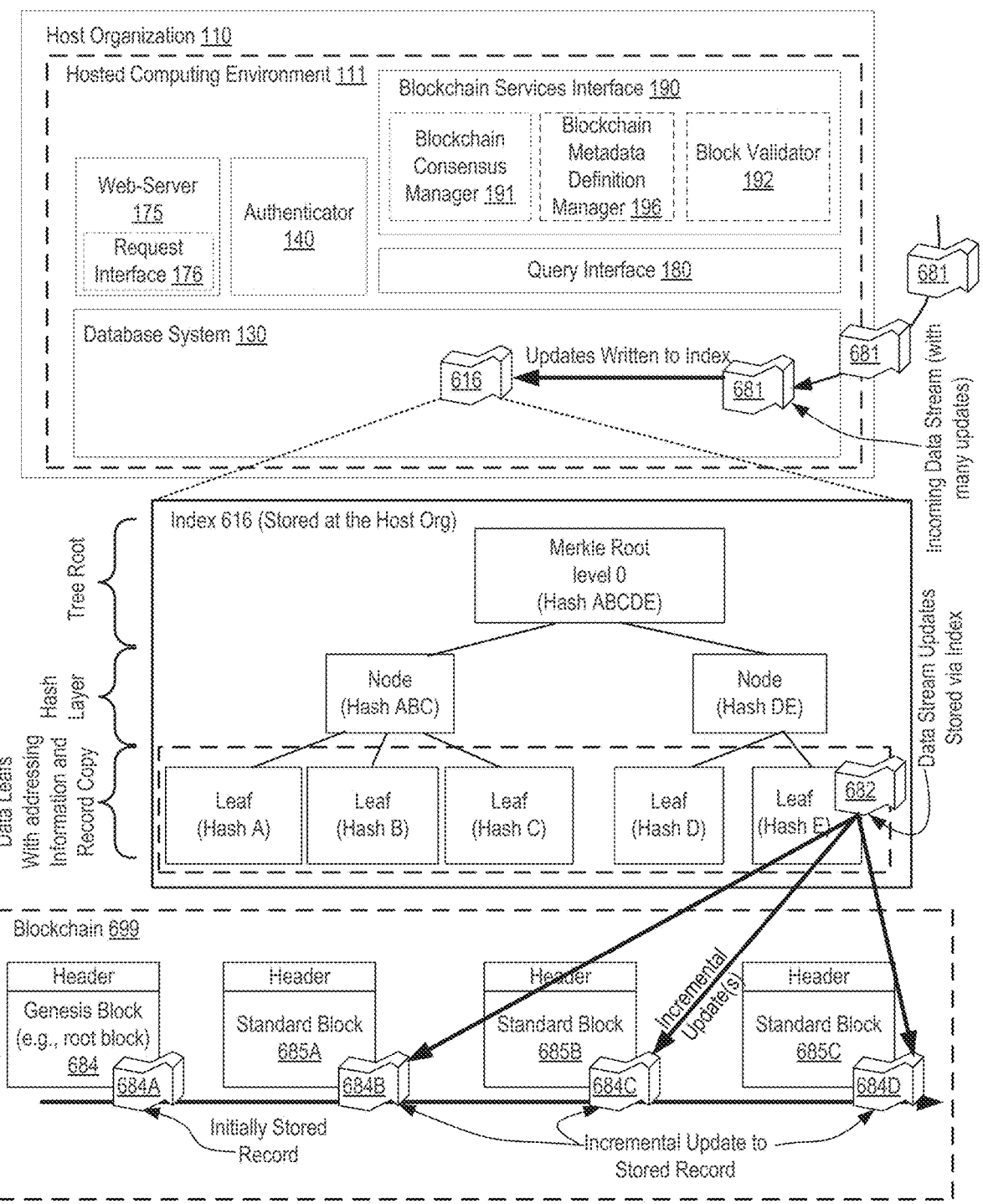
FIG. 6E depicts another exemplary architecture for incrementally updating a blockchain asset for stored records using an index to store current updates, in accordance with described embodiments.

FIG. 6E depicts another exemplary architecture 605 for incrementally updating a blockchain asset for stored records using an index to store current updates, in accordance with described embodiments.

In certain situations, it is desirable to store information within the blockchain, however, the volume and frequency of information updates for the stored records render use of the blockchain impractical given that blockchain storage is very poorly suited for information storage with many updates at a high frequency.

As shown here, an incoming data stream 681 with many updates is received at the host organization and the updates are written into the index 616 resulting in the data stream updates being stored via the index as shown at element 682. Periodically, incremental updates are then written into the blockchain by, for example, transacting with the blockchain to add a new asset having the stored record(s) with the incremental updates taken from the index 616 and pushed into the blockchain as stored records. For example, stored record 684A is initially stored on the blockchain 699 with an initial batch of data from the data stream. Next, more data stream updates are written first to the index 616 at the host organization and after a period of time, the incremental updates are then again written to the blockchain, resulting in repetitive incremental updates shown here as incremental update 684B, then incremental update 684C, and then incremental update 684D, and so on.

Consider for example the storage of an information stream from IoT devices (Internet of Things) devices which are reporting various telemetry data such as status, errors, location, events, configuration changes, etc. If the collection of such data scales to a large group of IoT devices in the hundreds the blockchain may be overwhelmed due to the frequency of data storage requests.

However, storing the information within the index 616, especially when the index is stored within the host organization, overcomes this problem as the database system 130 of the host organization easily accommodates a high frequency of database updates and interactions.

Therefore, in the event it is nevertheless desired to make such data available on the blockchain and to be stored upon the blockchain, then the frequency problem may be overcome by first writing the many updates (e.g., from the IoT devices or other such updates) directly into the index 616 within the host organization 110 and then periodically writing incremental updates to the blockchain for persistent storage of the data within the blockchain. For example, IoT device data streams may be collected by the host organization 110 into the index and then once every 24 hours (or some other period) the incremental update to the IoT device data stream (measured from the last update to the blockchain to the currently available data) is then pushed, flushed, added, or transacted onto the blockchain. Thus, the latest block of the blockchain then persistently stores the latest portion of the IoT device data stream and thus be accessible directly from the blockchain or alternatively available from the index 616 at the host organization.

In certain embodiments, the index purges or flushes the incremental data by storing the incremental update to the blockchain and then the index removes the stored contents or payload portion from the index 616 and retains only the block location information on the blockchain via which to locate the underlying stored records. Stated differently, once the incremental information is written to the blockchain, the index 616 may be cleaned up such that it retains where to locate the stored records having the incremental information on a specific block of the blockchain, but the index 616 itself no longer retains the contents of such stored records as they are available within the blockchain and because such data, which grows very quickly, may slow the index in an undesirable manner.

Pushing the whole change (e.g., all of the IoT data stream ever collected) to the blockchain in its entirety is problematic as all data prior to the incremental update is replicated over and over again within the blockchain. Thus, pushing only the incremental changes or updates to the blockchain provides efficient use of the blockchain for purposes of storage and efficient use of the index 616 by which to buffer the incoming data stream or incoming high frequency updates as well as via which the index 616 permits fast identification of location information indicating where the incremental information is stored (e.g., within which block) on the blockchain.

Figure 7A:
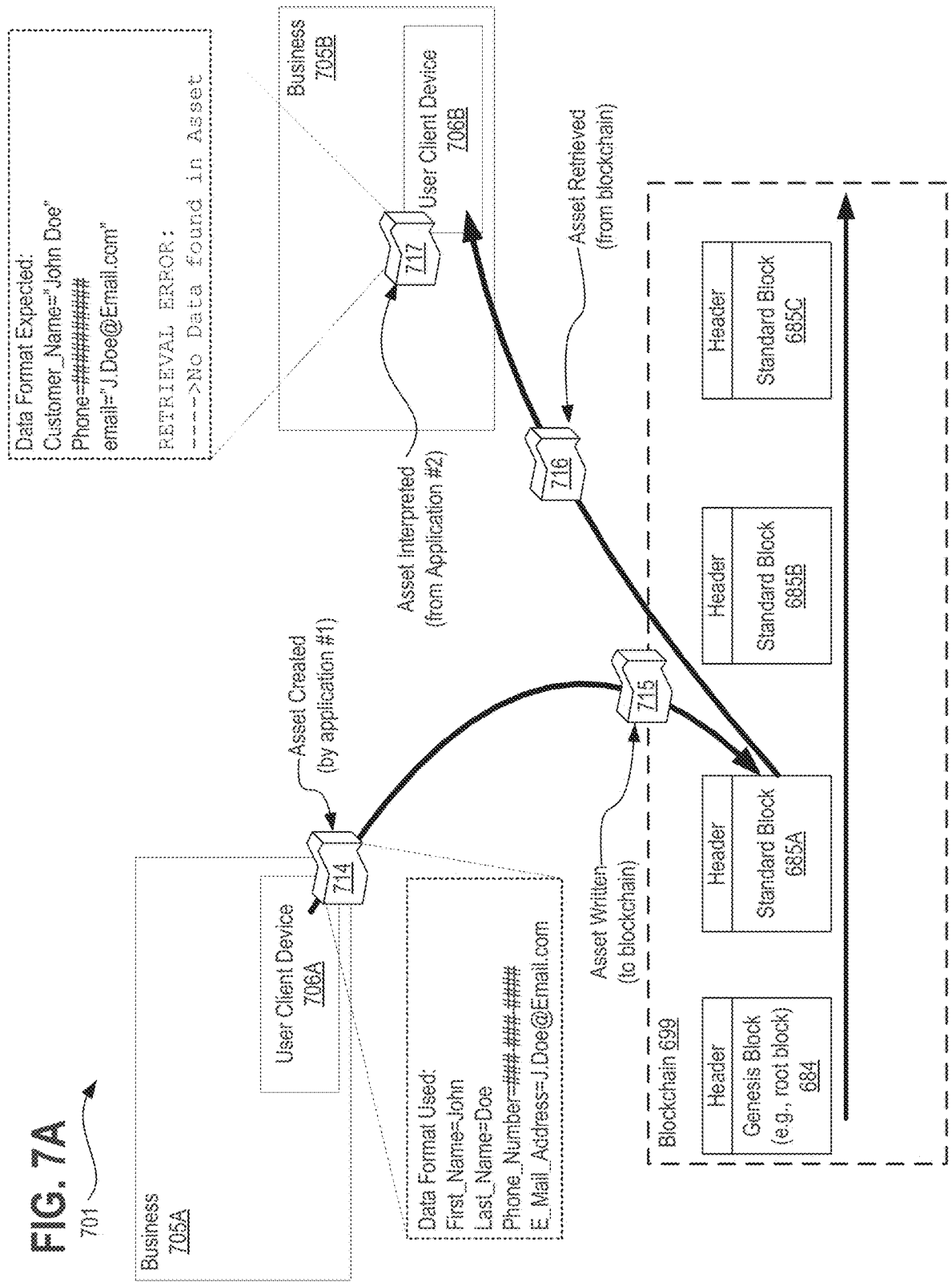
FIG. 7A depicts another exemplary architecture in accordance with described embodiments.

FIG. 7A depicts another exemplary architecture 701 in accordance with described embodiments.

Many customer organizations and businesses operate in a network-centric manner as they are obligated by the marketplace to solve customer problems. Therefore, it becomes necessary for businesses, including sometimes unrelated business organizations, to share data amongst one another on behalf of their customers.

Understandably, however, different businesses have a fundamental lack of trust in one another. Thus, many businesses find themselves in a situation today where they need to share data to satisfy their customers, and yet, they cannot trust that the other businesses with whom they share data can be trusted.

Distributed Ledger Technology and blockchain platforms specifically solve the issue of trust as is described above. This is true because data written onto the blockchain is immutable insomuch that updates may be provided, but the historical data is always accessible, and further still, all participating nodes for the blockchain cooperatively contribute to consensus based upon an agreed consensus model. The exception to this is the modified DLT technology discussed above for which a shared ledger (e.g., element 157 at FIG. 1C, et seq.) is hosted internally to a host organization and for which the host organization operates as the single and centralized trust authority, or alternatively for which trust determination is delegated to a customer organization operating a modified DLT shared ledger instance 157, pursuant to which the customer organization then determines for themselves who has access rights, such as what partner organizations or users, etc., have consent from the customer organization to access data in the modified DLT shared ledger.

Therefore, utilization of DLT technologies and blockchain technology specifically is considered to solve the issue of trust amongst businesses wishing to share data.

Notwithstanding the issue of trust having been largely solved, there remains two further obstacles which prevent adoption of the technology.

Firstly, adoption of blockchain is technologically complex and exceedingly difficult for most business to implement on their own. Even a technical evaluation of such data requires specialized computer programmers and developers having adequate skill in this particular area of expertise coupled with an understanding of the needs of the business, often provided by a technical business analyst, and then the procurement of additional computing infrastructure and either the development of a blockchain platform and protocol themselves or the identification and then participation with an existing public or private blockchain that meets the needs of the business. These developers must understand how to package and transact assets (sometimes called "coins") onto the blockchain and how to transfer those assets, within which their information of interest is embedded, between nodes and make such data available to other participating nodes on the blockchain, such that the information may be shared. Further still, there needs to be a consensus model by such a blockchain which is acceptable to the business. For these reasons alone, adoption of blockchain technologies, though promising, remains an insurmountable burden for many businesses.

Secondly, even assuming the above mentioned obstacles are overcome, there remains a significant problem with data standardization across applications for information which is written to, stored within, or persisted by the blockchain. For instance, even assuming a business manages to transact information to the blockchain and make that data accessible to another business, there simply is no guarantee whatsoever that the information written to the blockchain by a first business will be understandable by a second business. Therefore, the transportability of data amongst businesses wishing to share data presents another significant problem, due to the lack of standardization of data written onto the variously available blockchain platforms.

Consider the exemplary depiction shown here at FIG. 7, in which there are two businesses 705A and 705B, which have managed to agree to share data with one another and have successfully implemented the necessary computing architecture to transact with a blockchain 699.

With all data sharing agreements in place, business 705A creates an asset via its application #1 executing at the user client device 706A, and as depicted, embeds a customer record into that asset 714 which is to then be transacted onto the blockchain 699. As shown here, application #1 creates the asset with the following information:

```
Data Format Used:
First_Name=John
Last_Name=Doe
Phone_Number=###-###-####
E_Mail_Address=J.Doe@Email.com
```

Notably, for this record, there are four fields, including "First_Name" and "Last_Name" followed by "Phone_Number" which has a particular format mask used as well in which there are hyphens "-" required in between certain digits, and finally an email address which has a field identifier of "E_Mail_Address."

Each of the various fields are then populated with data.

The created asset is then transacted onto the blockchain 699 as depicted by the asset written 715 onto the blockchain and at some later time, business 705B elects to retrieve the information via its own application #2.

As shown here, business 705B transacts with the blockchain and the asset retrieved 716 is successfully transmitted to the application #2 executing at user client device 706B.

All seems well, until the application #2 utilizes its own understanding of the data to interpret the asset 717 via the code executing at application #2, which expects the following information:

```
Data Format Expected:
Customer_Name="John Doe"
Phone=##########
email="J.Doe@Email.com"
RETRIEVAL ERROR:
---->No Data Found in Asset
```

As might be expected, application #2 encounters a retrieval error message: "No Data found in Asset."

This is the result when application #2 looks for a field named "Customer_Name" and yet there is no such field. Application #2 additionally looks for the field "Phone" and finds no such field, and finally searches for "email" and again finds no such field.

While a human reader may readily understand that "First_Name" with the value "John" represents a sub-portion of the field "Customer_Name," such logic simply is not available within applications and computing programs which simply search for the field name that they are instructed (e.g., programmed) to search for, which is "Customer_Name" and not a combination of "First_Name" and "Last_Name."

While such a conversion between the two field types would be trivial for any programmer, the fact remains that the two applications by each of the respective businesses are simply incompatible, and if they are to be made compatible, then custom translation for these fields needs to be programmed.

Fundamentally, the non-transferability of this date is due to a lack of data standardization. The two distinct application entities each are enabled to write to the blockchain and retrieve from it, and an agreement is in place between the businesses to share such data, and yet, the two entity applications lack the ability to share the data because there is no definition of what constitutes a customer's name. One application expects this to be a combination of "First_Name" and "Last_Name" fields whereas another application expects the field "Customer_Name" to be utilized as a single field for the customer's full name.

Figure 7B:
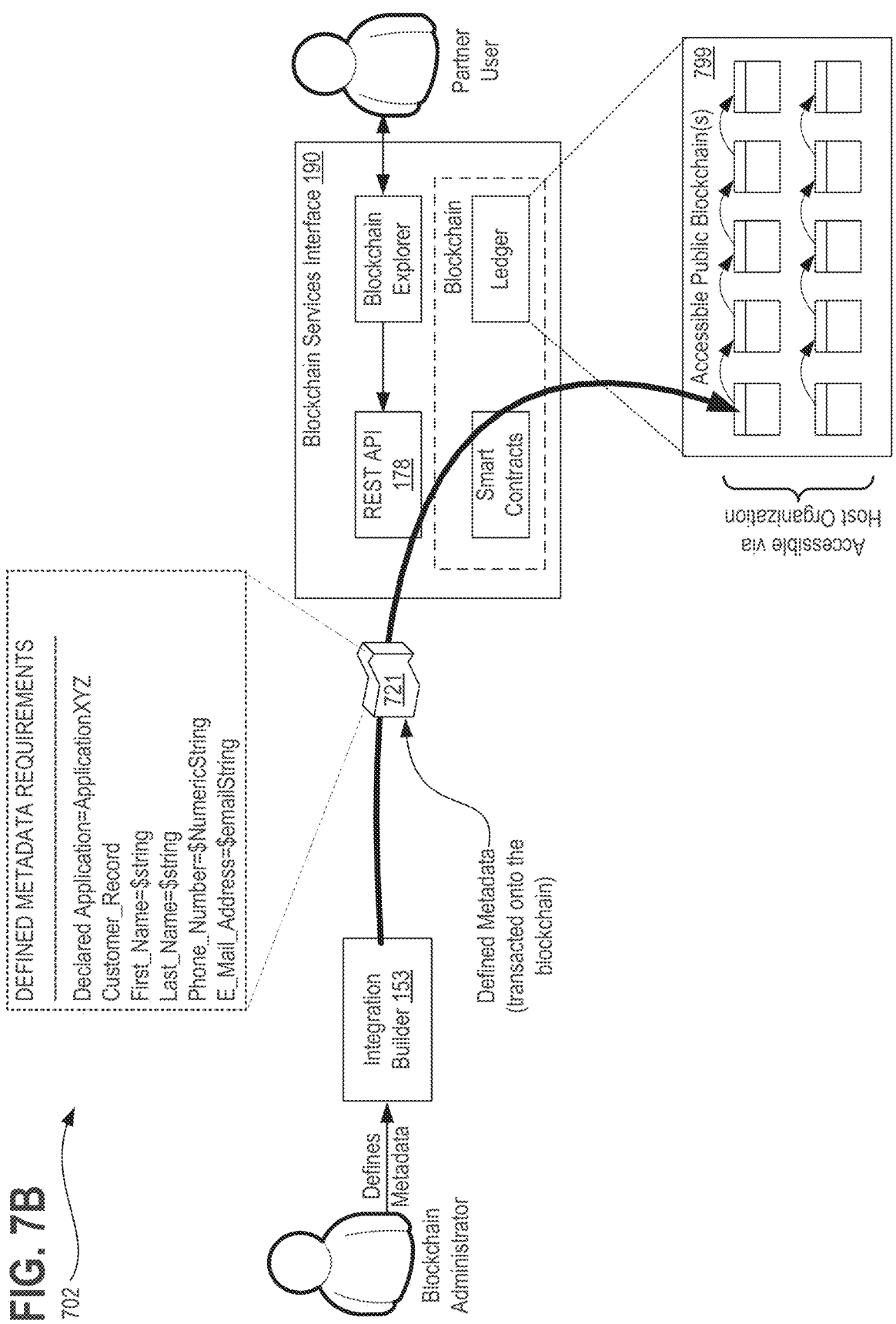
FIG. 7B depicts another exemplary architecture in accordance with described embodiments.

FIG. 7B depicts another exemplary architecture 702 in accordance with described embodiments.

In particular, there is now depicted a blockchain administrator defining metadata for the data utilized by an application which then standardizes the data which is written onto the blockchain on behalf of the two businesses, business 705A and business 705B.

As depicted here, the blockchain administrator defines metadata via the integration builder's GUIs or via the integration builder's API, and that defined metadata 721 is then pushed onto the specified blockchain 799.

Now, there is, transacted onto the blockchain, a clearly defined metadata specifying the requirements for the declared application "ApplicationXYZ" and specifically for the "Customer_Record," which is now structured as follows, as per the defined metadata:

```
DEFINED METADATA REQUIREMENTS
-----------------------------------
Declared Application=ApplicationXYZ
Customer_Record
First_Name=$string
Last_Name=$string
Phone_Number=$NumericString
E_Mail_Address=$emailString
```

Because the defined metadata 721 is transacted onto the blockchain, any application with permission to access data records on the blockchain 799 will be able to read and write data in compliance with the requirements specified by the defined metadata 721. This may be the specifically declared application, "ApplicationXYZ," or this may be other applications which utilized the data generated or managed by the declared application. Any application can read out the defined metadata 721 and operate in compliance with the requirements.

Figure 7C:
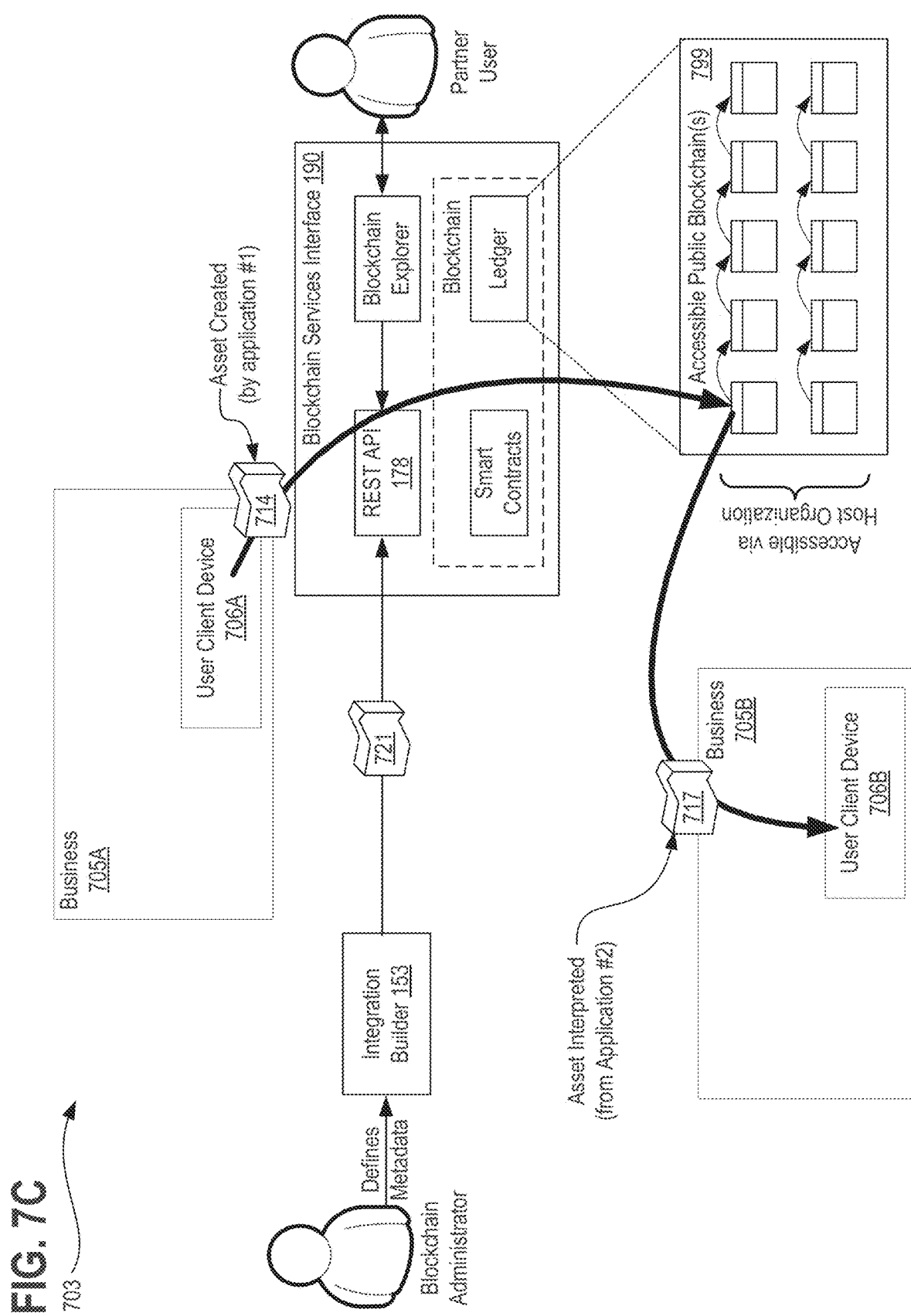
FIG. 7C depicts another exemplary architecture in accordance with described embodiments.

FIG. 7C depicts another exemplary architecture 703 in accordance with described embodiments.

In particular, it is now depicted that businesses 705A and 705B are enabled to share data transacted onto the blockchain 799 and because the defined metadata 721 specifies the requirements for formatting such data, the data written to the blockchain 799 and retrieved from the blockchain will embody a known format, and thus be transferable between the various businesses.

As shown here, the blockchain administrator defines the metadata via the blockchain services interface 190 which is transacted onto the blockchain, and then later, business 705A creates an asset 714 via application #1 and it writes that asset having the details of a customer record into the blockchain. Subsequently, business 705B retrieves the asset from the blockchain and when the asset is interpreted 717 via application #2 executing at business 705B, that data is successfully interpreted and understood by the application because there is a known and defined metadata structure for the customer record data.

Therefore, according to a particular embodiment, there are operations by a system of a host organization that declare a new application and transact defined metadata for the new application onto a blockchain. For instance, such operations may include operating a blockchain interface to the blockchain on behalf of a plurality of tenants of the host organization, in which each one of the plurality of tenants operate as a participating node with access to the blockchain. Such operations may further include, receiving, from a user device communicably interfaced with the system, first input declaring the new application. Such operations may further include, receiving second input from the user device adding a plurality of network participants for the new application, in which the network participants are granted access rights to the new application. Such operations may further include, receiving third input from the user device declaring a plurality of entity types for the new application. Such operations may further include, receiving fourth input from the user device declaring one or more new field definitions for each of the plurality of entity types. Such operations may further include, generating a blockchain asset having encoded therein as the defined metadata for the new application, at least (i) the plurality of network participants declared, (ii) the plurality of entity types declared, and (iii) the one or more new field definitions declared for each of the plurality of entity types. Such operations may further include, transacting the blockchain asset having the defined metadata encoded therein for the new application onto the blockchain.

According to the operations of another embodiment, the blockchain asset has a defined transaction type; and in which the defined transaction type for the blockchain asset having the defined metadata encoded therein associates the defined metadata for the new application with a smart contract to execute data validation for any data transacted onto the blockchain for the new application; in which the smart contract validates the data transacted onto the blockchain for the new application is in compliance with the defined metadata for the new application transacted onto the blockchain.

According to another embodiment such operations may further include: receiving a transaction at the blockchain specifying data for the new application; and triggering a smart contract based on the received transaction specifying the data for the new application; and executing the smart contract to validate the specified data for the new application is in compliance with the defined metadata for the new application; and in which the transaction is rejected if the specified data is non-compliant with the defined metadata for the new application.

According to the operations of another embodiment, transacting the blockchain asset onto the blockchain includes: adding a transaction to a new block on the blockchain specifying the defined metadata for the new application as payload data for the transaction; subjecting the added transaction to consensus by participating nodes of the blockchain, in which the added transaction is subjected to a consensus protocol by the participating nodes of the blockchain prior to the added transaction being accepted as part of a primary chain of the blockchain by the participating nodes of the blockchain; and in which the defined metadata for the new application is persisted within an accepted transaction on a new block of the blockchain pursuant to successful consensus for the added transaction.

According to another embodiment such operations may further include: receiving new input at the system, in which the new input declares a second new application; and receiving additional input at the system selecting one of the plurality of entity types declared for the first new application as a selected entity type for the second new application, in which the selected entity type inherits the one or more new field definitions as specified via the defined metadata for the respective one or more entity types associated with the first new application.

According to the operations of another embodiment, multiple different declared applications specify at least one of the plurality of entity types declared for the first new application as a selected entity type for the multiple different declared applications; and in which a single instance of the defined metadata corresponding to the respective one of the plurality of entity types declared for the first new application and all of the one or more new field definitions associated with the respective entity type declared for the first new application controls both (i) the respective one of the plurality of entity types declared for the first new application and (ii) the selected entity type for all of the multiple different declared applications having selected the respective entity type declared for the first application.

According to the operations of another embodiment, receiving the fourth input from the user device declaring one or more new field definitions for each of the plurality of entity types further includes receiving the fourth input defining a field definition type for each of the one or more new field definitions; and in which each field definition type is selected from the group including: integer, Boolean, numeric, alphanumeric, date, hyperlink, computed, or custom.

According to another embodiment such operations may further include: authenticating the user device with the host organization as being associated with one of the plurality of tenants; and in which the one of the plurality of tenant is a subscriber to cloud based on-demand services provided by the host organization over a public Internet.

According to another embodiment such operations may further include: executing an event listener to monitor any changes to the blockchain associated with the new application; and triggering an event when the changes to the blockchain associated with the new application are observed by the event listener.

According to another embodiment such operations may further include: receiving fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and monitoring, via an event listener, for any change to the blockchain meeting the specified event and the one or more event conditions.

According to the operations of another embodiment, each network participant is granted access rights to the new application and to data on the blockchain associated with the new application.

According to the operations of another embodiment, each of the plurality of network participants are selected from among the group including: a user of the host organization associated with one of the plurality of tenants of the host organization; a partner user corresponding to one of the plurality of tenants of the host organization; a customer organization corresponding to one of the plurality of tenants of the host organization; a non-user of the host organization; a partner organization which is not one of the plurality of tenants of the host organization; and one or more participating nodes on the blockchain which correspond to either a tenant of the host organization or a customer organization which subscribes to cloud computing services from the host organization; and one or more participating nodes on the blockchain which do not subscribe to cloud computing services from the host organization.

According to the operations of another embodiment, receiving the first input from the user device declaring the application further includes: receiving with the first input for the new application declared one or both of specified administrative control for the new application or ownership for the new application declared.

According to another embodiment such operations may further include: receiving instructions to deploy the new application declared and the defined metadata for the new application onto the blockchain; and in which transacting the blockchain asset having the defined metadata encoded therein for the new application onto the blockchain includes deploying the new application and the defined metadata via the blockchain responsive to receiving the instructions to deploy.

According to the operations of another embodiment, receiving the inputs defining each of (i) the plurality of network participants declared, (ii) the plurality of entity types declared, and (iii) the one or more new field definitions declared for each of the plurality of entity types includes receiving the inputs as programming code via an API at a blockchain metadata definition manager exposed by the host organization.

According to another embodiment such operations may further include: transmitting a GUI to the user device from a blockchain metadata definition manager, in which the GUI prompts for the inputs defining each of (i) the plurality of network participants declared, (ii) the plurality of entity types declared, and (iii) the one or more new field definitions declared for each of the plurality of entity types; in which the inputs are received at the GUI via one or more interactive click events, drag events, drop down selection events, text input events, and touch events; and in which receiving the inputs includes receiving the inputs from the GUI transmitted to the user device.

According to the operations of another embodiment, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

According to another embodiment such operations may further include: receiving an SQL query at a receive interface requesting data associated with the new application; translating the SQL query into native blockchain executable code via an Apex translator engine at the host organization; executing the native blockchain executable code against the blockchain to retrieve the data requested; and returning the data requested responsive to receipt of the SQL query.

According to another embodiment such operations may further include: generating a virtual table within a database system of the host organization; and structuring the virtual table at the database system of the host organization based on the metadata declared for the new application; in which entity types are represented as tables within the virtual table and further in which the one or more new field definitions declared for each of the plurality of more entity types for the new application are represented as columns within the tables at the virtual table.

According to the operations of another embodiment, the virtual table includes a materialized view hosted at the database system of the host organization structured based on the metadata declared for the new application; and in which the materialized view hosted at the database system of the host organization does not store any data associated with the new application; and in which SQL queries requesting read-only access are processed against the materialized view by translating the read-only SQL queries into a blockchain transaction to retrieve the requested data associated with the new application from the blockchain.

According to another embodiment such operations may further include: retrieving the defined metadata for the new application from the blockchain, including plurality of entity types declared for the new application, the one or more new field definitions declared for each of the plurality of entity types, and any field types applied to the one or more new field definitions; generating a materialized view of the data persisted with the blockchain within a virtual table at the host organization by structuring the virtual table based on the defined metadata for the new application; in which the materialized view represents the structure of the data associated with the new application which is persisted to the blockchain without storing the data associated with the new application within the materialized view at the host organization.

According to another embodiment such operations may further include: receiving, at the host organization, an SQL statement from a user device, in which the SQL statement is directed toward the materialized view requesting an SQL update or an SQL insert for the data persisted to the blockchain and associated with the new application; processing the SQL statement against the materialized view by translating the SQL statement requesting the SQL update or the SQL insert into a corresponding blockchain transaction to update or add the data associated with the new application at the blockchain; and issuing an acknowledgement to the user device confirming successful processing of the SQL statement against the materialized view pursuant to the corresponding blockchain transaction being accepted by consensus to the blockchain and successfully updating or adding the data associated with the new application at the blockchain.

According to another embodiment such operations may further include: receiving an SQL statement directed toward the materialized view at the host organization; in which the SQL statement specifies one or more of (i) a SELECT from SQL statement, (ii) an INSERT into SQL statement, and (iii) an UPDATE set SQL statement; and in which the SQL statement received is processed by translating the SQL statement into a corresponding blockchain transaction and executing the corresponding blockchain transaction against the blockchain in fulfillment of the SQL statement directed toward the materialized view at the host organization.

According to another embodiment such operations may further include: in which the metadata defined for the new application represents user specified relationships between two or more of the plurality of entity types by linking together assets at the blockchain.

According to another embodiment such operations may further include: declaring, at the host organization, new business logic for the new application within a table structure having one or more relationships between elements of the new business logic and one or more of the plurality of entity types for the new application; and defining the new business logic any all relationships within the metadata persisted to the blockchain.

According to another embodiment such operations may further include: executing an event listener to monitor for any changes to the defined metadata for the new application at the blockchain; and triggering an event when the changes to the metadata for the new application at the blockchain are observed by the event listener; and in which the triggered event automatically pushes a metadata update to the host organization to update a materialized view of the data associated with the new application by re-structuring the materialized view at the host organization based on the metadata update triggered by the event listener.

According to the operations of another embodiment, triggering the event via the event listener based on changes to the metadata for the new application further includes: triggering one or more of: a business user defined process flow to execute responsive to changes to the defined metadata persisted to the blockchain; a business user defined data retrieval operation to execute responsive to changes to the defined metadata persisted to the blockchain; a business user defined data filtering operation to execute responsive to changes to the defined metadata persisted to the blockchain; an administrator defined process flow to update a data analytics feed responsive to changes to the defined metadata persisted to the blockchain; and an administrator defined process flow to update an Artificial Intelligence (AI) training data stream responsive to changes to the defined metadata persisted to the blockchain.

According to a particular embodiment, there is non-transitory computer-readable storage media having instructions stored thereupon that, when executed by a processor of a system having at least a processor and a memory therein, the instructions cause the system to perform operations including: operating a blockchain interface to the blockchain on behalf of a plurality of tenants of the host organization, in which each one of the plurality of tenants operate as a participating node with access to the blockchain; receiving, from a user device communicably interfaced with the system, first input declaring a new application; receiving second input from the user device adding a plurality of network participants for the new application, in which the network participants are granted access rights to the new application; receiving third input from the user device declaring a plurality of entity types for the new application; receiving fourth input from the user device declaring one or more new field definitions for each of the plurality of entity types; generating a blockchain asset having encoded therein as the defined metadata for the new application, at least (i) the plurality of network participants declared, (ii) the plurality of entity types declared, and (iii) the one or more new field definitions declared for each of the plurality of entity types; and transacting the blockchain asset having the defined metadata encoded therein for the new application onto the blockchain.

According to yet another embodiment, there is a system to execute at a host organization, in which the system includes: a memory to store instructions; a processor to execute instructions; in which the processor is to execute a blockchain services interface on behalf of on behalf of a plurality of tenants of the host organization, in which each one of the plurality of tenants operate as a participating node with access to the blockchain; a receive interface to receive first input from a user device communicably interfaced with the system, the received first input declaring a new application; the receive interface to further receive second input from the user device adding a plurality of network participants for the new application, in which the network participants are granted access rights to the new application; the receive interface to further receive third input from the user device declaring a plurality of entity types for the new application; the receive interface to further receive fourth input from the user device declaring one or more new field definitions for each of the plurality of entity types; a blockchain services interface to generate a blockchain asset having encoded therein as the defined metadata for the new application, at least (i) the plurality of network participants declared, (ii) the plurality of entity types declared, and (iii) the one or more new field definitions declared for each of the plurality of entity types; and in which the blockchain services interface further is to transact the blockchain asset having the defined metadata encoded therein for the new application onto the blockchain.

According to the embodiment of the system, the receive interface is further to receive fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and in which the system further includes an event listener, in which the event listener is to monitor for any change to the blockchain meeting the specified event and the one or more event conditions and trigger the declared event responsive to a monitored change on the blockchain.

Figure 8A:
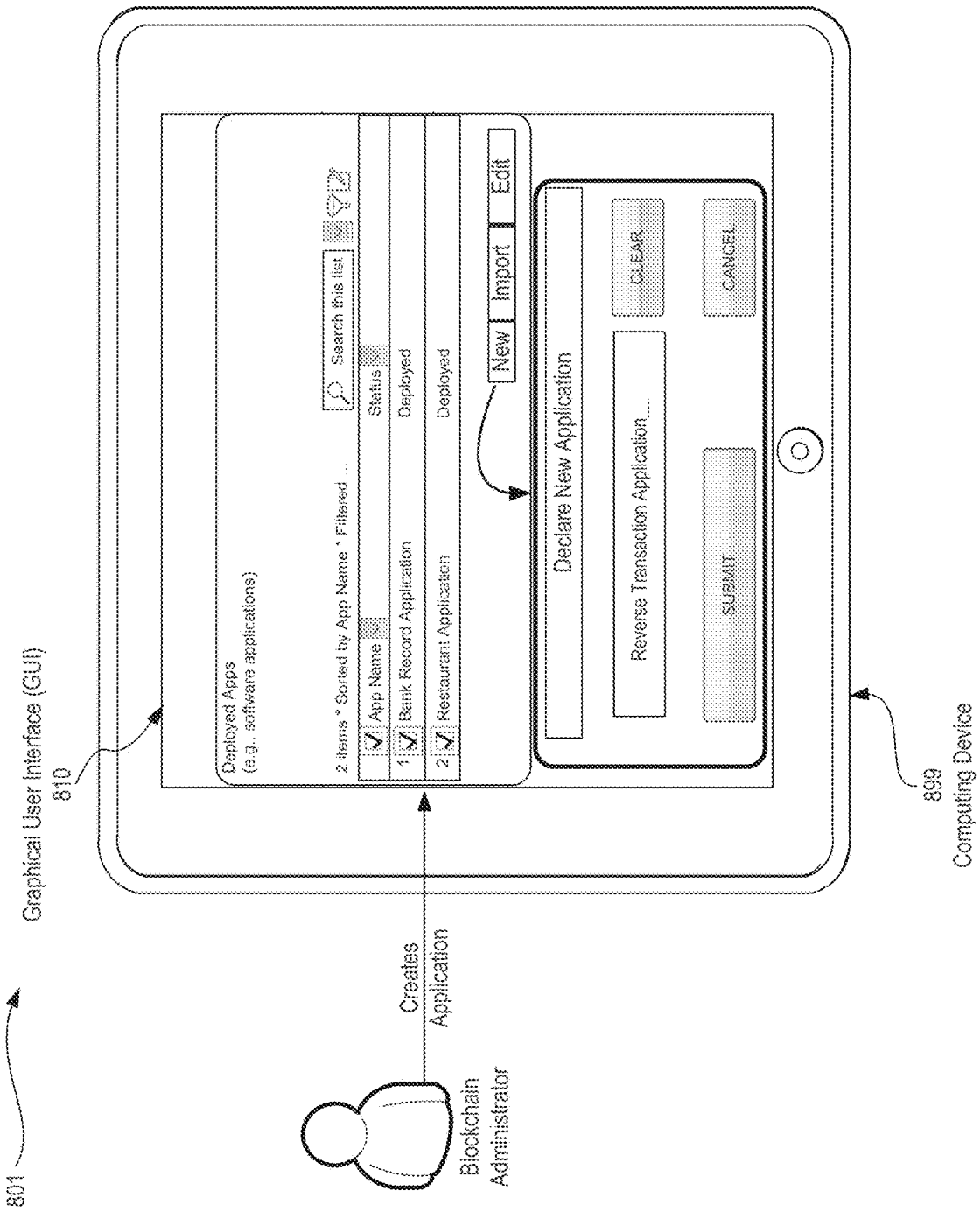
FIG. 8A depicts another exemplary architecture in accordance with described embodiments.

FIG. 8A depicts another exemplary architecture 801 in accordance with described embodiments.

As shown here, there is a GUI 810 executing at a computing device 899, such as a user device of the blockchain administrator, with the GUI 810 being pushed to the computing device 800 by the blockchain metadata definition manager 196 of the host organization.

As shown here, the blockchain administrator may view the deployed applications as shown at the top of the GUI 810 and by clicking the "new" button at the GUI 810, the declarative capability is provided for the blockchain administrator to declare a new application. While depicted here is the declaration of a new application via the GUI 810, the blockchain administrator may alternatively utilize an API provided via the blockchain metadata definition manager 196 to create the new application.

Figure 8B:
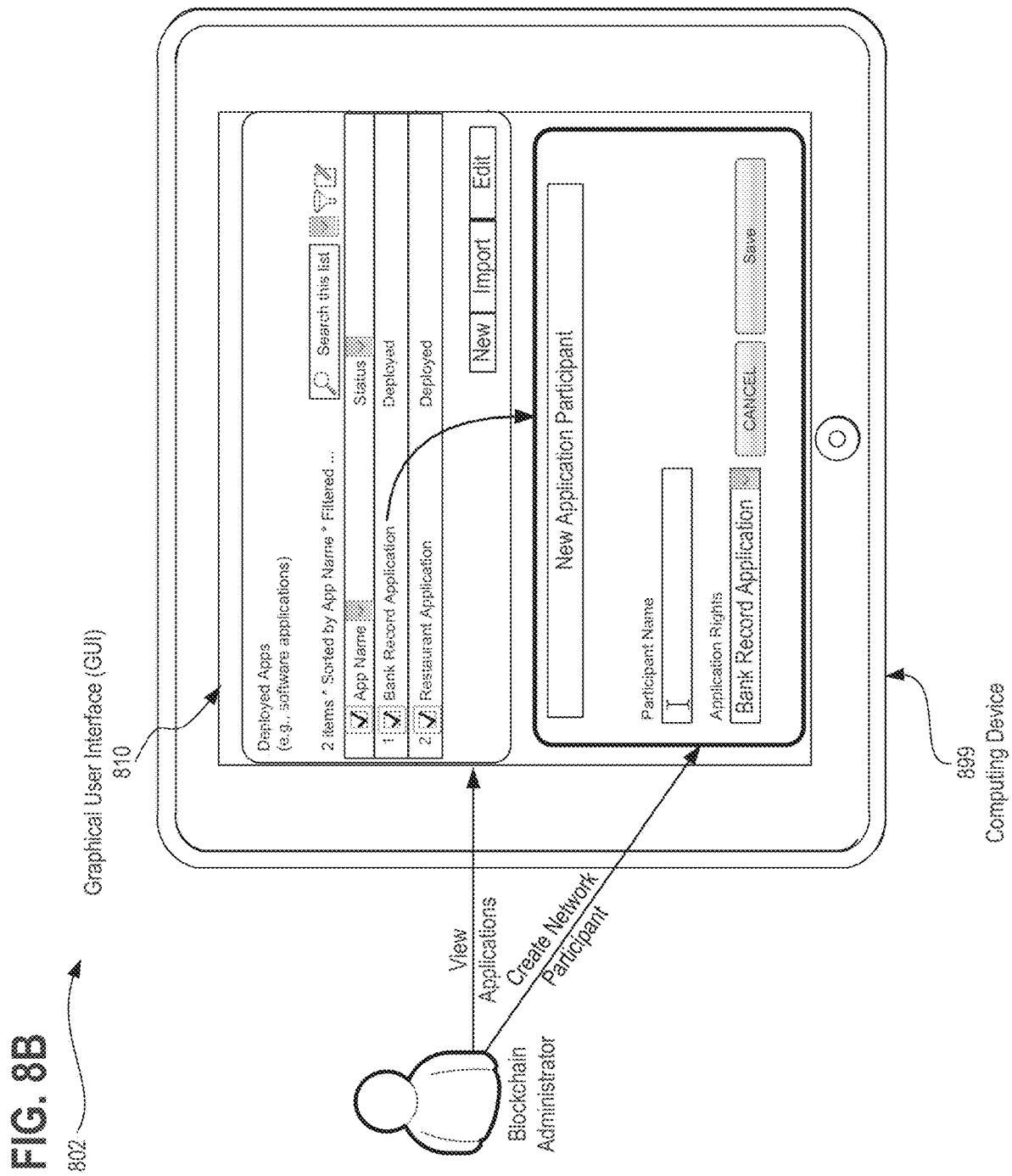
FIG. 8B depicts another exemplary architecture in accordance with described embodiments.

FIG. 8B depicts another exemplary architecture 802 in accordance with described embodiments.

In addition to the declaration of the new application or declaring the new application, there is additionally the ability for the blockchain administrator to define what participants have access to the data associated with this particular application, thus defining the network participants for this newly declared application.

Figure 8C:
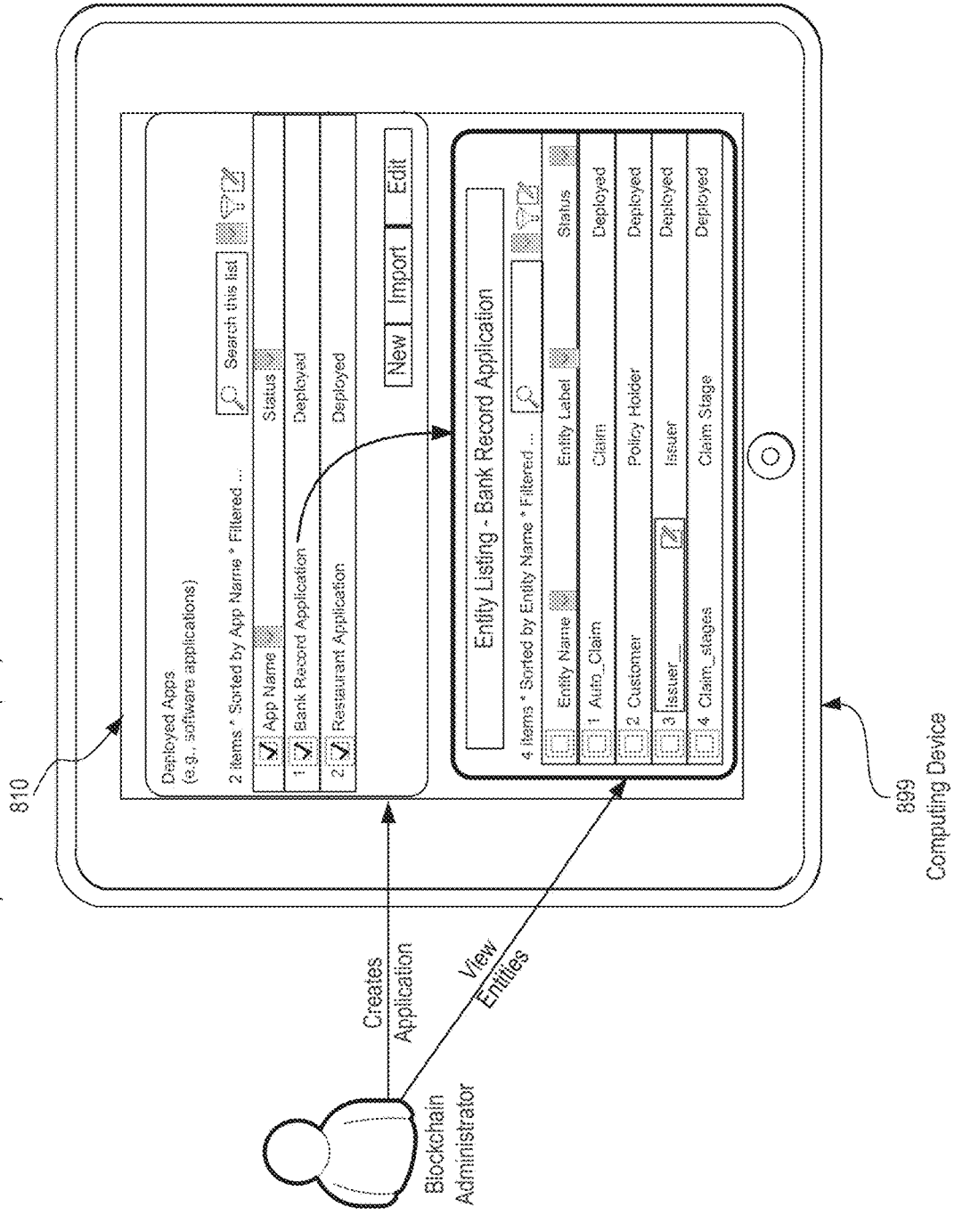
FIG. 8C depicts another exemplary architecture in accordance with described embodiments.

FIG. 8C depicts another exemplary architecture 803 in accordance with described embodiments.

There is again depicted the GUI 810, however, now depicted is the blockchain administrator viewing and editing entities for the "bank record application" by clicking on that application.

Thus, the blockchain administrator may first declare or create a new "application" and then once created, the blockchain administrator may edit or view that application and may create or declare new "entities" within the application, with each declarative entity defining the metadata for a particular custom field within which the application may ultimately store information in compliance with the defined metadata and which other applications may also interact with such data and reference such data, and possibly update, add to, or delete such data where adequate permissions exist, but again, doing so in compliance with the defined metadata.

For example, there is defined here for the bank record application, a "claim" having the entity name "Auto_Claim" and thus, any application wishing to write information to the blockchain pertaining to claims, at least to the extent such information will be utilized by the bank record application, then it is necessary to comply with the requirements of the defined entity "Auto_Claim."

Figure 8D:
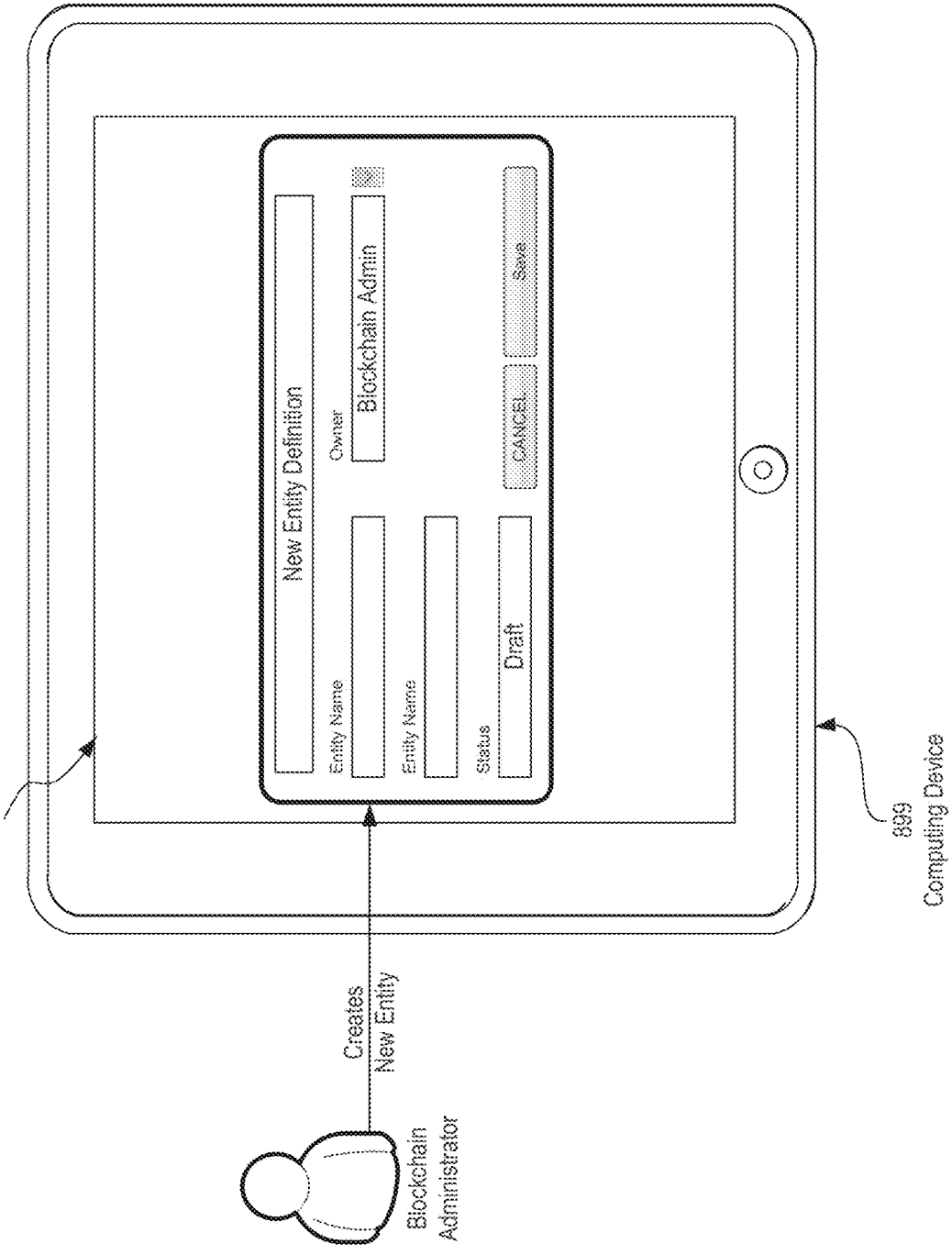
FIG. 8D depicts another exemplary architecture in accordance with described embodiments.

FIG. 8D depicts another exemplary architecture 804 in accordance with described embodiments.

Depicted here is a GUI 810 resulting from the blockchain administrator clicking on the "new" button on the prior screen to declare and create a new entity within the newly created application, or within a viewed application.

As shown here, there is a "New Entity Definition" GUI presented, in which the blockchain administrator can now create a new entity by entering the entity name, entity label, and selecting an owner for the entity, which by default is the user creating the entity. Clicking save then creates and declares this new entity. The blockchain administrator may additionally change the status to "deployed" and once saved, the entity will be transacted onto the blockchain, whereas in draft status, it will be retained only at the host organization's blockchain metadata definition manager 196.

According to a particular embodiment, every GUI has a corresponding API via which to interact with the blockchain metadata definition manager 196.

Figure 8E:
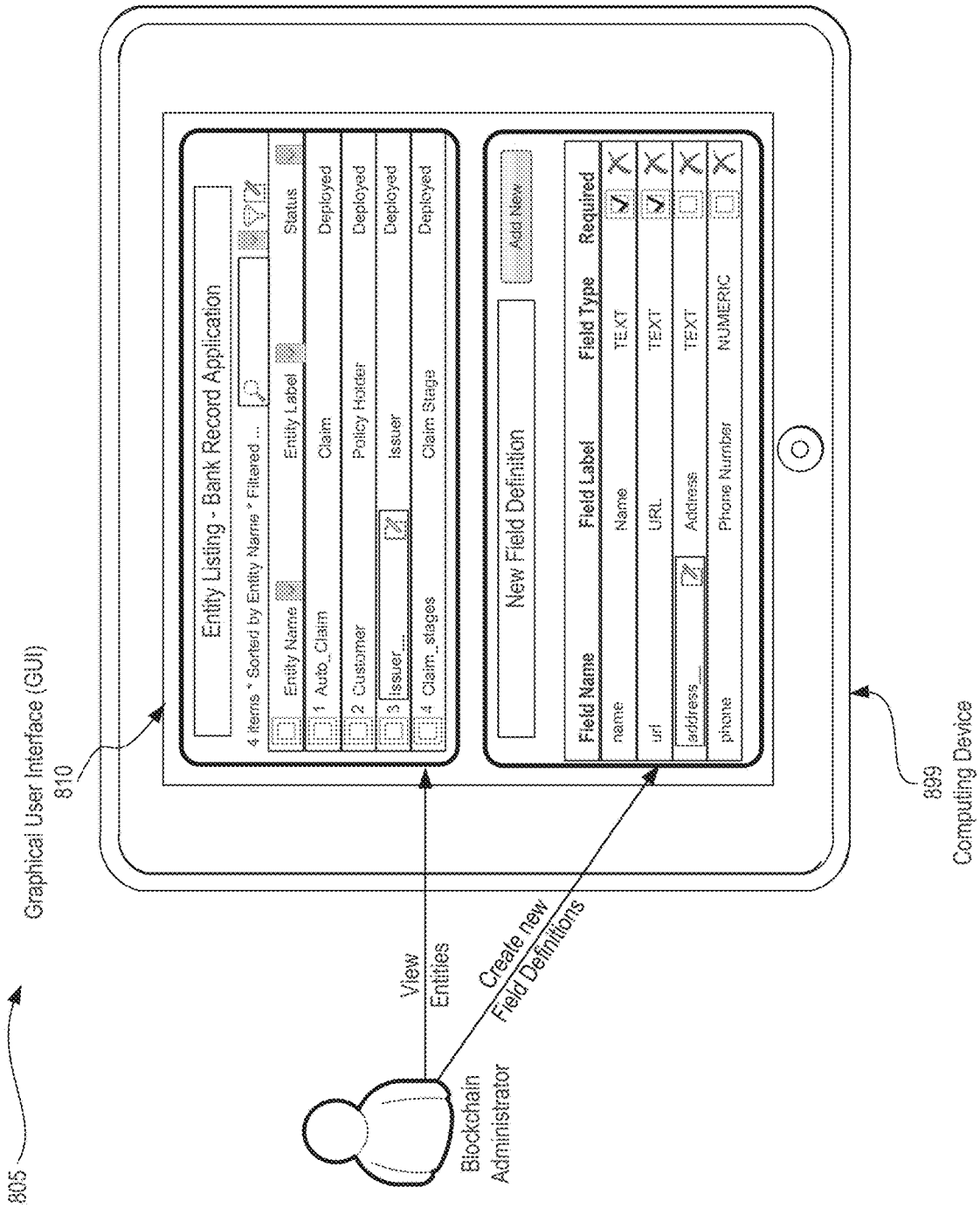
FIG. 8E depicts another exemplary architecture in accordance with described embodiments.

FIG. 8E depicts another exemplary architecture 805 in accordance with described embodiments.

Clicking on an existing entity, including the one just created at the prior GUI 810 as depicted at FIG. 8D, will result in the Field Definition GUI being presented, via which the blockchain administrator may now create any number of fields which are to be stored within that particular entity.

By way of analogy, it may be helpful to think of the declared application as a computer program, albeit one that runs via the cloud, and the declarative entities as tables comparable to tables in a relational database, and finally the declarative fields as column identifiers or populatable fields within a table, and lastly, the collection of fields would thus form a record. While the comparison is not exact, relationships between the various declarative elements and the metadata defined for them should help to illustrate their use.

Because the defined metadata specifies precisely what data is permissible, and the format and type of that data, any permitted application may then both successfully write information to the blockchain in a predictable and pre-defined format as specified by the metadata and additionally, applications with whom they are sharing may also successfully retrieve the information from the blockchain, knowing based on the defined metadata, how that information is supposed to look, and be structured, and thus how that information is to be interpreted.

Because the information is defined in blockchain via the metadata, all the participants know what each element of data means, based on the defined metadata, and therefore, for that network of participants, all participating nodes can share information via the blockchain.

Moreover, the participants are not restricted to the existing metadata transacted onto the blockchain, but they may create additional elements, create new metadata definitions, alter metadata definitions, etc.

For example, Bank Wells Fargo may decide that they, as a participant, require a new entity having fields X, Y, and Z. That participant may therefore define that metadata for the new entity (via the API or the GUI) having the fields X, Y, and Z, and then transact that new entity onto the blockchain.

The new entity will then be subjected to consensus by the other participating nodes. If the other participating nodes disagree, then consensus is not reached, and the change is negated. However, if consensus is reached, then the new entity having fields X, Y, and Z is transacted onto the blockchain by writing the defined metadata for that new entity onto the blockchain within a consensus block, or stated differently, the entity having already been written onto the blockchain, once consensus is attained, becomes a part of the "primary" chain on the blockchain which is accepted by all participants as the main chain.

According to another embodiment, smart contracts are executed for transactions on the blockchain which attempt to write or update data on the blockchain for an entity having defined metadata. For instance, there may be a trigger which causes the execution of the smart contract, in which case the smart contract retrieves or applies the defined metadata to validate that every field within the entity has a data type, data naming compliance, and a date mask which is in compliance with the requirements of the defined metadata.

Where the smart contract enforces the defined metadata, any transaction which fails compliance is either prohibited from being transacted onto the blockchain or if written to the blockchain, the transaction will never be accepted into a block on the main chain as the smart contract validation failure will prevent the transaction from reaching consensus for acceptance.

Thus, through the use of the described GUIs, it is possible for business users lacking programming and program development expertise to nevertheless declare a new application and declare new entity names as well as declaratively create new field definitions for those entity names. For those with greater technical expertise, they may utilize the APIs to interact with the blockchain metadata definition manager 196, if it is preferable for them to do so.

Regardless of the method chosen, the blockchain administrator can declaratively create a new application, new entities, and new field definitions, all without writing any code whatsoever, and the blockchain metadata definition manager 196 will then transact the defined metadata for the new application, the new entity, and/or the new field definitions onto the blockchain for voting and consensus.

Until consensus is reached, the defined metadata cannot be utilized. However, once transacted onto the blockchain and consensus is reached, then other participating nodes or participants on the blockchain can interact with all data for the declared application and the smart contract execution by the blockchain services interface 190 will force or mandate compliance with those interactions.

Figure 8F:
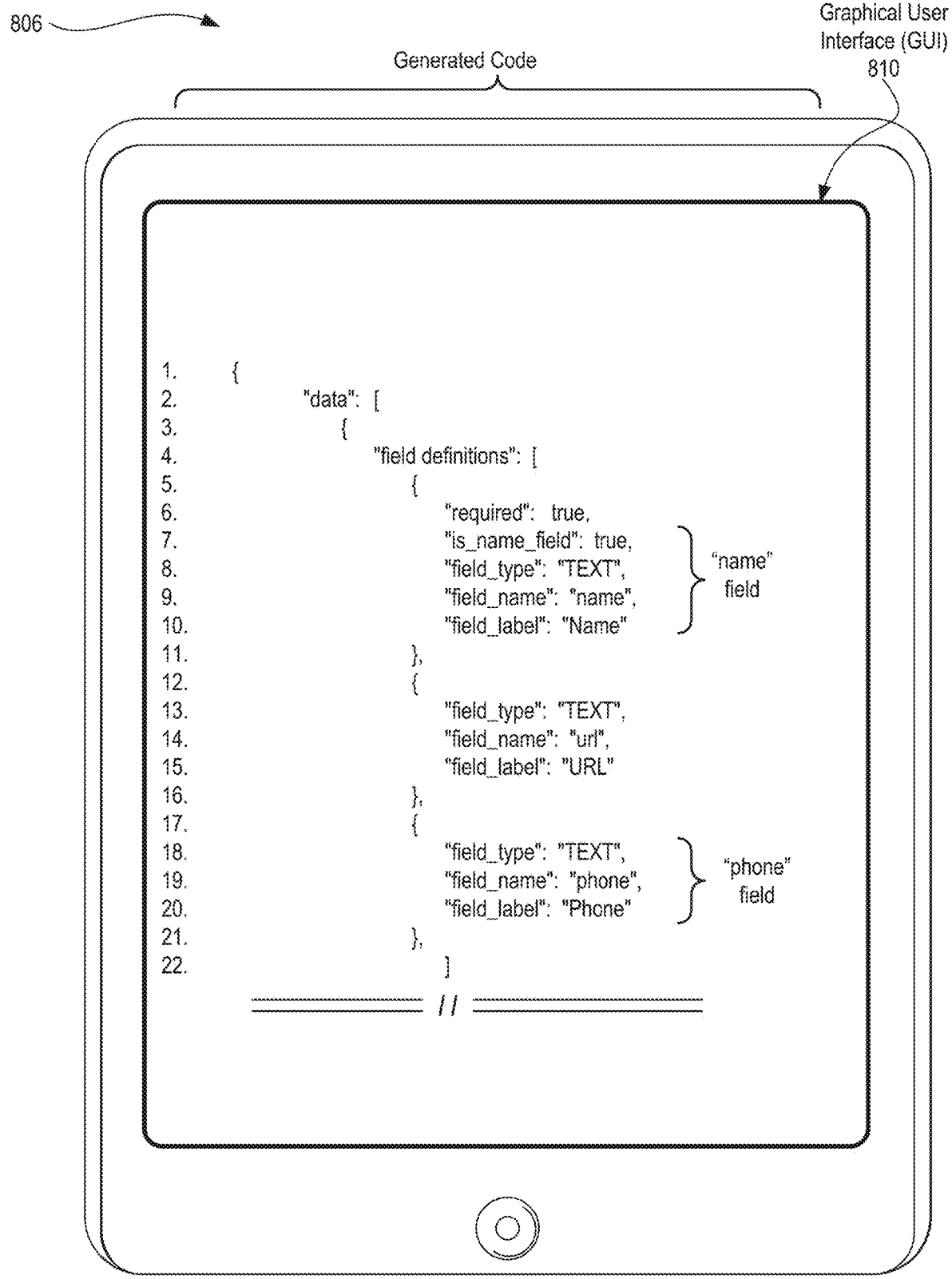

FIGS. 8F and 8G depict another exemplary architecture 806 and 807, respectively, in accordance with described embodiments.

Depicted here is the generated code which is created on behalf of the blockchain administrator's declarative actions to define the application and declare the entity and declare the various defined fields, resulting in the API compliant code being represented within the defined metadata, despite no code having been written by the blockchain administrator. In other embodiments, a programmer or developer may elect to utilize the API to generate this code, in which case the GUIs will reflect the coded entities and the coded defined fields, just as if they had been declared via the GUIs originally.

Thus, the disclosed platform permits the creation of the necessary code to transact with the blockchain and to interact with the blockchain and to define and declare an application, and entities for that application (which may be depicted as tables within a database system via a materialized view as is discussed below), and to further define and declare new field definitions for each entity, and also define permissible network participants which may utilize the declared application.

In such a way, the declarative metadata platform performs all the heavy lifting on behalf of the blockchain administrator, allowing a non-programmer to create all the necessary code to interact with the blockchain for the newly declared application by using only point and click actions through a series of GUIs.

Moreover, the constructs of an application, and allowed network participants, and new declarative entities and new declarative field definitions are presented in a familiar manner to the blockchain administrator since the various elements may be thought of as database tables, columns, fields, and records, etc., despite the fact that database entries and database tables are not being created. Instead, the information is transacted onto the blockchain as an asset, while permitting the blockchain administrator to point and click their way through the entire process without any knowledge or requirement that the blockchain administrator understands how to transact to the underlying blockchain or how to add and update or transfer assets on a blockchain. Therefore, practice of the disclosed embodiments drastically reduces the complexity on the part of a non-programmer user operating as a blockchain administrator.

And yet, for more sophisticated users having programming knowledge and understanding of blockchain, the same code may be written and generated via the APIs exposed by the blockchain services interface 190 and specifically the blockchain metadata definition manager 196 provided by the host organization.

FIG. 9A depicts another exemplary architecture 901 in accordance with described embodiments.

As shown here, the blockchain administrator transacts the defined metadata 910 onto the blockchain, which presumably will be accepted once consensus is reached, and a partner user next transacts a metadata compliant transaction 915 onto the blockchain.

Further depicted here, is the materialized view 920 which permits a host organization user 925 to interact with the data transacted onto the blockchain via the metadata compliant transaction 915 from the accessible cloud platforms 186 available via the host organization 110.

In computing, a materialized view 920 is a database object that contains the results of a query. For example, the materialized view 920 may be a local copy of data located remotely, or may be a subset of the rows and/or columns of a table or join result, or may be a summary using an aggregate function.

The process of setting up a materialized view is sometimes called materialization. On a sense, data materialization is a form of caching the results of a query, similar to other forms of precomputation, in which database administrators leverage materialized views for performance reasons for purposes of optimization.

In any database management system following the relational model, a view is a virtual table representing the result of a database query. Whenever a query or an update addresses an ordinary view's virtual table, the DBMS converts these into queries or updates against the underlying base tables.

Conversely, a materialized view takes a different approach insomuch that the query result is cached as a concrete ("materialized") table that may be updated separately from the original base tables. Such an approach permits for more efficient access, at the cost of extra storage and of some data being potentially out-of-date. Materialized views find use especially in data warehousing scenarios, where frequent queries of the actual base tables can be expensive.

In the example depicted here, the accessible cloud platforms 186 generally utilize information stored within the databases 130 of the host organization 110, however, where certain information is transacted to the blockchain and thus persisted at the blockchain, the materialized view permits the accessible cloud platforms 186 to interact with data stored by the blockchain via the materialized view 920. In such a way, both the host organization user 925 and the accessible cloud platforms may interact with the blockchain data as if it were data stored within the databases 130 of the host organization simply by referencing the materialized view.

Thus, it is in accordance with certain embodiments that any time information is transacted to the blockchain, the smart contract triggers and executes a validation scheme for the data transacted onto the blockchain to ensure it is in compliance with the defined metadata 910 and the smart contract additionally generates the materialized view 920 so as to create a referenceable copy within the database 130 of the host organization 110, thus permitting the standard query interface of the host organization to reference the information within the materialized view, which in turn corresponds to the information transacted onto the blockchain.

Thus, any entity which is declared and created for the blockchain, and for which data is then written or transacted onto the blockchain, will automatically have an equivalent entity (e.g., a table in a relational database) created within the database of the host organization 110 within the materialized view, and as defined fields are created and accepted onto the blockchain, those corresponding columns will then be created within the host organization database system 130, and then when data is transacted onto the blockchain, that corresponding entity table within the database system 130 of the host organization will then be populated, within the materialized view, such that users and processes interacting with the data from the side of the host organization, may access the information from the materialized view.

Consequently, developers and users may interact with the declared application which utilizes data and defined metadata persisted to the blockchain without any knowledge that they are actually utilizing blockchain and without any requirement that such users have any knowledge of how to interact with the blockchain.

According to certain embodiments, a new table is not created within the databases 130 of the host organization and therefore, it is not necessary to synchronize any data between the databases 130 of the host organization and the blockchain. Rather, a channel, pipeline, or view of the data persisted by the blockchain external from the host is represented via the materialized view at the databases 130 of the host organization, but the materialized view, although being referenceable, is not a copy that is synchronized back to the blockchain and does not allow updates or modifications. The materialized view is only permissible for read-only referencing from the databases 130 of the host organization. All modifications, updates, changes, etc., must be transacted onto the blockchain, and a refreshed materialized view will then pull those changes from the blockchain and reflect those modifications at the database 130. While such an arrangement creates additional overhead, the arrangement expressly negates the need to synchronize data within the materialized view as such data is wholly non-authoritative.

Consequently, developers, programs, processes, and users may utilize standard SQL queries to interact with the blockchain data, by referencing the materialized view 920. For example, specifying SELECT from $Table_Name WHERE . . . when specifying the entity name as the table name for the materialized view 920 will result in a database query result being returned by the host organization's database 130, despite the fact that the authoritative copy of the data resides within the blockchain itself. While this structure does create some duplicative data, and thus arguably results in wasted storage, the structure has the benefit of greatly simplifying queries originating from any of the accessible cloud platforms 186 which may utilize standard SQL without having to identify the blockchain or construct more complex blockchain transactions to retrieve the data, as the replication of the data to the materialized view 920 is performed automatically by the smart contract triggers. According to such embodiments, SQL commands which update, create, or delete records are not permitted for execution against the materialized view, however, such SQL commands which update, create, or delete records will be accepted and translated to the apex translation engine and Apex code interface 454 (shown at FIG. 4B) into native blockchain executable compliant code to perform the equivalent action of an SQL update, create, or delete command, but as a blockchain transaction which is then transacted against the blockchain, submitted for consensus, and then accepted onto the blockchain assuming voting or consensus is successful. Note also that a smart contract will execute to validate the transaction against the blockchain to enforce data compliance with the defined metadata persisted at the blockchain.

For example, an SQL query submitted from a host organization user may request an update for customer record John Doe for a specified application. Because such information is persisted at the blockchain, the SQL cannot be executed against the database systems 130 of the host organization. Moreover, the blockchain does not accept an SQL query which requests, "Please return all data for customer record John Doe." The information on the blockchain is not human readable and also does not permit this kind of a query.

Consequently, the Apex code interface 454 will translate the SQL code received into native blockchain code to transact updated payload data onto the blockchain for the customer record John Doe for the specified application. Note that when this occurs, the newest and latest information for customer record John Doe will now be reflected at the blockchain as the most up to date information and also at any materialized view of the same data, however, the old information for customer record John Doe remains within the blockchain as the blockchain records are immutable, thus creating an immutable audit trail which may be referenced at any time. Thus, any party with access rights to such data, can look back at prior blocks of the blockchain to determine what information was previously recorded for customer record John Doe, or in the case that customer record John Doe is deleted, such a change will be again reflected by the blockchain, but the old record itself remains immutably within the prior blocks of the blockchain, though the application will understand that such information is indicated as "deleted" and thus, the deleted record will not be referenced as live current data, but it always remains available, as per the inherent design of the DLT blockchain technology.

In alternative embodiments, the Apex code interface 454 (shown at FIG. 4B) is utilized to translate SQL database queries into a native blockchain protocol, permitting the translated SQL query to then be executed against the blockchain and generate a result set, which is then translated back into an SQL compliant format and returned responsive to the SQL queries. In yet other embodiments, a smart contract engine performs transactions against the blockchain to retrieve the defined entities and defined fields and translates those into the materialized view which is then stored within the host organization database system 130, subsequent to which non-translated SQL queries may be executed to retrieve the blockchain data directly from the materialized view.

Because the application itself is declarative, as are the declared entities and the declared defined fields for those entities, all data constructs are wholly customizable and may be tailored to the particular needs of the business, subject only to consensus on the blockchain by the network participants or the participating nodes which operate on that particular blockchain.

FIG. 9B depicts another exemplary architecture 902 in accordance with described embodiments.

As shown here, the defined metadata 910 has now been deployed to the blockchain as shown at element 911. Consequently, the declaratively defined application, its entities, and field definitions may now be utilized by any authorized network participants. In many circumstances, the authorized network participants will be host organization users 925 which have access to the various cloud services of the host organization 110, and thus, the hosted application 920 is exposed to the customers for use once deployed to the blockchain.

However, there is a need in certain circumstances for a partner user to access the software as an authorized network participant. Problematically, such a partner user having been authorized as a network participant and thus, granted permissions to interact with the declared application is not necessarily a customer of the host organization, and it may not be desirable to force them to become a subscribing customer of the host organization.

In order to deploy the declared application for use by non-customers of the host organization, there are two requirements in accordance with certain embodiments. Firstly, the blockchain administrator must define the permissible network participants, which may be done by defining an Internet Protocol (IP) address for those network participants in accordance with certain embodiments. The IP address may correspond to a host organization user, identified by IP, or the network participant may be a non-customer of the host organization, again identified by IP. In such a way, the participating nodes on the blockchain which may permissibly access the application and utilize the application may be identified and may communicate with one another and share data with one another, assuming they are correctly identifiable by the IP addresses defined by the blockchain administrator as added network participants for that particular application.

In certain embodiments, some or all of the added network participants are non-users or non-subscribers of the host organization, and thus, they cannot authenticate with the host organization and thus cannot identify themselves to the host organization via authentication credentials. It is therefore in accordance with such embodiments that an identified network participant that is a non-customer of the host organization and wishing to utilize the application as a permissible network participant (defined by the blockchain administrator) yet a non-customer of the host organization, proceeds through a two-step authentication process. Firstly, they must provide their IP which must correspond with an added network participant. The non-customer will then be presented with a challenge, responsive to which they need to return a public key. The non-customer will have been given the public key in advance by the blockchain administrator so that they may successfully traverse the authentication challenge.

Once the non-customer provides both their IP and responds to the challenge with the public key, then that public key is utilized every time that non-customer attempts to utilize the declared application to negotiate trust amongst the participating nodes on the blockchain.

Therefore, in accordance with a particular embodiment, a deployable install package 925 is transmitted to the partner user, in which the deployable install package 925 runs software for the non-customer, allowing them to access the declared application.

According to a particular embodiment, the deployable install package 925 is a generic software package which does not include functionality of the declared application, but rather, provides the non-customer partner organization to access the blockchain services interface of the host organization, such that the non-customer partner org may then transact with the blockchain through the host organization through the use of the declared application to which that particular non-customer partner org was added as an authorized network participant.

According to such an embodiment, the generic deployable install package 925, once installed and executed, will prompt the non-customer partner organization for a shared public key which will have been transmitted to them separately by the blockchain administrator that added the non-customer partner org as an authorized network participant for that particular declared application.

According to one embodiment, the deployable install package 925 issues the challenge based on the IP address of the non-customer partner organization which will have been configured by the blockchain administrator as part of the metadata for the declared application when adding the non-customer partner organization as an authorized network participant.

Therefore, the identical generic deployable install package 925 deployable install package 925 will operate differently based on where it is executed. If the deployable install package 925 is executed from a system having an IP address which is not in range or does not correspond to a configured IP for the authorized network participant, then the deployable install package 925 when executed will simply indicate that the location associated with that IP address is not an authorized network participant for any declared application.

If the identical deployable install package 925 is transmitted to a different person who is an authorized network participant for a different declared application, then the deployable install package 925, when executed, will prompt the user to enter the shared public key for the different declared application, thus necessitating that both the correct shared public key be provided and that the deployable install package 925 be executed from an IP address which is already configured as corresponding to an authorized network participant.

In such a way, the deployable install package 925 may be shared, distributed, or even published via the host organization's support pages, without any non-authorized user being granted to the declared application in question, so long as they cannot both spoof the IP and provide the correct shared public key responsive to the challenge.

In certain embodiments, a user based authentication challenge may additionally be provided for a known user, without necessitating that such a user or the non-customer partner organization associated with the user subscribe to any services from the host organization.

While users of the declared application may utilize an API to interact with the declared application and thus interact with the blockchain indirectly through the declared application, it is not necessary for them to do so.

Rather, according to a particular embodiment, the deployable install package 925 provides a UI which is dynamically generated from the metadata persisted at the blockchain for the declared application to which the executor of the deployable install package 925 is an authorized network participant.

Therefore, it is not necessary for the deployable install package 925 to have any application specific UIs. Rather, any GUI, API, or UI needed for the declared application will be dynamically constructed by the deployable install package 925 based on the associated metadata for the declared application.

In such a way, a non-customer partner organization which subscribes to no services whatsoever from the host organization may nevertheless utilize the blockchain services interface of the host organization (through the declared application) and utilize, interact with, and store data on the blockchain which is made accessible through the host organization's blockchain services interface.

According to a particular embodiment, once the deployable install package 925 is executed a user may authenticate with the declared application through the dynamically built UI which will associate the public key provided via by the user responsive to the initial challenge, and then proceed to generate GUI display screens based on the defined metadata for the declared application, including any defined entities and any defined field definitions, via which the non-customer of the host organization may enter data which is transacted onto the blockchain, update such data on the blockchain, and retrieve data from the blockchain, including data written to the blockchain by another organization, but with whom the data associated with the declared application is being shared, thus forming a common collection of data on the blockchain for all authorized network participants which utilize the new declared application.

Thus, the GUIs permit a blockchain administrator to define an application, define entities, define fields for each of those entities, and define permissible network participants, and then allow both host organization users and non-customer users to access the hosted software in which all the declarative metadata resides within a blockchain. Such a blockchain may operate wholly outside of the host organization and even outside of the control of the host organization, so long as the blockchain is accessible to the host organization. In alternative embodiments, the declarative metadata resides within a modified DLT which is operated internally to the host organization and for which the host organization is the single centralized trust authority.

Where the declarative metadata is hosted on an accessible blockchain outside of the host organization, such as blockchains 999 shown here, the declared applications interact with the information on the blockchain by transacting with the blockchain to retrieve payload data from assets, to update assets, to create assets, etc., Notably, however, the authoritative copy of the data is hosted external to the host organization on the accessible blockchain(s) 999 and is not stored by any table within the databases 130 of the host organization. The materialized view discussed above is an optional feature, but even when used, the information within the materialized view is not the authoritative copy. Any transactions making modifications to the data associated with the application, must not only comply with the defined metadata, but must also be updated at the blockchain 999. Where a modified DLT is operated internally, the data associated with the application must be updated within the modified DLT as the authoritative source. Such application data is therefore persisted by an accessible blockchain 999 as the ultimate authoritative copy of the data. Thus, even if the materialized view is deleted or corrupted, or becomes out of synch with the accessible blockchain, there is no affect upon the operations of the declared application because the data for that application and the metadata defining the structure and of such data is stored by the accessible blockchain 999.

FIG. 9C depicts another exemplary architecture 903 in accordance with described embodiments.

As shown here, there is an event listener 960 within the blockchain services interface 190 which accepts defined triggers 961 from the blockchain administrator and then operates to listen for specified events which occur on the blockchain, responsive to which, an event is triggered or fired, shown here as the event triggered 962 so as to push transactions to the host organization or to initiate the execution of a flow or data processing flow, or any defined operations as specified by the blockchain administrator. While this is a similar mechanism to that which is utilized to trigger the smart contract execution automatically to enforce data compliance with the defined metadata, the event listener and the defined triggers 961 permits the blockchain administrator to define any executable operations to occur based on their own customized criteria, regardless of operations performed by the smart contract execution.

Therefore, according to a particular embodiment, any time that any change occurs within the accessible blockchain matching the defined triggers 961 which is in the possession of the event listener 960, the event listener will fire an event or events (event triggered 962) back into the accessible cloud platforms 186, and the blockchain administrator can write any kind of flow via code submitted via the API to the blockchain services interface 190 or via the GUIs (e.g., via the integration builder and associated GUIs) which permits the blockchain administrator to create the flow, for example, create a smart contract to be executed or some other flow as defined by the blockchain administrator, and that flow will then cause updates within the accessible cloud platforms 186 as defined by the event triggered 962 responsive to the change having occurred on the blockchain as monitored by the event listener 960. According to one embodiment, a database transaction is performed within the databases 130 of the host organization or within the accessible cloud platform responsive to an event triggered 962. In another embodiment, a GUI is triggered and pushed to a user client device presenting information based on the change having occurred within the blockchain, as monitored by the event listener 960.

Figure 10A:
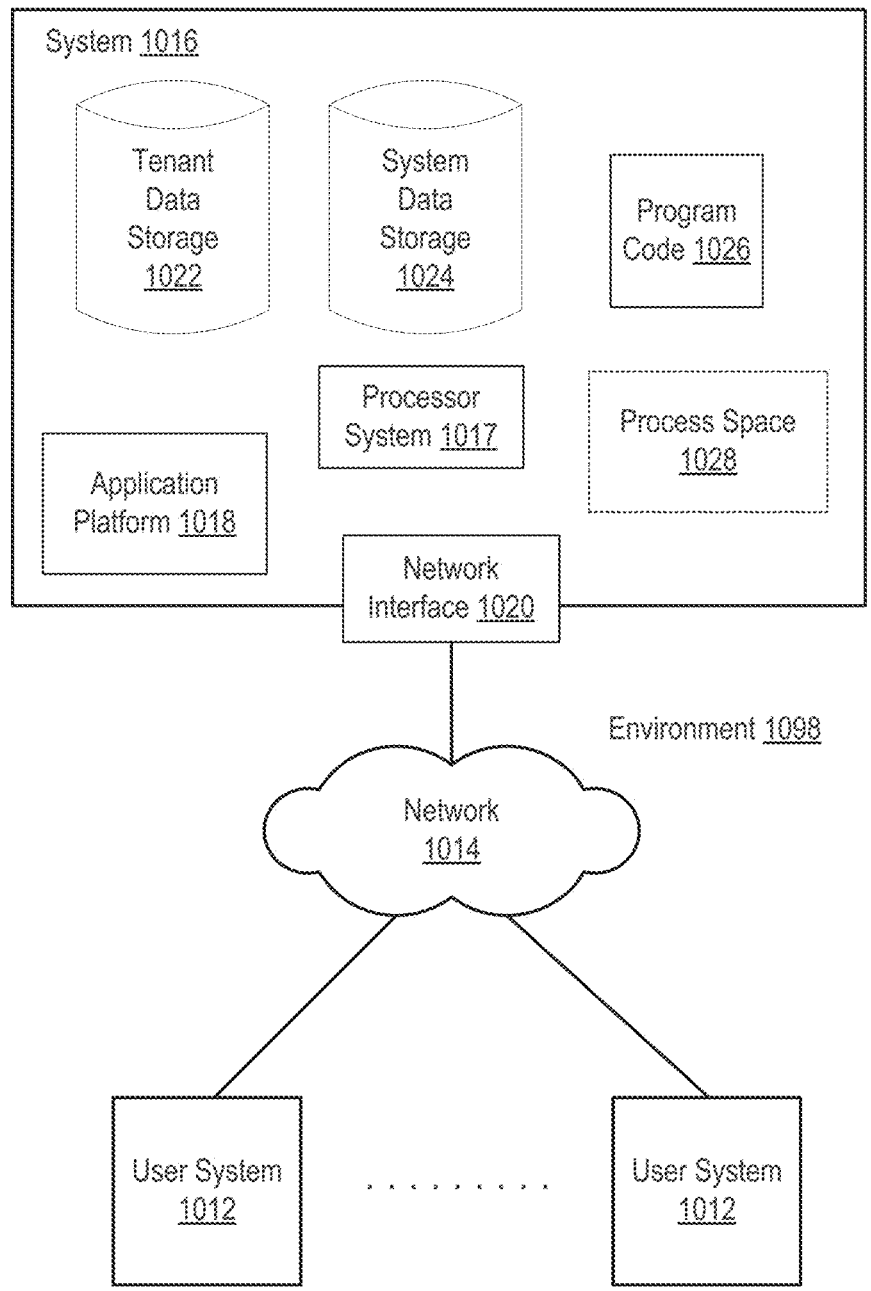
FIG. 10A illustrates a block diagram of an environment in which an on-demand database service may operate in accordance with the described embodiments.

FIG. 10A illustrates a block diagram of an environment 1098 in which an on-demand database service may operate in accordance with the described embodiments. Environment 1098 may include user systems 1012, network 1014, system 1016, processor system 1017, application platform 1018, network interface 1020, tenant data storage 1022, system data storage 1024, program code 1026, and process space 1028. In other embodiments, environment 1098 may not have all of the components listed and/or may have other elements instead of, or in addition to, those listed above.

Environment 1098 is an environment in which an on-demand database service exists. User system 1012 may be any machine or system that is used by a user to access a database user system. For example, any of user systems 1012 may be a handheld computing device, a mobile phone, a laptop computer, a work station, and/or a network of computing devices. As illustrated in FIG. 10A (and in more detail in FIG. 10B) user systems 1012 might interact via a network 1014 with an on-demand database service, which is system 1016.

An on-demand database service, such as system 1016, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1016" and "system 1016" is used interchangeably herein. A database image may include one or more database objects. A relational database management system (RDMS) or the equivalent may execute storage and retrieval of information against the database object(s). Application platform 1018 may be a framework that allows the applications of system 1016 to run, such as the hardware and/or software, e.g., the operating system. In an embodiment, on-demand database service 1016 may include an application platform 1018 that enables creation, managing and executing one or more applications developed by the provider of the on-demand database service, users accessing the on-demand database service via user systems 1012, or third party application developers accessing the on-demand database service via user systems 1012.

The users of user systems 1012 may differ in their respective capacities, and the capacity of a particular user system 1012 might be entirely determined by permissions (permission levels) for the current user. For example, where a salesperson is using a particular user system 1012 to interact with system 1016, that user system has the capacities allotted to that salesperson. However, while an administrator is using that user system to interact with system 1016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1014 is any network or combination of networks of devices that communicate with one another. For example, network 1014 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1012 might communicate with system 1016 using TCP/IP and, at a higher network level, use other common Internet protocols to communicate, such as HTTP, FTP, AFS, WAP, etc. In an example where HTTP is used, user system 1012 might include an HTTP client commonly referred to as a "browser" for sending and receiving HTTP messages to and from an HTTP server at system 1016. Such an HTTP server might be implemented as the sole network interface between system 1016 and network 1014, but other techniques might be used as well or instead. In some implementations, the interface between system 1016 and network 1014 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1016, shown in FIG. 10A, implements a web-based Customer Relationship Management (CRM) system. For example, in one embodiment, system 1016 includes application servers configured to implement and execute CRM software applications as well as provide related data, code, forms, webpages and other information to and from user systems 1012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1016 implements applications other than, or in addition to, a CRM application. For example, system 1016 may provide tenant access to multiple hosted (standard and custom) applications, including a CRM application. User (or third party developer) applications, which may or may not include CRM, may be supported by the application platform 1018, which manages creation, storage of the applications into one or more database objects and executing of the applications in a virtual machine in the process space of the system 1016.

One arrangement for elements of system 1016 is shown in FIG. 10A, including a network interface 1020, application platform 1018, tenant data storage 1022 for tenant data 1023, system data storage 1024 for system data 1025 accessible to system 1016 and possibly multiple tenants, program code 1026 for implementing various functions of system 1016, and a process space 1028 for executing MTS system processes and tenant-specific processes, such as running applications as part of an application hosting service. Additional processes that may execute on system 1016 include database indexing processes.

Several elements in the system shown in FIG. 10A include conventional, well-known elements that are explained only briefly here. For example, each user system 1012 may include a desktop personal computer, workstation, laptop, PDA, cell phone, or any wireless access protocol (WAP) enabled device or any other computing device capable of interfacing directly or indirectly to the Internet or other network connection. User system 1012 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 1012 to access, process and view information, pages and applications available to it from system 1016 over network 1014. Each user system 1012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1016 or other systems or servers. For example, the user interface device may be used to access data and applications hosted by system 1016, and to perform searches on stored data, and otherwise allows a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 1012 and all of its components are operator configurable using applications, such as a browser, including computer code run using a central processing unit such as an Intel Pentium® processor or the like. Similarly, system 1016 (and additional instances of an MTS, where more than one is present) and all of their components might be operator configurable using application(s) including computer code to run using a central processing unit such as processor system 1017, which may include an Intel Pentium® processor or the like, and/or multiple processor units.

According to one embodiment, each system 1016 is configured to provide webpages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 10B:
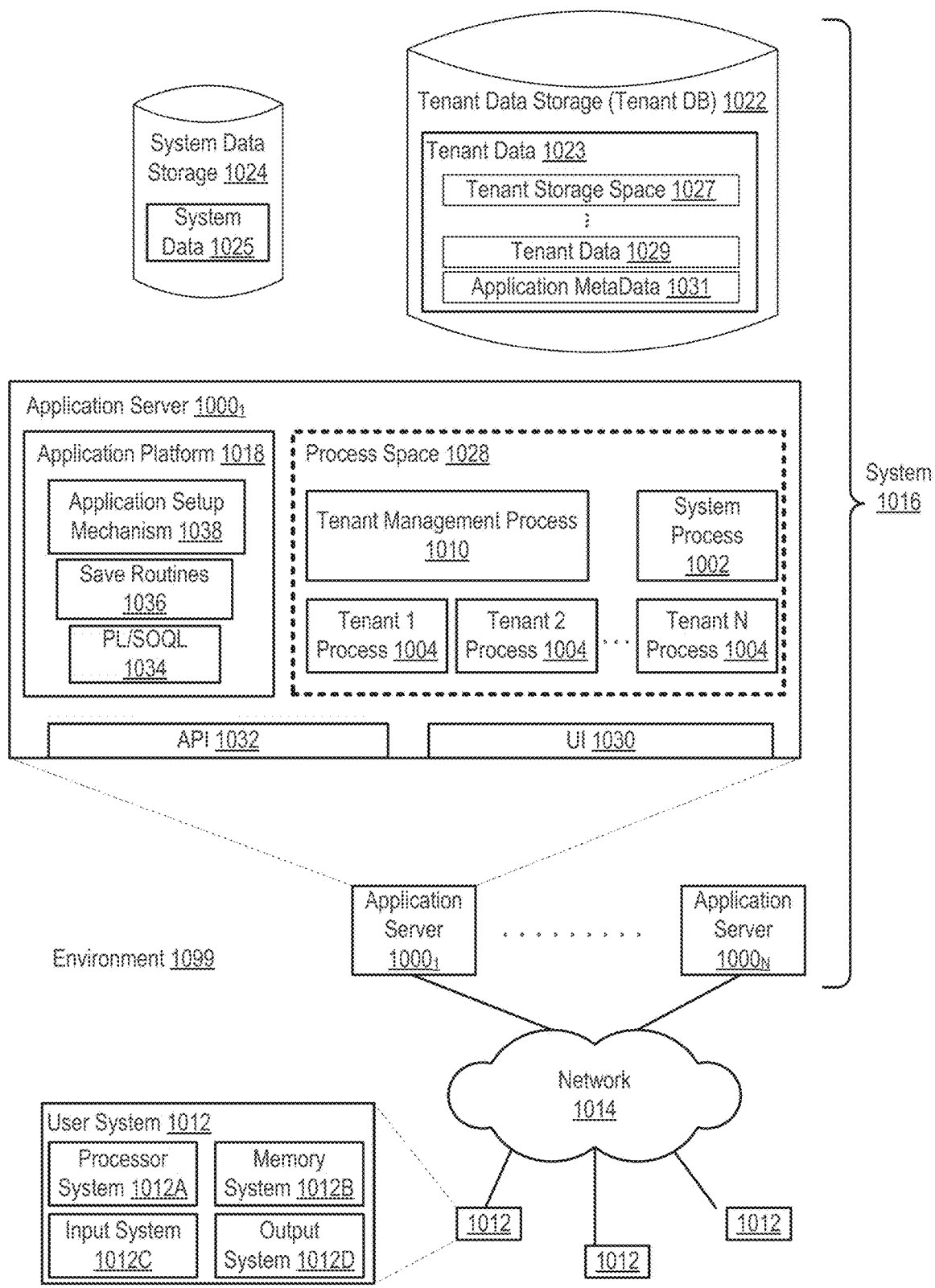
FIG. 10B illustrates another block diagram of an embodiment of elements of FIG. 10A and various possible interconnections between such elements in accordance with the described embodiments.

FIG. 10B illustrates another block diagram of an embodiment of elements of FIG. 10A and various possible interconnections between such elements in accordance with the described embodiments. FIG. 10B also illustrates environment 1099. However, in FIG. 10B, the elements of system 1016 and various interconnections in an embodiment are illustrated in further detail. More particularly, FIG. 10B shows that user system 1012 may include a processor system 1012A, memory system 1012B, input system 1012C, and output system 1012D. FIG. 10B shows network 1014 and system 1016. FIG. 10B also shows that system 1016 may include tenant data storage 1022, having therein tenant data 1023, which includes, for example, tenant storage space 1027, tenant data 1029, and application metadata 1031. System data storage 1024 is depicted as having therein system data 1025. Further depicted within the expanded detail of application servers $1000_{1-N}$ are User Interface (UI) 1030, Application Program Interface (API) 1032, application platform 1018 includes PL/SOQL 1034, save routines 1036, application setup mechanism 1038, process space 1028 includes system process space 1002, tenant 1-N process spaces 1004, and tenant management process space 1010. In other embodiments, environment 1099 may not have the same elements as those listed above and/or may have other elements instead of, or in addition to, those listed above.

User system 1012, network 1014, system 1016, tenant data storage 1022, and system data storage 1024 were discussed above in FIG. 10A. As shown by FIG. 10B, system 1016 may include a network interface 1020 (of FIG. 10A) implemented as a set of HTTP application servers 1000, an application platform 1018, tenant data storage 1022, and system data storage 1024. Also shown is system process space 1002, including individual tenant process spaces 1004 and a tenant management process space 1010. Each application server 1000 may be configured to tenant data storage 1022 and the tenant data 1023 therein, and system data storage 1024 and the system data 1025 therein to serve requests of user systems 1012. The tenant data 1023 might be divided into individual tenant storage areas (e.g., tenant storage space 1027), which may be either a physical arrangement and/or a logical arrangement of data. Within each tenant storage space 1027, tenant data 1029, and application metadata 1031 might be similarly allocated for each user. For example, a copy of a user's most recently used (MRU) items might be stored to tenant data 1029. Similarly, a copy of MRU items for an entire organization that is a tenant might be stored to tenant storage space 1027. A UI 730 provides a user interface and an API 1032 provides an application programmer interface into system 1016 resident processes to users and/or developers at user systems 1012. The tenant data and the system data may be stored in various databases, such as one or more Oracle™ databases.

Application platform 1018 includes an application setup mechanism 1038 that supports application developers' creation and management of applications, which may be saved as metadata into tenant data storage 1022 by save routines 1036 for execution by subscribers as one or more tenant process spaces 1004 managed by tenant management process space 1010 for example. Invocations to such applications may be coded using PL/SOQL 1034 that provides a programming language style interface extension to API 1032. Invocations to applications may be detected by one or more system processes, which manages retrieving application metadata 1031 for the subscriber making the invocation and executing the metadata as an application in a virtual machine.

Each application server 1000 may be communicably coupled to database systems, e.g., having access to system data 1025 and tenant data 1023, via a different network connection. For example, one application server $1000_1$ might be coupled via the network 1014 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 1012 to distribute requests to the application servers 1000. In one embodiment, the load balancer uses a least connections algorithm to route user requests to the application servers 1000. Other examples of load balancing algorithms, such as round robin and observed response time, also may be used. For example, in certain embodiments, three consecutive requests from the same user may hit three different application servers 1000, and three requests from different users may hit the same application server 1000. In this manner, system 1016 is multi-tenant, in which system 1016 handles storage of, and access to, different objects, data and applications across disparate users and organizations.

As an example of storage, one tenant might be a company that employs a sales force where each salesperson uses system 1016 to manage their sales process. Thus, a user might maintain contact data, leads data, customer follow-up data, performance data, goals and progress data, etc., all applicable to that user's personal sales process (e.g., in tenant data storage 1022). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1016 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1016 might also maintain system level data usable by multiple tenants or other data. Such system level data might include industry reports, news, postings, and the like that are sharable among tenants.

In certain embodiments, user systems 1012 (which may be client systems) communicate with application servers 1000 to request and update system-level and tenant-level data from system 1016 that may require sending one or more queries to tenant data storage 1022 and/or system data storage 1024. System 1016 (e.g., an application server 1000 in system 1016) automatically generates one or more SQL statements (e.g., one or more SQL queries) that are designed to access the desired information. System data storage 1024 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 11 illustrates a diagrammatic representation of a machine 1100 in the exemplary form of a computer system, in accordance with one embodiment, within which a set of instructions, for causing the machine/computer system 1100 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1118 (e.g., a persistent storage device including hard disk drives and a persistent database and/or a multi-tenant database implementation), which communicate with each other via a bus 1130. Main memory 1104 includes a blockchain metadata definition manager 1124 and a smart contract executor (e.g., smart contract validator) 1123 and a blockchain interface 1125. Main memory 1104 and its sub-elements are operable in conjunction with processing logic 1126 and processor 1102 to perform the methodologies discussed herein.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations and functionality which is discussed herein.

The computer system 1100 may further include a network interface card 1108. The computer system 1100 also may include a user interface 1110 (such as a video display unit, a liquid crystal display, etc.), an alphanumeric input device 1112 (e.g., a keyboard), a cursor control device 1114 (e.g., a mouse), and a signal generation device 1116 (e.g., an integrated speaker). The computer system 1100 may further include peripheral device 1136 (e.g., wireless or wired communication devices, memory devices, storage devices, audio processing devices, video processing devices, etc.).

The secondary memory 1118 may include a non-transitory machine-readable storage medium or a non-transitory computer readable storage medium or a non-transitory machine-accessible storage medium 1131 on which is stored one or more sets of instructions (e.g., software 1122) embodying any one or more of the methodologies or functions described herein. The software 1122 may also reside, completely or at least partially, within the main memory 1104 and/or within the processor 1102 during execution thereof by the computer system 1100, the main memory 1104 and the processor 1102 also constituting machine-readable storage media. The software 1122 may further be transmitted or received over a network 1120 via the network interface card 1108.

Figure 12:
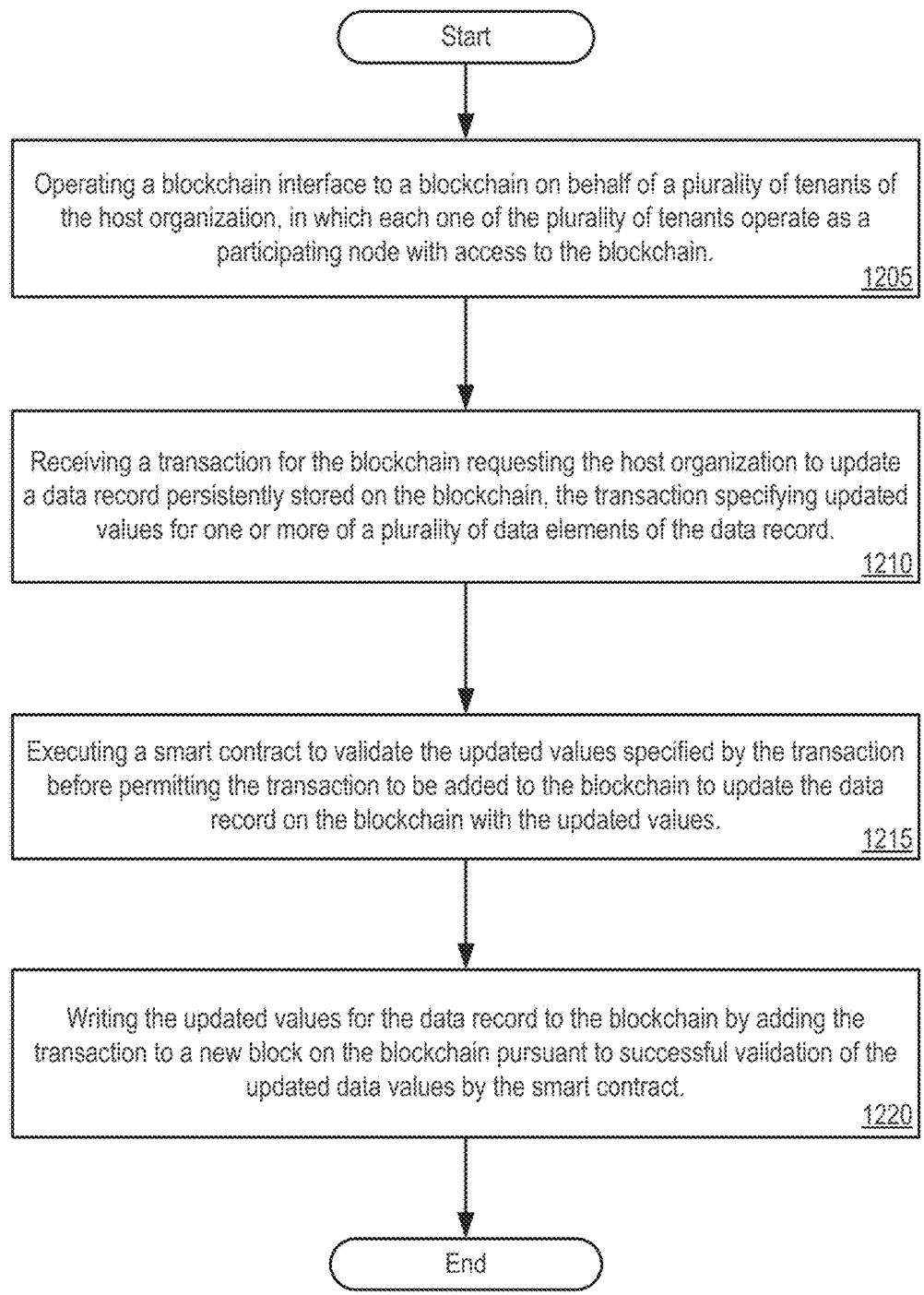
FIG. 12 depicts a flow diagram illustrating a method for implementing efficient storage and validation of data and metadata within a blockchain using Distributed Ledger Technology (DLT), in accordance with described embodiments.

FIG. 12 depicts a flow diagram illustrating a method 1200 for implementing efficient storage and validation of data and metadata within a blockchain using Distributed Ledger Technology (DLT) in conjunction with a cloud based computing environment such as a database system implementation supported by a processor and a memory to execute such functionality to provide cloud based on-demand functionality to users, customers, and subscribers.

Method 1200 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1250, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1200 depicted at FIG. 12, at block 1205, processing logic operates a blockchain interface to a blockchain on behalf of a plurality of tenants of the host organization, in which each one of the plurality of tenants operate as a participating node with access to the blockchain.

At block 1210, processing logic receives a transaction for the blockchain requesting the host organization to update a data record persistently stored on the blockchain, the transaction specifying updated values for one or more of a plurality of data elements of the data record.

At block 1215, processing logic executes a smart contract to validate the updated values specified by the transaction before permitting the transaction to be added to the blockchain to update the data record on the blockchain with the updated values.

At block 1220, processing logic writes the updated values for the data record to the blockchain by adding the transaction to a new block on the blockchain pursuant to successful validation of the updated data values by the smart contract.

According to another embodiment, method 1200 further includes: performing a data merge operation for the data record persistently stored on the blockchain, in which the data merge operation includes: retrieving the data record in its entirety from the blockchain to retrieve all of the plurality of data elements of the data record; merging the validated updated values as specified by the transaction for the blockchain into the plurality of data elements of the data record to form a complete data record having the validated updated values embodied therein; in which writing the updated values for the data record to the blockchain by adding the transaction to a new block on the blockchain includes writing the complete data record having the validated updated values embodied therein to the new block of the blockchain; in which the complete data record deprecates all prior versions of the data record stored on the blockchain and does not reference any prior version of the data record stored on the blockchain.

For example, the data merge operation permits data of a data record to be retrieved from a single block of the blockchain, regardless of how many updates the data record has previously undergone. While some data is thus duplicated (e.g., the non-updated values will now be present in a prior block and also the new block to which the complete record having been merged is written). Notwithstanding the data-redundancy, data retrieval is made more efficient and faster.

According to another embodiment of method 1200, writing the updated values for the data record to the blockchain by adding the transaction to a new block on the blockchain includes: writing the updated values into the new block on the blockchain with a reference to a prior block on the blockchain; in which retrieval of a complete and current version of the data record requires any data elements of the stored data record which are not modified by the updated values to be retrieved from the prior block on the blockchain based on the reference and retrieval of the updated values from the new block on the blockchain.

For example, rather than performing a data merge operation which improves retrieval but results in redundancy of stored data, the stored data record is instead represented by multiple blocks on the blockchain, with newer updated information being stored within a new block of the blockchain along with a reference pointer to a prior location on the blockchain from which the non-updated values of the stored data record may be retrieved.

According to another embodiment, method 1200 further includes: performing a data merge operation and a data serialization for the data record persistently stored on the blockchain; in which the data merge operation includes (i) retrieving the data record in its entirety from the blockchain and (ii) merging the updated values into the retrieved data record form a complete data record having the updated values embodied therein; in which the data serialization operation includes converting the complete data record formed by the data merge operation and having the updated values embodied therein into a serialized byte stream; and in which writing the updated values for the data record to the blockchain by adding the transaction to the new block on the blockchain includes writing the serialized byte stream to the new block on the blockchain.

For example, the updated record resulting from the data merge operation may be serialized (e.g., via a protobuf generator or other serialization means) to form a smaller and more efficient record to be stored to the blockchain, and potentially providing a layer of data security through abstraction resulting from the serialization and optionally permitting further encryption of the serialized updated record where a high degree of data security is warranted.

According to another embodiment, method 1200 further includes: executing a protobuf generator to convert the complete data record formed by the data merge operation and having the updated values embodied therein into the serialized byte stream.

According to another embodiment of method 1200, the serialized byte stream forms at least one of: a binary format serialized byte stream; a JavaScript Object Notation (JSON) compatible format serialized byte stream; an plain text or American Standard Code for Information Interchange (ASCII) compatible format serialized byte stream; an encrypted serialized byte stream; a protobuffed serialized byte stream; and a hexadecimal format serialized byte stream.

For example, the data serialization operation may produce any of a variety of formats depending upon the needs of the application developer's needs with respect to security and ease of interoperability of the serialized data.

According to another embodiment, method 1200 further includes: receiving a first transaction for the blockchain requesting the host organization to store the data record on the blockchain as a new stored data record, in which the new stored data record includes a plurality of data elements embedded therein as specified by the first transaction; and in which receiving the transaction for the blockchain requesting the host organization to update the data record persistently stored on the blockchain includes receiving a second transaction for the blockchain, in which the second transaction specifies the updated values for the new stored data record previously transacted onto the blockchain.

For example, an original and new record to be stored to the blockchain is still subjected to data validation, however, there is no need to update an original and new data record. Subsequently, updates to the original data record may be applied and stored on the blockchain subject to data validation.

According to another embodiment, method 1200 further includes: receiving a first transaction to store metadata on the blockchain, the metadata defining a valid format for the data record and the plurality of data elements stored by the data record; in which receiving the transaction for the blockchain requesting the host organization to update the data record persistently stored on the blockchain includes receiving a second transaction for the blockchain, in which the second transaction specifies the updated values for the stored data record as previously transacted onto the blockchain; and in which executing the smart contract to validate the updated values specified by the transaction includes retrieving the metadata from the blockchain stored pursuant to the first transaction and validating the updated values using the retrieved metadata.

For example, the metadata defining the appropriate format for the record may be permissibly stored onto the blockchain and then retrieved for use by the executed smart contract in performing the data validation. Additionally, it is further permissible to protobuf or serialize the metadata stored to the blockchain if desired.

According to another embodiment, method 1200 further includes: rejecting the transaction and prohibiting the updated values from being written to the data record persistently stored to the blockchain upon a failed validation of the updated values specified by the transaction.

According to another embodiment, method 1200 further includes: determining a transaction type based on the transaction received; identifying the smart contract to be executed based on the determined transaction type; and in which executing the smart contract to validate the updated values includes executing the smart contract identified based on the transaction type.

For example, transactions with the blockchain may be "typed" such that different transactions correspond to different transaction types. According to such an embodiment, based on the transaction type, a smart contract may be identified or looked up according to the determined transaction type. Subsequently, execution of the smart contract is based on the determined transaction type and smart contract identification. In certain embodiments, the transaction type is expressly specified with the transaction whereas in other embodiments the transaction type is derived based on the contents of the transaction.

According to another embodiment of method 1200, in which executing the smart contract to validate the updated values specified by the transaction includes: retrieving metadata defining a valid format for the data record persistently stored on the blockchain; validating the updated values specified by the transaction using the metadata retrieved; and issuing a successful validation result or a failed validation result based on the validation, in which the transaction is prohibited from being added to the blockchain pursuant to the failed validation result and in which the transaction is permitted to be added to the blockchain pursuant to the successful validation result.

For example, execution of the smart contract acts as a quality control and may be utilized to ensure that corrupted, malicious, or malformed data is not transacted onto the blockchain.

According to another embodiment of method 1200, the data record is stored on the blockchain within an asset's payload portion via a CREATE asset command term for the blockchain; and in which the data record is associated with a transaction type for stored data records which are to be stored in their entirety with any update within a new block of the blockchain deprecating any prior version of the data record.

According to another embodiment of method 1200, the data record is stored on the blockchain within an asset's payload portion via a CREATE asset command term for the blockchain; and in which the data record is associated with a transaction type for stored data records which are to be stored incrementally; in which any update to the stored data record writes the updated values specified by the transaction to a new block on the blockchain with a reference to a prior block on the blockchain within which the stored data record was previously stored; and in which retrieval of the stored data record from the blockchain requires retrieval of the updated values from the new block on the blockchain and retrieval of any remaining values not modified by the updated values from the prior block on the blockchain.

For example, storing records on the blockchain may leverage the CREATE asset command term to transact new assets onto the blockchain, within which the stored data record is then encoded or embodied, for instance, within a payload portion of the new asset. Subsequent updates to the stored data record may then update the asset using the UPDATE asset command function or generate an entirely new asset for a complete record with updated information generated via the data merge operation discussed above, in which case either the UPDATE asset command function may be utilized in which case the new version is created in its entirety but with a reference to a prior deprecated version of the stored data record or the CREATE asset command term may be utilized to simply remove all reference to any prior version and write the complete updated record to the blockchain as a new asset, depending on the blockchain protocol and the considerations of the application developer.

According to another embodiment, method 1200 further includes: receiving a second transaction for the blockchain requesting the host organization to store a related entity, the related entity to be persistently stored to the blockchain via a second asset separate and distinct from a first asset within which the stored data record is persistently stored on the blockchain; transacting with the blockchain via a CREATE asset transaction to add the second asset to the blockchain and storing the related entity within a payload portion of the second asset; and relating the related entity stored within the second asset to the stored data record within the first asset via a universally unique identifier (UUID) assigned to the related entity.

According to another embodiment, method 1200 further includes: retrieving the stored data record from the blockchain; updating the stored data record to include the UUID assigned to the related entity; and writing the updated stored data record having the UUID included therein to the blockchain.

According to another embodiment of method 1200, the stored data record includes a student record having embedded therein via the plurality of data elements at least a student first name, a student last name, and a student ID; in which the related entity includes a student transcript; relating the related entity stored within the second asset to the stored data record within the first asset via a universally unique identifier (UUID) assigned to the related entity includes linking the student transcript with the student record via the UUID assigned to the student transcript; in which updating the stored data record to include the UUID includes updating the student record to include the UUID linking the student record with the student transcript; and in which writing the updated stored data record having the UUID included therein to the blockchain includes writing the student record to the blockchain having embedded therein the student first name, the student last name, the student ID and the UUID assigned to the student transcript stored on the blockchain via a separate and distinct second asset.

For example, storage of other information which is not part of one of the data elements of the stored data record may nevertheless be stored onto the blockchain via the related entity functionality in which the related entity (such as a student transcript or a student medical record, etc.) is written to the blockchain as metadata stored within a separate asset from the stored data record and then linked with the stored data record by including a UUID assigned automatically to the related entity in the plurality of data elements of the stored data record, thus requiring an update to the stored data record to effectuate the link.

According to another embodiment of method 1200, metadata defining a valid format for the data record is stored on the blockchain within an asset's payload portion via a CREATE asset command term for the blockchain; and in which the metadata is associated with a transaction type for stored metadata.

For example, storage of metadata may also leverage the CREATE asset command term, although it is different in terms of its transaction type and also stored contents.

According to another embodiment of method 1200, the added transaction is subjected to a consensus protocol by the participating nodes of the blockchain prior to the added transaction being accepted as part of a primary chain of the blockchain by the participating nodes of the blockchain.

For example, transacting on the blockchain retains consensus schemes required for that blockchain so as to ensure transaction validity.

According to another embodiment of method 1200, the metadata is accessible only to one of the plurality of tenants of the host organization having defined and transacted the metadata onto the blockchain; or in which alternatively the metadata is accessible all of the plurality of tenants operating as one of the participating nodes with access to the blockchain regardless of which one of the plurality of tenants defined and transacted the metadata onto the blockchain.

For example, it is possible to define and store metadata to the blockchain with the intention that it remain domain-specific to the particular tenant organization that created the metadata for their specific application. However, there may be instances in which an administrator for the host organization wishes to create non-domain-specific metadata which is then made accessible to any tenant organization operating as a participating node within the blockchain or in certain instances, a tenant organization may wish to create such metadata for a particular application which is then made accessible to other tenant organizations.

According to another embodiment of method 1200, modification of the metadata transacted onto the blockchain is under the exclusive control of the one of the plurality of tenants having transacted the metadata onto the blockchain for persistent storage via the blockchain; in which a new consensus is required to write changes to the metadata onto the blockchain when the metadata is accessible to any of the plurality of tenants operating as one of the participating nodes with access to the blockchain; and in which no consensus is required to write changes to the metadata onto the blockchain when the metadata is accessible for exclusive use by only the one of the plurality of tenants having originally transacted the metadata onto the blockchain.

For example, where the metadata is accessible to other tenant organizations, then modifications are subjected to consensus controls, however, if the metadata is domain specific and limited to the exclusive use by the tenant organization having created it and stored it on the blockchain originally, then it is not necessary to enforce consensus of such modifications, though optionally, the blockchain protocol may require the consensus operation regardless.

According to another embodiment of method 1200, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

For example, certain blockchains are implemented by the host organization itself, in which the host organization defines the blockchain protocol and facilitates access to the blockchain on behalf of its tenant organizations who then operate as participating nodes on the host org provided blockchain, optionally with non-tenant orgs also permitted as participating nodes at the discretion of the host organization. However, there are also existing blockchain implementations which are not defined by or implemented by the host organization and thus, operate external from the host organization with such blockchain protocols having been defined by a third party or an outside consortium or standards body. In such an event, the host organization may nevertheless facilitate access to the blockchain by operating as a participating node itself on the blockchain, via which the host organization may then have access to the functions of the blockchain. In such an event, permissions and access rights may be granted by the tenant orgs to the host organization to act on their behalf as a proxy, or the host organization may implement virtual participating nodes on the blockchain within which each tenant org may operate as a participating node, thus providing a 1:1 correspondence between the tenant orgs and the virtual nodes implemented by the host organization or the host organization may execute the associated smart contract and perform validation of stored data record update transactions for the blockchain, but then permit the tenant organization's own participating node to self-authenticate with and then actually transact with the blockchain, for instance, via the host organization provided API. In such a way, tenant orgs may add transactions to the blockchain (subject to consensus) regardless of which the blockchain is implemented by the host organization or a third party.

According to another embodiment, method 1200 further includes: maintaining an index for a plurality of data records persistently stored to the blockchain; in which the index defines at least a location for each of the plurality of data records persistently stored to the blockchain, the location defining one addressable block of the blockchain from which to retrieve a respective data record persistently stored to the blockchain.

According to another embodiment of method 1200, the index includes a Merkle Tree compatible index; and in which the index is persistently stored at the host organization or persistently stored to the blockchain or persistently stored at both the host organization and the blockchain.

For example, such an index may be utilized to improve retrieval speeds, with the index being maintained within one or both of the host organization and the blockchain. While duplicative data is persistently stored, the retrieval time for fetching records indexed is greatly reduced due to the index defining a specific location of the data within the blockchain, such as at which block such data is stored.

According to another embodiment of method 1200, the index defines for each of the plurality of data records persistently stored to the blockchain, both (i) the location for each of the plurality of records persistently stored to the blockchain and (ii) a copy of any contents of the plurality of record records persistently stored to the blockchain; and in which maintaining the index includes writing the updated values for the data record to the index when the updated values for the data record are written to the blockchain pursuant to successful validation of the updated values.

According to another embodiment, method 1200 further includes: receiving a second transaction requesting retrieval, from the blockchain, of the updated data record previously written to the blockchain; retrieving the updated data record from the index without interacting with the blockchain; and returning the updated data record retrieved from the index responsive to the second transaction requesting the retrieval.

For example, in addition to indexing location information, contents of the records may also be retrieved, wholly negating the need to transact with the blockchain for a read-only retrieval request which has been previously indexed. Where the contents of such stored records are indexed in this way retrieval speed will be increased dramatically over conventional blockchain retrieval transactions, especially when the index is persisted and maintained at the host organization, thus eliminating any interaction with the blockchain whatsoever for a read-only retrieval.

According to another embodiment of method 1200, nodes and leafs of the index are retrievable via full or partial addresses as defined by an addressing structure for the index; in which the method further includes maintaining the addressing structure for the index, in which the addressing structure includes at least: a first portion of the addressing structure defining an application namespace; a second portion of the addressing structure defining an entity type identifier; and a third portion of the addressing structure defining a name for an entity or a data record stored by the blockchain and indexed by the index.

For example, any node or leaf or sub-tree 654 below a node may be directly referenced and retrieved from the index without having to walk, traverse, or search the index when the address is known, thus further increasing retrieval speeds.

According to another embodiment of method 1200, referencing the index with a fully qualified address will return contents of leaf from the index, the contents of the leaf; and in which referencing the index with a partial address will return a sub-tree beneath a node of the index matching the partial address, in which the sub-tree includes multiple leafs of the index structured below the node of the index matching the partial address.

For example, contents of any leaf may be returned by a call to the index with the full addresses, specifying the application namespace, the entity type identifier and the name of the entity or record, however, use of a partial address may be extremely beneficial as it permits the return of all matching records within a sub-tree beneath a node. For example, if desired, an application which stores student records may return all metadata for the application by specifying a partial address with the application namespace and the entity type identifier, but lacking specification of any specific entity name. Similarly, all student records may be returned using a partial address specifying the application namespace code and specifying the entity type identifier for the student data records, but lacking specification of any specific entity name.

According to another embodiment, method 1200 further includes: receiving multiple subsequent transactions specifying additional updated values for one or more of a plurality of data elements of the data record persistently stored to the blockchain; buffering the multiple subsequent transactions specifying the additional updated values to the index by updating the index with each of the multiple subsequent transactions upon receipt without writing corresponding updates to the blockchain; and incrementally updating the data record persistently stored to the blockchain by periodically adding a single incremental update transaction to the blockchain representing all of the additional updated values received via the multiple subsequent transactions.

For example, certain applications, such as a data stream from a group of IoT devices (Information of Things) results in updates with too high of frequency of changes and updates due to the endless stream of data to be practical for storage within a blockchain. However, buffering such information via the index and then periodically flushing such data to the blockchain via a single incremental update transaction overcomes this problem, thus permitting such high-frequency data record updates to nevertheless be transacted to and stored on the blockchain.

According to a particular embodiment, there is non-transitory computer readable storage media having instructions stored thereon that, when executed by a system of a host organization having at least a processor and a memory therein, the instructions cause the system to perform the following operations: operating a blockchain interface to a blockchain on behalf of a plurality of tenants of the host organization, in which each one of the plurality of tenants operate as a participating node with access to the blockchain; receiving a transaction for the blockchain requesting the host organization to update a data record persistently stored on the blockchain, the transaction specifying updated values for one or more of a plurality of data elements of the data record; executing a smart contract to validate the updated values specified by the transaction before permitting the transaction to be added to the blockchain to update the data record on the blockchain with the updated values; and writing the updated values for the data record to the blockchain by adding the transaction to a new block on the blockchain pursuant to successful validation of the updated data values by the smart contract.

Figure 13:
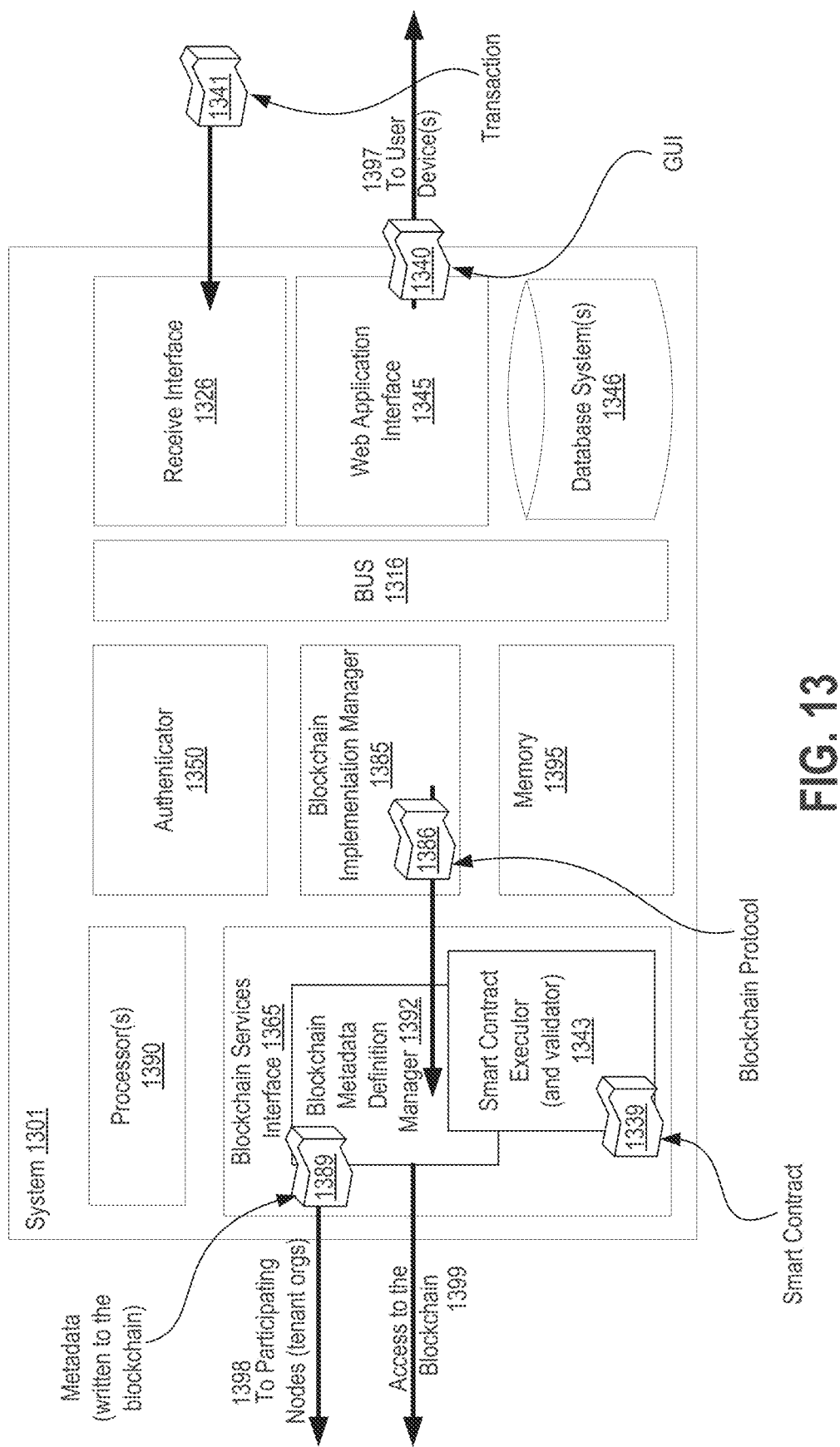
FIG. 13 shows a diagrammatic representation of a system within which embodiments may operate, be installed, integrated, or configured, in accordance with described embodiments.

FIG. 13 shows a diagrammatic representation of a system 1301 within which embodiments may operate, be installed, integrated, or configured. In accordance with one embodiment, there is a system 1301 having at least a processor 1390 and a memory 1395 therein to execute implementing application code for the methodologies as described herein. Such a system 1301 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 1301, which may operate within a host organization, includes the processor 1390 and the memory 1395 to execute instructions at the system 1301. According to such an embodiment, the processor 1390 is to execute a blockchain services interface 1365 on behalf of on behalf of a plurality of tenants 1398 of the host organization, in which each one of the plurality of tenants 1398 operate as a participating node with access to the blockchain 1399. Internal to the blockchain services interface 1365, there is depicted the blockchain metadata definition manager 1392, depicted here as writing metadata onto the blockchain via its access to the blockchain 1399 as provided by the blockchain services interface 1365.

A receive interface 1326 of the system 1301 is to receive a transaction 1341 for the blockchain requesting the host organization to update a data record persistently stored on the blockchain, in which the transaction specifies updated values for one or more of a plurality of data elements of the data record. Such a system further includes a smart contract 1339 executable via the processor 1390 and the smart contract executor and validator 1343 via which to validate the updated values specified by the transaction 1341 before permitting the transaction to be added to the blockchain to update the data record on the blockchain with the updated values. A blockchain services interface 1365 is further provided via which to the system 1301 is to write the updated values for the data record to the blockchain by adding the transaction 1341 to a new block on the blockchain pursuant to successful validation of the updated data values by the smart contract 1339.

A blockchain protocol 1386 for the blockchain defines a group of functions for the blockchain (e.g., as provided by the blockchain implementation manager 1385), in which the group of base functions are accessible to any participating node 1398 of the blockchain. The system 1301 may further persist metadata 1389 onto the blockchain; in which the receive interface 1326 is to further receive a transaction 1341 requesting such metadata 1389 to be stored to the blockchain, sometimes for use with validating updated values of a received transaction 1341. According to such a system 1301, the blockchain services interface 1365 is further to add the transaction 1341 to a new block on the blockchain pursuant to successful validation by the smart contract 1339.

According to such an embodiment of the system 1301, the receive interface 1326 may pass the transaction data contents of the transaction 1341 to be stored within in index persisted by the database system(s) 1346.

According to such an embodiment of the system 1301, a GUI 1340 may be pushed to the user devices 1397 via which the user devices or admin computing devices may interact with the blockchain metadata definition manager 1392.

According to another embodiment of the system 1301, the blockchain services interface 1365 is to interact with and provide access to the blockchain 1399.

According to another embodiment of the system 1301, the receive interface 1326 communicates with a user client device 1397 remote from the system and communicatively links the user device with the system via a public Internet. According to such an embodiment, the system operates at a host organization as a cloud based service provider to the user device 1399; in which the cloud based service provider hosts a receive interface 1326 exposed to the user client device via the public Internet, and further in which the receive interface (or web application interface 1345) receives inputs from the user device as a request for services from the cloud based service provider.

Bus 1316 interfaces the various components of the system 1301 amongst each other, with any other peripheral(s) of the system 1301, and with external components such as external network elements, other machines, client devices, cloud computing services, etc. Communications may further include communicating with external devices via a network interface over a LAN, WAN, or the public Internet while the authenticator 1350 authenticates user devices and users seeking to access data from the host organization exposed by the system 1301.

Figure 14A:
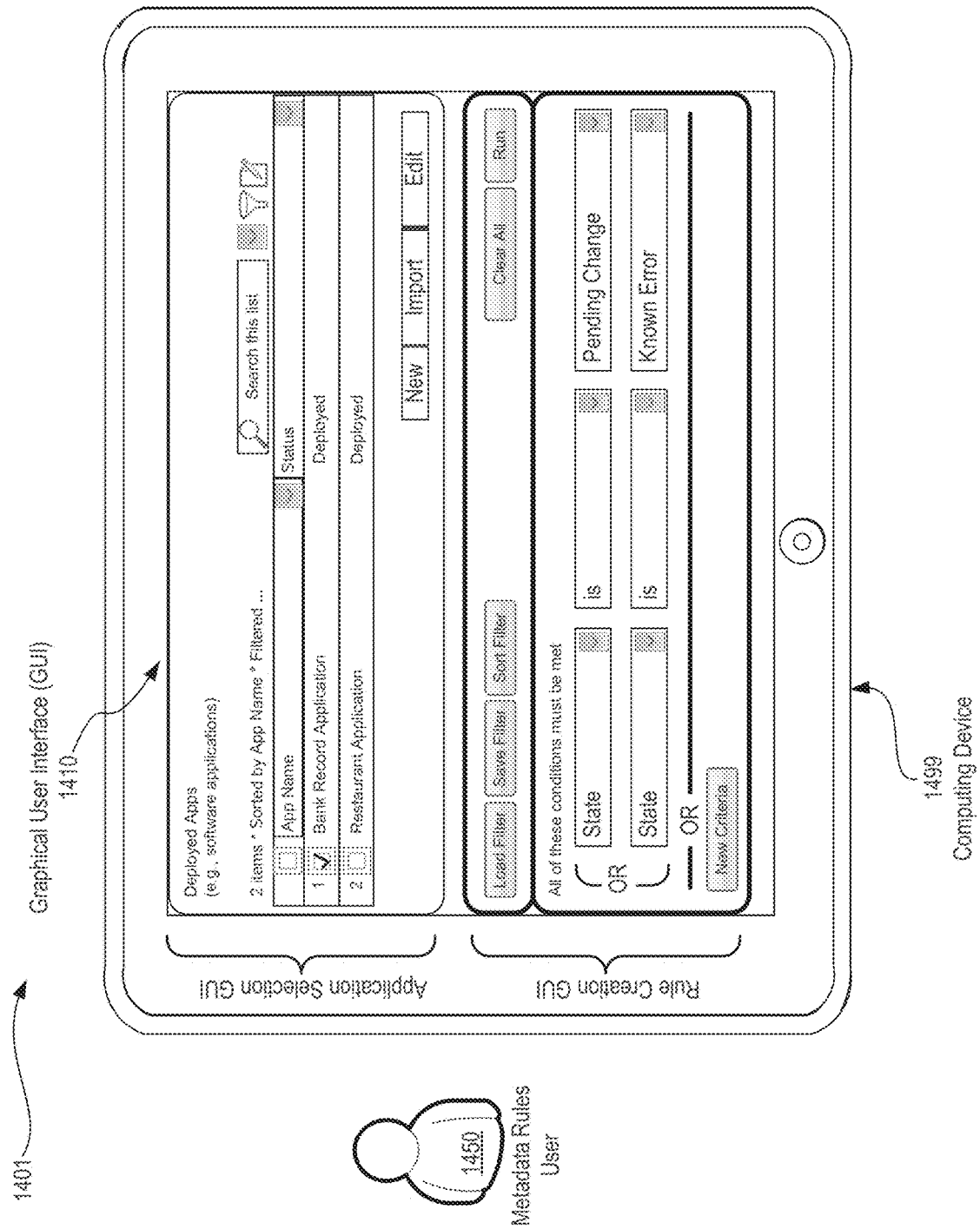
FIG. 14A depicts another exemplary architecture in accordance with described embodiments.

FIG. 14A depicts another exemplary architecture 1401 in accordance with described embodiments.

In particular, there is now depicted a metadata rules user 1450 utilizing the computing device 1499 and specifically utilizing the graphical user interface (GUI) 1410 to configure metadata rules to be applied to transactions occurring on the blockchain.

As shown here, there is an application selection GUI via which the metadata rules user 1450 may first select one or more applications to which a new metadata rule is to be applied, and then at the bottom, there is a rule creation GUI via which the metadata rules user 1450 may create a new rule to be deployed to the blockchain.

As shown here, the Rule Creation GUI provides the metadata rules user 1450 with a condition builder interface, via which the user may select through the GUI, states which must be present, and an operator, such as "is" or "not" or "includes" or "does not include" or "is equal to" or "is greater than" or "is less than" and so forth, and then the descriptor, such as "pending change" for a rule that is to be applied when the "State is pending change" or when the "state is known error," or some other new criteria to be added.

The GUI additionally permits the user to load existing filters or rules already declared and available via the system or to save the newly created rule or filter, or to sort, etc. Further still, the "Run" capability, which is discussed in greater detail below, permits the metadata rules user 1450 to simulate execution of the newly defined rule without actually transacting anything onto the blockchain and without pushing the newly created rule to the blockchain for consensus and acceptance.

Notably, the Application Selection GUI permits the metadata rules user 1450 to create rules which are to be applied to transactions associated with a particular application, such as the "bank record application" which is depicted as having been selected here within the application selection GUI. However, it is also permissible to have metadata rules applied to specific transactions on the blockchain or to all transactions on the blockchain.

Figure 14B:
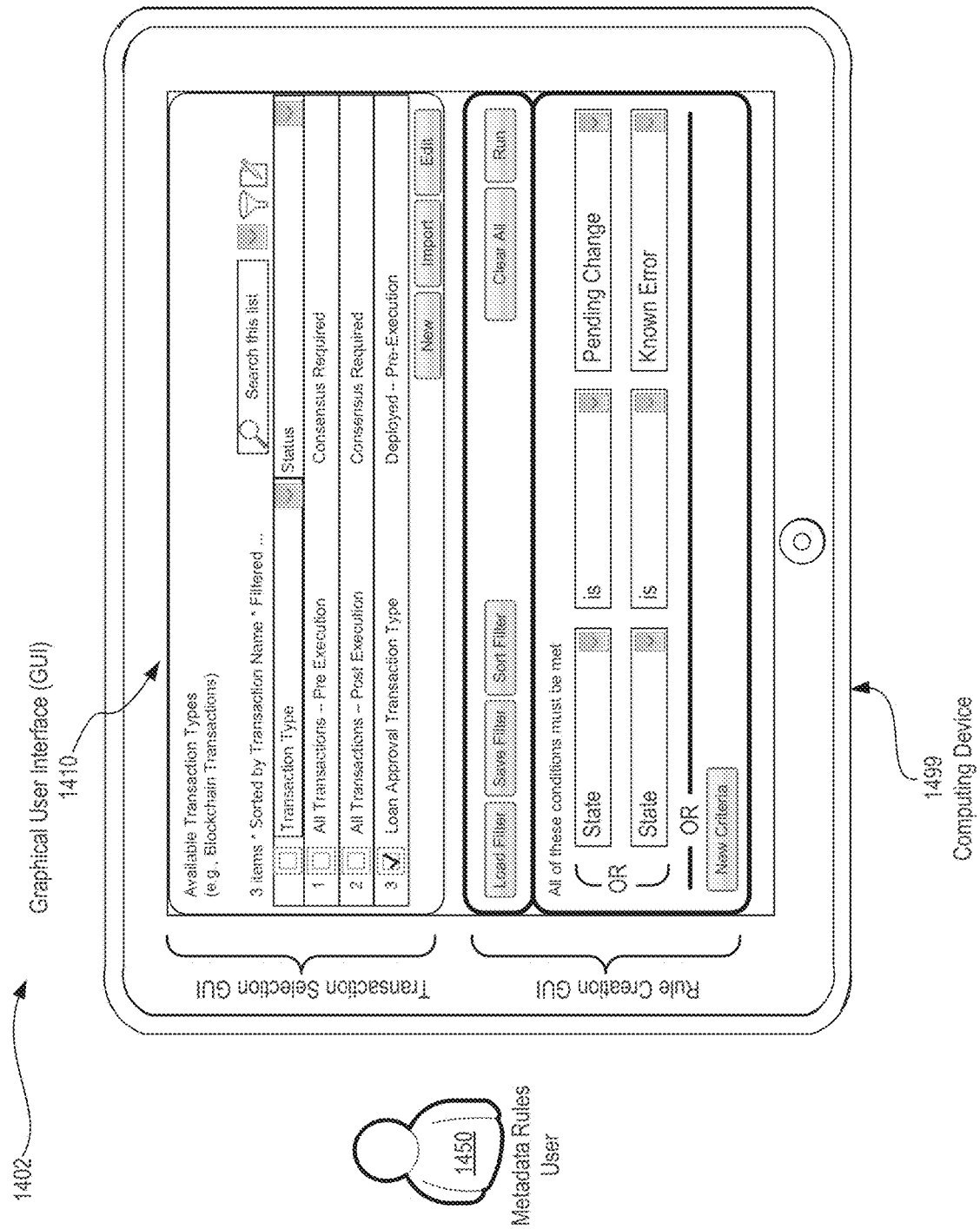
FIG. 14B depicts another exemplary architecture in accordance with described embodiments.

FIG. 14B depicts another exemplary architecture 1402 in accordance with described embodiments.

There is again depicted the metadata rules user 1450 utilizing the computing device 1499 and specifically utilizing the graphical user interface (GUI) 1410 to configure metadata rules to be applied to transactions occurring on the blockchain.

Whereas the prior GUI permitted the metadata rules user to apply newly defined rules or apply previously created rules to transactions associated with a particular application previously declared, the transaction selection GUI depicted here permits the metadata rules user 1450 to apply rules specifically to transactions of a given type or to all transactions on the blockchain, regardless of type, and regardless of whether such transactions happen to be associated with any declared application.

As shown here, there are various permissible configurations for newly defined metadata rules or for available previously defined metadata rules. For example, the metadata rules user 1450 may apply a new or existing rule to "All transactions—Pre Execution" in which case the rule is, as described, executed for every transaction which arrives on the blockchain prior to executing the transaction itself. Such pre-execution rules may be utilized for any defined criteria and conditions, but are ideally suited for validation procedures, such as validating that alphanumeric characters are not entered into a numeric field, or that a date entered into a date field corresponds to a valid date format, or complies with certain restrictions, such as within a permissible number of days, or represents a date which is not in the future or not in the past, and so forth. Additional validation schemes to occur prior to execution of a received transaction at the blockchain may include, for example, a validation that an account holder has sufficient funds available for a requested funds transfer. For example, if a user wants to transfer 1 bitcoin value or some other unit of value to another user, a pre-execution rule may check to validate that the user or account holder has possession of the funds equal to or greater than the amount of funds to be transferred.

Additionally permissible are post execution metadata rules for all transactions. Such rules may be utilized to take some action after a transaction occurs on the blockchain, such as triggering a notification or issuing a confirmation to a transaction requestor, or pushing transaction data to a log or to an analytics engine or to an AI engine, etc. Many possibilities exist, but the rule creation and application to a post-execution transaction means that the rule will be applied to every transaction on the blockchain after execution of the transaction or alternatively, based on the rule's conditions and criteria, to every transaction on the blockchain which matches the defined criteria and conditions, after execution of the transaction on the blockchain.

There is further permissible the application of defined metadata rules to any transaction having a particular transaction type (for pre or post transaction execution) or for any transaction having a particular transaction type and which meets certain defined criteria and conditions in accordance with the defined rule as set forth by the rule creation GUI. For example, there is depicted here that the metadata rules user 1450 has selected the "Loan Approval Transaction Type," for application of a particular rule, which as depicted by the GUI, happens to have already been defined and deployed to the blockchain for pre-execution. The deployed state indicates that consensus has already been reached for this existing metadata rule, whereas any newly defined rule would require consensus to be reached before the status would indicate a "deployed" state.

Ultimately, the GUIs will consume the entered data provided by the metadata rules user 1450 and auto-generate applicable code. For example, the exemplary code depicted here may be output by the GUI and transacted onto the blockchain for consensus and then execution against the matching transactions:

```
# COMMENT:      current_inventory < 5
# COMMENT:              OR
# COMMENT:      (current_month = "December"
# COMMENT:              AND
# COMMENT:      current_inventory < 20)
{
   "rules":
     [{
         "name" : "inventory_rule",
         "criteria": {"any":
             [
                 { "name": "inventory",
                   "operator": "less_than",
                   "value": 5,
                 },
             ]},
         "actions":
            [
               {"name": "order_more",
                  "params":{"number_to_order": 40},
               },
            ]
     }]
}
```

Thus, as depicted here, the GUIs output appropriate syntax, which according to this example, will be applied to transactions for which the "current inventory" is less than 5 or in situations in which the "current month" is December and for which the "current inventory" is less than 20, presumably because there is a spike in demand for the month of December, and so the metadata rules creator has indicated that such rules are to be applied anytime inventory falls below five or in the special situation of December when inventory falls below twenty.

Such syntax may then be processed through the Apex translation engine to transform the blockchain platform agnostic syntax into a native blockchain syntax for the targeted blockchain to which the rule is to be applied and executed via smart contracts on that respective blockchain, as was described previously with regard to, for example, FIGS. 4A and 4B with issuance (deployment) of metadata to the blockchain and retrieval thereof being depicted at FIG. 4C.

The code the follows the syntax then implements the necessary rule via smart contract execution. Notably, the code is created by the GUI interface on behalf of the metadata rules user 1450, thus greatly simplifying the configuration and creation of such rules.

One of the biggest problems for business users seeking to leverage the capabilities of Blockchain technology is the creation and programming of business rules for smart contracts execution.

Problematically, each of the different blockchain platforms have different smart contract requirements for executing such business rules, resulting in different syntaxes, different permissible conditions and criteria and different mechanisms by which to deploy any created rules to the respective blockchain.

Consequently, any validation schemes and workflows to execute such business rules are written via smart contracts which are then deployed to the respective blockchain, and because of the differing syntaxes, such rules must be manually written by programmers and developers specifically for a particular blockchain to which such rules are to be applied and utilized.

It is therefore in accordance with the described embodiments that metadata rules users, blockchain administrators, and programmers utilizing the metadata driven blockchain platform may create metadata driven business rules which are then executed via the same smart contracts on the respective blockchain platforms, but without necessitating the metadata rules users, blockchain administrators, and programmers create different rules syntax for every different platform.

Therefore, it is permissible for blockchain administrators and metadata rule users to define a business rule within their own cloud environment utilizing GUIs provided by the host organization's which then generates the necessary syntax and metadata defining such rules which is then stored in Blockchain as metadata as well as, according to certain embodiments, being converted into a native blockchain smart contract execution format.

As software systems utilizing blockchain grow in complexity and usage, it becomes burdensome to business users if every change to the logic and/or behavior of the system breaks previously configured smart contracts and business rules, thus requiring the business users to write and deploy new code, which is a significant problem with decentralized networks given that the business user is often not in a position to dictate how and when the blockchain platform they are using is updated or modified.

Therefore, use of the metadata driven business rules engine in blockchain provides such business users with a simple interface, allowing anyone to capture new rules and logic defining the behavior of a system, including non-programmers through the use of the GUIs. Such rules, represented by the metadata written to the blockchain, may then be executed by the blockchain via smart contract execution. When changes to the behavior of the blockchain platform occur, the metadata does not need to be re-written or re-coded, rather, the metadata stored on the blockchain is simply read and executed in accordance with the new behavior of the blockchain platform, as the defined metadata rules is agnostic in terms of such changes to the underlying blockchain platform. However, in certain situations, the host organizations Blockchain Metadata Definition Manager 196 may need to trigger a re-conversion of the defined metadata rules into native smart contract executable code for the blockchain in question, but such events may be automated and do not require any specific action on the part of the business user and certainly do not require the business user to re-write their business rules or the associated code to implement such rules. In other embodiments, the metadata, having been written to the blockchain, may simply be re-read by the smart contract execution engine and interpreted and executed appropriately at the blockchain's back-end processor, without any action by the host organization or the business user, depending upon the capabilities of the particular blockchain platform for which the business rules have been applied.

According to a particular embodiment, a blockchain administrator may define marketing logic and business rules for a specific declared application (DApp), such as one selected via the Application Selection GUI at FIG. 14A. For example, blockchain administrator or other metadata rules user having appropriate permissions may then define conditions specifying when certain customers or items are eligible for a discount based on the transaction in blockchain. The conditions may be specified for certain customers, or certain items, or other criteria, such as inventory levels, date ranges, or whatever business logic is appropriate of the needs of the business's objectives.

Normally, the creation of such business rules requires specialized syntax to be developed by a programmer for execution via a blockchain platform's smart contract execution engine, with such syntax being different for different blockchain platforms. However, in the event that the metadata rules user or blockchain administrator utilizes the Blockchain Metadata Definition Manager 196 provided by the host organization's suite of blockchain services, then the blockchain administrator need only define the rule via the GUIs, associating them with particular declared applications or specific types of transactions (or all transactions), and then, once the submitted rule is approved by the blockchain network's consensus mechanism, the defined rule will be executed automatically by host organization's blockchain services interface and associated smart contract execution and management engines.

FIG. 14C depicts another exemplary architecture 1403 in accordance with described embodiments.

As shown here, there is also permissible entry of the metadata rules via an Application Programming Interface (API) 1411 via the metadata rules user in the event that a metadata rules programmer 1451 or developer wishes to create the rule syntax manually or in the event that another application is utilized to push the appropriate syntax to the metadata rules creation engine, which may permissibly be accomplished via the metadata rules API to the same effect as if the metadata rules user configures such rules via the GUIs.

Regardless of how such metadata rules are written, be it via the GUIs provided or the API interface, the defined rules may be utilized to enforce validation requirements for data entry and input submitted to an application or to trigger various execution flows, such as discounting merchandise for certain customers or based on certain inventory levels as noted above.

Once defined, the metadata rules written to the blockchain are executed at the blockchain network level using the blockchain's smart contract execution engine where available or executed via the host organization's smart contract execution engine when such capabilities are not available via the blockchain platform.

Utilizing such metadata rules driven smart contracts, exemplary validations may include, for example, prohibiting entry of incorrect data (e.g., telephone numbers with incorrect numbers of digits or malformed email addresses, etc.) or the entry of improper type data, such as entering alpha characters into a numeric only field, etc.

However, very often, the rules are not validation specific, but represent more complex business rules to be defined via the blockchain metadata definition manager 196. For instance, as noted above in the inventory application example, there may be various actions to be taken based on inventory levels being too high or inventory levels being diminished, etc. Such metadata rules may be utilized therefore for the management of stock levels across multiple partners, each of which may have their own local inventor, but for which the rules are applied based on an aggregate inventory, etc.

Prior solutions required that programmers and developers cod the rules into a native blockchain executable format for smart contract execution and the process was complex, error prone, and simply not available to novice or non-programmer business users, who are the very individuals most likely to craft and define such rules. This arrangement therefore adds cost and complexity on the part of businesses wishing to utilize the blockchain technology and leverage the capabilities of smart contract execution, as it was necessary to pay a highly skilled developer to code the rules into the engine, while not addressing the problem of the high potential for error.

Because the metadata rules are defined and written to the blockchain utilizing a blockchain agnostic format, it is possible for the same metadata rule to be created once and then applied to multiple different blockchain platforms. Moreover, because the UI allows the user to create the full syntax (either via the GUIs or the API), it is further possible of the GUI condition builder to specify conditions specific to the needs of the business developer or program such conditions through the API.

Further still, regardless of whether the GUI or the API is utilized, the defined metadata rules are restricted to the creation of permissible entities, field definitions, and field types for an associated application or for an associated transaction because the metadata driven blockchain platform will not allow the creation of a rule or condition which violates the defined metadata for a declared application or a declared entity or its dependent field definitions and field types.

In such a way, creation of metadata rules is restricted to only those conditions, criteria, transactions and declared applications for which the blockchain administrator or metadata rules user has permissions to interact with and for which such defined business rules is in compliance with the metadata for the associated declared application (DApp), entity, etc.

By restricting the definition of the metadata rules to only permissible entries in compliance with previously defined metadata definitions for existing applications, entities, transaction types, etc., it is therefore further possible to significantly reduce the possibility for security holes, logic errors, or other malformed business rules which may occur if the code for such rules were to be written free form, without being restricted to such metadata definitions or to the permissible criteria on the condition builder GUIs.

According to yet another embodiment, once the metadata rules code is output from the GUI or accepted by the API, it is then processed and traversed through a metadata governance model, prior to the metadata rules code being submitted to the blockchain.

Processing the code through the governance model then presents to metadata rules user or the blockchain administrator creating the metadata rules information on how the created code will affect blockchain transactions and assets, thus permitting the user to see on the fly within a simulated or sandbox environment, how the rule will perform when executed for a blockchain transaction. For example, the governance model and rule simulation may mimic or simulate certain values to show what the rule will create when executed on the blockchain and how data, assets, and transaction execution will be affected on the blockchain.

According to another embodiment, once the code is created and processed through the governance model, the user may then submit the code to partners on the blockchain platform (e.g., submitting the code to other blockchain participating nodes) for evaluation and consensus prior metadata rules and code defining such rules being accepted onto the blockchain.

According to such an embodiment, the partners and any participating node onto the blockchain may apply the same governance model and also simulate execution of the created metadata rule to observe how the rule will affect data, assets, and transactions for the blockchain, without actually executing anything on the blockchain itself.

Based on the simulated execution, the partners and participating nodes may then vote for consensus or vote to reject the rule, etc., so as to determine whether or not the defined metadata rule will be accepted onto the blockchain.

According to a particular embodiment, the code and syntax for the rule is created in a JSON compatible format, but then later, when written onto the blockchain after consensus, is translated into Web Assembly Language, and thus takes on a safer binary format with cryptographic properties of a contract that cannot be changed by anyone once deployed onto the blockchain. Stated differently, all of the participating nodes can see the deployed and accepted code in its Web Assembly Language format, but they cannot change it, without again proceeding throughout the entire creation/editing of the rule, validation against metadata definitions, subjection to governance, and submitted again for consensus and then acceptance onto the blockchain.

WebAssembly (often shortened to Wasm or WASM) is a standard that defines a binary format and a corresponding assembly-like text format for executables used by web pages. The purpose of Wasm is to enable the JavaScript engine of a web browser to execute page scripts nearly as fast as native machine code. While not a full replacement for JavaScript, Wasm provides improved execution for performance-critical portions of page scripts and runs in the same sandbox as regular script code.

Representation of WebAssembly code or Wasm code is intended to be run on a portable abstract structured stack machine designed to be faster than parsing JavaScript, as well as faster to execute and amenable to extremely compact code representation.

Once accepted to the blockchain, the smart contract is then triggered and executed based on transaction type or based on all transactions or based on whatever defined criteria and conditions were defined and accepted.

According to such embodiments, execution of the smart contract is performed by multiple nodes on the blockchain or by all nodes on the blockchain, and output is then compared by multiple blockchain nodes to ensure that the output from concurrent executions is identical, so as to prevent tampering or any spoofing attempt or submission of malicious or fraudulent smart contract execution output as authentic.

Assuming the output is identical for multiple participating nodes having executed the smart contract, then consensus will be met and the results or output of the smart contract execution will be accepted onto the blockchain.

As noted above, there are permitted both pre and post transaction execution constructs, in which pre execution is typically preferred for validation of data prior to even attempting to execute a transaction received at the blockchain and in which post execution is utilized to evaluate whether or not an event or transaction occurs in a particular way, then to take some action via the smart contract after execution of the transaction.

The metadata rules are considered to be metadata driven and declarative on the fly because the rules may be created utilizing a condition builder and simulated to test how the transaction or rule execution will look in a sandbox environment. In such a way, partners and other participating nodes on a blockchain are put at ease because they too can review the rule via the GUI rather than having to pay a programmer or developer to review 1000s of lines of code in a costly, time consuming, and burdensome process, which thus in turn drastically improves security by limiting the conditions and values that can be coded into a smart contact from the GUI and the API to that which is compatible with the defined metadata for a declared application or its associated entities or entities and field definitions for a particular transaction, etc.

Moreover, because the code is converted into a WebAssembly (WASM) format and represented as a binary, it is safe from tampering and malicious actors.

According to yet additional embodiments, conditions specified via a metadata rule may further be limited according to whether a transaction on the blockchain is by an "owner" of a declared application or a "party" of a declared application (DApp). For example, an owner of the application may have enhanced rights to, for example, modify a record transacted onto the blockchain whereas an authorized network participant for the declared application may be merely a "party" for the application and may thus have permissions to create new records and submit additional information for records as well as read records, but perhaps they lack authority to modify or alter certain records, thus permitting a permissions enforcement mechanism for data on the blockchain in which the metadata rules will define a rule requiring that, for example, a transaction seeking to change an existing record must first "validate" in a pre-transaction execution smart contract that the transaction submitter is an "owner" for the application rather than merely a "party" for the application. Many other variations of permission enforcement are possible. Further still, such a rule could be utilized to trigger a notification when a "party" but not "owner" submits a record change transaction, with the defined metadata a rule then defining whether or not that transaction is processed or rejected.

FIG. 15 depicts a flow diagram illustrating a method 1500 for implementing a declarative and metadata driven blockchain platform using Distributed Ledger Technology (DLT) in conjunction with a cloud based computing environment such as a database system implementation supported by a processor and a memory to execute such functionality to provide cloud based on-demand functionality to users, customers, and subscribers.

Method 1500 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1550, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1500 depicted at FIG. 15, beginning with block 1505, there are described operations by a system of a host organization for declaring a new application and transacting defined metadata for the new application onto a blockchain, by the following operations:

At block 1510, processing logic operates a blockchain interface to the blockchain on behalf of a plurality of tenants of the host organization, in which each one of the plurality of tenants operate as a participating node with access to the blockchain.

At block 1515, processing logic receives, from a user device communicably interfaced with the system, first input declaring the new application.

At block 1520, processing logic receives second input from the user device adding a plurality of network participants for the new application, in which the network participants are granted access rights to the new application.

At block 1525, processing logic receives third input from the user device declaring a plurality of entity types for the new application.

At block 1530, processing logic receives fourth input from the user device declaring one or more new field definitions for each of the plurality of entity types.

At block 1535, processing logic generates a blockchain asset having encoded therein as the defined metadata for the new application, at least (i) the plurality of network participants declared, (ii) the plurality of entity types declared, and (iii) the one or more new field definitions declared for each of the plurality of entity types.

At block 1540, processing logic transacts the blockchain asset having the defined metadata encoded therein for the new application onto the blockchain.

FIG. 16 depicts a flow diagram illustrating a method 1600 for implementing a declarative, metadata driven, cryptographically verifiable multi-network (multi-tenant) shared ledger in conjunction with a cloud based computing environment such as a database system implementation supported by a processor and a memory to execute such functionality to provide cloud based on-demand functionality to users, customers, and subscribers.

Method 1600 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1650, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1600 depicted at FIG. 16, beginning with block 1605, processing logic operates an interface to a shared ledger on behalf of a plurality of authorized network participants for the shared ledger, in which the shared ledger persists data via a plurality of distributed shared ledger nodes.

At block 1610, processing logic generates a network org within the shared ledger to store the data on behalf of a founder org as a first one of the plurality of authorized network participants.

At block 1615, processing logic receives input from the founder org defining a plurality of partner orgs as additional authorized network participants for the network org, in which all of the authorized network participants have read access to the data stored by the network org via the shared ledger without replicating the data.

At block 1620, processing logic receives input from the founder org defining permissions for each of the partner orgs to interact with the network org within the shared ledger.

At block 1625, processing logic writes metadata to the shared ledger defining at least the authorized network participants for the network org and the permissions defined for each of the partner orgs.

At block 1630, processing logic receives requests from the authorized network participants to interact with the network org.

At block 1635, processing logic transacts with the shared ledger in fulfillment of the requests.

None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system of a host organization providing cloud computing services, the system having at least a processor and a memory, the method comprising:
   operating a blockchain interface to the blockchain on behalf of a plurality of tenants of the host organization, wherein the host organization operates as a participating node on the blockchain to enable interactions between the host organization and the blockchain;
   receiving input at the host organization, the input identifying a plurality of network participants granted access rights to a new application for deployment at the host organization, the input identifying a plurality of entity types for the new application, the input identifying one or more new field definitions for one or more of the plurality of entity types;
   generating a blockchain asset having encoded therein as a metadata definition for the new application, at least (i) the plurality of network participants, (ii) the plurality of entity types, and (iii) the one or more new field definitions;
   writing the metadata definition from the host organization onto the blockchain via the participating node of the host organization by transacting the blockchain asset having the defined metadata encoded therein for the new application onto the blockchain, wherein the blockchain asset has a defined transaction type that associates the metadata definition and the application with a smart contract configured to validate that data records transacted onto the blockchain for the new application are in compliance with the metadata definition;
   executing an event listener to monitor any changes to the blockchain associated with the new application; and
   triggering an event when the changes to the blockchain associated with the new application are observed by the event listener.

2. The method of claim 1, further comprising:
   receiving a transaction at the blockchain specifying data for the new application; and
   triggering a smart contract based on the received transaction specifying the data for the new application; and
   executing the smart contract to validate the specified data for the new application is in compliance with the defined metadata for the new application; and
   wherein the transaction is rejected if the specified data is non-compliant with the defined metadata for the new application.

3. The method of claim 1, wherein transacting the blockchain asset onto the blockchain comprises:
   adding a transaction to a new block on the blockchain specifying the defined metadata for the new application as payload data for the transaction;
   subjecting the added transaction to consensus by participating nodes of the blockchain, wherein the added transaction is subjected to a consensus protocol by the participating nodes of the blockchain prior to the added transaction being accepted as part of a primary chain of the blockchain by the participating nodes of the blockchain; and
   wherein the defined metadata for the new application is persisted within an accepted transaction on a new block of the blockchain pursuant to successful consensus for the added transaction.

4. The method of claim 1, further comprising:
   receiving new input at the system, wherein the new input declares a second new application; and
   receiving additional input at the system selecting one of the plurality of entity types declared for the first new application as a selected entity type for the second new application, wherein the selected entity type inherits the one or more new field definitions as specified via the defined metadata for the respective one or more entity types associated with the first new application.

5. The method of claim 1:
   wherein multiple different declared applications specify at least one of the plurality of entity types declared for the first new application as a selected entity type for the multiple different declared applications; and
   wherein a single instance of the defined metadata corresponding to the respective one of the plurality of entity types declared for the first new application and all of the one or more new field definitions associated with the respective entity type declared for the first new application controls both (i) the respective one of the plurality of entity types declared for the first new application and (ii) the selected entity type for all of the multiple different declared applications having selected the respective entity type declared for the first application.

6. The method of claim 1, wherein receiving the input from the user device declaring one or more new field definitions for each of the plurality of entity types further comprises receiving the input defining a field definition type for each of the one or more new field definitions; and
wherein each field definition type is selected from the group comprising: integer, Boolean, numeric, alphanumeric, date, hyperlink, computed, or custom.

7. The method of claim 1, further comprising:
authenticating the user device with the host organization as being associated with one of the plurality of tenants; and
wherein the one of the plurality of tenant is a subscriber to cloud based on-demand services provided by the host organization over a public Internet.

8. The method of claim 1, further comprising:
receiving input from the user device declaring an event and one or more monitored event conditions for the new application declared;
wherein the declared event specifies one of: (i) a process flow to execute at the host organization responsive to occurrence of the event at the blockchain or (ii) a database transaction to execute against a database system internal to the host organization responsive to occurrence of the event at the blockchain; and
monitoring, via an event listener, for any change to the blockchain meeting the specified event and the one or more event conditions.

9. The method of claim 1:
wherein each network participant is granted access rights to the new application and to data on the blockchain associated with the new application.

10. The method of claim 1:
wherein each of the plurality of network participants are selected from among the group comprising:
a user of the host organization associated with one of the plurality of tenants of the host organization;
a partner user corresponding to one of the plurality of tenants of the host organization;
a customer organization corresponding to one of the plurality of tenants of the host organization;
a non-user of the host organization;
a partner organization which is not one of the plurality of tenants of the host organization; and
one or more participating nodes on the blockchain which correspond to either a tenant of the host organization or a customer organization which subscribes to cloud computing services from the host organization; and
one or more participating nodes on the blockchain which do not subscribe to cloud computing services from the host organization.

11. The method of claim 1, wherein receiving the input from the user device declaring the application further comprises:
receiving with the input for the new application declared one or both of specified administrative control for the new application or ownership for the new application declared.

12. The method of claim 1, further comprising:
receiving instructions to deploy the new application declared and the defined metadata for the new application onto the blockchain; and
wherein transacting the blockchain asset having the defined metadata encoded therein for the new application onto the blockchain comprises deploying the new application and the defined metadata via the blockchain responsive to receiving the instructions to deploy.

13. The method of claim 1:
wherein receiving the inputs defining each of (i) the plurality of network participants declared, (ii) the plurality of entity types declared, and (iii) the one or more new field definitions declared for each of the plurality of entity types comprises receiving the inputs as programming code via an API at a blockchain metadata definition manager exposed by the host organization.

14. The method of claim 1, further comprising:
transmitting a GUI to the user device from a blockchain metadata definition manager, wherein the GUI prompts for the inputs defining each of (i) the plurality of network participants declared, (ii) the plurality of entity types declared, and (iii) the one or more new field definitions declared for each of the plurality of entity types;
wherein the inputs are received at the GUI via one or more interactive click events, drag events, drop down selection events, text input events, and touch events; and
wherein receiving the inputs comprises receiving the inputs from the GUI transmitted to the user device.

15. The method of claim 1: wherein a blockchain protocol for the blockchain is defined by the host organization and further wherein the host organization permits access to the blockchain for the plurality of tenants of the host organization operating as participating nodes on the blockchain; or alternatively wherein a blockchain protocol for the blockchain is defined by a third party blockchain provider other than the host organization and further wherein the host organization also operates as a participating node on the blockchain via which the host organization has access to the blockchain.

16. The method of claim 1, further comprising:
receiving an SQL query at a receive interface requesting data associated with the new application;
translating the SQL query into native blockchain executable code via an Apex translator engine at the host organization;
executing the native blockchain executable code against the blockchain to retrieve the data requested; and
returning the data requested responsive to receipt of the SQL query.

17. The method of claim 1, further comprising:
generating a virtual table within a database system of the host organization; and
structuring the virtual table at the database system of the host organization based on the metadata declared for the new application;
wherein entity types are represented as tables within the virtual table and further wherein the one or more new field definitions declared for each of the plurality of more entity types for the new application are represented as columns within the tables at the virtual table.

18. The method of claim 17:
wherein the virtual table comprises a materialized view hosted at the database system of the host organization structured based on the metadata declared for the new application; and wherein the materialized view hosted at the database system of the host organization does not store any data associated with the new application; and wherein SQL queries requesting read-only access are processed against the materialized view by translating the read-only SQL queries into a blockchain transaction to retrieve the requested data associated with the new application from the blockchain.

19. The method of claim 1, further comprising:

retrieving the defined metadata for the new application from the blockchain, including plurality of entity types declared for the new application, the one or more new field definitions declared for each of the plurality of entity types, and any field types applied to the one or more new field definitions;

generating a materialized view of the data persisted with the blockchain within a virtual table at the host organization by structuring the virtual table based on the defined metadata for the new application;

wherein the materialized view represents the structure of the data associated with the new application which is persisted to the blockchain without storing the data associated with the new application within the materialized view at the host organization.

20. The method of claim 19, further comprising:

receiving, at the host organization, an SQL statement from a user device, wherein the SQL statement is directed toward the materialized view requesting an SQL update or an SQL insert for the data persisted to the blockchain and associated with the new application;

processing the SQL statement against the materialized view by translating the SQL statement requesting the SQL update or the SQL insert into a corresponding blockchain transaction to update or add the data associated with the new application at the blockchain; and issuing an acknowledgement to the user device confirming successful processing of the SQL statement against the materialized view pursuant to the corresponding blockchain transaction being accepted by consensus to the blockchain and successfully updating or adding the data associated with the new application at the blockchain.

21. The method of claim 19, further comprising:

receiving an SQL statement directed toward the materialized view at the host organization;

wherein the SQL statement specifies one or more of (i) a SELECT from SQL statement, (ii) an INSERT into SQL statement, and (iii) an UPDATE set SQL statement; and wherein the SQL statement received is processed by translating the SQL statement into a corresponding blockchain transaction and executing the corresponding blockchain transaction against the blockchain in fulfillment of the SQL statement directed toward the materialized view at the host organization.

22. The method of claim 19, further comprising:

wherein the metadata defined for the new application represents user specified relationships between two or more of the plurality of entity types by linking together assets at the blockchain.

23. The method of claim 1, further comprising:

declaring, at the host organization, new business logic for the new application within a table structure having one or more relationships between elements of the new business logic and one or more of the plurality of entity types for the new application; and defining within the new business logic, all relationships within the metadata persisted to the blockchain.

24. The method of claim 1, further comprising:

executing an event listener to monitor for any changes to the defined metadata for the new application at the blockchain; and triggering an event when the changes to the metadata for the new application at the blockchain are observed by the event listener; and wherein the triggered event automatically pushes a metadata update to the host organization to update a materialized view of the data associated with the new application by re-structuring the materialized view at the host organization based on the metadata update triggered by the event listener.

25. The method of claim 24:

wherein triggering the event via the event listener based on changes to the metadata for the new application further comprises:

triggering one or more of:

a business user defined process flow to execute responsive to changes to the defined metadata persisted to the blockchain;

a business user defined data retrieval operation to execute responsive to changes to the defined metadata persisted to the blockchain;

a business user defined data filtering operation to execute responsive to changes to the defined metadata persisted to the blockchain;

an administrator defined process flow to update a data analytics feed responsive to changes to the defined metadata persisted to the blockchain; and an administrator defined process flow to update an Artificial Intelligence (AI) training data stream responsive to changes to the defined metadata persisted to the blockchain.

26. Non-transitory computer-readable storage media having instructions stored thereupon that, when executed by a processor of a system of a host organization providing cloud computing services, the system having at least a processor and a memory therein, cause the system to perform operations comprising:

operating a blockchain interface to the blockchain on behalf of a plurality of tenants of the host organization, wherein the host organization operates as a participating node on the blockchain to enable interactions between the host organization and the blockchain;

receiving input at the host organization, the input identifying a plurality of network participants granted access rights to a new application for deployment at the host organization, the input identifying a plurality of entity types for the new application, the input identifying one or more new field definitions for one or more of the plurality of entity types;

generating a blockchain asset having encoded therein as a metadata definition for the new application, at least (i) the plurality of network participants, (ii) the plurality of entity types, and (iii) the one or more new field definitions;

writing the metadata definition from the host organization onto the blockchain via the participating node of the host organization by transacting the blockchain asset having the defined metadata encoded therein for the new application onto the blockchain, wherein the blockchain asset has a defined transaction type that associates the metadata definition and the application with a smart contract configured to validate that data records transacted onto the blockchain for the new application are in compliance with the metadata definition;

executing an event listener to monitor any changes to the blockchain associated with the new application; and triggering an event when the changes to the blockchain associated with the new application are observed by the event listener.

27. A system to execute at a host organization providing cloud computing services, wherein the system comprises:

a memory to store instructions;

a hardware processor to execute instructions;

wherein the hardware processor is operable to execute instructions to expose a blockchain interface to the blockchain on behalf of a plurality of tenants of the host organization, wherein the host organization operates as a participating node on the blockchain to enable interactions between the host organization and the blockchain;

wherein the system is operable to receive input at the host organization from a user device, the input identifying a plurality of network participants granted access rights to a new application for deployment at the host organization, the input identifying a plurality of entity types for the new application, the input identifying one or more new field definitions for one or more of the plurality of entity types;

wherein the system is operable to generate a blockchain asset having encoded therein as a metadata definition for the new application, at least (i) the plurality of network participants, (ii) the plurality of entity types, and (iii) the one or more new field definitions;

wherein the system is operable to write the metadata definition from the host organization onto the blockchain via the participating node of the host organization by transacting the blockchain asset having the defined metadata encoded therein for the new application onto the blockchain, wherein the blockchain asset has a defined transaction type that associates the metadata definition and the application with a smart contract configured to validate that data records transacted onto the blockchain for the new application are in compliance with the metadata definition;

wherein the system is operable to execute an event listener to monitor any changes to the blockchain associated with the new application; and wherein the system is operable to trigger an event when the changes to the blockchain associated with the new application are observed by the event listener.

28. The system of claim 27:

wherein the receive interface is further to receive input from the user device declaring an event and one or more monitored event conditions for the new application declared;

wherein the declared event specifies one of: (i) a process flow to execute at the host organization responsive to occurrence of the event at the blockchain or (ii) a database transaction to execute against a database system internal to the host organization responsive to occurrence of the event at the blockchain; and wherein the system further comprises an event listener, wherein the event listener is to monitor for any change to the blockchain meeting the specified event and the one or more event conditions and trigger the declared event responsive to a monitored change on the blockchain.

* * * * *